(12) United States Patent
Akamatsu

(10) Patent No.: US 8,232,583 B2
(45) Date of Patent: Jul. 31, 2012

(54) FIELD EFFECT POWER GENERATION DEVICE

(76) Inventor: Norio Akamatsu, Tokushima (JP)

( * ) Notice: Subject to any disclaimer, the term of this patent is extended or adjusted under 35 U.S.C. 154(b) by 0 days.

(21) Appl. No.: 12/736,852

(22) PCT Filed: Jun. 16, 2009

(86) PCT No.: PCT/JP2009/002744
§ 371 (c)(1),
(2), (4) Date: Apr. 4, 2011

(87) PCT Pub. No.: WO2009/153981
PCT Pub. Date: Dec. 23, 2009

(65) Prior Publication Data
US 2011/0169276 A1 Jul. 14, 2011

(30) Foreign Application Priority Data

Jun. 16, 2008 (JP) ................................. 2008-156264

(51) Int. Cl.
*H01L 29/762* (2006.01)

(52) U.S. Cl. ................ 257/240; 257/E29.194; 257/241; 257/341; 335/296; 335/306; 607/62; 438/147

(58) Field of Classification Search ........... 257/E29.194, 257/215, 240, 241, 313, 341, 357, 390, 798; 438/75, 144, 147; 607/45, 46, 62; 315/5.34, 315/5.35; 335/296–306; 290/1 R; 74/DIG. 9
See application file for complete search history.

(56) References Cited

U.S. PATENT DOCUMENTS

| 5,635,804 | A | * | 6/1997 | Tanaka et al. | 318/139 |
| 5,635,889 | A | * | 6/1997 | Stelter | 335/306 |
| 5,886,609 | A | * | 3/1999 | Stelter | 335/306 |
| 6,069,516 | A | * | 5/2000 | Vargha | 327/390 |
| 6,670,990 | B1 | * | 12/2003 | Kochi et al. | 348/310 |
| 6,704,603 | B1 | * | 3/2004 | Gesotti | 607/62 |
| 7,204,832 | B2 | * | 4/2007 | Altshuler et al. | 606/9 |

* cited by examiner

*Primary Examiner* — Chris Chu
(74) *Attorney, Agent, or Firm* — Edwards Wildman Palmer LLP

(57) ABSTRACT

The objective is to develop a device that generates power with high efficiency and utilizes the obtained electrical energy effectively without external combustion energy such as fossil fuels or the like. Electrical energy is obtained by carriers passing through a potential barrier due to a field effect, and thus energy is pre-supplied to the carriers to increase the number of carriers contributing to electrical energy generation, whereby a highly efficient field power generation device can be realized.

16 Claims, 70 Drawing Sheets

50   49

13  8  14 thermionic emission

E : Energy
N : Number of Electrons

E : Energy
N : Number of Electrons
T : Threshold voltage $$I = A_0 S \cdot T^2 \cdot \exp\left(-\frac{b_0}{T}\right) \quad \text{[amp]}$$

where

- $I$ : emitted current in amperes
- $T$ : temperature of the source degrees Kelvin (centigrade absolute)
- $A_0$: proportionality constant ($= 4\pi m e k^2 / h^3$)
- $b_0$: ($= eE_w/k = 11{,}600 E_w$)
- $S$ : surface area, sq m Fig. 3-5. Emitted current density vs temperature for tungsten.

FIELD EFFECT POWER GENERATION DEVICE

TECHNICAL FIELD

The present invention relates to a power generation device that utilizes a field effect. Long-term use of energy obtained from fossils such as coal and petroleum is exceedingly difficult due to deterioration of the global environment and their reserve limitations. However, for the survival of humankind it is necessary to resolve environmental problems and become liberated from the problem of depletion of fossil energy by developing field effect power generation devices. The field effect power generation device of the present invention makes it possible to efficiently convert the kinetic energy of electrons accelerated by an electrical field into electrical energy.

Hence, when the field effect power generation device of the present invention acquires widespread acceptance, total emission of carbon dioxide that is a cause of global warming is curbed, emission of harmful wastes is reduced and the depletion problems attendant on fossil energy such as coal, petroleum, gas and nuclear power are resolved, that is, the field effect power generation device of the present invention has potential for stable energy supply for the long term survival of humankind.

The present invention relates to a device that generates power efficiently by injecting carriers into a channel forming material 2 from a carrier output material by utilizing the field effect, pre-supplying energy to the carriers by accelerating the injected carriers inside an acceleration channel present on the surface of the channel forming material, so that the carriers penetrate and pass through a potential barrier due to a quantum mechanical tunneling effect, and collecting the carriers in a carrier absorption collector.

RELATED ART

In the case where fossil fuels such as coal and petroleum are burned, carbon dioxide is released into the atmosphere. The carbon dioxide that is released acts as a greenhouse gas, with the result of global warming progress. However, humankind requires energy in order to maintain civilization. It is necessary to obtain electrical energy through power generation. Thus, the problems with conventional power generation devices are set forth below.

(1) Coal Power Generation
(a) Coal is present on the earth in large amounts, is low in price, and has stable supply systems. However, in the case where coal is burned, large quantities of carbon dioxide are released into the atmosphere, and the carbon dioxide that is released acts as a greenhouse gas, causing global warming.
(b) In the case where coal is burned, large amounts of nitrogen oxides and sulfur oxides are released into the atmosphere, causing acid rain and exerting adverse impacts on the global environment.
(c) Coal ash is formed by combustion of coal, the treatment of which gives rise to difficult problems of cost, location, etc.
(2) Petroleum Power Generation
(a) In the case where petroleum is burned, large quantities of carbon dioxide are released into the atmosphere, and the carbon dioxide that is released acts as a greenhouse gas, causing global warming.
(b) Reserves of petroleum are finite, the price of crude oil has soared, and there is a possibility that the supply systems become unstable.

(3) Nuclear Power Generation
(a) The atomic nuclei emit radiation, which has high potential to adversely impact human health.
(b) There are problems of cost and location in the treatment of the wastes after the nuclear fuel is spent.
(c) The safety of nuclear power generation may sometimes become a problem due to earthquake, etc.
(4) Solar Cells
(a) These do not emit carbon dioxide, but their power generation efficiency is not good.
(b) Since they use silicon, their manufacturing cost is high.
(c) They cannot be used during the night or at times when there is no sun.
(5) Wind Power Generation
(a) This does not emit carbon dioxide, but its power generation efficiency is not good.
(b) Its equipment is large-sized and therefore its manufacturing cost is high.
(c) It cannot be used at times when the wind is not blowing.

All of the conventional energy generation methods have involved devices that convert already existing energy sources into electrical energy. Energy conversion devices have various kinds of drawbacks. When considering the finiteness of fossil resources and the global environment, there is a need to create new energy sources that are sustainable. Since almost all equipments and transportation devices in civilized society consume large quantities of energy, development of power generation devices with good efficiency is desirable. There is also a need to use materials and structures that do not entail high manufacturing costs for the power generation devices. It is desirable to develop devices of which durability is fully assured, so that the price of the electricity that they generate is not a burden on the users. The field effect power generation device of the present invention is different in its principles from the conventional energy converting devices, and is able to carry out true creation of electrical energy.

The field effect power generation of the present invention represents a new method that is radically different from the conventional power generation. Therefore, it is necessary to use terminology strictly according to precise definitions, and definitions of terms are set forth below.

<Definition of Power Generation>

In the case where there are two conducting materials and an insulating material between them inside a device; without supplying external energy such as thermal energy or solar energy to the device, carriers having a positive charge or a negative charge move from one of the two conducting materials to the other conducting material. The movement of the carriers makes it possible that one of the conducting materials becomes a positive electrode having a positive charge and the other conducting material becomes a negative electrode having a negative charge, and thus electrical energy is generated. This phenomenon is defined as true electricity power generation.

<Distinction Between Power Generation and Energy Conversion>

Energy conversion is defined as what an energy source is present outside a device, external energy is put into the device, and the energy that is put in is converted into electrical energy. In the case where all output energy is generated in the interior of a device without any energy being supplied to the device from outside, that can be said to be a genuine power generation device. In the case where the energy that is output from a device is greater than the energy input from the exterior, that is a power generation device in the broad sense, since power generation is regarded as having been effected in the interior of the device.

<Theory of Field Effect Power Generation>

The normal state of a material is shown in FIG. 1. In this figure, a positive hole 49 having a positive charge and an electron 50 having a negative charge, are contained in a carrier output material 1 in almost equal quantities, and attract each other through electrostatic force according to Coulomb's law, so that it almost never happens that the positive charge or the negative charge breaks away from the carrier output material 1 and is released to the outside. However, in the case where some kind of treatment is implemented with respect to the normal-state material, a positive charge or a negative charge is released from the interior of the material and moves to another material. This case is considered below. In the example case, shown in FIG. 2, where electrons possessing negative charge move from the interior of the material to another material, the latter material, in which electrons become excessive and negative charge accumulates, becomes a power source negative voltage terminal 44, and the former material, in which electrons become deficient and positive charge remains, becomes a power source positive voltage terminal 43. When this state occurs, electrical energy is generated. If electrons move from one material to another material, negative charge accumulates in the movement destination material and positive charge remains in the movement original material. Hence, when the power source positive voltage terminal 43 and the power source negative voltage terminal 44 are electrically connected with a conductive wire, electrons move from the power source negative voltage terminal 44 to the power source positive voltage terminal 43, and thereby current flows from the power source positive voltage terminal 43 to the power source negative voltage terminal 44. When the foregoing phenomenon is considered from the viewpoint of energy, power generation is effected that is, electrical energy is generated by electrons being released from the movement original material and moving to the movement destination material. In actual fact, as shown in FIG. 3, an insulator 8 is present between the power source positive voltage terminal 43 and the power source negative voltage terminal 44. In order to generate electrical energy effectively, it is necessary to store the electrical energy temporarily in an energy accumulator 15. In the case where the energy accumulator 15 is connected between the power source positive voltage terminal 43 and the power source negative voltage terminal 44, as shown in FIG. 4, positive holes are output from the power source positive voltage terminal 43 and move to one terminal of the energy accumulator 15, and electrons are output from the power source negative voltage terminal 44 and move to the other terminal of the energy accumulator 15, so that electrical energy is accumulated in the energy accumulator 15. When an electrical load 5 is electrically connected in parallel to the energy accumulator 15, as shown in FIG. 5, the current output from the energy accumulator 15 flows to the electrical load 5, and thereby the electrical energy that has been generated is consumed. When electrons are moved from one material to another material, electrical energy is generated. Therefore, methods of effectively moving the electrons are considered. As shown in FIG. 6, one of the materials is used as a carrier output material 1, and the other material is used as an electron absorption collector 26. There is an insulator between the carrier output material 1 and the electron absorption collector 26. The reason for this is that if there were no insulator, the positive charge present in the interior of the carrier output material 1 and the negative charge present in the interior of the electron absorption collector 26 would be subjected to electrostatic force according to Coulomb's law, and the electrons would return to the carrier output material 1, so that it would not be possible to utilize the electrical energy. The case is considered where a vacuum is present as the insulator 8 between the carrier output material 1 and the electron absorption collector 26. In order to move electrons from the carrier output material 1 to the electron absorption collector 26, a channel forming material 2 is disposed as an intermediate medium in contact with the carrier output material 1. As shown in FIG. 7, in the case where the carrier output material 1 and the channel forming material 2 are electrically well connected, a potential barrier occurrence portion 20 is present between the carrier output material 1 and the channel forming material 2, and which inhibits the movement of carriers. Further, between the channel forming material 2 and the vacuum, there is a potential barrier equivalent to an irreversible process occurrence section, which prevents electrons from being emitted. Hence, in order to move the electrons present in the interior of the carrier output material 1 to the electron absorption collector 26, it is necessary to impart kinetic energy to the electrons. In the field effect power generation of the present invention, kinetic energy is imparted to the electrons by utilizing the effect of an electrical field. More precisely, an accelerating electrode is disposed to accelerate the carriers, positive voltage is supplied to the accelerating electrode from a power source, positive charge accumulates in the electrode, and an electrical field is applied between the region to which negative charge is applied and the electrode in which the positive charge is accumulated. By an effect of the applied electrical field, the electrons are accelerated and become in such a state that the electrons possess kinetic energy. The electrons possessing kinetic energy become carriers and move in the interior of an accelerating channel 9 shown in FIG. 8. When sufficient kinetic energy is imparted to the electrons, the movement of the electrons is divided into two cases, namely, the case where the electrons are injected and the case the electrons are emitted.

(1) The Case where Electrons are Injected

In general, hot carriers are generated by imparting sufficient kinetic energy to carriers such as electrons or positive holes, and the hot carriers move to a different region by passing through a potential barrier, that is called injection. This phenomenon is quantum tunneling. Since the carriers have the wave-like nature, they pass through the potential barrier and move due to the quantum tunneling effect. When the kinetic energy of the carriers is sufficiently large, ultra-hot carriers are generated. In the case where the potential barrier between one material A and the other material B is low, there occurs electron leakage to material A from material B when a large number of electrons are accumulated in material B, and thus it is impossible to enhance power generation voltage. Accordingly, in order to enhance the power generation voltage, it is necessary to set the potential barrier between material A and material B high. When the potential barrier is high, the number of electrons that penetrate and pass through the potential barrier due to the quantum tunneling effect is small. Therefore, in order to get over a high potential barrier, the carriers present in the interior of material A need to possess sufficiently large kinetic energy. However, ultra-hot carriers can get over the high potential barrier because they possess sufficient kinetic energy. This phenomenon is called ultra-hot carrier injection. In the field effect power generation device of the present invention, ultra-hot carriers are generated by effectively utilizing an electrical field, and penetrate and pass through the high potential barrier due to the quantum tunneling effect by means of the ultra-hot-carrier injection. By this, a large number of electrons are accumulated in material B and high power generation voltage is obtained. Consequently, efficient electrical power generation can be achieved. In the interior of the accelerating channel 9 shown in FIG. 9, electrons that have been injected into the channel forming material 2 from the carrier output material 1 move on the surface of the channel forming material 2. In this figure, the carrier surface movement 23 indicates that the electrons move on the surface of the channel forming material 2.

(2) The Case where Electrons are Emitted

The phenomenon of electrons breaking away from a material and being released into a vacuum is called emission. There are two types of emission: thermal emission and cold emission.

(a) In the case where thermal energy is imparted to a material (cathode), electrons acquire sufficient kinetic energy, and thus they are emitted into a vacuum even inside a weak field due to the thermal emission phenomenon.

(b) In the case where a material having an extremely thin front edge is prepared and the field concentrates at the front edge portion, electrons are emitted into a vacuum inside a strong field due to the cold emission (or field emission) phenomenon.

In order for electrons to be emitted from the interior of a material into a vacuum, the electrons need to acquire sufficient kinetic energy. More precisely, if electrons possessing sufficient kinetic energy are generated, and penetrate and pass through the high potential barrier due to the quantum tunneling effect, high power generation voltage can be obtained. As shown in FIG. 10, in the case where electrons possess sufficient kinetic energy, the electrons break away from the surface of the channel forming material 2 and are emitted into a vacuum. The movement of the electrons is indicated by the emission 22 arrow. The electrons emitted into a vacuum are accelerated in the interior of the accelerating channel 9, collide with the electron absorption collector 26, and are absorbed by the electron absorption collector 26. Accordingly, electrons become superabundant in the electron absorption collector 26, and it has negative potential. On the other hand, positive charge remains in the carrier output material 1 that has output the electrons, and it has positive potential. Hence, when the carrier output material 1 having positive potential is used as the power source positive voltage terminal and the electron absorption collector having negative potential as the power source negative voltage terminal, electrical energy is generated at both ends. In the foregoing power generation process, there is almost no energy supplied from outside. Because the electrode that generates the field is disposed in the interior of the insulator 8, there is almost no current leakage from the electrode, and so good efficiency power generation is obtained. The generated electrical energy is the result of electrons being accelerated and gaining kinetic energy due to a field effect. Thus, the field effect power generation of the present invention creates electrical energy and is different from energy conversion, and therefore there is no need for the energy conservation law to be applied to it.

<Energy Accumulator>

When a positive electrode having positive charges and a negative electrode having negative charges arise from the power generation phenomenon, the positive charge and negative charge that have arisen prevent the positive charge and negative charge that arise at the next moment from moving to the positive electrode and the negative electrode respectively. Thus, when positive charge reaches the positive electrode, the positive charge is moved to one of the terminals of the energy accumulator, and when negative charge reaches the negative electrode, the negative charge is moved to the other terminal of the energy accumulator, and thereby efficient power generation is achieved.

<Consumption of Electrical Energy>

The phenomenon whereby, when an electrical load is connected between a material possessing positive charge and a material possessing negative charge, current flows to the electrical load and the positive charge and the negative charge disappear, is called consumption of electrical energy.

<Carrier Acceleration>

If positive charges that are present inside a material move, they become positive charge carriers, and if negative charges move, they become negative charge carriers. Normally, positive charge carriers are called positive holes and negative charge carriers are called electrons. Positive charge carriers and negative charge carriers move due to electrostatic force according to Coulomb's law, which is referred to as carrier acceleration.

<Carrier Collection>

Positive charge carriers or negative charge carriers are collected by a collector, which is referred to as carrier collection.

<Potential Barrier>

In the case where movement of positive charges or negative charges is prevented by electrostatic force according to Coulomb's law, a potential barrier is present.

<Difference Between Potential Barriers in Injection and Emission>

Injection is the movement of carriers between two different materials that are electrically connected. If carriers penetrate and break through a potential barrier present at the boundary of the two different materials due to the quantum tunneling effect, injection is executed. Since the aforementioned two different materials are conducting materials or semiconducting materials, a potential barrier present at the boundary between the two different materials is in a relatively low state, so that injection can be executed even if the kinetic energy that the carriers possess is relatively small. In the case where the conducting materials are present in a vacuum, electrons are emitted into the vacuum from the conducting materials, the emitted electrons are collected by a collector, and consequently power generation can be realized. In this case, it is relatively easy to collect the electrons emitted into a vacuum and flying therein in a collector, however, it is exceedingly difficult to cause the electrons to be emitted from a conductive material into a vacuum. Supposing that external energy can be supplied to the conducting material, the electrons present in the interior of the conducting material are able to acquire sufficient kinetic energy and relatively easily emitted from the interior of the material into a vacuum. However, this is not a power generation phenomenon but a case of mere energy conversion, and fundamentally different from the power generation device of the present invention. In the case where no energy is supplied from the outside, the condition is considered where the electrons present in the interior of the conducting material acquire large kinetic energy, and are emitted into a vacuum through a potential barrier between the conducting material and the vacuum due to the quantum tunneling effect by utilizing the kinetic energy.

<Sliding and Emission>

In order to implement field effect power generation, it is necessary to cause electrons to break away from the interior of the material. Electrons can be released by using the field effect, but normally the quantity of emitted electrons is small. Hence, in order to improve power generation efficiency, a method of increasing the number of emitted electrons is developed. To consider the case where electrons break away, by means of the positive charge in the material, from the restraint due to the electrostatic force in accordance with Coulomb's law, the case where a flying body breaks away from the earth's gravitation is cited. In accordance with Newton's law of universal gravitation, a flying body is pulled toward the earth and it is difficult for the flying body to break away from the earth's gravity. In the case of rocket propulsion, the earth's gravity is overcome by causing the fuels to react explosively, and the rocket takes off from the earth surface. However, an airplane, which is a flying body, takes off by a method different from a rocket. More precisely, an airplane performs gliding before taking off. That is, immediately before taking off, an airplane moves on the surface of a runway and accelerates, and thereby the airplane body reaches such a state that possess sufficient kinetic energy, whereupon takeoff becomes possible. Likewise in the case of electrons breaking away from a material and being released into a vacuum, the electrons need to acquire sufficient kinetic energy. The electrons are also able to acquire sufficient kinetic energy by sliding on the surface of the material while accelerating, and overcome the electrostatic force according to Coulomb's law and are released out of the material. Considering the great difference between the fuels used for takeoff of an airplane and takeoff of a rocket, when electrons are released from the material after acquiring sufficient kinetic energy by accelerating the electrons on the material surface, the energy necessary for breaking away from the material becomes small and efficient. Electrons moving on a material surface while accelerating, then being emitted into a vacuum, is called sliding emission. When the plurality of electrodes are disposed inside the insulator 8 that is disposed on the surface of the channel forming material 2 and positive charge is supplied to those electrodes, the electrons that have been injected into the channel forming material 2 are subjected to accelerating force, resulting in sliding emission of the electrons. By sliding emission of the electrons, the electrons acquire sufficient kinetic energy, after which, the electrons completely break away from the material and are emitted into a vacuum. At this juncture, since the electrodes are inside the insulator, current flowing from the electrodes is almost zero, and therefore energy loss is negligible. Thus, in the present invention, good-efficiency power generation is carried out by utilizing sliding emission of electrons. When electrons are caused to move at high speed on the surface of a conducting material or semiconducting material, it becomes relatively easy to cause the electrons to break away from the material and be emitted into a vacuum, and the phenomenon of power generation is realized. The state where electrons move at high speed on the surface of a conducting material or semiconducting material is motion of the electrons in a two-dimensional plane. However, since the normal material is three-dimensional, special ingenuity is required in order to realize motion of the electrons in a two-dimensional plane inside the material. More precisely, by reducing by just one of the dimensions in which the electrons move, it becomes possible to realize motion of the electrons in a two-dimensional plane inside the material. There exist the methods set forth below for realizing motion of the electrons in a two-dimensional plane inside the material.

(1) Preparing a material with extremely small thickness.

(2) Preparing a material with few electrons which are the carriers.

Fabricating graphene using carbon-based material produces a material with extremely small thickness, so that electrons are able to move on the surface of the material in a horizontal direction, and it becomes possible to accelerate the electrons in the accelerating channel and impart large kinetic energy to the electrons. Further, if a PN junction is formed by using a P semiconductor and an N semiconductor, and the electrons which are the N semiconductor's majority carriers are injected into the P semiconductor by applying the field effect, then since electrons are minority carriers in the P semiconductor, the electrons perform sliding motion in the accelerating channel on the surface of the P semiconductor. It is then possible to accelerate the electrons in the acceleration channel on the roughly two-dimensional surface of the P semiconductor, and impart large kinetic energy to the electrons.

<Power generation condition 1> Carrier injection is performed between two different materials.

<Power generation condition 2> The electrons are caused to perform sliding emission.

<Power generation condition 3> The electrons are caused to be emitted into a vacuum.

<Power generation condition 4> The electrons emitted into a vacuum are collected by a collector.

<Power generation condition 5> The positive charges and negative charges move to an energy accumulator.

<Power generation condition 6> An electrical load is connected to both ends of the energy accumulator and current flows to the electrical load, so that the positive charges and negative charges disappear.

<Pre-Supply of Energy>

In order to perform field effect power generation well, energy is previously supplied to the electrons present inside the material. The phenomenon of electrons being emitted from inside a material into a vacuum is classified into the two types set forth below.

(1) Abrupt Emission

In the case where a field is applied to a low-temperature material from outside, electrons are field-emitted from the material. This is termed cold-cathode emission. When this happens, although the kinetic energy possessed by the electrons inside the electron-emitting material is small, the electrons are emitted by the high-field effect. In order for electrons to be field-emitted from a cold cathode, the conditions set forth below must be satisfied.

(1) A sufficiently high field is applied to the electron emitting material.

(2) The field is concentrated at the front edge portion of the material by making the radius of curvature of the edges of the electron emitting material sufficiently small.

In the case where electrons are field-emitted from a cold cathode, the electrons are emitted from inside the material into a vacuum by means of the high-field effect, without any pretreatment being carried out with respect to the electrons inside the material, and consequently there is such a drawback that the number of electrons which are emitted is extremely small. The phenomenon whereby electrons are field-emitted from a cold cathode is termed abrupt emission. In order for abrupt emission to be performed, it is necessary to cause the field that is applied from outside the material to become sufficiently intense. When abrupt emission is performed upon electrons, the emission quantity is small, and so it has been extremely difficult to perform good-efficiency power generation. More precisely, when the field that is applied is made intense, the current that leaks from the electrode becomes large, and when the radius of curvature of the front edge of the electron-emitting material is made small, weaknesses arise in the durability of the material, so that it has been difficult to perform practical power generation. Accordingly, in the present invention, the pretreatment set forth below is implemented upon the electrons prior to emission.

(2) Post-Sliding Emission

Power generation efficiency decreases when abrupt emission is performed, and thus an appropriate treatment is implemented before the electrons are emitted. The process of supplying kinetic energy in advance to the electrons is termed pre-supply of energy. By carrying out pre-supply of energy to the electrons immediately before the electrons are emitted, the number of electrons that are emitted is increased, and therefore the power generation efficiency increases. In the present invention, energy is pre-supplied to the electrons in the interior of the electron-emitting material.

The treatment whereby energy is pre-supplied to the electrons in the interior of the electron-emitting material is set forth in detail below. Electrodes are used in order to move the carriers, and voltage is applied to the electrodes. Types of electrodes are chosen according to each state of the electrons. There are five types of electrodes set forth below.

(1) Injection electrode
(2) Sliding electrode
(3) Tunneling electrode
(4) Emission electrode
(5) Accelerating electrode These five types of electrode are described in detail below.

(1) Injection Electrode

Two types of conducting or semiconducting material are present, herein referred to as material A and material B. Material A and material B are disposed electrically connected to each other. The case is considered where carriers are injected from material A into material B by means of the field effect. An insulator is disposed on the upper surface of material B and an injection electrode is disposed in the interior of the insulator. Since the carriers are injected from material A, the material A is called the carrier output material. Positive charge is supplied to the injection electrode, and negative charge to the carrier output material, from the power source. A field arises between the injection electrode to which positive charge is supplied and the carrier output material to which negative charge is supplied. Due to the effect of the field that arises, carriers are injected from the carrier output material into material B. The carriers that are injected move inside a channel formed on the surface of material B. Since a channel is formed on the surface of material B, the material B is called the channel forming material. When carriers are injected into the channel forming material from the carrier output material, due to the reverse action, anti-carriers are injected from the channel forming material into the carrier output material. In the case where the carriers are electrons, the anti-carriers are positive holes, and when electrons are injected from the carrier output material into the channel forming material, due to the reverse action, positive holes are injected from the channel forming material into the carrier output material. Conversely, in the case where the carriers are positive holes, the anti-carriers are electrons, and when positive holes are injected from the carrier output material into the channel forming material, due to the reverse action, electrons are injected from the channel forming material into the carrier output material. Since the injection electrode is disposed inside an insulator, the impedance between the carrier output material and channel forming material and the injection electrode is kept in a high state. Hence, even when voltage is applied to the injection electrode from the power source, the current leakage from the power source is an extremely minute amount, so that the power supplied from the power source also is an extremely minute amount, and the power generation efficiency rises, which means that the practicality requirement is satisfied.

(2) Sliding Electrode

An insulator is disposed on the surface of the channel forming material. An accelerating channel is formed in the vicinity of the boundary between the surface of the channel forming material and the insulator. In order for the electrons present inside the acceleration channel to move in a sliding manner, a sliding electrode is used. The sliding electrode is disposed inside the insulator. In the case where the carriers are electrons, positive charge accumulates in the sliding electrode. An attractive force according to Coulomb's law acts between the positive charge accumulated in the sliding electrode and the negative charge possessed by the electrons. Thus, the electrons move inside the channel in a sliding manner due to the field effect, and are gradually accelerated. In the case where the carriers are positive holes, negative charge accumulates in the sliding electrode. An attractive force according to Coulomb's law acts between the negative charge accumulated in the sliding electrode and the positive charge possessed by the positive holes. Thus, the positive holes move inside the channel in a sliding manner due to the field effect, and are gradually accelerated. Since the sliding electrode is disposed inside the insulator, the impedance between the carrier output material and channel forming material and the sliding electrode is kept in a high state. Hence, even when voltage is applied to the sliding electrode from the power source, the current leakage from the power source is an extremely minute amount, so that the power supplied from the power source also is an extremely minute amount, and the power generation efficiency increases, which means that the practicality requirement is satisfied.

(3) Tunneling Electrode

There is an acceleration channel on the surface of the channel forming material, and there is an irreversible process occurrence section at the rear end of the acceleration channel. More precisely, an insulator is disposed at the edge of the channel forming material. In the case where the insulator is extremely thin, it is called an insulating thin film. The insulating thin film acts as an irreversible process occurrence section with respect to the carriers, and in this irreversible process occurrence section, a potential barrier is present. In the case where the insulator is thick, the carriers are unable to get over and pass through the potential barrier. Considering from the view point of quantum mechanics, however, the carriers have the wave-like nature of electrons, and when the insulator is a thin film, some carriers can penetrate and pass through the potential barrier due to the tunneling effect. More precisely, in the case where carriers possess sufficiently large kinetic energy to become hot carriers, the hot carriers penetrate and pass through the potential barrier due to the quantum tunneling effect. In this case, in order to generate hot carriers, a tunneling electrode is employed. Since an insulator of silicone dioxide or the like is disposed between the tunneling electrode and the channel forming material, the current leakage from the tunneling electrode is extremely minute amount. Thus, the power to be supplied from the power source in order for the tunneling electrode to generate the field is extremely small. Due to the fact that the charge accumulated in the tunneling electrode and the carriers inside the channel mutually exert attractive forces based on Coulomb's law, the carriers are accelerated. Consequently, the carriers penetrate and pass through the potential barrier by means of the quantum tunneling effect. After penetrating and passing through the potential barrier, the carriers are finally collected in a carrier absorption collector. Since the carriers collected in the carrier absorption collector are unable to go back to their original state, the process whereby they penetrate and pass through the potential barrier by means of the tunneling effect is an irreversible one. New energy is generated by causing the carriers to pass through an irreversible process.

(4) Emission Electrode

In the case where the insulator disposed at the edge of the channel forming material is a thin film, then based on an effect of the tunneling electrode, carriers penetrate and pass through the potential barrier by means of the quantum tunneling effect. However, in the case where the insulator disposed at the edge of the channel forming material is a vacuum, a different phenomenon occurs. In the case where the carriers are electrons and there is a vacuum at the edge of the channel forming material, an emission electrode is used to emit electrons into a vacuum. The vacuum at the edge of the channel forming material becomes an irreversible process occurrence section, where a potential barrier is present. This potential barrier corresponds to the work function of the material. In the case where electrons possess small kinetic energy, the electrons cannot pass through the potential barrier located at the boundary between the channel forming material and the vacuum. However, in the case where electrons possess sufficiently large kinetic energy, the wavelength of the electrons having the wave-like nature becomes short, and due to the quantum tunneling effect, the electrons can pass through the potential barrier located at the boundary between the channel forming material and the vacuum. When an electrical field is applied due to the positive charge accumulated in the sliding electrode, electrons are accelerated inside the channel by the field effect, and thereby possess sufficiently large kinetic energy. Electrons possessing sufficiently large kinetic energy are emitted from the edge of the channel forming material into a vacuum. By disposing a material with good insulating qualities such as silicon dioxide in the space between the emission electrode and the channel forming material, the space is kept in a state of high resistance. Since the space between the emission electrode and the channel forming material is in a state of high resistance, even when voltage is applied to the emission electrode from the power source, the current leakage from the emission electrode is extremely minute amount. Hence, even though an emission electrode is disposed, the power loss consumed at this portion is extremely small, and so the power generation efficiency is preferable.

(5) Accelerating Electrode

An electrical field is applied due to the positive charge stored in the emission electrode, and electrons are emitted from the channel forming material by means of the field effect. The electrons having been emitted fly toward the electron absorption collector. In the initial state, no charge is accumulated in the electron absorption collector, and so the flying electrons easily reach and are absorbed by the electron absorption collector. In the case where negative charge is accumulated in the electron absorption collector, repulsive force based on Coulomb's law acts between the accumulated negative charge and the negative charge the flying electrons possess. Hence, the electrons are subjected to repulsive force from the electron absorption collector and are unable to approach the electron absorption collector. In order for the flying electrons to overcome the repulsive force from the electron absorption collector and approach the electron absorption collector, the flying electrons need to possess sufficiently large kinetic energy. In order to raise the velocity of the flying electrons, an accelerating electrode is used. The accelerating electrode is disposed forward of the flight path of the electrons, and accumulates positive charge. The positions of the accelerating electrode and the insulator are so adjusted that the flying electrons are not able to reach the accelerating electrode. The positive charge supplied from the power source to the accelerating electrode acts upon the negative charge the electrons possess in order to accelerate the flying electrons. When the flying electrons are accelerated and their kinetic energy becomes sufficiently large, the electrons overcome the repulsive force from the negative charge accumulated in the electron absorption collector, and therefore approach the electron absorption collector. When the electrons approach sufficiently close to the electron absorption collector, positive charge appears on the surface of the electron absorption collector due to electrostatic induction. This positive charge that appears on the surface of the electron absorption collector and the negative charge possessed by the electrons attract each other due to forces based on Coulomb's law, so that the flying electrons collide with the positive charge appearing on the surface of the electron absorption collector and are absorbed into the electron absorption collector. Negative charge is accumulated in the electron absorption collector having absorbed electrons, and this can be utilized as electrical energy. In order to inhibit leakage of the negative charge that is accumulated in the electron absorption collector, the electron absorption collector is disposed in the interior of the insulator.

Power generation using no fossil fuels such as coal and petroleum is described in the following patent documents.

[Patent Document 1]: Japanese Patent No. 3449623 (Title of the invention: SOLAR ENERGY CONVERTER, Inventor: Norio Akamatsu, the same as the present inventor)

In this Patent Document 1, electrical power is generated by using solar light that is an energy source outside the apparatus. More specifically, Patent Document 1 describes a power generation method in which solar light made to be received by a material is converted into thermal energy, thermal electrons are emitted from the heated material, and the thermal energy is converted into electrical energy through the thermal electron emission. In conclusion, the description in Patent Document 1 does not go beyond the mere conversion of external energy into electrical energy, and thus does not conform to the above-described Definition of "power generation". Thus, it is nothing more than an energy converter and is essentially different from the present invention. Moreover, there is a disadvantage that, for example, the solar light converter of Patent Document 1 cannot be used at night and rainy day at which almost no solar light is present. On the other hand, the field effect power generation device of the present invention requires no external energy. More specifically, in the field effect power generation device of the present invention, kinetic energy obtained by accelerating electrons is converted into electrical energy and thus, the field effect power generation device of the present invention can be regarded as a true power generation device.

[Patent Document 2]: Japanese Patent Laid-Open No. 2003-189646 (Title of the invention: SOLAR ENERGY CONVERTER AND SOLAR LIGHT ENERGY CONVERSION SYSTEM, Inventor: Norio Akamatsu, the same as the present inventor)

Also in this Patent Document 2, electrical power is generated by using solar light that is an energy source outside the apparatus. More specifically, Patent Document 2 relates to an energy converter that converts solar light into electrical energy and a system thereof. In conclusion, Patent Document 2 does not conform to the above-described Definition of "power generation". Thus, nothing more than an energy converter is described and it is essentially different from the present invention. There is a disadvantage that, for example, the solar light converter of Patent Document 2 cannot be used at night and rainy day at which almost no solar light is present. On the other hand, the field effect power generation device of the present invention requires no external energy. More specifically, in the field effect power generation device of the present invention, kinetic energy obtained by accelerating electrons is converted into electrical energy and thus the field effect power generation device of the present invention can be regarded as a true power generation device.

[Patent Document 3]: Japanese Patent Laid-Open No. 2003-250285 (Title of the invention: APPARATUS AND SYSTEM FOR THERMAL POWER GENERATION, one of the inventors, Norio Akamatsu, is the same as the present inventor)

In this Patent Document 3, electrical energy is obtained by using a large amount of thermal energy. Thus, this invention proposes nothing more than a device in which thermal energy can be converted into electrical energy. Patent Document 3 includes a description related to an energy converter that converts thermal energy into electrical energy. In this Patent Document 3, electrical power is generated by using a thermal energy source outside the device. In conclusion, Patent Document 3 does not conform to the above-described Definition of "power generation". Thus, nothing more than an energy converter is described and it is essentially different from the present invention. The thermal energy can be obtained by combustion of fossil fuels such as coal and petroleum. Carbon dioxide is produced by the use of the thermal electric generation device of Patent Document 3, and thus an adverse effect such as contribution to the global warming cannot be avoided. On the other hand, the field effect power generation device of the present invention requires no external energy at all. More specifically, in the field effect power generation device of the present invention, kinetic energy obtained by accelerating electrons is converted into electrical energy and thus the field effect power generation device of the present invention can be regarded as a true power generation device. Since power generation using a technique of Patent Document 3 was found to be quite difficult, Patent Document 3 was abandoned without request for examination.

[Patent Document 4]: Japanese Patent Laid-Open No. 2003-258326 (Inventor: Norio Akamatsu, the same as the present inventor)

In this Patent Document 4, electrical energy is obtained by using a large amount of thermal energy. Patent Document 4 includes a description related to an energy converter that converts thermal energy into electrical energy. In this Patent Document 4, electrical power is generated by using a thermal energy source outside the device. In conclusion, Patent Document 4 does not conform to the above-described Definition of "power generation". Thus, nothing more than an energy converter is described and it is essentially different from the present invention. The thermal energy can be obtained by combustion of fossil fuels such as coal and petroleum. Carbon dioxide is produced by the use of the thermal electric generation device of Patent Document 4, and thus an adverse effect such as contribution to the global warming cannot be avoided. On the other hand, the field effect power generation device of the present invention requires no external energy at all. More specifically, in the field effect power generation device of the present invention, kinetic energy obtained by accelerating electrons is converted into electrical energy and thus, the field effect power generation device of the present invention can be regarded as a true power generation device.

[Patent Document 5]: Japanese Patent Laid-Open No. 2004-140288 (Inventor: Norio Akamatsu, the same as the present inventor)

In this Patent Document 5, electrical energy is obtained by using a large amount of thermal energy. Patent Document 5 includes a description related to an energy converter that converts thermal energy into electrical energy. In this Patent Document 5, electrical power is generated by using a thermal energy source outside the device. In conclusion, Patent Document 5 does not conform to the above-described Definition of "power generation". Thus, nothing more than an energy converter is described and it is essentially different from the present invention. The thermal energy can be obtained by combustion of fossil fuels such as coal and petroleum. Carbon dioxide is produced by using the thermal electric generation device of Patent Document 5, and thus an adverse effect such as contribution to the global warming cannot be avoided. On the other hand, the field effect power generation device of the present invention requires no external energy at all. More specifically, in the field effect power generation device of the present invention, kinetic energy obtained by accelerating electrons is converted into electrical energy and thus, the field effect power generation device of the present invention can be regarded as a true power generation device.

[Patent Document 6]: Japanese Patent Laid-Open No. S49-067594 (Inventor: Toshio Hosokawa, 1974)

In this Patent Document 6, electrical energy is obtained by using a large amount of thermal energy. Thus, this invention proposes nothing more than a device in which thermal energy can be converted into electrical energy. More specifically, this invention includes a description related to an energy converter that converts thermal energy into electrical energy. On the other hand, the present invention does not propose an energy conversion device but proposes a true electric energy generation device. In Patent Document 6, electrical power is generated by using a thermal energy source outside the device. In conclusion, Patent Document 6 does not conform to the above-described Definition of "power generation". Thus, nothing more than an energy converter is described and it is essentially different from the present invention. The thermal energy can be obtained by combustion of fossil fuels such as coal and petroleum. Carbon dioxide is produced by using the thermal electric generation device of Patent Document 6, and thus an adverse effect such as contribution to the global warming cannot be avoided. The power generation device of the present invention is not a simple energy converter and true power generation can be performed therewith. In the present invention, external energy is not at all used and carriers are injected and emitted by field effect. Thus, electrical energy is generated inside the device and the obtained electrical energy can be used for the electrical load. All things considered, the power generation device of the present invention is fundamentally different from conventionally invented devices.

[Patent Document 7] Japanese Patent Examined Publication No. 11-510307

In this Patent Document 7, a field electron-emitting material and a field electron-emitting device are disclosed. However, disclosed therein are a discharging apparatus, an electron gun, and a display using emitted electrons themselves for the field emission of electrons, which completely lack the technical idea of utilizing the field emission of electrons for generating electrical power. It is to be noted that the present invention does not go against the law of energy conservation. For exact description, the law of energy conservation should be referred to as "the law of energy conservation related to energy conversion." Specifically, in energy conversion, no difference in total amount of energy exists between the energy before conversion and the energy after the conversion if the amount of loss is included. Thus, "the law of conservation of energy related to energy conversion" is rigorously established. In other words, "the law of energy conservation related to energy conversion" indicates that when generated energy is converted into another form of energy, total amount of energy before the conversion is conserved after the conversion. The law of conservation energy obviously is not applied to the present invention where energy is newly generated owing to the wave-like nature of electrons and mobility of electrons. For example, a large amount of energy generated from uranium in nuclear power generation is not a result of simple energy conversion, and thus, "the law of energy conservation related to energy conversion" is not applicable. Furthermore, "the law of energy conservation related to energy conversion" is not applicable to energy generated in the sun or to energy generated by nuclear fusion. The present inventor has proposed techniques described in the followings as power generation devices with which electrical energy can be obtained with almost no energy supply from the outside.

[Patent Document 8] WO2007/116524 (PCT/JP2006/307607) (Title of the invention: FIELD EMITTING/ELECTRIC-POWER GENERATING DEVICE, Inventor: Norio Akamatsu, the same as the present inventor)

[Patent Document 9] WO2007/122709 (PCT/JP2006/308277) (Title of the invention: LINEAR ACCELERATION GENERATOR, Inventor: Norio Akamatsu, the same as the present inventor)

[Patent Document 10] WO2007/135717 (PCT/JP2006/310026) (Title of the invention: FIELD EMISSION POWER GENERATOR, Inventor: Norio Akamatsu, the same as the present inventor)

[Patent Document 11] PCT/JP2006/317778 (Title of the invention: ELECTRONIC POWER GENERATOR, Inventor: Norio Akamatsu, the same as the present inventor)

The inventor of Patent Documents 8, 9, 10 and 11 listed above is the same as the inventor of the power generation device of the present invention. These patent documents describe that electrons are emitted and the emitted electrons are collected. However, in the techniques proposed in Patent Documents 8, 9, 10 and 11, the number of emitted electrons is small when electrical field is weak, it is difficult to collect the electrons when the electrical field is strong, electron leakage is caused by the positive voltage of an external power source, and thus the loss is large and it is difficult to obtain efficient power generation. The inventor of the present invention has made further innovation to overcome the above drawbacks, and thus proposes the power generation device of the present invention. Patent Documents 8, 9, 10 and 11 do not conform to the above-described Power generation conditions 1, 2 and 5. Specifically, injection of a carrier is performed between two different materials under Power generation condition 1. Electrons are subjected to sliding and emission under Power generation condition 2. Positive and negative charges move to the energy accumulator under Power generation condition 5.

Accordingly, almost no electrons are emitted into a vacuum even if any of the techniques described in Patent Documents 8, 9, 10 and 11 is employed, and thus a practical power generation device cannot be realized therewith. As the present invention points out, the number of electrons emitted due to field effect is dramatically increased by conforming to the three power generation conditions of Power generation conditions 1, 2 and 5, and these three power generation conditions are not at all described in the past documents. In order to implement field effect power generation, it is necessary to cause electrons to break away from the interior of a material. The electron emission can be achieved by using field effect, but the number of electrons thus emitted is generally small. In addition, the electrons need to possess sufficient kinetic energy when breaking away from the material and being emitted into a vacuum. The electrons move on the surface of the material while being accelerated, and thereby can acquire sufficient kinetic energy. By this, the electrons can overcome electrostatic force according to the Coulomb's law and are emitted out of the material. When the injected electrons are accelerated on the surface of the material to acquire sufficient kinetic energy and then are emitted from the material, the energy required for the emission becomes lower, whereby efficient emission can be obtained. The emission in which the electrons are emitted into a vacuum after moving on the surface of the material while being accelerated is referred to as sliding and emission. In the case where the plurality of electrodes are disposed in the insulator provided on the surface of the channel forming material 2 and positive charge is supplied to the electrodes, electrons injected into the channel forming material 2 receives acceleration force and thus, the sliding and emission of electrons is performed. The electrons acquire kinetic energy due to the sliding and emission, and after that, the electrons completely break away from the material and are emitted into a vacuum. Here, the electrodes are inside the insulator and thus, almost no current flows out of the electrodes. Therefore, energy loss is negligible. Accordingly, in the present invention, power generation with good efficiency can be achieved by utilizing the sliding and emission of electrons. Further, the techniques described in Patent Documents 8, 9, 10 and 11 have drawbacks described below and thus the efficiency of power generation is not good. Specifically, power generation using electrons is implemented by transferring the electrons inside a carrier output material 1 to an electron collecting collector by means of emission. Electron emission is classified into the following two types.

(1) Abrupt emission
(2) Increasing kinetic energy of electrons right before emission, that is, pre-supplying energy to the electrons In patent documents related to power generation that have been made public, kinetic energy of electrons is not increased by pre-supplying energy to the electrons right before emission. More specifically, no treatment of any kind has been performed on electrons in the period that the electrons are present in a carrier output material. Therefore, the electrons inside the material are subjected to the abrupt emission by electrical field, and thus the number of emitted electrons is extremely small, whereby practical power generation cannot be achieved. On the other hand, in the electrical field power generation of the present invention, since kinetic energy of the electrons is increased by pre-supplying energy to the electrons right before the emission, the number of emitted electrons can be increased, power generation output is increased, and thus the power generation becomes more practical. To overcome the drawbacks, a channel forming material is provided between the carrier output material and the electron collection collector, and the injection electrode is used for causing the electrons to be easily injected from the carrier output material to the channel forming material. Further, the sliding electrode is disposed to increase kinetic energy of the electrons inside the channel forming material, and the tunneling electrode is used for causing the electrons to pass through a potential barrier due to the quantum tunneling effect. The emission electrode is used for causing the electrons to be emitted into a vacuum from the interior of the material. Still further, the accelerating electrode is used for accelerating the emitted electrons and increasing the kinetic energy of the electrons. Accordingly, the electrons can reach the electron absorption collector that has high potential barrier, whereby the number of emitted electrons is successfully increased. As a result, power generation output can be increased. However, the techniques described in Patent Documents 8, 9, 10 and 11 do not refer to pre-supplying energy to the electrons that are about to be emitted and thus, the number of emitted electrons is small and power generation efficiency thereof is not good. Moreover, with the techniques described in Patent Documents 8, 9, 10, and 11, when collecting electrons, repulsive force according to the Coulomb's law acts between the electrons that have been accumulated and the electrons to be newly accumulated, and thus the accumulated charges cannot be increased. Specifically, conventional devices are not provided with the energy accumulator proposed in the present invention. A positive electrode of an external power source and electrons to be collected can be paired in a conventional technology. However, in such a technique, a positive charge is supplied from an external power source when a pair of electrical charge of a carrier and a charge having sign opposite therefrom is dissolved so as to use the carrier as electrical energy. Thus, power generation loss becomes large and the power generation efficiency is difficult to be improved. In the present invention, the energy accumulator is provided and a pair of an electron and a positive hole is formed in the energy accumulator. Thus, almost no energy is supplied from the external power source. Therefore, almost no energy is lost in the power generation using the device of the present invention and the power generation can be performed with good efficiency. In the present invention, the acceleration channel is set to further improve the power generation efficiency. In the above mentioned acceleration channel, the carrier acceleration device is used to accelerate carriers. Usable electrical energy is generated via an irreversible process with the accelerated carriers passing through the potential barrier. However, in patent documents of the past, no technique of accelerating the carriers in the acceleration channel before getting over the potential barrier is described and thus, there has been a drawback that power generation efficiency cannot be improved. The acceleration of electrons due to field effect increases kinetic energy of the electrons. However, power generation techniques described in patent documents that have been made public includes no idea of converting the kinetic energy of electrons into electrical energy. The increase in kinetic energy of the electron increases the speed of the flying electrons. When high-speed electrons collide with the material, the kinetic energy of the electrons is lost and the temperature of the material rises. In other words, the kinetic energy of the flying electrons is converted into kinetic energy of electrons inside the material when the electrons collide against the material. Consequently, the kinetic energy of the electrons present inside the material which the electrons have collided against increases. In no conventional power generation device, the kinetic energy of electrons inside the material is converted into electrical energy to be used. Energy can always be utilized through conversion and thus, the present invention describes that the kinetic energy of the colliding electron can ultimately be used as electrical energy.

RELATED-ART DOCUMENTS

Patent Documents
  Patent Document 1: Japanese Patent No. 3449623
  Patent Document 2: Japanese Patent Laid-Open No. 2003-189646
  Patent Document 3: Japanese Patent Laid-Open No. 2003-250285
  Patent Document 4: Japanese Patent Laid-Open No. 2003-258326
  Patent Document 5: Japanese Patent Laid-Open No. 2004-140288
  Patent Document 6: Japanese Patent Laid-Open No. S49-067594
  Patent Document 7: Japanese Patent Examined Publication No. 11-510307
  Patent Document 8: WO2007/116524
  Patent Document 9: WO2007/122709
  Patent Document 10: WO2007/135717
  Patent Document 11: PCT/JP2006/317778

SUMMARY OF THE INVENTION

Problem(s) to be Solved by the Invention

In Patent Documents 1, 2, 3, 4, 5 and 6, electrical power is generated by using external energy such as fossil fuels of coal and petroleum and solar light. The problems such as depletion of fossil fuels and environmental destruction cannot be addressed with power generation using external energy. Furthermore, power generation using solar light cannot be a primary energy supply source because power cannot be generated at night or rainy day. With the field effect power generation of the present invention, power generation using no external energy source is implemented. The present inventor has proposed the power generation using no external power source with Patent Documents 7, 8, 9 and 10. Still, Patent Documents 7, 8, 9 and 10 describe techniques in which electrons in a material are directly emitted into a vacuum by utilizing a field. Among the above-described examples of plane takeoff and rocket launch, the techniques for emitting electrons from a material proposed in Patent Documents 7, 8, 9 and 10 correspond to the rocket launch. Thus, as electrons are abruptly emitted in the techniques for emitting electrons from a material described in the past patent documents, such techniques are referred to as an abrupt emission. The number of electrons emitted, based on the abrupt emission technique, is extremely small and thus, a large amount of power cannot be generated. The abrupt emission corresponds to a technique for launching a rocket and therefore requires a large amount of energy. On the other hand, with the sliding and emission technique that corresponds to a technique for making a plane take off after gliding on a runway, a large number of electrons can be emitted even if the amount of energy supplied is small. The kinetic energy of the electrons is increased right before the emission. Thus, an objective of the field effect power generation of the present invention lies in the pre-supply of energy to electrons. In the present invention, energy is pre-supplied to carriers by using the injection electrode, the sliding electrode, the tunneling electrode, the emission electrode and the accelerating electrode to achieve the objective. If the technique in which abrupt emission is performed on electrons in a material is employed to generate electrical power in the field effect power generation, the number of electrons emitted is small and power generation efficiency is low. On the other hand, if kinetic energy is supplied to the electrons right before the emission, the number of emitted electrons is large and power generation efficiency is improved. Accordingly, energy needs to be pre-supplied to the electrons to improve the power generation efficiency of the field effect power generation. Three types of techniques described below can be used to pre-supply energy.

(1) In the field effect power generation of the present invention, electrical power is generated by moving carriers due to an electrical field. The carriers are injected from the carrier output material into the channel forming material. The kinetic energy of the carriers increases as the carriers are accelerated by moving on the surface of the channel forming material in a sliding manner, whereby the number of carriers that contribute to the power generation increases. Thus, with the effects of the injection electrode and the sliding electrode, energy is pre-supplied to the carriers in the period that the carriers are held in the material to increase the number of carriers contributing to the power generation.

(2) In the field effect power generation of the present invention, a cascade system (or relay system) is employed to pre-supply kinetic energy of the electrons that have been emitted and accelerated to the electrons to be emitted next, whereby the generated energy is efficiently used. The cascade system includes the following two types of methods.

(2.1) Direct Emission Method of Electron

Direct emission method of electron is also referred to as secondary electron emission method. An electron flying in a vacuum is defined as a primary electron. In the case where the primary electron collides with a secondary electron-emitting member, electrons are knocked out of the secondary electron-emitting member by the kinetic energy of the primary electron. The knocked-out electron is defined as a secondary electron. If the kinetic energy of the primary electron is large, electrons to be collected by the electron absorption collector are emitted from the material with a large number of secondary electrons being knocked out, whereby the number of electrons contributing to the power generation increases. Thus, power generation output is increased by the direct emission method of electron. In other words, the number of carriers contributing to the power generation is increased by employing the secondary electron emission method to pre-supply energy to the electrons in the period that the electrons are held inside the material.

(2.2) Indirect Emission Method of Electron

A directly heated tube and an indirectly heated tube are examples of a cathode of a vacuum tube (electron tube). In a vacuum tube in which a cathode is directly heated, the temperature of the cathode is increased by applying current to the cathode. In a vacuum tube in which a cathode is indirectly heated, a heater is used separately from the cathode. The current is applied to the heater to raise the temperature of the heater and the heat of the heated heater is conducted to the cathode. Thus, the temperature of the cathode is indirectly raised. In the case where the electron emitted into a vacuum and accelerated collides against the electron absorption collector, the kinetic energy of the electron is converted into thermal energy due to the collision. The heat generated due to the collision is conducted to the material that possesses an electron to be emitted next. Thus, the temperatures of the carrier output material and the channel forming material in contact therewith rise. Accordingly, kinetic energy of electrons in the carrier output material increases, whereby the number of electrons injected from the carrier output material into the channel forming material increases. Furthermore, the kinetic energy of the electrons in the channel forming material increases. The increase in the kinetic energy of the electrons contributes to an increase in power generation output. In a cascade system including N stages, thermal energy of an electron absorption collector of a first stage is conducted to a carrier output material and a channel forming material of a second stage. The thermal energy is propagated to a third stage and thereafter to be finally propagated to an electron collecting collector of an Nth stage. Thus, the number of electrons contributing to the power generation is increased by employing the cascade system to pre-supply energy to electrons in the period that the electrons are held inside a material. A system in which thermal energy generated in the electron collecting collector of the Nth stage is feedbacked to the carrier output material and the channel forming material of the first stage belongs to a thermal feedback system that is described next.

(3) In the case where the thermal feedback system is employed in the field effect power generation of the present invention, a heat conductor is disposed to be in contact with the electron absorption collector and the thermal energy generated when an electron collides with an electron absorption collector is feedbacked to a carrier output material and a channel forming material. Thus, the kinetic energy of the accelerated electron is pre-supplied to the electron to be emitted next. In the case where the cascade system including N stages and the thermal feedback system are both employed, collision of flying electrons raises the temperatures of the carrier output material and the channel forming material of a first stage, a second stage, . . . , and an Nth stage, and the thermal energy generated in the electron absorption collector of the Nth stage is feedbacked to the carrier output material and the channel forming material of the first stage. Thus, power can be generated with extremely high efficiency. Therefore, energy can be pre-supplied to electrons by employing the thermal feedback system in the period that the electrons are held in a material. Thus, the number of electrons contributing to the power generation increases and the power generation efficiency improves. It is described below that in the field effect power generation of the present invention, power generation efficiency is dramatically improved by employing the above-mentioned pre-supply of energy compared with any of the power generation systems that have been proposed.

Problems to be solved by the field effect power generation device of the present invention are described below.

(1) In the field effect power generation device of the present invention, energy is pre-supplied to carriers to increase the number of electrons contributing to the injection. Therefore, the power generation output of the field effect power generation device of the present invention is increased.

(2) In the field effect power generation device of the present invention, energy is pre-supplied to electrons on the basis of an effect of electrical field. Thus, the number of electrons contributing to the emission is increased and only a small amount of power is lost by generating the electrical field. Therefore, the power generation with high efficiency can be obtained.

(3) The field effect power generation device of the present invention is light-weight, small, and generates power with high efficiency by employing the thermal feedback system for pre-supplying energy to electrons.

Means for Solving Problem(s)

The features of the field effect power generation device of the present invention are set forth below.

(1) In the field effect power generation device of the present invention, energy is pre-supplied to electrons to increase the number of electrons contributing to emission. Thus, the power generation output of the field effect power generation device of the present invention is large.

(2) In the field effect power generation device of the present invention, energy is pre-supplied to electrons on the basis of an effect of electrical field. Thus, only a small amount of power is lost for field generation, and the power generation efficiency is high.

(3) In the field effect power generation device of the present invention, energy is pre-supplied to electrons by employing the thermal feedback system. Thus, the field effect power generation device of the present invention is small-sized and light-weight, and can generate power with high efficiency.

(4) In the field effect power generation device of the present invention, glass and stainless plates are used for a carbon-based material, an insulator and a vacuum vessel, so that there is almost no deterioration. Thus, the field effect power generation device of the present invention has high durability and a long service life.

(5) The field effect power generation device of the present invention can be manufactured by simply installing a field generating electrode, the carbon-based material, and the insulator in the vacuum vessel, and thus has a simple structure and can be readily manufactured.

(6) Heavy use of the field effect power generation device of the present invention does not lead to environmental destruction because no toxic materials are used therein.

(7) In the field effect power generation device of the present invention, the electrode is disposed in the vacuum vessel. Thus, only a deteriorating electron emission material needs to be replaced. Accordingly, long-term use of the field effect power generation device leads to a substantial reduction in maintenance cost.

Compared with a conventional power generation device, the field effect power generation device of the present invention has the following features.

(1) In a conventional power generation device, electrons are emitted into a vacuum through abrupt emission, and thus the number of emitted electrons is small. Therefore, power generation output of the conventional power generation device is extremely small. On the other hand, in the field effect power generation device of the present invention, energy is pre-supplied to electrons to increase the number of electrons involved in emission. Thus, the power generation output of the field effect power generation device of the present invention increases.

(2) In the field effect power generation device of the present invention, energy is pre-supplied to electrons on the basis of an effect of electrical field. Thus, only a small amount of power is lost for field generation and power generation efficiency is high.

(3) In the field effect power generation device of the present invention, energy is pre-supplied to electrons by employing the thermal feedback system. Thus, the field effect power generation device of the present invention is small-sized, light-weight, and can generate power with high efficiency.

(4) In the field effect power generation device of the present invention, glass and stainless plates are used for a carbon-based material, an insulator and a vacuum vessel, so that there is almost no deterioration. Thus, the field effect power generation device of the present invention has high durability and a long service life.

(5) The field effect power generation device of the present invention can be manufactured by simply installing the field generating electrode, the carbon-based material, and the insulator in the vacuum vessel and thus has a simple structure and can be readily manufactured.

(6) Heavy use of the field effect power generation device of the present invention does not lead to environmental destruction because no toxic materials are used therein.

(7) In the field effect power generation device of the present invention, the electrode is disposed in the vacuum vessel. Thus, only the deteriorating electron emission material needs to be replaced. Accordingly, long-term use of the field effect power generation device leads to a substantial reduction in maintenance cost.

Due to the above-mentioned features, the field effect power generation device of the present invention is convinced to be highly practical.

Advantages of the Invention

<Advantage 1>

In the field effect power generation device described in claim (1), as schematically described in FIG. 11 that is a block diagram illustrating main portions of the present invention, the carrier output material 1 and the channel forming material 2 are disposed on a substrate 19. The carrier output material 1 and the channel forming material 2 are electrically connected with each other. The insulator 8 is disposed partially or entirely on the surface of the channel forming material 2. An electrode of a carrier accelerator 60 is disposed in the insulator 8. Voltage is applied to the electrode of the carrier accelerator 60 from a power source. Thus, the carrier accelerator 3 is formed. By an effect of the carrier accelerator 3, a part of the accelerating channel 9 is formed on the surface of the channel forming material 2 on which the insulator 8 is provided. The following describes the carrier accelerator 3 in detail. FIG. 12 shows a block diagram illustrating the inside of the carrier accelerator 3 in the field effect power generation device of the present invention. The carrier accelerator 3 comprises a power source 30, the electrode of the carrier accelerator 60 and the insulator 8. The electrode of the carrier accelerator 60 is disposed in the insulator 8. The power source 30 and the electrode of the carrier accelerator 60 are electrically connected with each other. Negative or positive charges are supplied to the electrode of the carrier accelerator 60 from the power source 30.

Carriers in the carrier output material 1 are injected into the channel forming material 2 from the carrier output material 1 by an effect of an electrical field applied by the electrode of the carrier accelerator 60. The carriers injected into the channel forming material 2 are accelerated and move in the accelerating channel 9. More specifically, the carriers move in a sliding manner and can obtain kinetic energy. A carrier which can acquire sufficient kinetic energy greater than threshold value can penetrate the high-potential barrier of an irreversible process occurrence section 4 due to quantum tunneling effect. The carriers moving at high speed are eventually collected in the carrier absorption collector 28 disposed at an edge of the accelerating channel 9. The carriers collected in the carrier absorption collector 28 are fed to one of the input terminals of an energy accumulator 15. Anti-carriers remaining in the carrier output material 1 are fed to the other input terminal of the energy accumulator 15. The carriers and the anti-carriers are accumulated in the energy accumulator 15 in pairs, whereby carriers and anti-carriers injected later in time are not interfered in their movement while being accelerated. Thus, a large amount of energy is accumulated in the energy accumulator 15. The carriers and the anti-carriers are supplied to the electrical load 5 by connecting the electrical load 5 in parallel with the energy accumulator 15. As a result, the energy obtained as a result of the generation of the carriers and the anti-carriers is consumed in the electrical load 5. A device that injects carriers can be readily manufactured by using integrated circuit technology. Thus, the field effect power generation device of the present invention can generate electrical power with higher efficiency compared with conventional field effect power generation devices. Moreover, in the field effect power generation device of the present invention, electrical energy can be accumulated in the energy accumulator 15 by moving both of the carriers and anti-carriers to the energy accumulator 15 quickly, whereby the power generation efficiency is excellent. The energy accumulator 15 is described below in detail. The energy accumulator 15 is illustrated in FIG. 13. In this figure, a positive charge input/output portion 16 of the energy accumulator 15 and a negative charge input/output portion 17 of the energy accumulator 15 are illustrated. The energy accumulator 15 has an energy input mode and an energy output mode, and the energy input mode of the energy accumulator 15 is illustrated in FIG. 14. In the energy input mode, the positive charge input/output portion 16 of the energy accumulator 15 receives positive charges. A typical example of positive charges is positive holes. In the energy input mode, the negative charge input/output portion 17 of the energy accumulator 15 receives negative charges. A typical example of negative charges is electrons.

The negative charges and positive charges fed to the energy accumulator 15 are accumulated to form a dipole therein or may be accumulated in another form of energy by being converted. Another form of energy includes electro-chemical ion. Examples of electro-chemical conversion include a rechargeable battery and conversion into hydrogen. The charges can be converted into hydrogen to be accumulated in the energy accumulator 15. Here, hydrogen can be output as electrical energy with a fuel cell. If the carriers obtained in the power generation device of the present invention remain in the collector, the remaining carriers prevent the subsequently emitted carriers from reaching the collector. Thus, the carriers that have reached the collector need to be sent to the energy accumulator. If only a small number of carriers remains in the collector, the carriers subsequently approaching the collector can finally reach the collector to be absorbed therein without being interfered.

The energy output mode of the energy accumulator 15 is illustrated in FIG. 15. When the energy accumulated in the energy accumulator 15 is output, carriers having positive charges are output from the positive charge input/output portion 16 and carriers having negative charges are output from the negative charge input/output portion 17. The output positive charge carriers and the negative charge carriers are neutralized through recombination of the positive charge carriers and the negative charge carriers in the electrical load 5. At this point, energy is supplied to the electrical load.

Monopole means a single polarity and dipole means two polarities. For example, in the case where electrons are absorbed in a conductive material, a monopole is formed, whereas in the case where positive and negative charges are respectively accumulated in two conductive materials that are electrically insulated from each other, but arranged close to each other, a dipole is regarded to be formed. As an example of monopole, as shown in FIG. 16, the case where a large number of carriers having negative charges is absorbed in a conductive material is considered below. The conductive material accumulates a large number of carriers having negative charges, and thus has high negative potential. Accordingly, an electrical field in the directions indicated by the arrows in the figure is present in the vicinity of the conductive material. In the case where an electron 50 approaches the conductive material possessing a large amount of negative charges, the repulsive Coulomb's force acts between the negative charges of the conductive material and the negative charges of the electron 50. Thus, the electron 50 cannot approach the conductive material possessing a large amount of negative charges. In order to cause the electron 50 to approach the conductive material having a large amount of negative charges, the electron 50 needs to possess a large amount of kinetic energy. Therefore, the electron 50 needs to be accelerated to a high speed in the accelerating channel 9. A strong electrical field is required for the acceleration to high speed and a high voltage is required to apply such a strong electrical field. When a high voltage is applied to the electrode, electrical charges leak through the insulator 8 provided between the positive electrode and the negative electrode. The leaked electrical charge needs to be compensated by using an external power source. Thus, the power consumption of the external power source is increased. When the external power loss is increased, the overall power generation efficiency in the power generation system is decreased, whereby the system becomes less practical. Thus, supplying voltage higher than necessary from the external power source increases the loss, and is not preferable. Thus, in order to establish an efficient power generation system with relatively low voltage, it is necessary to avoid leaving the generated electricity in a monopole state. In order to do so, the carriers generated in the power generation device need to be stored in a dipole state. Such a method can improve power generation efficiency.

As an example of a dipole, as shown in FIG. 17, the state where positive and negative charges are present very close to each other is considered. In practice, as shown in FIG. 18, negative charges are accumulated in a negative charge accumulation conductor 13, positive charges are accumulated in a positive charge accumulation conductor 14, and the insulator 8 is disposed between the two conductors to prevent the positive and the negative charges from coupling. FIG. 19 shows the case where the electron 50 approaches the dipole. In the figure, electrical lines of force emanating from the positive charges and terminating on the negative charges are represented by curved lines with arrows. Almost all the electrical lines of force are present in the vicinity of the positive and negative charges because they are very close to each other. Thus, the electrical field applied between the positive and negative charges remains in the local area where the positive and negative charges are present. Accordingly, even when an electron approaches the negative charges in the dipole state from the outside, almost no electrical fields of the dipole affect the electron. Specifically, the positive and negative charges in a dipole state are almost neutral when remotely observed, and thus exerts almost no force based on Coulomb's law to the outside. Accordingly, the electron 50 approaching the dipole from the outside can approach the negative charges even when the electron 50 has low kinetic energy. This is because the repulsive Coulomb's force acting between the charges with the same signs is canceled out due to the effect of the positive and negative charges being close to each other. When an electron 50 having a negative charge approaches sufficiently the negative charge accumulation conductor 13, positive charges appear on the surface of the negative charge accumulation conductor 13 due to the electrical induction phenomenon, and the attractive Coulomb's force acts between the appearing positive charges and the electron approaching from the outside. Thus, the electron approaching from the outside collides with the negative charge accumulation conductor 13 and is absorbed therein.

According to the above consideration, in the input mode of the dipole, if the positive and negative charges generated by the power generation are made in a dipole state, the amount of positive and negative charges of the dipole can be increased by supplying new carriers to the conductive material through the accelerating channel 9. If the accumulated amount of positive and negative charges increases, the voltage between the positive charge accumulation conductor 14 and the negative charge accumulation conductor 13 of the dipole increases. In the output mode of the dipole, when the electrical load 5 is connected to the positive electrode and the negative electrode of the dipole, the positive charges accumulated in the positive charge accumulation conductor 14 and the negative charges accumulated in the negative charge accumulation conductor 13 are recombined by the current flowing in the electrical load 5, neutralized, and disappeared. At this point, electrical energy is supplied to the electrical load by the current flow and consumed in the electrical load. The total amount of current that flows in the electrical load corresponds to the amount of accumulated positive and negative charges, and thus a large amount of power can be obtained by a large amount of accumulated positive and negative charges. In the case where a dipole has an input mode and an output mode, the dipole is referred to as a separable dipole which is capable of separating positive and negative charges. In the power generation device of the present invention, power generation efficiency can be improved by using the separable dipole. An example of a dipole which is difficult to be separated includes an atom configured by disposing an electron possessing a negative charge around the nucleus possessing a positive charge. Separation of an electron and a proton from the atom is difficult also in terms of energy. According to an experiment, if negative charges generated by power generation are accumulated in a monopole, potential of the monopole rises sharply and reach several thousands of volts within a short period of time. However, the amount of electrical charges accumulated in the monopole is extremely small and thus, when the electrical charges are emitted through the electrical load 5, the accumulated charges disappear with small current flowing. As a result, high voltage and small current are obtained in the power generation method using a monopole. Since the electricity is a product of voltage and current, the monopole type power generation cannot provide large electricity and thus, is extremely less practical. All the conventional inventions related to power generation employs the monopole type power generation and thus, have been rarely used in practice. On the other hand, the present invention employing the dipole type can supply sufficient current, and thus has a feature of guarantying extremely high practicality. Moreover, in the field effect power generation device of the present invention, there is no need to supply carriers with energy for penetrating and breaking through large work function required for emitting the electron into a vacuum, and only energy required for the injection inside the material is supplied to the carriers by means of the field effect. Consequently, kinetic energy of the carriers can be increased, and thus electrical power can be generated by converting the kinetic energy of the carriers into electrical energy. An electrical field is applied by supplying electrical charges to the electrodes disposed in the insulator 8. Almost no current leaks from the electrodes and thus, large electrical power can be obtained with extremely small electrical power supplied from an external power source. Accordingly, the field effect power generation device of the present invention has extremely high power generation efficiency. In other words, the field effect power generation device of the present invention has the feature that the energy supplied from an external power source is extremely small, and thus excellent power generation efficiency can be obtained. Hence, the device can be regarded to be sufficiently practical.

<Advantage 2>

In the field effect power generation device described in claim (2), in addition to the operations and advantageous effects of the configuration described in claim (1), is configured by the carrier accelerator includes a plurality of power sources and a plurality of electrodes. The electrodes of the carrier accelerator are electrically connected to the plurality of power sources, and the plurality of electrodes of the carrier accelerator is disposed around the channel forming material through the insulator. Thus, the accelerating channel is formed. An electrical field applied by an effect of the voltage applied to the electrodes of the carrier accelerator affects the carriers, so that the carriers are injected from the carrier output material into the channel forming material. In the field effect power generation device of the present invention, the case where the carrier accelerator is formed by a plurality of electrodes is illustrated in FIG. 20. As illustrated in the figure, the insulator 8 is disposed on the upper surface of the channel forming material 2, and a first electrode of the carrier accelerator 61 and a second electrode of the carrier accelerator 62 are disposed in the insulator 8. In the same figure, the power source 30 is an external DC power source. However, the power source 30 is depicted to be placed close to the electrodes in the figure. The case where the accelerating channel is formed between the channel forming material and the insulator is illustrated in FIG. 21. Electrical lines of force illustrated in FIG. 21 are generated when voltage is applied to the first electrode of the carrier accelerator 61 and the second electrode of the carrier accelerator 62 by using the power source 30. The accelerating channel 9 is formed in the vicinity of the border between the channel forming material 2 and the insulator 8. The injected carriers are present in the accelerating channel 9 and move on the surface of the channel forming material 2. By the effect of the electrical field applied by the first electrode of the carrier accelerator 61 and the second electrode of the carrier accelerator 62, the carriers are accelerated in the accelerating channel 9. The carriers obtain kinetic energy by being accelerated in the accelerating channel 9 due to the effect of the electrical field. Thus, based on the kinetic energy that the carriers injected into the channel forming material obtain, the carriers can penetrate the irreversible process occurrence section due to the quantum tunneling effect. Accordingly, the number of carriers collected in the carrier absorption collector is increased compared with the conventional power generation methods that have been proposed. The carries collected by the carrier absorption collector is fed to one of the input terminals of the energy accumulator and the anti-carriers remaining in the carrier output material are fed to the other one of the input terminals of the energy accumulator. The carriers and the anti-carriers are accumulated in the energy accumulator in pairs. Thus, acceleration and movement of carriers and anti-carriers to be injected later in time are not interfered, and thus a large amount of energy is accumulated in the energy accumulator. The carriers and the anti-carriers are supplied to an electrical load by connecting the energy accumulator and the electrical load in parallel. Thus, electrical energy generated by the carriers and the anti-carriers is consumed in the electrical load. The carriers can be easily injected by using an integrated circuit technique. In conclusion, the field effect power generation device of the present invention has a definitive feature that the energy loss in the accelerating channel is almost zero because the electrodes are disposed in the insulator and the carriers are accelerated in the accelerating channel. All things considered, the field effect power generation device can generate electrical energy more efficiently compared with the conventional power generation devices. When a plurality of power sources for field generation is used and also a plurality of electrodes of the carrier accelerator 3 is disposed, kinetic energy of the electrons increases, electricity generated by the power generation increases, and the power generation efficiency improves. Here, a plurality of batteries can be used as the power sources. The power sources can be generated by an AC/DC converter using a transformer and a rectifier. A high voltage can be obtained by applying the voltage generated in the field effect power generation device of the present invention to a plurality of capacitors connected in parallel in order to charge all the capacitors at once and then connecting the charged capacitors in series. An electrical field can be applied to the electrodes by using a high voltage generated by the serial connection of the capacitors and the acceleration and sliding movement in a sliding manner of the carriers in the field effect power generation device can be achieved by the applied electrical field.

<Advantage 3>

In the field effect power generation device described in claim (3), in addition to the operations and advantageous effects of the configuration described in claim (1), when an N-type semiconductor is used as the carrier output material and a P-type semiconductor is used as the carrier input material, the N-type semiconductor and the P-type semiconductor are electrically connected to each other to form a PN junction. The insulator is provided entirely or partially on the surface of the P-type semiconductor, the electrodes of the carrier accelerator are disposed in the insulator, and voltage is applied to the electrodes of the carrier accelerator by using the power source. Thus, the carrier accelerator is formed. By the effect of the carrier accelerator, a part of the accelerating channel is formed on the surface of the P-type semiconductor on which the insulator is provided. Movement of the carriers in the vicinity of the carrier output material 1 and the channel forming material 2 is illustrated in FIG. 22. The carrier output material 1 is disposed while being electrically connected to the channel forming material 2. In the case where the N-type semiconductor 11 is used as an example of the carrier output material 1, the N-type semiconductor 11 is heavily doped with impurities, that is, in a heavily doped state. In the case where the P-type semiconductor 10 is used as an example of the channel forming material 2, the N-type semiconductor 11 and the P-type semiconductor 10 form a PN junction. A positive potential terminal of a first power source 31 is connected to a first electrode of the carrier accelerator 61, whereas a negative potential terminal of the first power source 31 is connected to the carrier output material 1. An electrical field formed by the carrier accelerator 3 is applied between the first electrode of the carrier accelerator 61 and the carrier output material 1 (N-type semiconductor 11). The carriers are injected into the channel forming material 2 from the carrier output material 1 by the applied electrical field. In the example where the PN junction is formed, electrons are injected as the carriers. The injected carriers move in the accelerating channel 9 in a sliding manner, while being accelerated, and thus acquire sufficient kinetic energy. The direction and the magnitude of the movement of the carriers are determined by the electrical field applied by the carrier accelerator 3. Coulomb force 81 applied by the electrical field on the carriers is represented by vectors. A positive potential terminal of a second power source 32 is connected to a second electrode of the carrier accelerator 62, whereas a negative potential terminal of the second power source 32 is connected to the carrier output material 1. An electrical field is applied between the second electrode of the carrier accelerator 62 and the carrier output material 1. The Coulomb force 81 applied on the carriers represents the direction and the magnitude of the carrier movement caused by the applied electrical field. The Coulomb force 81 applied on the carriers is represented by vectors. The Coulomb force 81 acting on the two carriers illustrated in the figure is represented by two vectors, and their summation makes the resultant vector 82. The first electrode of the carrier accelerator 61 and the second electrode of the carrier accelerator 62 are both disposed in the insulator 8. A typical example of the insulator 8 is silicon dioxide. An example is described below where the N-type semiconductor 11 serves as the carrier output material 1, the P-type semiconductor 10 serves as the channel forming material 2, and the PN junction is formed. With the resultant vector 82 applied on the PN junction, electrons, which are the majority carriers in the N-type semiconductor 11 serving as the carrier output material 1, are injected into the P-type semiconductor 10 serving as the channel forming material 2. In the P-type semiconductor, the injected electrons are the minority carriers and an inversion layer is formed in the P-type semiconductor on the side closer to the insulator 8. When an inversion layer in which the carriers move is formed on the surface of the channel forming material 2, the inversion layer serves as the channel. The injected carriers move in a sliding manner in the accelerating channel 9 to obtain large kinetic energy. In the channel on the surface of the channel forming material 2, the injected electrons receive Coulomb force by the effect of the electrical field. The resultant vector 82 illustrated in the figure is formed by combining two vectors represented by arrows based on vector computation. The resultant vector is directed in the direction of the border line between the insulator 8 and the P-type semiconductor 10 by adjusting the voltage of the first power source 31 and the voltage of the second power source 32. Thus, the electrons injected into the P-type semiconductor 10 move in a sliding manner on the surface of the P-type semiconductor 10 on which the insulator 8 is provided by appropriately adjusting the voltages of the two power sources. Eventually, the electrons injected into the P-type semiconductor 10 are absorbed by the electron absorption collector 26 (not shown in the figure).

The injection of the electrons from the N-type semiconductor 11 to the P-type semiconductor 10 leads to the injection of positive holes from the P-type semiconductor 10 to the N-type semiconductor 11. Thus, the positive holes reach the N-type semiconductor 11 and positive charges are accumulated therein. If the energy accumulator 15 is connected between the N-type semiconductor 11 serving as the carrier output material 1 and the electron absorption collector 26, the positive holes and the electrons are accumulated therein in pairs. If the electrical load 5 is connected in parallel with the energy accumulator 15, the electrons accumulated in the electron absorption collector 26 and the positive holes accumulated in the N-type semiconductor 11 are neutralized via the electrical load 5 to disappear electrically. At this point, electrical energy is supplied to the electrical load 5. The electrical energy is generated by accelerating the carriers based on the field effect. The effect of the electrical field applied by the electrodes of the carrier accelerator causes the electrons in the N-type semiconductor to be injected into the P-type semiconductor. The electrons injected into the P-type semiconductor are accelerated through sliding movement in the accelerating channel 9. The carriers obtain kinetic energy by being accelerated, and thus the electrons in a high energy state can penetrate the potential barrier of the irreversible process occurrence section by the quantum tunneling effect. The electrons moving at high speed are collected by the electron absorption collector disposed at the end of the accelerating channel. The electrons collected in the electron absorption collector are fed to one of the input terminals of the energy accumulator, whereas the positive holes remaining in the N-type semiconductor are fed to the other of the input terminals of the energy accumulator. The electrons and the positive holes are accumulated in the energy accumulator in pairs. Thus, accelerating movement of electrons and positive holes to be injected later in time is not interfered, whereby a large amount of energy is accumulated in the energy accumulator. The electrons and the positive holes are supplied to an electrical load by connecting the energy accumulator to the electrical load in parallel. As a result, electrical energy obtained by the generation of the electrons and the positive holes is consumed in the electrical load. A device that injects electrons and positive holes can easily be manufactured by employing an integrated circuit technique. Thus, electrical energy can be more efficiently generated in the field effect power generation device of the present invention compared with the conventional power generation devices. Moreover, in the field effect power generation device of the present invention, electrical energy can be accumulated in the energy accumulator by moving both of the electrons and the positive holes to the energy accumulator quickly. Thus, the field effect power generation device of the present invention exhibits excellent efficiency. In the case where the P-type semiconductor is used as the carrier output material and the N-type semiconductor is used as the carrier input material, a PN junction is formed by electrically connecting the P-type semiconductor and the N-type semiconductor with each other. The insulator is disposed entirely or partially on the surface of the N-type semiconductor, the electrodes of the carrier accelerator are disposed in the insulator, and voltage is applied to the electrodes of the carrier accelerator using the power source. Thus, the carrier accelerator is formed. A part of the accelerating channel is formed on the surface of the N-type semiconductor on which the insulator is provided by the effect of the carrier accelerator. The positive holes in the P-type semiconductor are injected into the N-type semiconductor by the effect of the electrical field applied by the electrodes of the carrier accelerator. The positive holes injected into the N-type semiconductor are accelerated through sliding movement in the accelerating channel 9. The carriers obtain kinetic energy by being accelerated and thus, the positive holes having sufficient kinetic energy can penetrate the irreversible process occurrence section. The positive holes moving at high speed are collected by a positive-hole absorption collector disposed at the end of the accelerating channel. The positive holes collected in the positive-hole absorption collector are fed to one of the input terminals of the energy accumulator, whereas the electrons remaining in the P-type semiconductor are fed to the other one of the input terminals of the energy accumulator. The electrons and the positive holes are accumulated in the energy accumulator in pairs. Thus, accelerating movement of electrons and positive holes to be injected later is not interfered, whereby a large amount of energy is accumulated in the energy accumulator. The electrons and the positive holes are supplied to the electrical load by connecting the energy accumulator to the electrical load in parallel. As a result, electrical energy obtained by the generation of the electrons and the positive holes is consumed in the electrical load. A device that injects electrons and positive holes can easily be manufactured by employing an integrated circuit technology. Thus, electrical energy can be more efficiently generated in the field effect power generation device of the present invention compared with the conventional power generation devices. Moreover, in the field effect power generation device of the present invention, electrical energy can be accumulated in the energy accumulator by moving both of the electrons and the positive holes to the energy accumulator quickly. Thus, the field effect power generation device of the present invention exhibits excellent efficiency. In conclusion, in the field effect power generation device of the present invention, the amount of energy required for the electrons to penetrate the work-function barrier and to be emitted into a vacuum is extremely small owing to the injection effect. Therefore, the total energy supplied from the external power source is extremely small. Accordingly, the field effect power generation device of the present invention has the feature of exhibiting excellent power generation efficiency. Moreover, the field effect power generation device of the present invention has a definitive feature that, the carriers are accelerated in the carrier accelerator and the energy consumption in the accelerating channel is almost zero by disposing the electrodes in the insulator. All things considered, the field effect power generation device can generate electrical energy more efficiently compared with the conventional power generation devices. The case where the P-type semiconductor 10 is used as an example of the channel forming material 2 is described below. FIG. 23 illustrates the case where the insulator 8 is disposed on the P-type semiconductor 10. The first electrode of the carrier accelerator 61 and the second electrode of the carrier accelerator 62 are disposed in the insulator 8. The first electrode of the carrier accelerator 61 and the second electrode of the carrier accelerator 62 are disposed very close to the P-type semiconductor 10. The first electrode of the carrier accelerator 61 is connected to the negative electrode of the power source 30, whereby negative charges are accumulated. The second electrode of the carrier accelerator 62 is connected to the positive electrode of the power source 30, whereby positive charges are accumulated. Thus, an electrical field is applied between the first electrode of the carrier accelerator 61 and the second electrode of the carrier accelerator 62. No current flows between the electrodes disposed in the insulator. Electrical lines of force that emanate from the second electrode of the carrier accelerator 62 and terminate on the first electrode of the carrier accelerator 61 are illustrated in FIG. 24. As illustrated in the figure, an electrical field is applied between the positive electrode and the negative electrode. The electrical lines of force are represented by curved lines with arrows. The electrical lines of force can penetrate through the insulator 8 and the P-type semiconductor 10. Thus, the accelerating channel 9 is formed in the vicinity of the boundary between the P-type semiconductor 10 and the insulator 8 by the electrical field. An electrical field in the horizontal direction is present in the vicinity of the surface of the P-type semiconductor 10. The carrier electrons injected into the P-type semiconductor 10 can move toward the right as viewed in the figure in a sliding manner owing to the applied electrical field. In other words, the electrical field applied by the voltage of the power source 30 accelerates the electrons in the right direction. In the case where a plurality of electrodes of the carrier accelerator is disposed in the insulator, the moving speed of the electrons is increased and the electrons can possess large kinetic energy. The kinetic energy is generated by applying the electrical field, however, the energy in this state can not be utilized electrically, and thus the kinetic energy of the carriers is converted into potential energy. The electrons possessing sufficient kinetic energy can penetrate potential barrier to eventually reach and be absorbed by the electron absorption collector 26. Thus, the electron absorption collector 26 acquires electrical charges. The electrical charge accumulated in the electron absorption collector 26 contributes to the power generation. The power generation efficiency of the field effect power generation device of the present invention is extremely high because almost no energy for power generation is necessary to be supplied thereto from the external power source.

<Advantage 4>

In the field effect power generation device described in claim (4), in addition to the operations and advantageous effects of the configuration described in claim (1), field effect power generation can be advantageously conducted by forming the irreversible process occurrence section with an insulator or a vacuum. Introduction of an irreversible process is required to achieve the phenomenon of field effect power generation. The irreversible process can be implemented with the carriers moving from the carrier output material 1 to the channel forming material 2 by penetrating the potential barrier occurrence portion 20 owing to quantum tunneling effect. The case where the carrier output material 1 and the channel forming material 2 are provided and the potential barrier occurrence portion 20 is formed between the carrier output material 1 and the channel forming material 2 as illustrated in FIG. 25 is described below. The carrier output material 1 and the channel forming material 2 are assumed to be conductive.

As a concrete example, the case where the carriers are electrons and the anti-carriers are positive holes is considered below. As illustrated in FIG. 26, by the effect of the carrier accelerator 3, the electrons move from the carrier output material 1 to the channel forming material 2 by penetrating the potential barrier occurrence portion 20 due to quantum tunneling effect. If the carriers penetrate the potential barrier occurrence portion 20, as illustrated in FIG. 27, the electrons having negative charges are accumulated in the channel forming material 2, whereas the positive holes having positive charges of absent holes of the electrons are accumulated in the carrier output material 1. When the number of positive holes in the carrier output material 1 and the number of electrons in the channel forming material 2 are increased, the positive charges of the positive holes and the negative charges of the electrons are attracted to each other based on Coulomb's law. Thus, the effect of the carrier accelerator 3 is halted and when the number of electrons in the channel forming material 2 increases to a sufficient level, as illustrated in FIG. 28, the electrons in the channel forming material 2 move to the carrier output material 1. Specifically, a reversible process takes place, whereby the electrons accumulated in the channel forming material 2 cannot be effectively utilized as electrical energy. Therefore, an irreversible process has to be introduced for the movement of the carriers to implement efficient power generation.

In order to realize field effect power generation, the movement of carriers is considered in detail. A material in which carriers and anti-carriers exist in an electrically neutral state is referred to as the carrier output material 1. The electrons penetrate the potential barrier occurrence portion 20 by using the wave-like nature of electrons, and are injected into the channel forming material 2. Specifically, in the case where the potential barrier occurrence portion 20 is provided between the carrier output material 1 and the channel forming material 2, the carriers penetrate the potential barrier occurrence portion 20 from the carrier output material 1 to the channel forming material 2 by the quantum tunneling effect based on the wave-like nature of electrons, whereby the carriers are accumulated in the channel forming material 2.

Next, an example where the electrons break away from the carrier output material 1 is considered. In order for electrons to break away from the carrier output material 1, the electrons need to possess sufficient kinetic energy. The following two techniques are available for providing the electrons with kinetic energy.

(1) When energy is supplied to the carrier output material 1, electrons in the carrier output material 1 possess kinetic energy. As the energy to be supplied to the carrier output material 1, there are such methods as electromagnetic wave irradiation, heat application and the like. When the carrier output material 1 is heated to raise the temperature, the electrons need to penetrate the potential barrier occurrence portion 20 in order to break away from the carrier output material 1. In the case where the kinetic energy of the electrons in the carrier output material 1 is sufficiently large, the electrons can break away from the carrier output material 1. However, there remain positive charges in the carrier output material 1 after the electrons break away from the carrier output material 1, the electrons that have broken away from the carrier output material 1 are attracted by the positive charges due to Coulomb force. Accordingly, the probability that the electrons move to the channel forming material 2 becomes low. Thermal power generation is realized based on the above-described principle. In the thermal power generation, it is difficult to implement an efficient power generation device. This is because heat application is required to raise the temperature in the entire of the carrier output material 1.

(2) Since the electrons in the carrier output material 1 have negative charges, when positive charges approach, the electrons are attracted to each other on the basis of Coulomb's law. The speed of the electrons can be increased by utilizing this attractive force, and thereby the electrons can be provided with kinetic energy. Once the electrons possess sufficient kinetic energy, the electrons can penetrate and pass through the potential barrier occurrence portion 20 present between the carrier output material 1 and the channel forming material 2 owing to the quantum tunneling effect based on the wave-like nature of electrons. The carrier output material 1 and the channel forming material 2 are provided on the substrate 19. The carrier output material 1 and the channel forming material 2 are electrically connected with each other. An insulator is provided entirely or partially on the surface of the channel forming material 2. The electrodes of the carrier accelerator 3 are disposed in the insulator. A voltage is applied to the electrode of the carrier accelerator 60 by using the power source. Thus, the carrier accelerator 3 is formed. By the effect of the carrier accelerator 3, a part of the accelerating channel is formed on the surface of the channel forming material 2 disposed on the side of the insulator 8. The carriers in the carrier output material 1 are injected into the channel forming material 2 from the carrier output material 1 by the effect of the electrical field applied by the electrode of the carrier accelerator 60. The carriers injected into the channel forming material 2 move, while being accelerated, in the accelerating channel. The carriers acquire kinetic energy by being accelerated, and thus the carriers in a high energy state can penetrate the irreversible process occurrence section 4 due to the quantum tunneling effect. The carriers moving at high speed are collected in the carrier absorption collector disposed at the end of the accelerating channel 9. The carriers collected in the carrier absorption collector are fed to one of the input terminals of the energy accumulator 15, whereas the anti-carriers remaining in the carrier output material 1 are fed to the other of the input terminals of the energy accumulator 15. The carriers and the anti-carriers are accumulated in the energy accumulator 15 in pairs. Thus, accelerating movement of carriers and anti-carriers to be injected later is not interfered, whereby a large amount of energy accumulated in the energy accumulator 15 increases. The carriers and the anti-carriers are supplied to the electrical load 5 by connecting the energy accumulator 15 to the electrical load 5 in parallel. As a result, electrical energy obtained by generating the carriers and the anti-carriers is consumed in the electrical load 5. A device that injects carriers can be easily manufactured by employing an integrated circuit technique. Thus, electrical energy can be more efficiently generated in the field effect power generation device of the present invention compared with the conventional power generation devices. Moreover, in the field effect power generation device of the present invention, electrical energy can be accumulated in the energy accumulator 15 by moving both of the carriers and the anti-carriers to the energy accumulator 15 quickly. Thus, energy generation efficiency is excellent. Further, in the field effect power generation device of the present invention, there is no need to supply the carriers with energy required for emitting electrons into a vacuum, namely for causing the electrons to break through a work function, and electrical power can be generated by supplying the device with only the energy required for the carrier injection in the material. Thus, energy supplied from the external power source is extremely small. As a result, the field effect power generation device of the present invention has the feature that excellent power generation efficiency can be obtained.

<Advantage 5>

According to the field effect power generation device described in claim (5), the carrier output material 1 and the channel forming material 2 are provided on a substrate. The carrier output material 1 and the channel forming material 2 are electrically connected with each other. The insulator 8 is provided entirely or partially on the surface of the channel forming material 2. The electrode of the carrier accelerator 60 is disposed in the insulator 8. A voltage is applied to the electrode of the carrier accelerator 60 by using a power source. Thus, the carrier accelerator 3 is formed. By the effect of the carrier accelerator 3, a part of the accelerating channel 9 is formed on the surface of the channel forming material 2 disposed on the side of the insulator 8. Electrons in the carrier output material 1 are injected into the channel forming material 2 from the carrier output material 1 by the effect of the electrical field applied by the electrode of the carrier accelerator 60. In order to implement the injection of the electrons, it is necessary to consider the movement of electrons inside a material in details. The carrier output material 1 and the channel forming material 2 are assumed to be different materials and electrically connected with each other, namely there exists the potential barrier occurrence portion 20 at the border between the carrier output material 1 and the channel forming material 2. Hence, the carriers cannot move freely between the materials. In the carrier output material 1, the number of the electrons serving as the carriers and the number of the positive holes serving as the anti-carriers are substantially the same, and thus the carrier output material 1 is in an electrically neutral state. In addition, in the channel forming material 2, the number of the electrons serving as the carriers and the number of the positive holes serving as the anti-carriers are substantially the same, and thus the channel forming material 2 is in an electrically neutral state. If a positive voltage is supplied to the electrode of the carrier accelerator 60, the electrons having negative charges move by the effect of an electrical field applied by the positive voltage. Taking into account the wave-like nature of electrons, the electrons in the carrier output material 1 can penetrate the potential barrier occurrence portion 20 and move to the channel forming material 2. This phenomenon is referred to as the injection of electrons. Accordingly, in the case where the potential barrier occurrence portion 20 is provided between the carrier output material 1 and the channel forming material 2, the electrons penetrate the potential barrier occurrence portion 20 from the carrier output material 1 to the channel forming material 2 owing to the quantum tunneling effect based on the wave-like nature of electrons, whereby the electrical charges are accumulated in the channel forming material 2. The carriers injected into the channel forming material 2 move, while being accelerated, in the accelerating channel 9. The electrons acquire kinetic energy by being accelerated, and thus the electrons in a high energy state can penetrate the irreversible process occurrence section 4 by means of the quantum tunneling effect. Then, the electrons are emitted into a vacuum. The phenomenon in which the electrons are emitted into a vacuum is described below. As illustrated in FIG. 29, the electrons in a material penetrate and pass through the potential barrier by the quantum tunneling effect to be emitted. According to the classical mechanics, electrons cannot get over the high potential barrier. However, according to the quantum mechanics, electrons can penetrate and pass through the high potential barrier due to the wave-like nature of electrons. This phenomenon is called the tunneling effect.

As illustrated in FIG. 30, in the thermal emission of electrons, electrons are emitted into a vacuum when heated to have their energy increased over a work function. As illustrated in FIG. 31, a stronger external electrical field reduces the thickness of the potential barrier, so that the electrons can be emitted into a vacuum by the field effect without heating the cathode. This depends on the quantum tunneling effect due to the wave-like nature of electrons. In the field effect power generation device of the present invention, electrons are emitted into a vacuum without thermal energy supplied to the electrons from the outside. In order for the electrons to be emitted into a vacuum from the material, the electrons need to get over the potential barrier at the border between the material and the vacuum. For the emission of electrons, the electrons need to acquire sufficient kinetic energy. An effect of the electrical field applied by the electrode of the carrier accelerator 60 is used to provide the electrons with kinetic energy. The electrons inside the channel forming material 2 have negative charges, and when positive charges approach, the charges are attracted to each other based on Coulomb's law. The speed of the electrons can be increased by using the attractive force. The acceleration of the electrons due to the field effect increases the kinetic energy of the electrons. The electrons obtaining sufficient kinetic energy in the channel forming material 2 can penetrate and pass through the potential barrier occurrence portion 20 at the border between the channel forming material 2 and the vacuum owing to the quantum tunneling effect based on the wave-like nature of electrons. The present invention has the feature that the electrons are injected from the carrier output material 1 to the channel forming material 2 and accelerated by the field effect in the accelerating channel 9, and thus the probability that the electrons are emitted by the quantum tunneling effect is enhanced. This emission is an irreversible process. The emitted electrons fly at high speed in the accelerating channel 9 to be collected in the electron absorption collector 26 disposed at the end of the accelerating channel 9. The electrons collected in the electron absorption collector 26 are fed to one of the input terminals of the energy accumulator 15, whereas the positive holes remaining in the carrier output material 1 are fed to the other of the input terminals of the energy accumulator 15. The electrons and the positive holes are accumulated in the energy accumulator 15 in pairs. Thus, accelerating movement of the electrons and positive holes to be injected later is not interfered, whereby a large amount of energy is accumulated in the energy accumulator 15. The electrons and the positive holes are supplied to an electrical load 5 by connecting the energy accumulator 15 to the electrical load 5 in parallel. As a result, electrical energy obtained by the generation of the electrons and the positive holes is consumed in the electrical load 5. A device that injects electrons and positive holes can be easily manufactured by employing an integrated circuit technique. Thus, electrical energy can be more efficiently generated in the field effect power generation device of the present invention compared with conventional power generation devices. Moreover, in the field effect power generation device of the present invention, electrical energy can be accumulated in the energy accumulator 15 by moving both of the electrons and the positive holes to the energy accumulator 15 quickly. Thus, energy generation efficiency is excellent. In the field effect power generation device of the present invention, there is no need to supply the electrons with energy required for breaking through a large work function to be emitted into a vacuum, and power can be generated by supplying the device with only the energy required for the injection in the materials. Thus, energy supplied from the external power source is extremely small. As a result, the field effect power generation device of the present invention has the feature that excellent power generation efficiency can be obtained.

<Advantage 6>

According to the field effect power generation device described in claim (9), in addition to the operations and advantageous effects of the configuration described in claim (5), the field effect power generation device has the following operations and advantageous effects. The case is considered below in which electrons of the carriers having negative charges are absorbed in the electron absorption collector 26. Generated electrical power is consumed when the electrons accumulated in the electron absorption collector 26 move through the electrical load 5 to be recombined with positive charges and disappear. The following conditions are required to use the electrons accumulated in the electron absorption collector 26 for the power consumption.

(1) Electrons reach the electron absorption collector 26 efficiently.

(2) Leakage and disappearance of electron accumulated in the electron absorption collector 26 is curved to a minimum amount, so that almost all the electrons are involved in the power consumption.

(3) The carrier accelerator 3 is disposed around the electron absorption accumulator 26 and the positive charges are accumulated in an electrode of the carrier accelerator 3, and thus, the electrons can approach the electrode of the carrier accelerator 3 before being absorbed in the electron absorption collector 26. Therefore, the configuration is such that the electrons moving toward the carrier absorption collector 26 are prevented from moving in the opposite direction by the effect of the positive electrodes of the carrier accelerator 3.

(4) When the electrons are accumulated in the electron absorption collector 26, repulsive force based on Coulomb's law acts on the electrons subsequently approaching the electron absorption collector 26 due to the negative charges accumulated in the electron absorption collector 26. Thus, the electrons absorbed in the electron absorption collector 26 need to be moved to the energy accumulator 15 quickly.

(5) Electrons and positive holes are accumulated in the energy accumulator 15 in pairs. When electrons or positive holes are supplied from the power source, positive and negative charges recombine via the electrical load 5 and disappear. In this case, the power of the external power source is consumed and the power generation efficiency is decreased. Thus, electrons and positive holes accumulated in the energy accumulator 15 are supplied from the carrier output material 1 to improve the power generation efficiency.

The electrons accelerated by the positive charges accumulated in the positive electrodes of the carrier accelerator 3 possess kinetic energy. The electrons possessing kinetic energy approach the electron absorption collector 26. When the electrons collide with the electron absorption collector 26, kinetic energy of the electrons is emitted to provide thermal energy to the electron absorption collector 26. The temperature of the electron absorption collector 26 rises due to the thermal energy supplied thereto. When the temperature of the electron absorption collector 26 rises, the heat of the electron absorption collector 26 is conducted to a peripheral portion of the electron absorption collector 26. Thus, the temperature of the peripheral portion rises. Increase in temperature of the electron absorption collector 26 and its peripheral portion deteriorates the quality of materials of the electron absorption collector 26 and its peripheral portion. The deterioration of the quality reduces the specific resistance of the material, which leads to an increase in current leakage and lowers power generation efficiency. The deterioration of the quality also causes disadvantages such as shorter durability. Moreover, the increase in temperature of the electron absorption collector 26 and its peripheral portion causes an increase in temperature of the entire device. This is a critical disadvantage for mobile devices and thus, the application of the device of which temperature rises is limited. Therefore, when the electrons possessing kinetic energy approach the electron absorption collector 26, the kinetic energy of the electrons needs to be reduced before colliding with the electron absorption collector 26.

Electrons have negative charges. According to Coulomb's law, negative charges repel each other, while negative and positive charges attract each other. Thus, electrons are accelerated when approaching the positive charges and are decelerated when approaching the negative charges. Therefore, in the early stage of power generation, electrons are accelerated by the effect of positive charges to generate hot electrons, but after being sufficiently accelerated and penetrating the potential barrier to approach the electron absorption collector 26, the electrons need to be decelerated by the effect of negative charges.

In the case where the electrons possessing kinetic energy approach the electron absorption collector 26, the following techniques are employed to decelerate the electrons.

(1) A decelerating electrode is disposed around the electron absorption collector 26.

(2) If negative charges are accumulated in the electron absorption collector 26, the electrons approaching the electron absorption collector 26 receives repulsive force based on Coulomb's law due to the negative charges accumulated in the electron absorption collector 26. Thus, the electrons approaching the electron absorption collector 26 are decelerated.

(3) The structure of the electron absorption collector 26 is determined in accordance with the purpose of decelerating the electrons approaching the electron absorption collector 26.

The above-mentioned three deceleration techniques are described below in detail.

(1) In the case where the electrons approach the electron absorption collector 26, as illustrated in FIG. 32, conductors are disposed just in front of the electron absorption collector 26. The conductors are referred to as suppressors 25. The insulators 8 are disposed between the suppressors 25 and the electron absorption collector 26. Thus, the suppressors 25 and the electron absorption collector 26 are electrically insulated from each other. The power sources are connected between the suppressors 25 and the electron absorption collector 26, and the potential of each of the suppressors 25 is set to be smaller than the potential of the electron absorption collector 26. Electrons receive repulsive effect based on Coulomb's law from the negative charges accumulated in the suppressors 25 just before approaching the electron absorption collector 26. Thus, the electrons approaching the electron absorption collector 26 are decelerated. The electrons possessing kinetic energy lose a part of the kinetic energy when approaching the electron absorption collector 26 because of the suppressors 25. Thus, the speed of electrons colliding with the electron absorption collector 26 is lowered, so that the energy supplied to the electron absorption collector 26 decreases and the temperature rise of the electron absorption collector 26 is kept down. Moreover, in the case where the electrons bounce back due to the collision with the electron absorption collector 26, the electrons are again directed toward the electron absorption collector 26 by the repulsing effect of the negative charges of the suppressors 25. Thus, the suppressors 25 also provide the effect of preventing the breakaway of electrons caused by bouncing. Accordingly, the performance ability of the electron absorption collector 26 for collecting the electrons becomes excellent.

(2) If negative charges are accumulated in the electron absorption collector 26, the electrons subsequently approaching the electron absorption collector 26 receives repulsive force based on Coulomb's law due to the negative charges accumulated in the electron absorption collector 26. Thus, the electrons approaching the electron absorption collector 26 are decelerated. Accordingly, energy supplied to the electron absorption collector 26 due to the collision of the electrons therewith is reduced, so that the temperature rise of the electron absorption collector 26 can be kept down. If negative charges are accumulated in the electron absorption collector 26, power generation voltage is high and the electrical energy is large. Accordingly, the negative charges remaining in the electron absorption collector 26 make it possible to supply large electrical energy and to keep down the temperature rise of the electron absorption collector 26 as well. Thus, a highly efficient power generation device can be realized. In order for the negative charges to constantly remain in the electron absorption collector 26, it is necessary to manufacture a device in which a large number of electrons approach the electron absorption collector 26. In other words, a structure capable of supplying the electron absorption collector 26 with a large number of electrons is employed. Furthermore, when electrons approach the electron absorption collector 26 more than necessary, negative charges of electrons attaching to the periphery may adversely affect the movement of the following electrons. Therefore, controlling the number of electrons to be accelerated depending on the potential of the electron absorption collector 26 is an essential condition for implementing a device with excellent efficiency and durability.

(3) The structure of the electron absorption collector 26 is determined in accordance with the purpose of decelerating the electrons approaching the electron absorption collector 26. If the electron absorption collector 26 is flat, the electrons collide with the electron absorption collector 26 without decelerating. Thus, the surface of the electron absorption collector 26 is provided with micro asperity. As an effective example of micro asperity, carbon-based materials are disposed on the surface of the electron absorption collector 26. If micro carbon-based materials are disposed on the surface of the electron absorption collector 26, electrons approach the carbon-based materials just before approaching the conductive portion of the electron absorption collector 26. When the electrons approach the carbon-based materials, the electrons collide with the electron absorption collector 26 after being decelerated by the repulsive effect based on Coulomb's law due to the negative charges of the electrons that have reached the electron absorption collector 26 earlier in time and thus, the speed of the electrons colliding with the electron absorption collector 26 decreases. Therefore, the temperature rise of the electron absorption collector 26 can be kept down. Accordingly, the carbon-based materials disposed on the surface of the electron absorption collector 26 have the effect of improving the durability of the field effect power generation device of the present invention and making the power generation efficiency thereof excellent.

<Advantage 7>

In the field effect power generation device described in claim (10), in addition to the operations and advantageous effects of the configuration described in claim (5), the number of electrons penetrating the potential barrier occurrence portion 20 is increased by irradiating the carrier output material 1 and the channel forming material 2 with the energy of wave-like nature that electromagnetic waves, electrons, photons and the like possess according to the quantum mechanics. This phenomenon is described below in detail.

The field effect power generation phenomenon of the present invention requires the introduction of the irreversible process occurrence section 4 to prevent the electrons collected in the electron absorption collector 26 from moving in the opposite direction. In order for the electrons to penetrate the irreversible process occurrence section 4, it is necessary to supply kinetic energy to the electrons. In order to do so, the electrons need to be injected from the carrier output material 1 to the channel forming material 2 by penetrating the potential barrier occurrence portion 20 due to the quantum tunneling effect, and be accelerated by moving on the surface of the channel forming material 2. The carrier output material 1 in which the number of electrons is almost the same as that of the positive holes is irradiated with electromagnetic waves, electrons, photons and the like. By utilizing the wave-like nature of electrons, the electrons penetrate the potential barrier occurrence portion 20 and are preferably injected into the channel forming material 2. In other words, in the case where the potential barrier occurrence portion 20 is provided between the carrier output material 1 and the channel forming material 2, irradiating the carrier output material 1 with electromagnetic waves, electrons, photons and the like allows the carriers to penetrate the potential barrier occurrence portion 20 due to the quantum tunneling effect, and thus the carriers are accumulated in the channel forming material 2. Statistical distribution of energy of electrons in a material is described in FIG. 33. According to the figure, there is a tendency that the number of high-energy electrons is small, the number of low-energy electrons is also small, and the number of middle-energy electrons is the largest. The electrons having small energy are called cold electrons and the electrons having large energy are called hot electrons. In FIG. 34, T represents the threshold of the potential barrier relative to energy of the electrons. Electrons having energy large enough to get over the threshold T of the potential barrier is referred to as elite electrons. Electrons having energy that is not large enough to get over the threshold T of the potential barrier is referred to as non-elite electrons. In the field effect power generation device of the present invention, the elite electrons, which can get over the threshold T of the potential barrier, can contribute to the power generation, but non-elite electrons, which cannot get over the threshold T of the potential barrier, cannot contribute to the power generation. If no kinetic energy is supplied to electrons in a material from the outside, almost all the electrons in the material are non-elite electrons. Irradiating the carrier output material 1 and the channel forming material 2 with electromagnetic waves, electrons, photons and the like possessing a wave-like nature according to the quantum mechanics provides the electrons with kinetic force, and hence increases the number of elite electrons. Thus, a large number of electrons can get over the threshold T of the potential barrier.

When electrons are disposed in an electrical field, the electrons move in the direction of approaching the positive charges accumulated in the positive electrode applying the electrical field, and move in the direction of detaching from the negative charges accumulated in the negative electrode applying the electrical field. Accordingly, when the electrons are moved by the effect of electrical field, the speed of electrons is increased, and thus the electrons are accelerated. Owing to the synergy effect between the electrons accelerated by the applied electrical field and the wave-like nature of electrons, the kinetic energy of the electrons increases and the number of elite electrons capable of getting over the threshold T of the potential barrier increases. Therefore, the number of the injected and emitted electrons increases. Accordingly, the amount of generated power is increased by the increased number of electrons contributing to the power generation.

The features of the field effect power generation device of the present invention are described below. In addition to the effect of electrical field, the feature of the method in which kinetic energy of output electrons is increased by irradiating the carrier output material 1 and the channel forming material 2 with electromagnetic waves, electrons, photons and the like having the wave-like nature of electrons according to the quantum mechanics is described below. When positive charges are accumulated in a positive electrode and negative charges are accumulated in a negative electrode, an electrical field is applied between the positive electrode and the negative electrode. The insulator 8 is disposed between the positive electrode and the negative electrode. The insulator 8 has high impedance and thus, almost no current flows between the positive electrode and the negative electrode. Thus, energy consumed for applying the electrical field is extremely small and energy consumed for creating elite electrons is small. Thus, power generation with high power generation efficiency can be achieved. In the device of the present invention, in addition to the field effect, the carrier output material 1 and the channel forming material 2 are irradiated with electromagnetic waves, electrons, photons and the like to increase the number of elite electrons contributing to the power generation. The carrier output material 1 and the channel forming material 2 are provided on the substrate 19. The carrier output material 1 and the channel forming material 2 are electrically connected with each other. The insulator 8 is provided entirely or partially on the surface of the channel forming material 2. The electrodes of the carrier accelerator 3 are disposed in the insulator 8 and voltage is applied to the electrode 60 by using the power source. Thus, the carrier accelerator 3 is formed. By the effect of the carrier accelerator 3, a part of the accelerating channel 9 is formed on the surface of the channel forming material 2 on the side of the insulator 8. The electrons in the carrier output material 1 are injected into the channel forming material 2 from the carrier output material 1 by the effect of the electrical field applied by the electrode of the carrier accelerator 60. Irradiating the carrier output material 1 with electromagnetic waves, electrons, photons and the like having the wave-like nature according to quantum mechanics increases the number of electrons to be injected into the channel forming material 2. The electrons injected into the channel forming material 2 move, while being accelerated, in the accelerating channel 9. The electrons acquire large kinetic energy by irradiating the channel forming material 2 with electromagnetic waves, electrons, photons and the like having the wave-like nature according to quantum mechanics. Thus, the electrons in a high energy state can penetrate the irreversible process occurrence section 4 by means of the quantum tunneling effect. Accordingly, the electrons are emitted into a vacuum. The emitted electrons are collected in the electron absorption collector 26 disposed at the end of the accelerating channel 9. The electrons collected in the electron absorption collector 26 are fed to one of the input terminals of the energy accumulator 15, whereas the positive holes remaining in the carrier output material 1 are fed to the other of the input terminals of the energy accumulator 15. The electrons and the positive holes are accumulated in the energy accumulator 15 in pairs. Thus, accelerating movement of electrons and positive holes to be emitted later in time is not interfered, whereby a large amount of energy is accumulated in the energy accumulator 15. The electrons and the positive holes are supplied to the electrical load 5 by connecting the energy accumulator 15 to the electrical load 5 in parallel. As a result, electrical energy obtained by the generation of the electrons and the positive holes is consumed in the electrical load 5. A device that injects carriers can be readily manufactured by employing an integrated circuit technique. Thus, electrical energy can be more efficiently generated in the field effect power generation device of the present invention compared with conventional power generation devices. Moreover, in the field effect power generation device of the present invention, electrical energy can be accumulated in the energy accumulator 15 by moving both the electrons and the positive holes to the energy accumulator 15 quickly. Thus, energy generation efficiency is good. In conclusion, in the field effect power generation device of the present invention, with the synergy effect between irradiating the carrier output material 1 and the channel forming material 2 with electromagnetic waves, electrons, photons and the like having the wave-like nature according to the quantum mechanics and the field effect, a field effect power generation device with excellent power generation efficiency can be implemented.

<Advantage 8>

In the field effect power generation device described in claim (11), in addition to the operations and advantageous effects of the configuration described in claim (5), the field effect power generation can be advantageously performed by a secondary electron emission material entirely or partially disposed on the surface of the carrier input material.

Carriers injected from the carrier output material 1 to the channel forming material 2 are accelerated by the carrier accelerator 3 and thus, the carriers obtain kinetic energy. An area in which the carriers move is referred to as the accelerating channel 9. An example where the carriers are electrons is described below. As illustrated in FIG. 35, the electrons injected from the carrier output material 1 to the channel forming material 2 move in the accelerating channel 9 provided between the channel forming material 2 and the insulator 8. A first power source 31 is used to inject electrons serving as the carriers from the N-type semiconductor 11 to P-type semiconductor 10. An electrical field is applied between the first electrode of the carrier accelerator 61 and the second electrode of the carrier accelerator 62 by the first power source 31. The electrons move in the accelerating channel 9 provided between the insulator 8 and the channel forming material 2, and advance in the direction of the second electrode of the carrier accelerator 62 in which positive charges are accumulated. Furthermore, an electrical field is applied between the second electrode of the carrier accelerator 62 and the third electrode of the carrier accelerator 63 by a second power source 32. The electrons move, while being accelerated, under the third electrode 63 of the accelerator. On the right side of the accelerating channel 9, a surface of the channel forming material 2 is set to have asperities. The asperities formed on the surface of the channel forming material 2 are extremely small in size. An electrical field is applied between the third electrode of the carrier accelerator 63 and a fourth electrode of the carrier accelerator 64 by a third power source 33. When the electrons serving as the carriers possess sufficient kinetic energy, the electrons penetrate the surface of a recess area of the channel forming material 2. The speed of the electrons becomes progressively high due to the effects of the electrical fields applied by the electrodes of the carrier accelerator 3, and the electrons penetrate and pass through a potential barrier by the quantum tunneling effect on the surface of the channel forming material 2 with asperities. Eventually, the speed of the electrons becomes sufficiently high and the electrons possess large kinetic energy. Then, as denoted e in the figure, the electrons break away from the surface of the channel forming material 2 and are emitted into a vacuum. In the present invention, the emitted electrons collide with the electron absorption collector 26 and are absorbed in the collector. The electrons absorbed in the collector are used as electrical energy.

FIG. 36 illustrates the case where secondary electron emission materials 80 are provided in a protrusion area of the channel forming material 2. In the figure, an electrical field is applied between the first electrode of the carrier accelerator 61 and the second electrode of the carrier accelerator 62 by the first power source 31, the electrons move in the accelerating channel 9 disposed between the insulator 8 and the channel forming material 2, and advance, while being accelerated, in the direction of the second electrode of the carrier accelerator 62 in which positive charges are accumulated. Furthermore, an electrical field is applied between the second electrode of the carrier accelerator 62 and the third electrode of the carrier accelerator 63 by the second power source 32. The electrons move, while being accelerated, right under the third electrode 63 of the accelerator. The electrons possessing large kinetic energy by being accelerated due to the electrical fields collide with the secondary electron emission materials 80, so that the secondary electron emission materials 80 emit secondary electrons. The electrons colliding with the secondary electron emission materials 80 are referred to as primary electrons. The primary electrons and the secondary electrons move, while being accelerated by the electrical field applied between the third electrode of the carrier accelerator 63 and the fourth electrode of the carrier accelerator 64 by a third power source 33. When the secondary electrodes are emitted from the secondary electron emission materials 80 provided on the surface of the channel forming material 2, the positive holes that have been paired therewith remain in the channel forming material 2. The positive holes serve as the carriers injected from the channel forming material 2 to the carrier output material 1. Large kinetic energy can be provided to the injected carriers by accelerating the carriers with the carrier accelerator 3. A path through which the carriers pass is referred to as the accelerating channel 9. As illustrated in FIG. 37, the electrons serving as the carriers move through the accelerating channel 9 provided between the channel forming material 2 and the insulator 8. The electrical field is applied between the first electrode of the carrier accelerator 61 and the second electrode of the carrier accelerator 62 by the first power source 31. The electrons move on the surface of the channel forming material 2 on the side of the insulator 8 in the direction of the second electrode of the carrier accelerator 62 in which positive charges are accumulated. When the speed of electrons is sufficiently high, the electrons possess large kinetic energy. Thus, the electrons fly once emitted from between the insulator 8 and the channel forming material 2. The flying electrons collide with the secondary electron emission materials 80 and a large number of secondary electrons is then emitted. Furthermore, the electrical field is applied between the second electrode of the carrier accelerator 62 and the third electrode of the carrier accelerator 63 by the second power source 32. The electrons move, while being accelerated, to right under the third electrode of the carrier accelerator 63 of the accelerator. When the speed of electrons is sufficiently high, the electrons possess large kinetic energy. The flying electrons collide with the secondary electron emission materials 80 and a large number of secondary electrons is then emitted. The electrical field is applied between the third electrode of the carrier accelerator 63 and the fourth electrode of the carrier accelerator 64 by the third power source 33. When the electrons serving as the carriers acquire sufficient kinetic energy, the flying electrons collide with the secondary electron emission materials 80 and a large number of secondary electrons is thus emitted. By repeating the above processes, the number of flying electrons is extremely increased. The electrons colliding with the secondary electron emission materials 80 are referred to as the primary electrons. The primary electrons and the secondary electrons move, while being accelerated by the electrical field applied between the third electrode of the carrier accelerator 63 and the fourth electrode of the carrier accelerator 64 by the third power source 33. When the secondary electrodes are emitted from the secondary electron emission materials 80 provided on the surface of the channel forming material 2, the positive holes that have been paired therewith remain in the channel forming material 2. The positive holes serve as the carriers injected from the channel forming material 2 to the carrier output material 1. Note that the secondary electron emission materials 80 are also used for a camera tube and the like, and are formed of lead oxide, a silicon oxide material and the like. When the electrons collide with the secondary electron emission materials 80, energy of the primary electrons emitting the largest number of secondary electrons is several hundreds of electron volts (eV).

Electrons serving as carriers obtain larger kinetic energy by being accelerated by an electrical field. The electrons having large kinetic energy can overcome the repulsive force based on Coulomb's law and collide with a collector even when a large number of electrons is accumulated in the collector. Thus, voltage generated by the power generation rises. The secondary electron emission materials 80 are provided in the accelerating channel 9 and the electrons moving at high-speed serves as the primary electrons. When a large number of secondary electrons is emitted, the number of electrons contributing to the power generation increases and the number of electrons that can be taken out from the power generation device increases. Accordingly, the current flowing to the electrical load 5 increases. Since the electrical power is the product of voltage and current, an amount of electrical power that can be obtained by the power generation increases and the power generation efficiency improves by providing the secondary electron emission materials 80.

<Advantage 9>

The field effect power generation device described in claim (12) has, in addition to the operations and advantageous effects of the configuration described in claim (5), the feature that the path of emitted electrons is deflected by using a deflecting electrode and a deflecting pole. Deflection technique using the deflection pole is described below in detail. The case where the N-type semiconductor 11 is used as the carrier output material 1 and the P-type semiconductor 10 is used as the channel forming material 2 is described below. FIG. 38 illustrates the case where the injected electrons serving as the carriers are collected in the electron absorption collector 26 by deflecting their path. The P-type semiconductor 10 and the N-type semiconductor 11 form a PN junction. A negative voltage terminal of the first power source 31 is electrically connected to the N-type semiconductor 11. A positive voltage terminal of the first power source 31 is electrically connected to the first electrode of the carrier accelerator 61. An electrical field is applied between the first electrode of the carrier accelerator 61 and the N-type semiconductor 11. The applied electrical field causes the electrons serving as the carriers to be injected from the N-type semiconductor 11 into the P-type semiconductor 10, and the injected electrons move in the accelerating channel 9. A negative voltage terminal of the second power source 32 is electrically connected to the first electrode of the carrier accelerator 61, a positive voltage terminal of the first power source 31 is electrically connected to the second electrode of the carrier accelerator 62. An electrical field is applied between the first electrode of the carrier accelerator 61 and the second electrode of the carrier accelerator 62. The injected electrons are accelerated in the accelerating channel 9 by the applied electrical field. A negative voltage terminal of the third power source 33 is electrically connected to the second electrode of the carrier accelerator 62. A positive voltage terminal of the third power source 33 is electrically connected to the third electrode of the carrier accelerator 63. An electrical field is applied between the second electrode of the carrier accelerator 62 and the third electrode of the carrier accelerator 63. The injected electrons are accelerated in the accelerating channel 9 by the applied electrical field. A negative voltage terminal of the fourth power source 34 is electrically connected to the third electrode of the carrier accelerator 63. The positive voltage terminal of the third power source 33 is electrically connected to the fourth electrode of the carrier accelerator 64. An electrical field is applied between the third electrode of the carrier accelerator 63 and the fourth electrode of the carrier accelerator 64. The injected electrons are accelerated in the accelerating channel 9 by the applied electrical field. A negative voltage terminal of the fifth power source 35 is electrically connected to the fourth electrode of the carrier accelerator 64. A positive voltage terminal of the fifth power source 35 is electrically connected to the fifth electrode of the carrier accelerator 65. An electrical field is applied between the fourth electrode of the carrier accelerator 64 and the fifth electrode of the carrier accelerator 65. The injected electrons are accelerated in the accelerating channel 9 by the applied electrical field. FIG. 39 shows a schematic top view of a case where electrons in the accelerating channel receive field deflection to cause their path to be deflected, and are collected into the electron absorption collector in the field effect power generation of the present invention. The N-type semiconductor 11 and the P-type semiconductor 10 form a PN junction. The first power source 31, the second power source 32, the third power source 33, the fourth power source 34 and the fifth power source 35 are connected in series and thus are collectively represented by the power source 30 in the figure. The positive voltage terminal of the power source 30 is electrically connected to the fifth electrode of the carrier accelerator 65. The negative voltage terminal of the power source 30 is electrically connected to the N-type semiconductor 11. An electrical field is applied between the fifth electrode of the carrier accelerator 65 and the N-type semiconductor 11. The applied electrical field causes the electrons to be injected from the N-type semiconductor 11 to P-type semiconductor 10. The injected electrons move in the accelerating channel 9 on the surface of the P-type semiconductor 10. Positive charges accumulated in the fifth electrode of the carrier accelerator 65 attract the injected electrons with attractive force based on Coulomb's law. Thus, the injected electrons move in the direction of a sixth electrode of the carrier accelerator 66 in the carrier accelerating channel. Electrical fields applied by other accelerating electrodes disposed in the insulator 8 also contribute to the movement of the injected electrons. As illustrated in the figure, the P-type semiconductor 10 does not have a linear shape but has a curved shape. Thus, the electrons moving linearly on the surface of the P-type semiconductor 10 cannot reach the fifth electrode of the carrier accelerator 65. The insulator 8 is provided in the straight direction.

As illustrated in FIG. 39, a positive voltage terminal of a carrier path deflection power source 90 is electrically connected to a carrier path deflection positive electrode 91. A negative voltage terminal of the carrier path deflection power source 90 is electrically connected to a carrier path deflection negative electrode 92. An electrical field applied between the carrier path deflection positive electrode 91 and the carrier path deflection negative electrode 92 makes the flying path of the electrons injected on the surface of the P-type semiconductor curved. As a result, the injected electrodes move in the direction of the electron absorption collector 26 to be eventually collected therein.

The electron absorption collector 26 is electrically connected to a negative voltage terminal of the energy accumulator 15. The N-type semiconductor 11 is electrically connected to a positive voltage terminal of the energy accumulator 15. The electrons absorbed in the electron absorption collector 26 reach the negative electrode of the energy accumulator 15. The positive holes injected from the P-type semiconductor 10 into the N-type semiconductor 11 reach the positive electrode of the energy accumulator 15. Thus, the positive and negative charges are accumulated in the energy accumulator 15. Accordingly, when an electrical load is connected to the terminals of the energy accumulator 15, the positive holes and the electrons accumulated in the energy accumulator 15 recombine via the electrical load. At this point, electrical energy can be supplied to the electrical load.

FIG. 40 illustrates the case where the injected electrons serving as the carriers are collected in the collector by deflecting their path. The P-type semiconductor 10 and the N-type semiconductor 11 form a PN junction. The negative voltage terminal of the first power source 31 is electrically connected to the first electrode of the carrier accelerator 61. The positive voltage terminal of the first power source 31 is electrically connected to the second electrode of the carrier accelerator 62. An electrical field is applied between the first electrode of the carrier accelerator 61 and the second electrode of the carrier accelerator 62. The applied electrical field causes the electrons serving as the carriers to be injected from the N-type semiconductor 11 into the P-type semiconductor 10, and the electrons move in the accelerating channel 9. The negative voltage terminal of the second power source 32 is electrically connected to the second electrode of the carrier accelerator 62. The positive voltage terminal of the second power source 32 is electrically connected to the third electrode of the carrier accelerator 63. An electrical field is applied between the second electrode of the carrier accelerator 62 and the third electrode of the carrier accelerator 63. The injected electrons are accelerated in the accelerating channel 9 by the applied electrical field. The negative voltage terminal of the third power source 33 is electrically connected to the third electrode of the carrier accelerator 63. The positive voltage terminal of the third power source 33 is electrically connected to the fourth electrode of the carrier accelerator 64. An electrical field is applied between the third electrode of the carrier accelerator 63 and the fourth electrode of the carrier accelerator 64. The injected electrons are accelerated in the accelerating channel 9 by the applied electrical field. The negative voltage terminal of the fourth power source 34 is electrically connected to the fourth electrode of the carrier accelerator 64. The positive voltage terminal of the third power source 33 is electrically connected to the fifth electrode of the carrier accelerator 65. An electrical field is applied between the fourth electrode of the carrier accelerator 64 and the fifth electrode of the carrier accelerator 65. The injected electrons are accelerated in the accelerating channel 9 by the applied electrical field. The negative voltage terminal of the fifth power source 35 is electrically connected to the fifth electrode of the carrier accelerator 65. The positive voltage terminal of the fifth power source 35 is electrically connected to the sixth electrode of the carrier accelerator 66. An electrical field is applied between the fifth electrode of the carrier accelerator 65 and the sixth electrode of the carrier accelerator 66. The injected electrons are accelerated in the accelerating channel 9 by the applied electrical field. The N-type semiconductor 11 and the P-type semiconductor 10 form a PN junction. The first power source 31, the second power source 32, the third power source 33, the fourth power source 34, and the fifth power source 35 are connected in series and thus are collectively represented by the power source 30 in the figure. The positive voltage terminal of the power source 30 is electrically connected to the sixth electrode of the carrier accelerator 66. The positive charges of the sixth electrode of the carrier accelerator 66 generate an electrical field. The applied electrical field causes the electrons to be injected from the N-type semiconductor 11 to P-type semiconductor 10. The injected electrons move in the accelerating channel 9 on the surface of the P-type semiconductor 10. Positive charges accumulated in the sixth electrode of the carrier accelerator 66 attract the injected electrons with attractive force based on Coulomb's law. Thus, the injected electrons move in the direction of the sixth electrode of the carrier accelerator 66 in the carrier accelerator 3. Electrical fields applied by other accelerating electrodes disposed in the insulator also contribute to the movement of the injected electrons. The P-type semiconductor 10 does not have a linear shape but has a curved shape. Thus, the electrons moving straight ahead on the surface of the P-type semiconductor 10 cannot reach the sixth electrode of the carrier accelerator 66. The insulator 8 is provided in the straight direction. The positive voltage terminal of the carrier path deflection power source 90 is electrically connected to the carrier path deflection positive electrode 91. The negative voltage terminal of the carrier path deflection power source 90 is electrically connected to the carrier path deflection negative electrode 92. An electrical field applied between the carrier path deflection positive electrode 91 and the carrier path deflection negative electrode 92 makes the flying path of the electrons injected on the surface of the P-type semiconductor curved. As a result, the injected electrons move toward the electron absorption collector 26 to be eventually collected therein.

The electron absorption collector 26 is electrically connected to the negative voltage terminal of the energy accumulator 15. The N-type semiconductor 11 is electrically connected to the positive voltage terminal of the energy accumulator 15. The electrons absorbed in the electron absorption collector 26 reach the negative electrode of the energy accumulator 15. The positive holes injected from the P-type semiconductor 10 into the N-type semiconductor 11 reach the positive electrode of the energy accumulator 15. Thus, positive and negative charges are accumulated in the energy accumulator 15. Accordingly, when an electrical load is connected to both terminals of the energy accumulator 15, the positive holes and the electrons accumulated in the energy accumulator 15 recombine via the electrical load. At this point, electrical energy can be supplied to the electrical load. Note that, in the figure, the electrical fields are used to make the path of the injected electrons curved. Instead, a magnetic field can also be used to make the flying path of the electron curved. The present invention includes a technique in which magnets are disposed at positions around the path of injected electrons to form a magnetic field to make the flying path of the electrons curved.

A Deflection technique using a deflection magnetic pole is described below in detail. The case where the N-type semiconductor 11 is used as the carrier output material 1 and the P-type semiconductor 10 is used as the channel forming material 2 is described below. FIG. 41 illustrates the case where the path of electrons serving as injected carriers is deflected, so that the electrons are collected in the electron absorption collector 26. The P-type semiconductor 10 and N-type semiconductor 11 form a PN junction. The negative voltage terminal of the first power source 31 is electrically connected to the N-type semiconductor 11. The positive voltage terminal of the first power source 31 is electrically connected to the first electrode of the carrier accelerator 61. An electrical field is applied between the N-type semiconductor 11 and the first electrode of the carrier accelerator 61. The applied electrical field causes the electrons serving as the carriers to be injected from the N-type semiconductor 11 into the P-type semiconductor 10, and the injected carriers move in the accelerating channel 9. The negative voltage terminal of the second power source 32 is electrically connected to the first electrode of the carrier accelerator 61. The positive voltage terminal of the first power source 31 is electrically connected to the second electrode of the carrier accelerator 62. An electrical field is applied between the first electrode of the carrier accelerator 61 and the second electrode of the carrier accelerator 62. The injected electrons are accelerated in the accelerating channel 9 by the applied electrical field. The negative voltage terminal of the third power source 33 is electrically connected to the second electrode of the carrier accelerator 62. The positive voltage terminal of the third power source 33 is electrically connected to the third electrode of the carrier accelerator 63. An electrical field is applied between the second electrode of the carrier accelerator 62 and the third electrode of the carrier accelerator 63. The injected electrons are accelerated in the accelerating channel 9 by the applied electrical field. The negative voltage terminal of the fourth power source 34 is electrically connected to the third electrode of the carrier accelerator 63. The positive voltage terminal of the third power source 33 is electrically connected to the fourth electrode of the carrier accelerator 64. An electrical field is applied between the third electrode of the carrier accelerator 63 and the fourth electrode of the carrier accelerator 64. The injected electrons are accelerated in the accelerating channel 9 by the applied electrical field. The negative voltage terminal of the fifth power source 35 is electrically connected to the fourth electrode of the carrier accelerator 64. The positive voltage terminal of the fifth power source 35 is electrically connected to the fifth electrode of the carrier accelerator 65. An electrical field is applied between the fourth electrode of the carrier accelerator 64 and the fifth electrode of the carrier accelerator 65. The injected electrons are accelerated in the accelerating channel 9 by the applied electrical field.

FIG. 42 schematically illustrates a top view of the case where electrons in the accelerating channel receive magnetic deflection to have their path deflected to be collected in the electron absorption collector in the field effect power generation of the present invention. The N-type semiconductor 11 and the P-type semiconductor 10 form a PN junction. The first power source 31, the second power source 32, the third power source 33, the fourth power source 34, and the fifth power source 35 are connected in series and thus are collectively represented by the power source 30 in the figure. The positive voltage terminal of the power source 30 is electrically connected to the fifth electrode of the carrier accelerator 65. The negative voltage terminal of the power source 30 is electrically connected to the N-type semiconductor 11. An electrical field is applied between the fifth electrode of the carrier accelerator 65 and the N-type semiconductor 11. The applied electrical field causes the electrons to be injected from the N-type semiconductor 11 to P-type semiconductor 10. The injected electrons move in the accelerating channel 9 on the surface of the P-type semiconductor 10. Positive charges accumulated in the fifth electrode of the carrier accelerator 65 attract the injected electrons with attractive force based on Coulomb's law. Thus, the injected electrons move toward the fifth electrode of the carrier accelerator 65. Electrical fields applied by other accelerating electrodes disposed in the insulator also contribute to the movement of the injected electrons. As illustrated in the figure, the P-type semiconductor 10 does not have a linear shape but has a curved shape. Thus, the electrons moving linearly on the surface of the P-type semiconductor 10 cannot reach the fifth electrode of the carrier accelerator 65. The insulator 8 is provided in the straight direction. As illustrated in FIG. 41, a carrier path deflection N pole 93 and a carrier path deflection S pole 94 are provided on the respective sides of the P-type semiconductor. The magnetic lines of force emanate from the carrier path deflection N pole 93 and enter to the carrier path deflection S pole 94. Thus, a magnetic field is applied from the lower to the upper side in the vertical direction of the P-type semiconductor. The movement path of electrons is curved by the electrons of the carriers moving through the magnetic field. More specifically, the electrons receive Lorentz force while moving on the surface of the P-type semiconductor by the applied magnetic field, whereby the path thereof is curved. As illustrated in FIG. 42, electrons have their path deflected to reach the electron absorption collector 26 to be collected in the electron absorption collector 26. The electron absorption collector 26 is electrically connected to the negative voltage terminal of the energy accumulator 15. The N-type semiconductor 11 is electrically connected to the positive voltage terminal of the energy accumulator 15. The electrons absorbed in the electron absorption collector 26 reach the negative electrode of the energy accumulator 15. The positive holes injected from the P-type semiconductor 10 into the N-type semiconductor 11 reach the positive electrode of the energy accumulator 15. Thus, the positive and negative charges are accumulated in the energy accumulator 15. Accordingly, when an electrical load is connected to both terminals of the energy accumulator 15, the positive holes and the electrons accumulated in the energy accumulator 15 recombine via the electrical load. At this point, electrical energy can be supplied to the electrical load.

<Advantage 10>

In the field effect power generation device described in claim (13), in addition to the operations and advantageous effects of the configuration described in claim (5), thermal energy generated in the electron absorption collector 26 is effectively utilized for generating electrical energy. More specifically, a thermal conductor is disposed in such a manner that the thermal energy generated in the electron absorption collector 26 is advantageously conducted to the thermal conductor. Collision of the electrons with the electron absorption collector 26 generates thermal energy in the electron absorption collector 26. The generated thermal energy is advantageously conducted to the thermal conductor to raise the temperature of the thermal conductor. The thermal conductor is disposed in such a manner that heat can be advantageously conducted to the carrier output material 1 and the channel forming material 2. Thus, the thermal energy conducted to the thermal conductor is advantageously conducted to the carrier output material 1 and the channel forming material 2. As a result, the temperature of the channel forming material 2 rises. Electron emission from a material of which temperature rises is described below.

FIG. 43 shows a formula of thermal electron emission established by S. Dushman (1923) and described in Pg. 45 of the reference literature "Electronic Engineering Principles, by John D. Ryder (Prentice-Hall, Inc.)". According to the formula, emitted current is proportional to about the square root of an absolute temperature T of a cathode. FIG. 44 depicts an electron emission characteristic of tungsten obtained by calculating characteristic curve based on the formula of thermal electron emission established by S. Dushman (1923). According to the figure, the number of emitted electrons exponentially increases in relation to the absolute temperature T of the cathode. In the field effect power generation device of the present invention, thermal energy is conducted from the thermal conductor to the channel forming material 2 to raise the absolute temperature T of the channel forming material 2. Thus, a large number of electrons are emitted from the channel forming material 2. Emission of a large number of electrons increases electrical energy to be accumulated in the energy accumulator 15. The above-mentioned energy circulation path forms a positive feedback system, whereby power generation amount increases and the temperatures of components rise with the passage of time. Therefore, it is necessary to set a limit to the power generation amount or the temperature of the components. When the power generation system exceeds the limited range, the system needs to be set to a normal operation by lowering the voltage of power supplied to the electrode of the carrier accelerator 60. The temperature increase of the channel forming material 2 is caused as a result of conversion of kinetic energy of flying electrons into thermal energy. Thus, the source of all energy of the power generation device of the present invention is generated by the effect of electrical field acting on the electrons. In conclusion, electrical energy can be generated extremely advantageously by forming the positive feedback system using the energy generated by field effect acceleration of electrons. Since almost no energy is lost in applying an electrical field, power generation efficiency of the field effect power generation device of the present invention can be regarded as being extremely high.

<Advantage 11>

In the field effect power generation device described in claim (14), in addition to the operations and advantageous effects of the configuration described in claim (5), a carbon-based material is used as the carrier input material, sub-nanometer materials are disposed on the surface of the carbon-based material, and thus a power generation device with higher efficiency can be formed. The case where asperities of sub-nanometers in size are provided on the surface of the channel forming material 2 is described below. In FIG. 45, a carbon-based material is used as the channel forming material 2. In the figure, a carbon-based material 76 is disposed on the upper surface of the substrate 19 and a sub-nanometer material 75 is disposed on the upper surface of the carbon-based material 76. Examples of the carbon-based material 76 include graphene and graphite. An example of the sub-nanometer material 75 includes ruthenium oxide. FIG. 46 is an enlarged view of the carbon-based material 76 and the sub-nanometer material 75. Pieces of ruthenium oxide as the sub-nanometer material 75 are accumulated on the surface of the carbon-based material 76 by the reaction between ruthenium tetroxide and the carbon-based material. Ruthenium oxide is smaller than 1 nanometer and thus, electrons injected into the channel forming material 2 move, while flying and being accelerated, between the sub-nanometer materials 75. Thus, by using the sub-nanometer material 75, the concentration effect of an electrical field is eminently exerted to increase the number of emitted electrons. Thus, efficiency of the field effect power generation device of the present invention can be improved.

<Advantage 12>

In the field effect power generation device described in claim (15), in addition to the operations and advantageous effects of the configuration described in claim (5), an output voltage can be controlled by adjusting the voltage of a power source used for the carrier accelerator. Thus, the temperature rise can be kept down and a device with high durability can be developed. FIG. 47 is a cross-sectional view of a field effect power generation device in which the output voltage is controlled by switching. In the figure, the positive voltage terminal of the first power source 31 is electrically connected with the first electrode of the carrier accelerator 61. The negative voltage terminal of the first power source 31 is electrically connected with the carrier output material 1 via a mode 1 start switch 101. The first power source 31 is used to inject electrons serving as carriers from the carrier output material 1 to the channel forming material 2. The negative voltage terminal of the second power source 32 is electrically connected with the first electrode of the carrier accelerator 61. The positive voltage terminal of the second power source 32 is electrically connected with the second electrode of the carrier accelerator 62. The negative voltage terminal of the third power source 33 is electrically connected with the second electrode of the carrier accelerator 62. The positive voltage terminal of the third power source 33 is electrically connected with the third electrode of the carrier accelerator 63. The negative voltage terminal of the fourth power source 34 is electrically connected with the third electrode of the carrier accelerator 63. The positive voltage terminal of the fourth power source 34 is electrically connected with the fourth electrode of the carrier accelerator 64.

In the mode 1 of the field effect power generation, the mode 1 start switch 101 is in a conductive state, whereas a mode 2 start switch 102 is in a non-conductive state. FIG. 48 shows an enlarged view of a first stage emitter 105 and its periphery. An electrical field is applied between the first electrode of the carrier accelerator 61 to which positive voltage is applied and the carrier output material 1 to which negative voltage is applied. Electrons serving as carriers are injected from the carrier output material 1 to the channel forming material 2 by the effect of the electrical field. Upon injection, the electrons penetrate a potential barrier between the carrier output material 1 and the channel forming material 2 by the tunneling effect by the electrical field applied between the first electrode of the carrier accelerator 61 and the carrier output material 1. The injected electrons move on the surface of the channel forming material 2 in the accelerating channel 9. A radius of a curvature of the tip of the channel forming material 2 is assumed to be sufficiently small. An example of the channel forming material 2 includes a carbon nanotube, a carbon wall and graphene. The carrier output material 1 and the channel forming material 2 are electrically connected with each other. When the channel forming material 2 is a carbon-based material, a special bonding technique is required to electrically connect the carrier output material 1 and the channel forming material 2. Specifically, if titanium is exemplarily used as the carrier output material 1, the carrier output material 1 and the carbon-based channel forming material 2 can be appropriately and electrically connected with each other at about 1100° C. In the field effect power generation device employing the feedback method of present invention, the carrier output material 1 is heated to a high temperature, and thus excellent power generation efficiency can be obtained by electrically connecting the carrier output material 1 and the channel forming material 2 at high temperature.

The electrons injected into the channel forming material 2 are accelerated in the accelerating channel 9 by the electrical field applied by the first electrode of the carrier accelerator 61, whereby the electrons have large kinetic energy. The electrons having large kinetic energy reach the irreversible process occurrence section 4 and then are emitted from the channel forming material 2. Upon emission, the electrons penetrate and pass through the potential barrier corresponding to the work function between the channel forming material 2 and a vacuum by the tunneling effect based on the applied electrical field, whereby the electrons are emitted into a vacuum.

The field effect power generation device has a shape of a cylinder. Thus, the electrons as the carriers receive axial symmetric force, move in the axial direction, and collide with a first stage electron absorption collector 127, whereby the electrons are absorbed in the first stage electron absorption collector 127. The electrons absorbed in the first stage electron absorption collector 127 move to a mode 1 energy accumulator 115. Meanwhile, positive holes having positive charges remain in the first stage emitter 105 that has emitted the electrons serving as the carriers. The positive holes move to the mode 1 energy accumulator 115 to form a dipole with the electrons. The electrons reaching the first stage electron absorption collector 127 move to the mode 1 energy accumulator 115, and thus almost no electrons remain in the first stage electron absorption collector 127. Accordingly, the path of electrons subsequently approaching the first stage electron absorption collector 127 is almost never blocked. In other words, negative charges of the electrons almost never affect the movement direction of the subsequent electrons because the electrons and the positive holes form a dipole in the mode 1 energy accumulator 115. Similarly, the positive holes move from the first stage emitter 105 to the mode 1 energy accumulator 115 to form a dipole with the electrons and thus, the positive charges of the positive holes moving from the carrier output material 1 to the channel forming material 2 almost never interfere with the movement of the electrons. Thus, the power generation device of the present invention has the feature of excellent power generation. In previously proposed power generation devices, electrons and positive holes remain in the original material and interfere with the movement of subsequent carriers, and thus highly efficient power generation is difficult to be achieved therewith.

The collision of the emitted and accelerated electrons with the first stage electron absorption collector 127 raises the temperature of the first stage electron absorption collector 127. The thermal energy of the first stage electron absorption carrier 127 is conducted to a second stage emitter 106 through a mode 1 thermal conductor 120 to raise the temperature of the second stage emitter 106. The temperature rise of the second stage emitter 106 increases kinetic energy of electrons in the second stage emitter 106.

In the mode 2 of the field effect power generation, the mode 1 start switch 101 is in a non-conductive state and the mode 2 start switch 102 is in a conductive state. In FIG. 47, the positive voltage terminal of the fifth power source 35 is electrically connected with the fifth electrode of the carrier accelerator 65. The negative voltage terminal of the fifth power source 35 is electrically connected with the carrier output material 1 via the mode 2 start switch 102. The negative voltage terminal of the sixth power source 36 is electrically connected with the fifth electrode of the carrier accelerator 65. The positive voltage terminal of the sixth power source 36 is electrically connected with the sixth electrode of the carrier accelerator 66. A negative voltage terminal of the seventh power source 37 is electrically connected with the sixth electrode of the carrier accelerator 66. A positive voltage terminal of the seventh power source 37 is electrically connected with the seventh electrode of the carrier accelerator 67. A negative voltage terminal of the eighth power source 38 is electrically connected with the seventh electrode of the carrier accelerator 67. A positive voltage terminal of the eighth power source 38 is electrically connected with the eighth electrode of the carrier accelerator 68.

FIG. 48 shows an enlarged view of the second stage emitter 106 and its periphery. An electrical field is applied between the fifth electrode of the carrier accelerator 65 to which positive voltage is applied and the carrier output material 1 to which negative voltage is applied. The effect of the electrical field causes electrons as carriers to be injected from the carrier output material 1 to the channel forming material 2. Upon injection, the electrons penetrate a potential barrier between the carrier output material 1 and the channel forming material 2 by the tunneling effect by the electrical field applied between the fifth electrode of the carrier accelerator 65 and the carrier output material 1. The injected electrons move in the accelerating channel 9. A radius of a curvature of the tip of the channel forming material 2 is assumed to be sufficiently small. Examples of the channel forming material 2 include a carbon nanotube, a carbon wall, and graphene. The carrier output material 1 and the channel forming material 2 are electrically connected with each other. In the case where the channel forming material 2 is a carbon-based material, a special bonding technique is required to electrically connect the carrier output material 1 and the channel forming material 2. A concrete example of the special technique is such that preferable electrical connection can be realized by using the carbon-based material and high-temperature titanium. The electrons injected into the channel forming material 2 are accelerated in the accelerating channel 9 by the electrical field applied by the electrodes of the carrier accelerator, whereby the electrons have large kinetic energy. The electrons having large kinetic energy reach the irreversible process occurrence section 4, and then are emitted from the channel forming material 2. Upon emission, the electrons penetrate and pass through the potential barrier corresponding to the work function between the channel forming material 2 and a vacuum by the tunneling effect based on the applied electrical field, whereby the electrons are emitted into a vacuum.

The field effect power generation device has a shape of a cylinder. Thus, the electrons as the carriers receive axial symmetric force, move in the direction of the axis, and collide with a second stage electron absorption collector 128 to be absorbed therein. The electrons absorbed in the second stage electron absorption collector 128 move to a mode 2 energy accumulator 116. Meanwhile, positive holes having positive charges remain in the second stage emitter 106 that has emitted the electrons as the carriers. The positive holes move to the mode 2 energy accumulator 116 to form a dipole with the electrons. The electrons reaching the second stage electron absorption collector 128 move to the mode 2 energy accumulator 116, and thus almost no electrons remain in the second stage electron absorption collector 128. Accordingly, the path of electrons subsequently reaching the second stage electron absorption collector 128 is almost never blocked. In other words, negative charges of the electrons almost never affect the movement direction of the subsequent electrons because the electrons and the positive holes form a dipole in the mode 2 energy accumulator 116. Similarly, the positive holes move from the carrier output material 1 to the mode 2 energy accumulator 116 to form a dipole with the electrons thereat and thus, the positive charges of the positive holes almost never interfere the movement of the electrons from the carrier output material 1 to the channel forming material 2. Thus, the power generation device of the present invention has the feature of excellent power generation. In previously proposed power generation devices, electrons and positive holes remain in the original material and interfere with the movement of subsequent carriers, and thus highly efficient power generation is difficult to be achieved therewith. The collision of the emitted and accelerated electrons with the second stage electron absorption collector 128 raises the temperature of the second stage electron absorption collector 128. The thermal energy of the second stage electron absorption carrier 128 is conducted to the first stage emitter 105 through a mode 2 thermal conductor 121 to raise the temperature of the first stage emitter 105. The temperature rise of the first stage emitter 105 increases kinetic energy of electrons in the first stage emitter 105. Thus, when the next turn of the mode 1 is started, the number of emitted electrons increases because the kinetic energy of the electrons in the first stage emitter 105 is large. By alternately repeating the mode 1 and the mode 2 of the field effect power generation, the temperatures of the first stage emitter and the second stage emitter progressively rise and the number of emitted electrons increases accordingly. Thus, in the field effect power generation device of the present invention, the power generation amount increases with the passage of time. The number of emitted electrons is controlled by switching the mode 1 start switch 101 and the mode 2 start switch 102. Thus, the temperature rise of the entire device can be kept down. As a result, the field effect power generation employing a method in which the output voltage thereof is controlled by switching operation and performing feedback of thermal energy has high durability and excellent power generation efficiency.

EMBODIMENTS

<First Embodiment>

Figure 1:
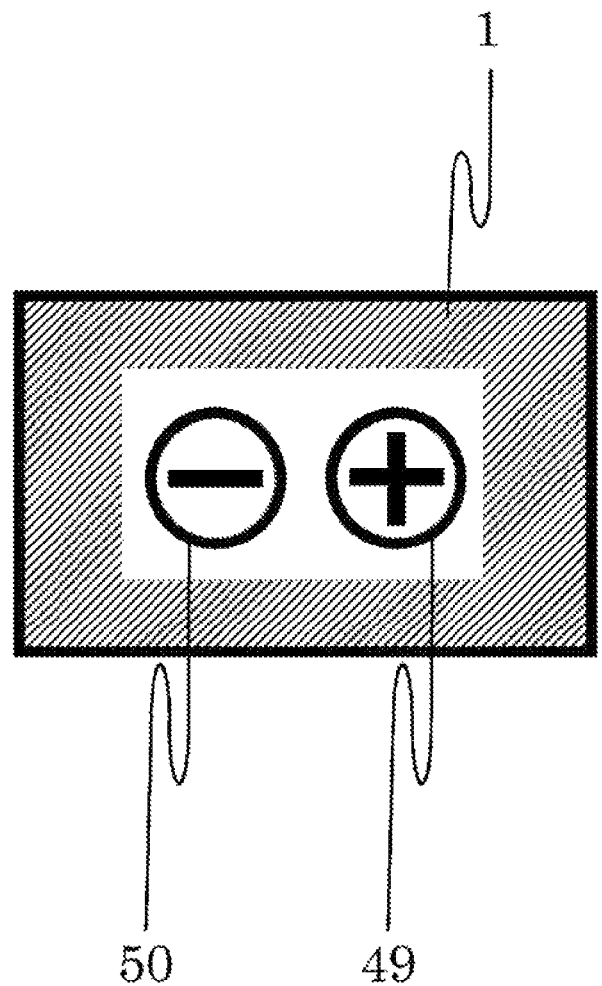
FIG. 1 shows an example in which positive and negative charges are present in a material.
Figure 2:
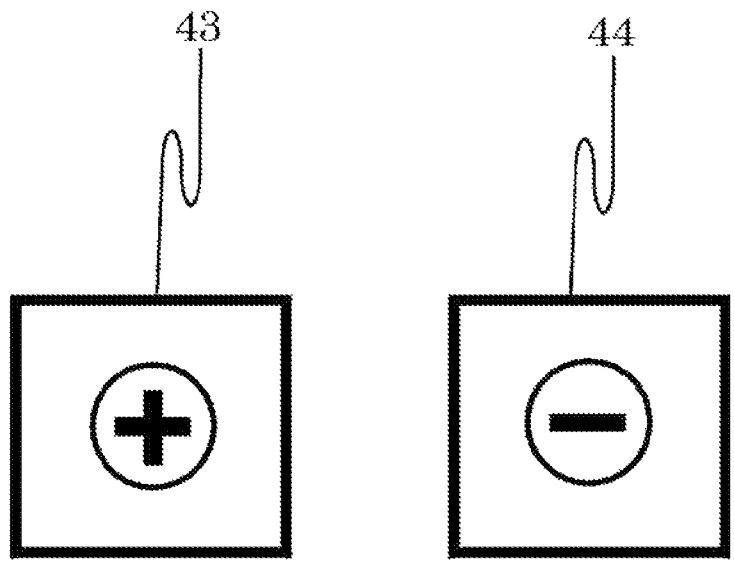
FIG. 2 shows power source positive voltage terminal and the power source negative voltage terminal in a field effect power generation device of the invention.
Figure 3:
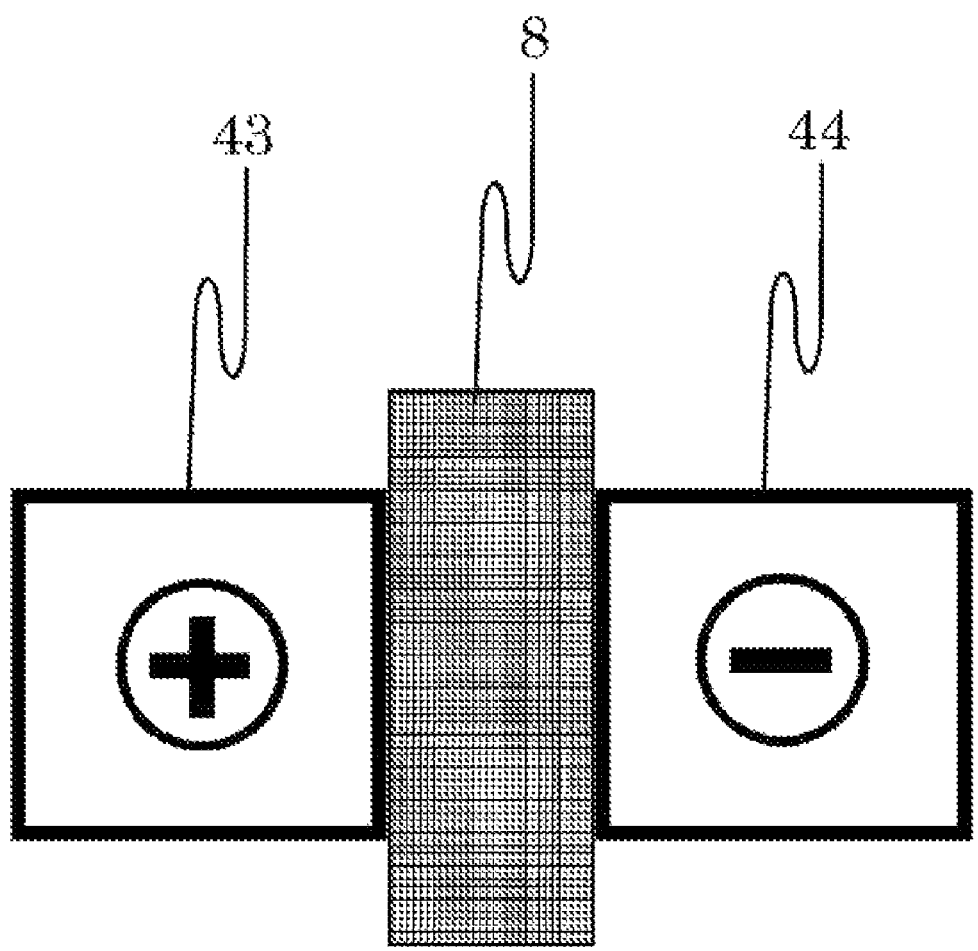
FIG. 3 shows an example in which an insulator is present between the power source positive voltage terminal and the power source negative voltage terminal in the field effect power generation device of the invention.
Figure 4:
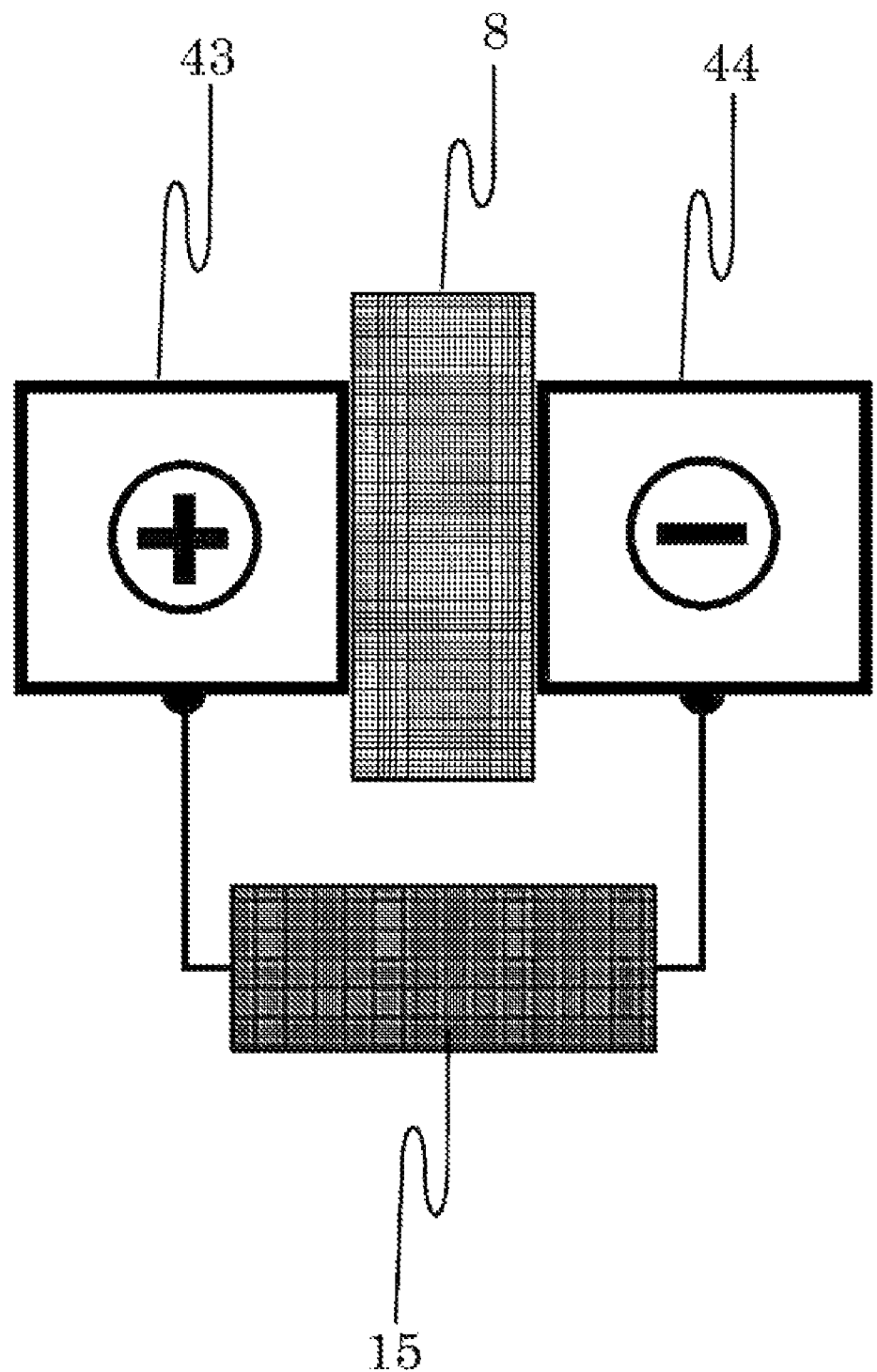
FIG. 4 shows an example in which an energy accumulator is connected between the power source positive voltage terminal and the power source negative voltage terminal in the field effect power generation device of the invention.
Figure 5:
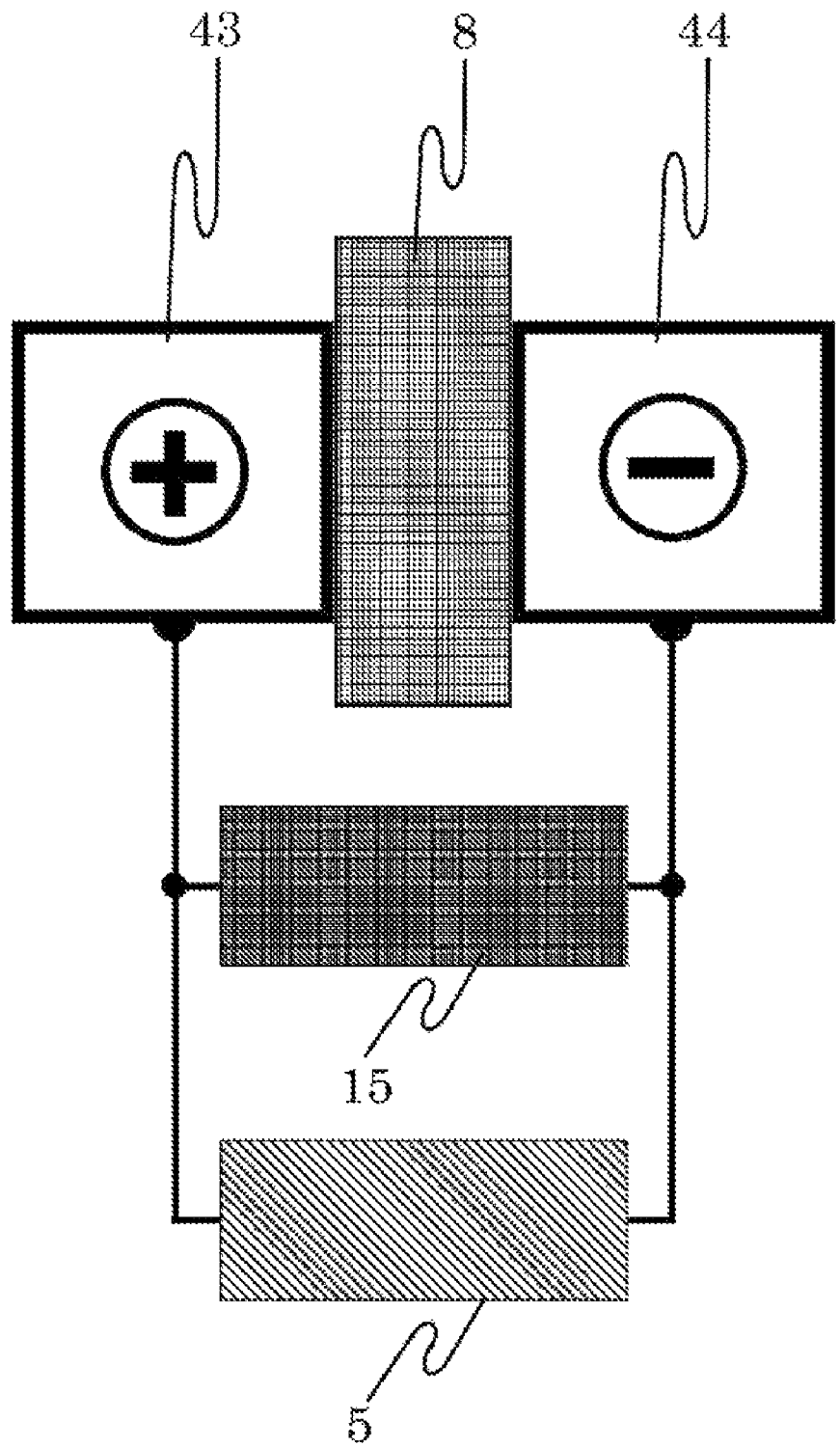
FIG. 5 shows an example in which an electrical load is connected in parallel to the energy accumulator in the field effect power generation device of the invention.
Figure 6:
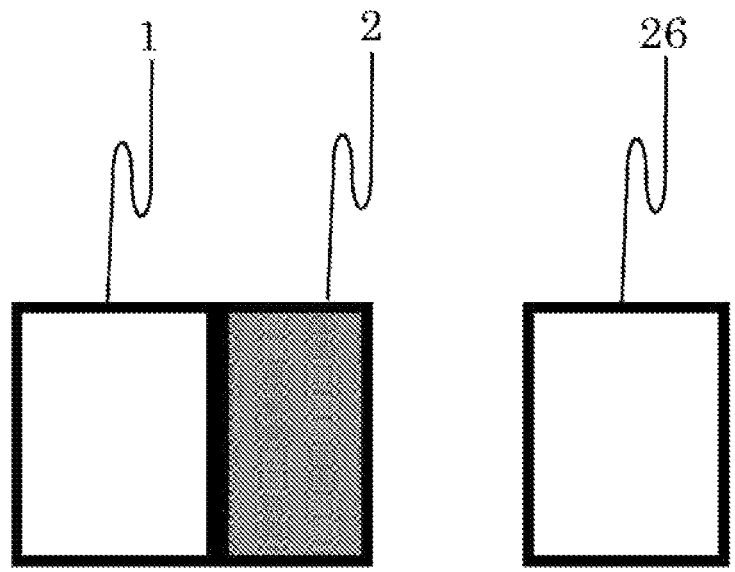
FIG. 6 shows an example in which a carrier output material and a channel forming material are electrically connected and the channel forming material is disposed between the carrier output material and an electron absorption collector in the field effect power generation device of the invention.
Figure 7:
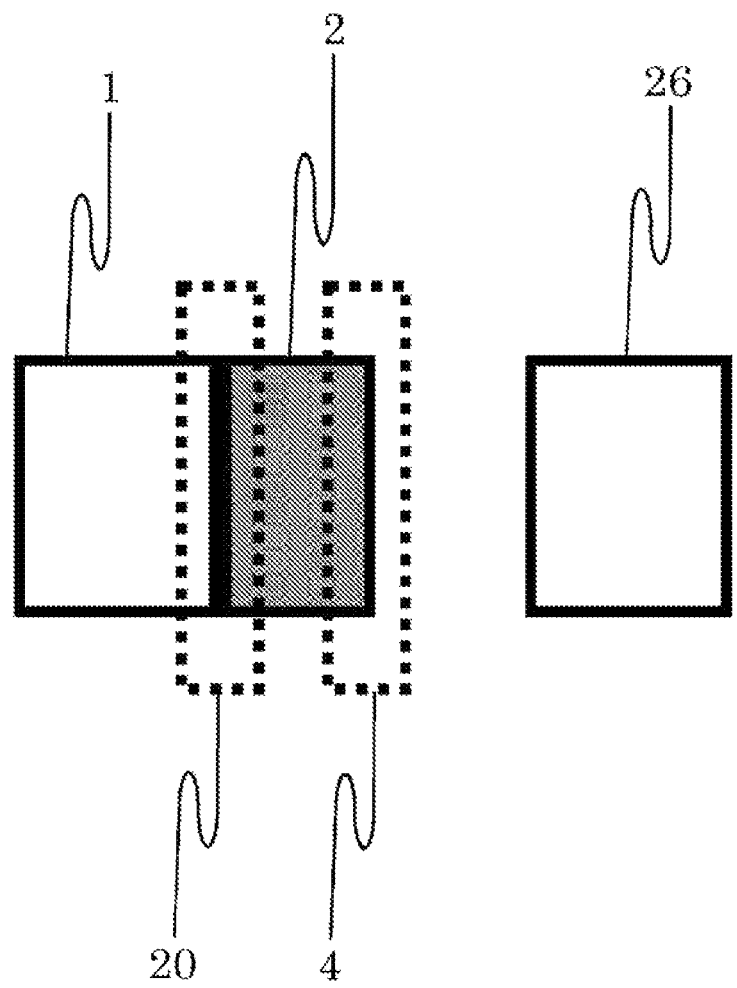
FIG. 7 shows a potential barrier occurrence portion between the carrier output material and the channel forming material and an irreversible process occurrence section located at the boundary of the channel forming material in the field effect power generation device of the invention.
Figure 8:
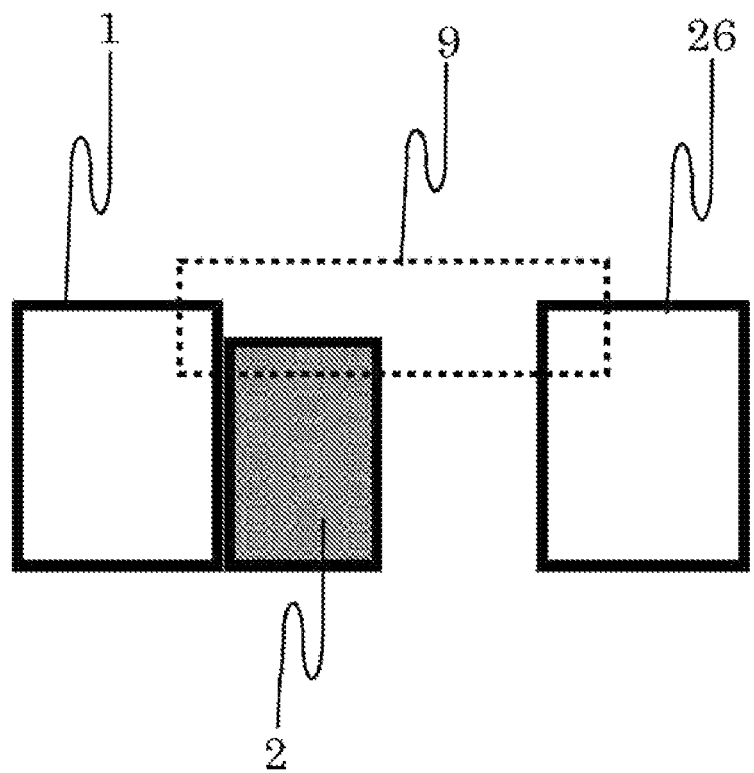
FIG. 8 shows an accelerating channel on the surface of the channel forming material in the field effect power generation device of the invention.
Figure 9:
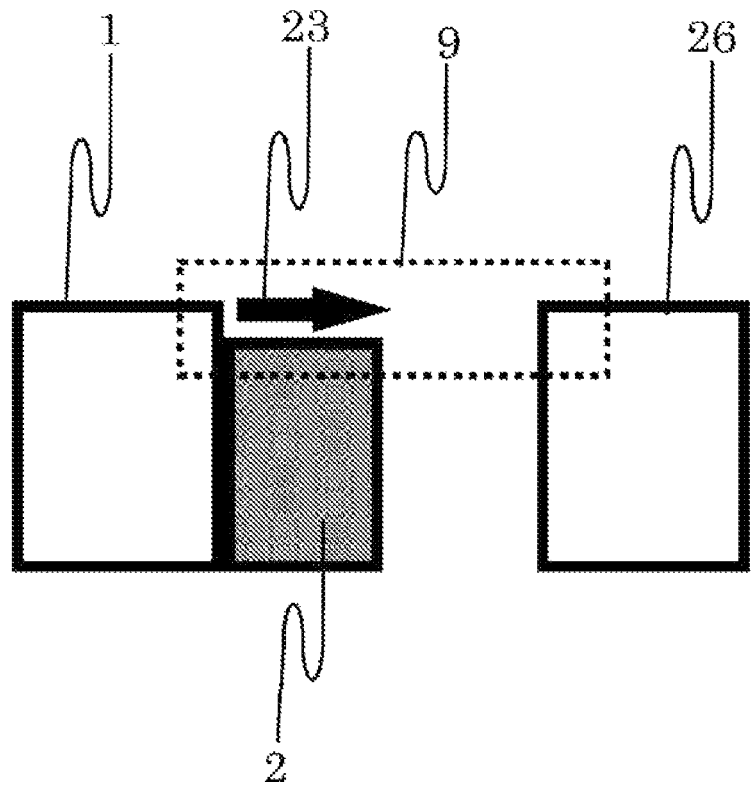
FIG. 9 shows an example in which carriers perform sliding motion across the surface of the channel forming material in the field effect power generation device of the invention.
Figure 10:
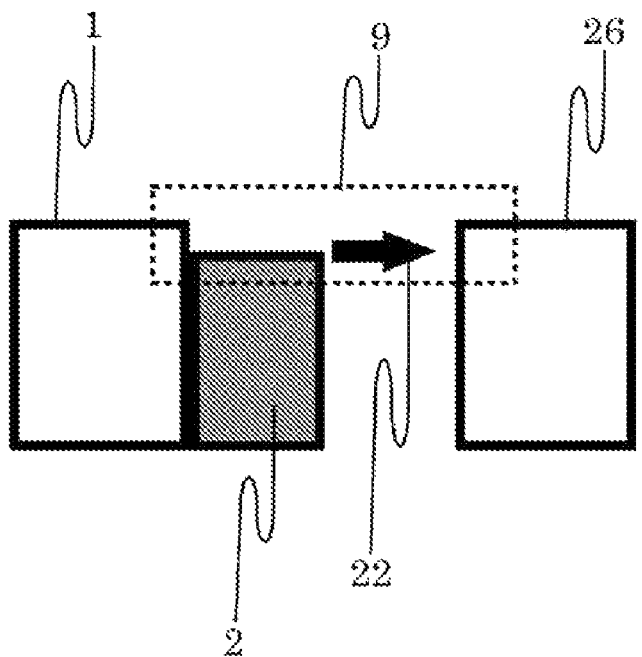
FIG. 10 shows an example in which electrons are emitted from the channel forming material in the field effect power generation device of the invention.
Figure 11:
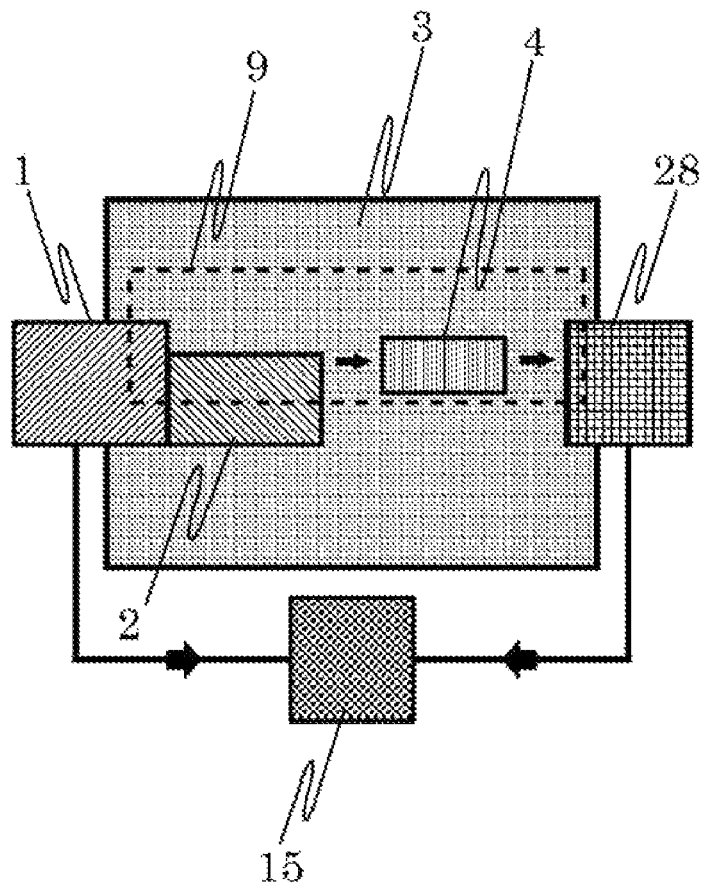
FIG. 11 is a block diagram of the field effect power generation device of the invention.
Figure 12:
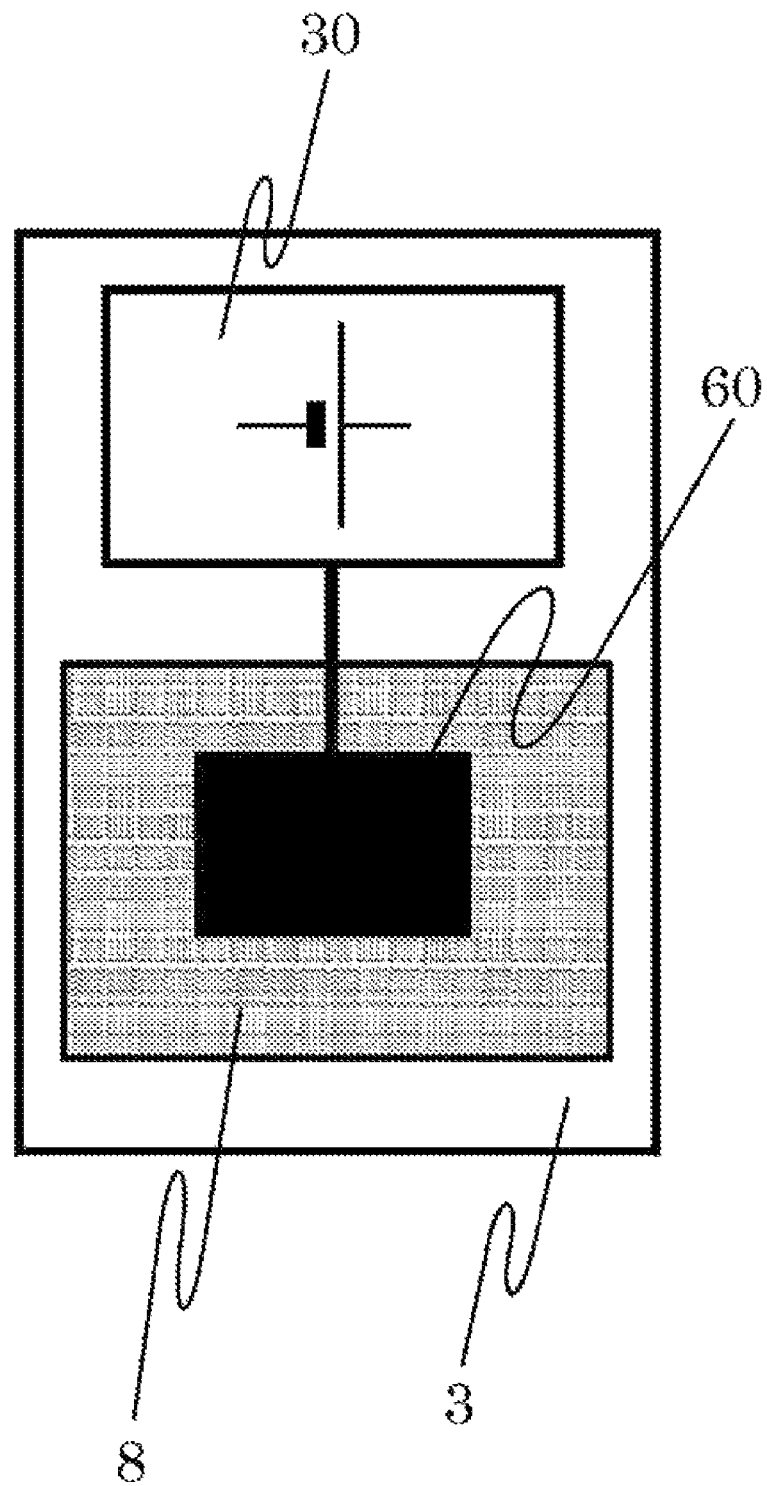
FIG. 12 is a block diagram illustrating the inside of the carrier accelerator in the field effect power generation device of the present invention.
Figure 13:
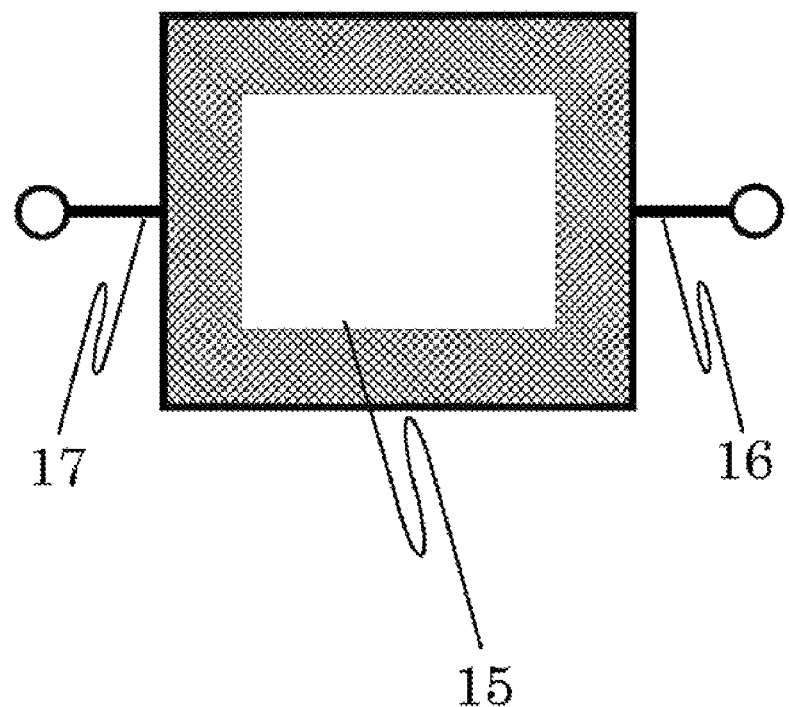
FIG. 13 shows the energy accumulator in the field effect power generation device of the invention.
Figure 14:
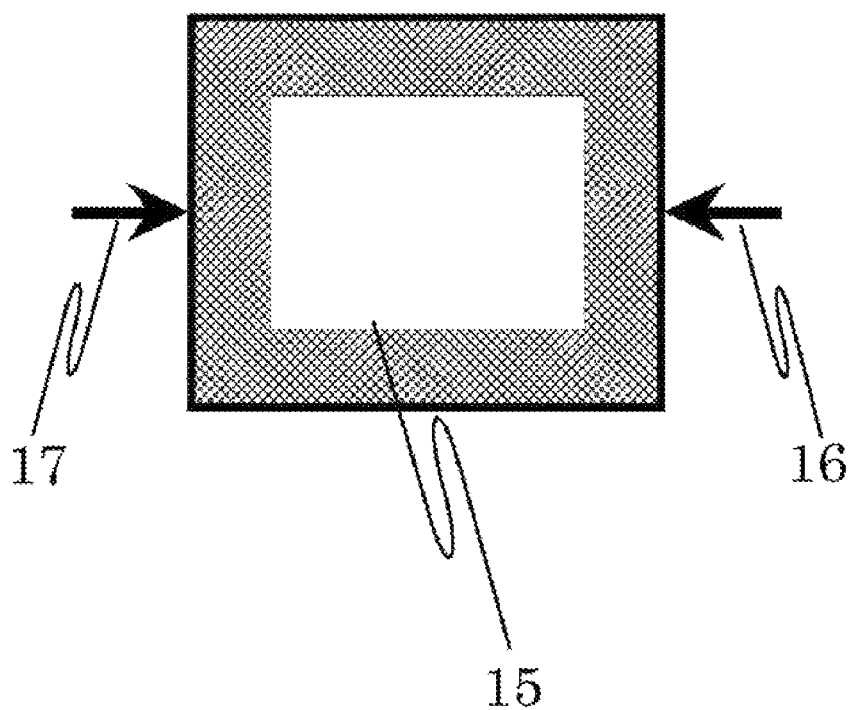
FIG. 14 shows an input mode of the energy accumulator in the field effect power generation device of the invention.
Figure 15:
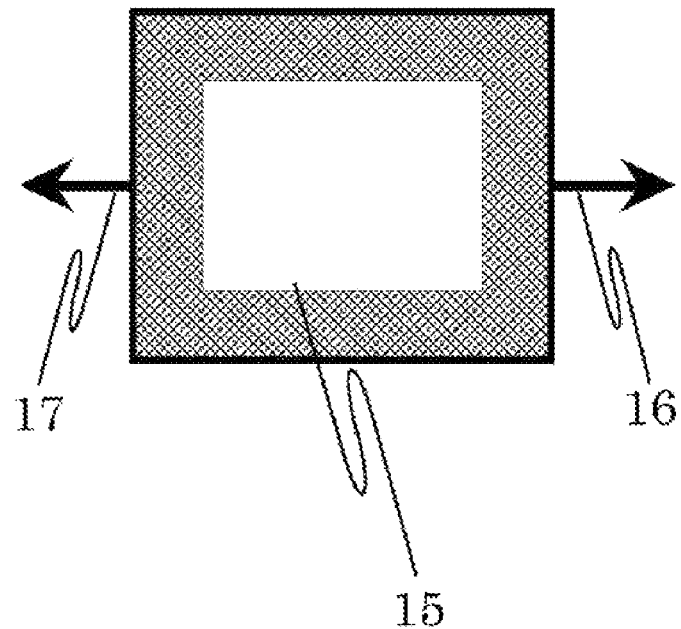
FIG. 15 shows an output mode of the energy accumulator in the field effect power generation device of the invention.
Figure 16:
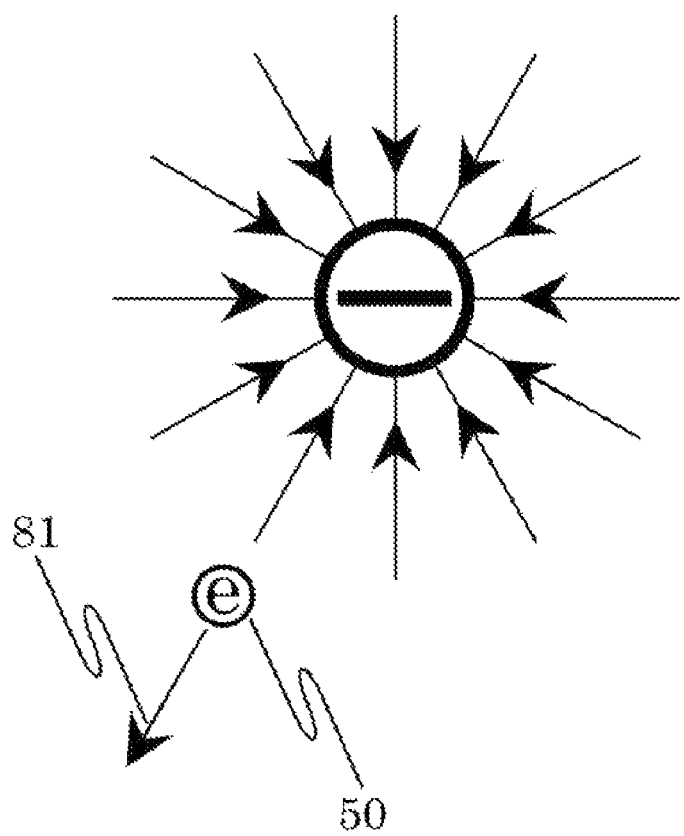
FIG. 16 shows a specific example of monopole.
Figure 17:
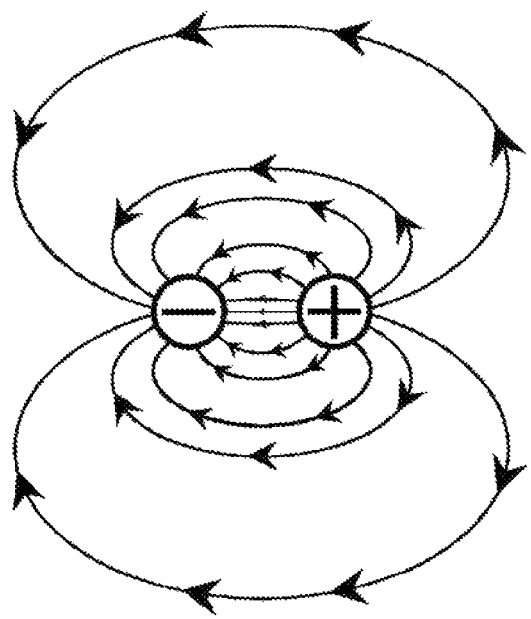
FIG. 17 shows a dipole composed of positive and negative charges.
Figure 18:
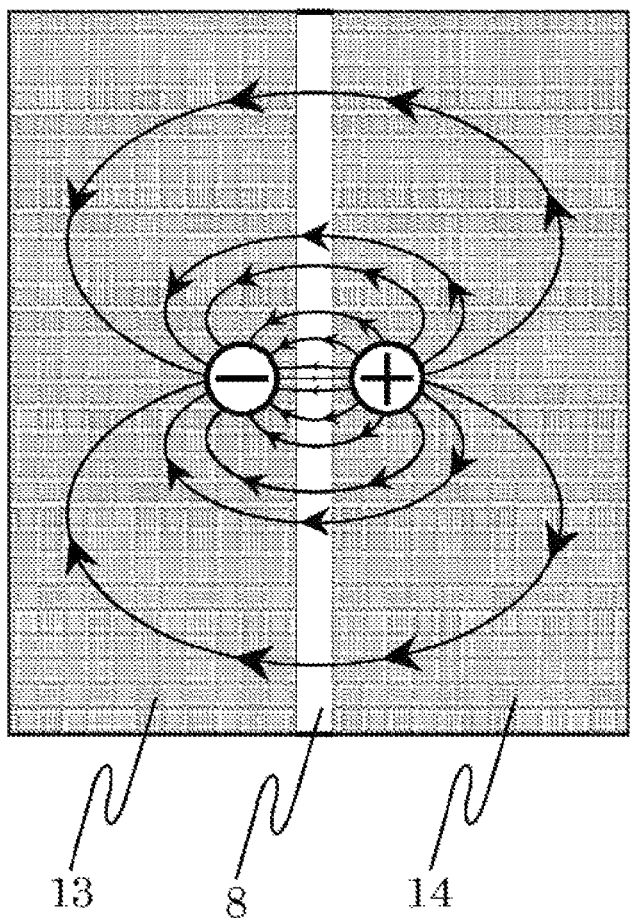
FIG. 18 shows an example in which the dipole is formed in a positive charge accumulation conductor and a negative charge accumulation conductor.
Figure 19:
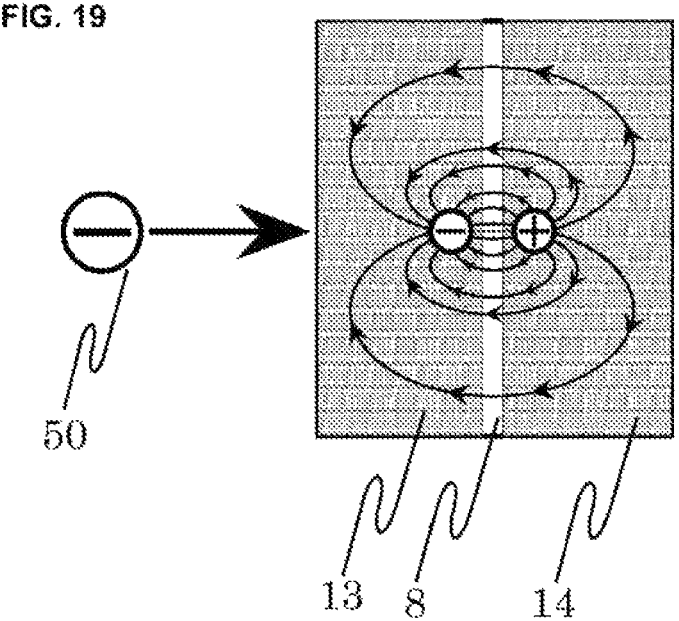
FIG. 19 shows an example in which an electron approaches the dipole.
Figure 20:
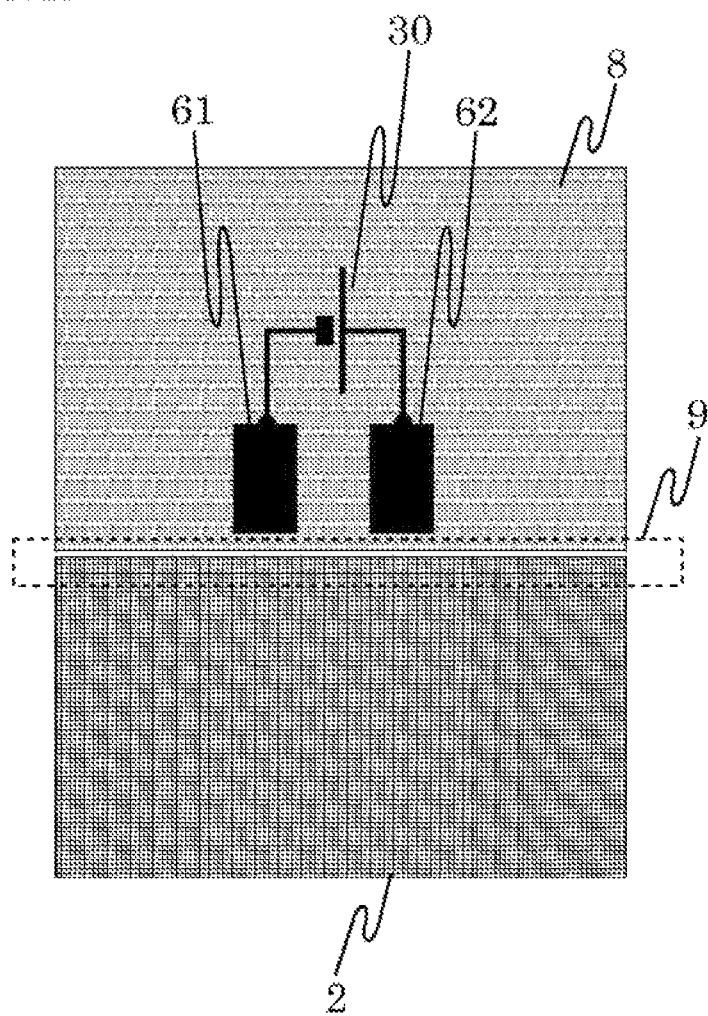
FIG. 20 shows an example in which the carrier accelerator is formed by a plurality of electrodes in the field effect power generation device of the invention.
Figure 21:
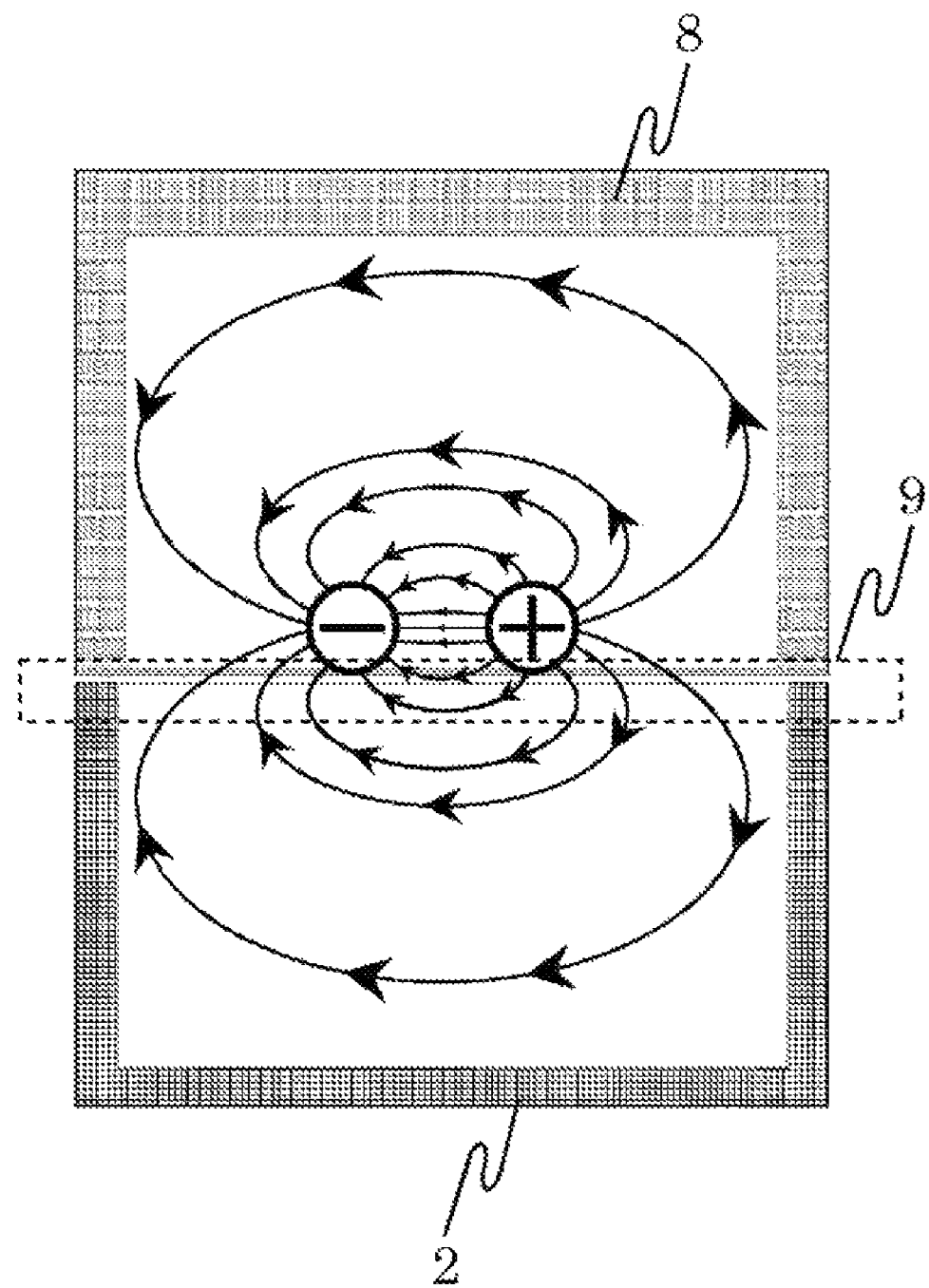
FIG. 21 shows an example in which an accelerating channel is formed between the channel forming material and the insulator in the field effect power generation device of the invention.
Figure 22:
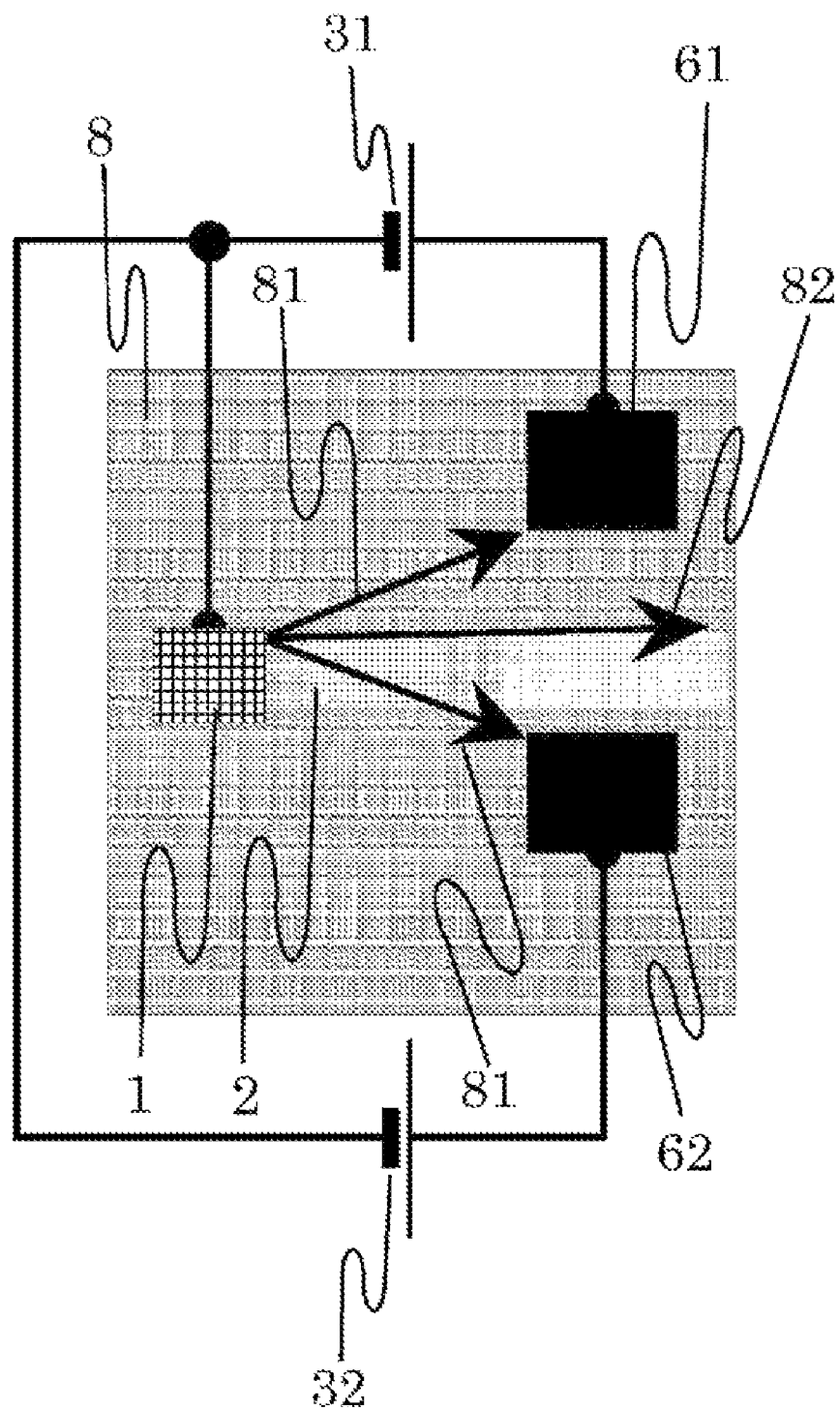
FIG. 22 shows movement of the carriers in an area around the carrier output material and the channel forming material in the field effect power generation device of the invention.
Figure 23:
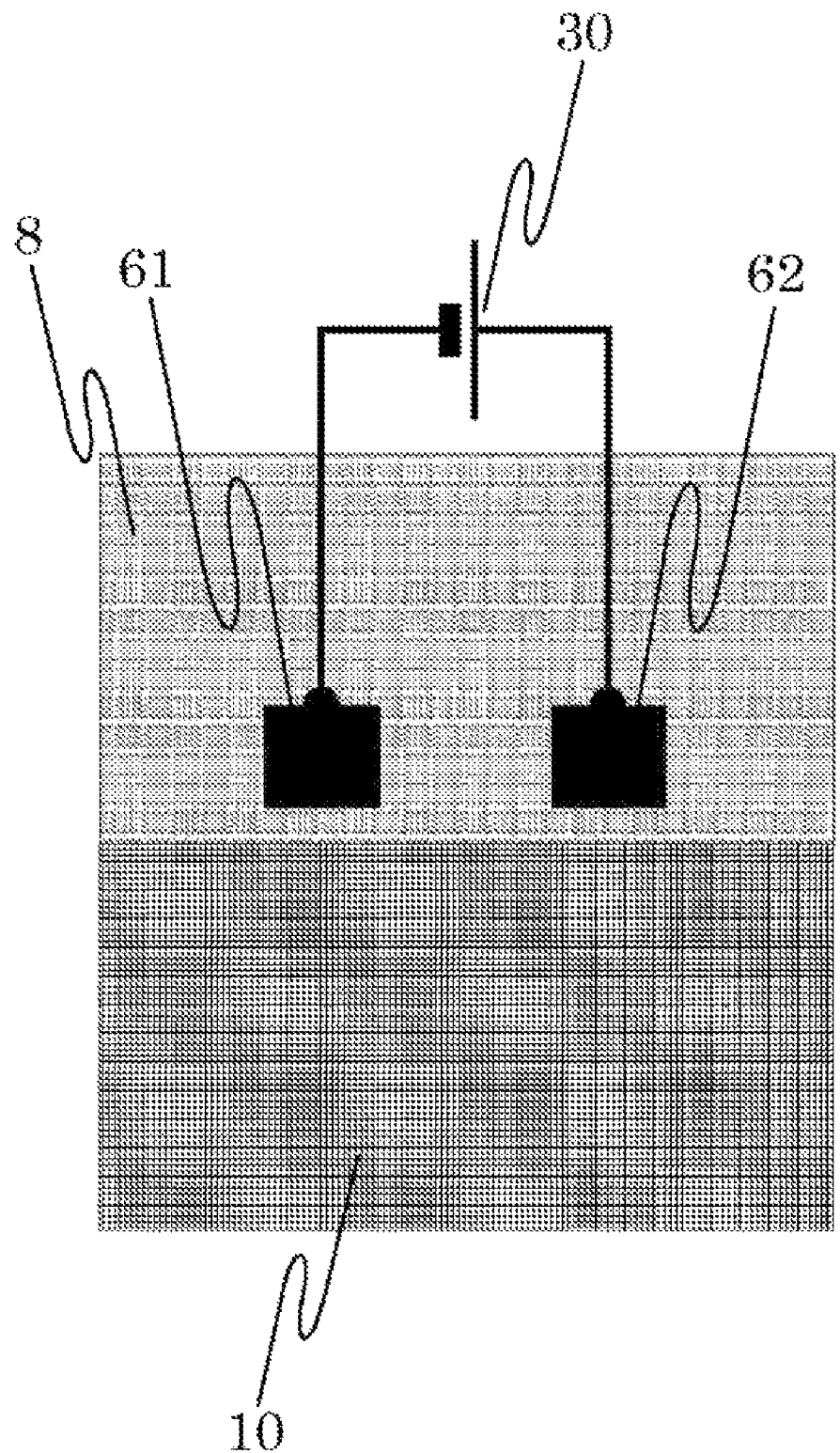
FIG. 23 shows two electrodes of the carrier accelerator in the insulator with the channel forming material being the P-type semiconductor in the field effect power generation device of the invention.
Figure 24:
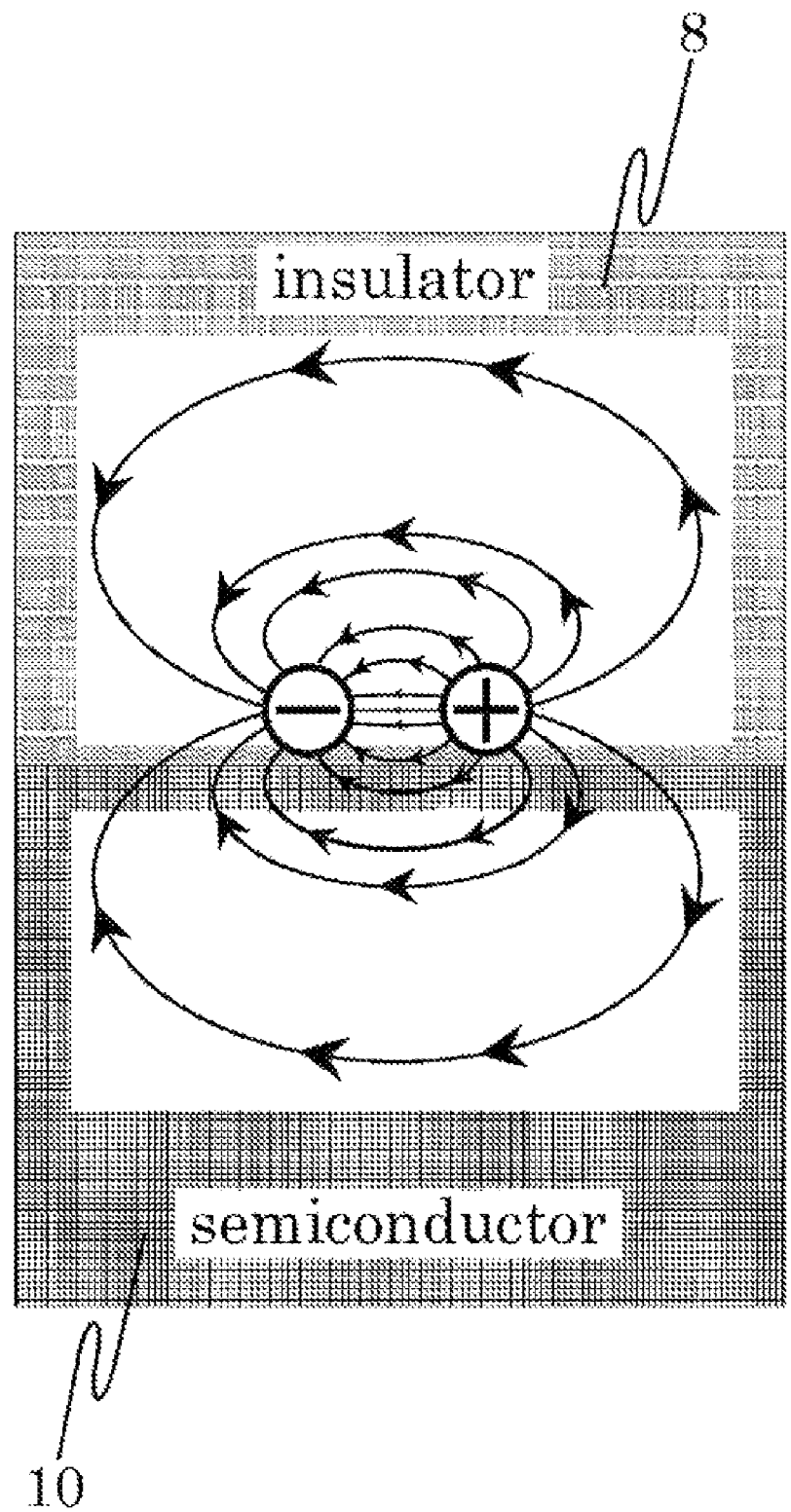
FIG. 24 shows electrical lines of force generated by the first electrode of the carrier accelerator and the second electrode of the carrier accelerator in the field effect power generation device of the invention.
Figure 25:
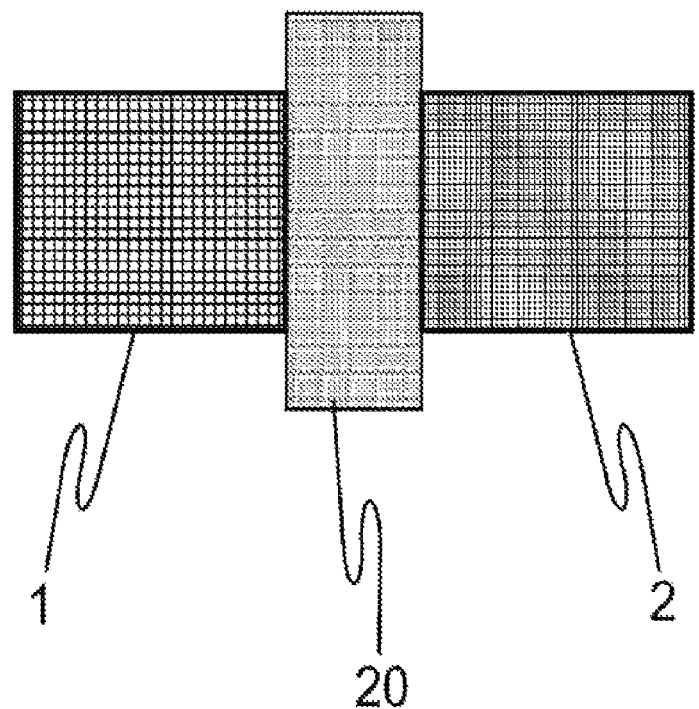
FIG. 25 shows an example in which the potential barrier occurrence portion is formed between the carrier output material and the channel forming material in the field effect power generation device of the invention.
Figure 26:
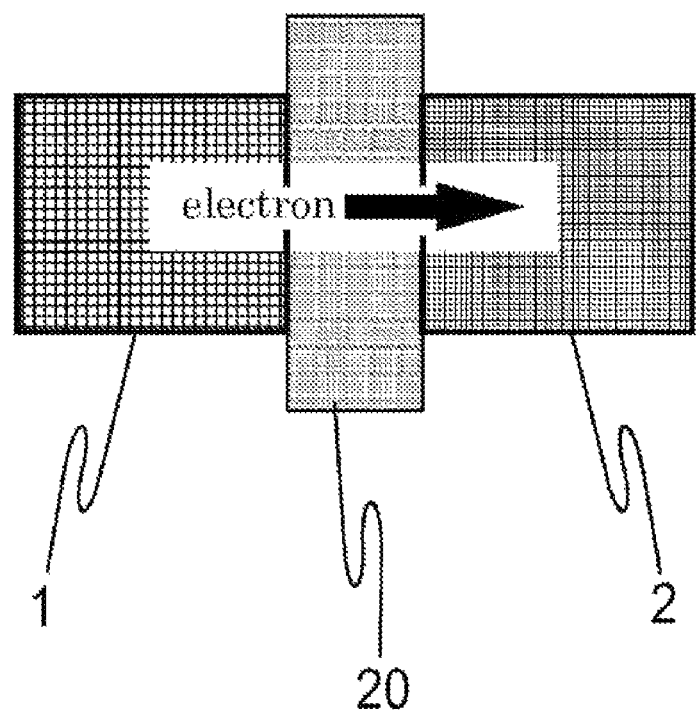
FIG. 26 shows an example in which an electron passes from the carrier output material to the channel forming material by the quantum tunneling effect.
Figure 27:
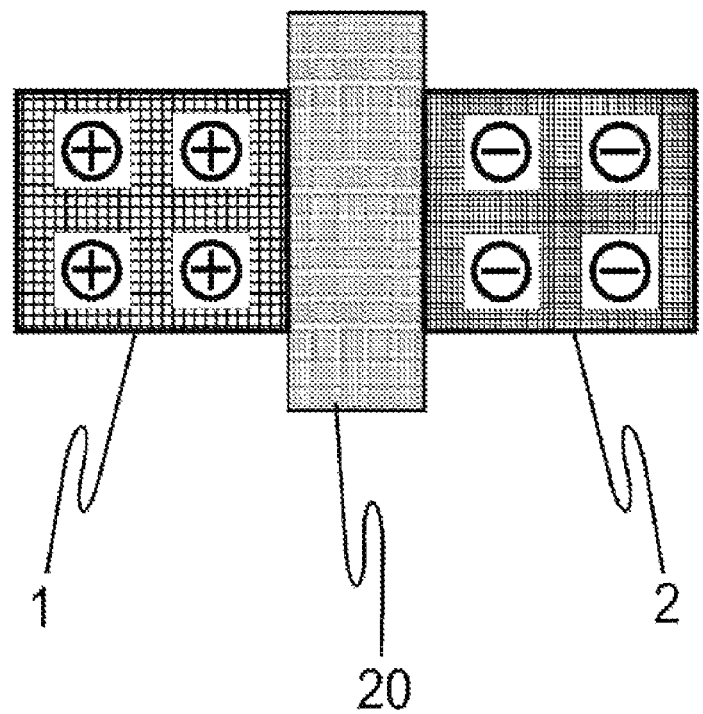
FIG. 27 shows an example in which positive charges are accumulated in the carrier output material and negative charges are accumulated in the channel forming material.
Figure 28:
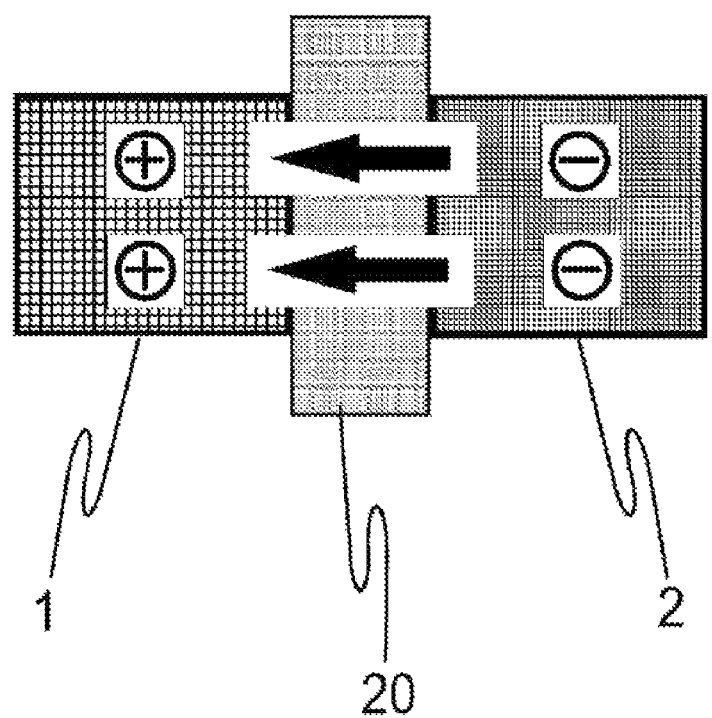
FIG. 28 shows a reversible process in which electrons in the channel forming material return to the carrier output material.
Figure 29:
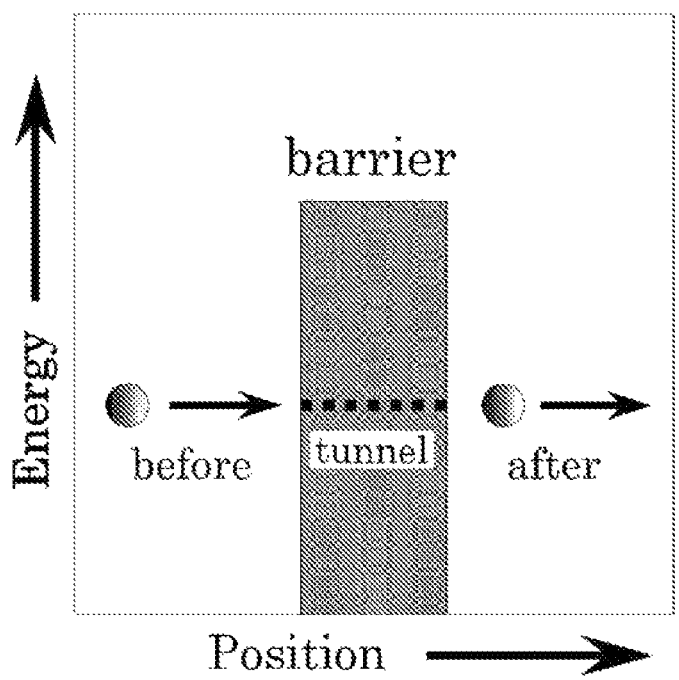
FIG. 29 shows an example in which an electron is penetrating the potential barrier by the quantum tunneling effect.
Figure 30:
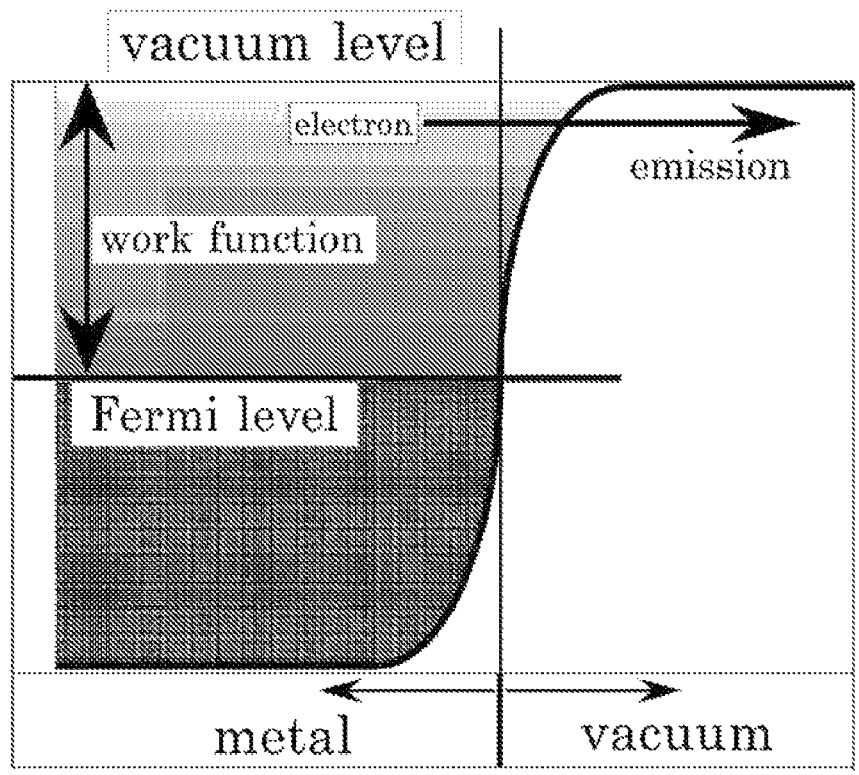
FIG. 30 shows thermal emission of electrons in which electrons are emitted beyond a potential barrier.
Figure 31:
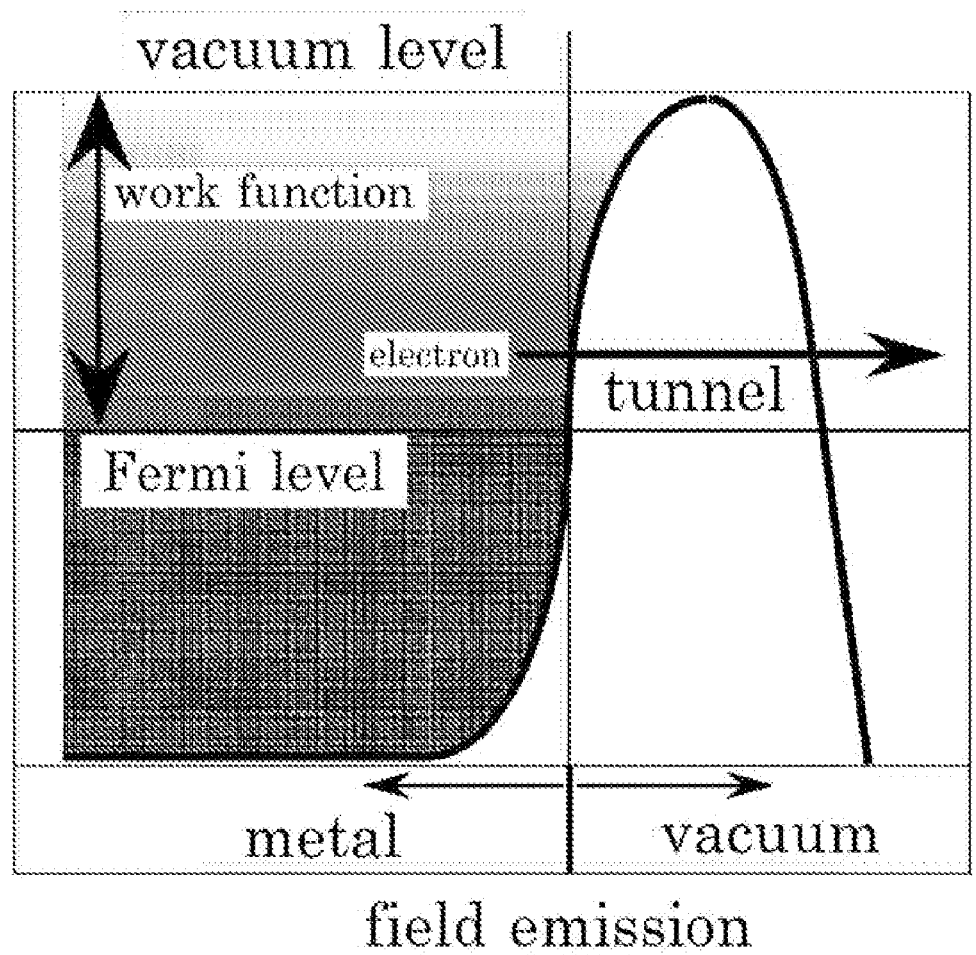
FIG. 31 shows an example in which a stronger electrical field reduces the thickness of the potential barrier, whereby electrons pass by the quantum tunneling effect.
Figure 32:
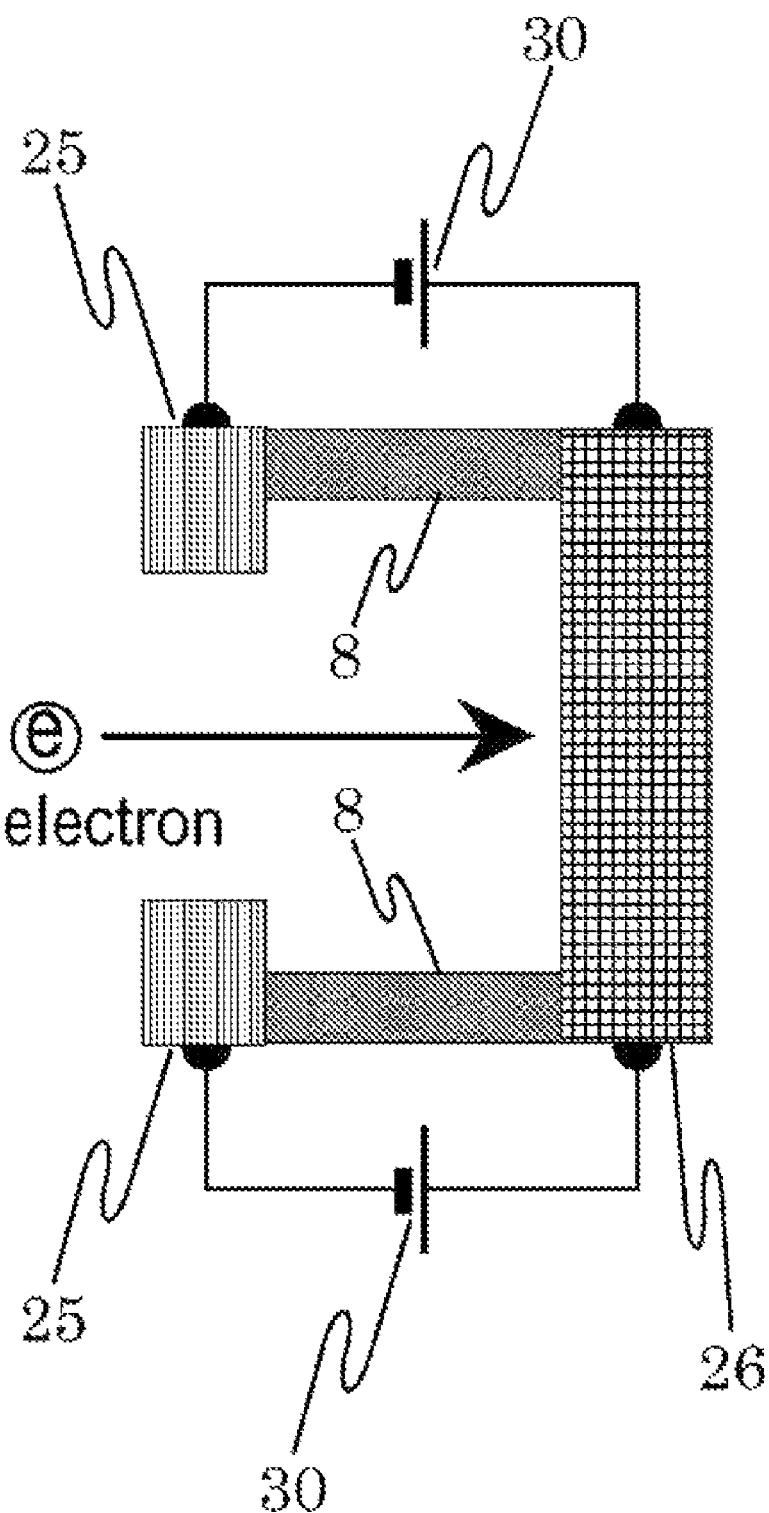
FIG. 32 shows an example in which a flying electron passes through suppressors and approaches an electron absorption collector in the field effect power generation device of the invention.
Figure 33:
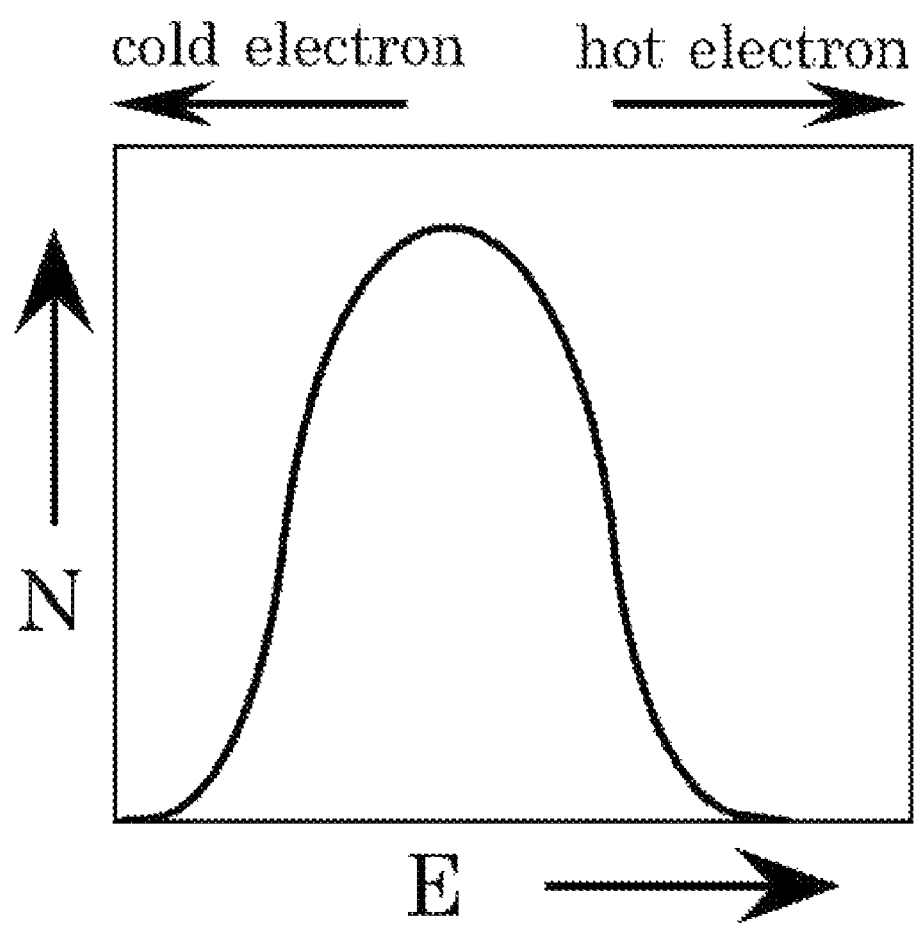
FIG. 33 depicts statistical distribution of energy of electrons in a material.
Figure 34:
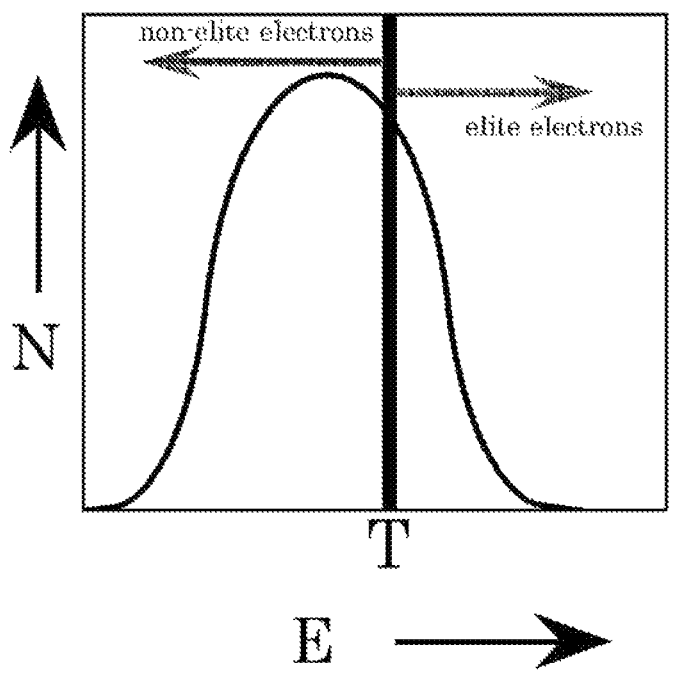
FIG. 34 shows the threshold T of energy corresponding to the potential barrier of electrons.
Figure 35:
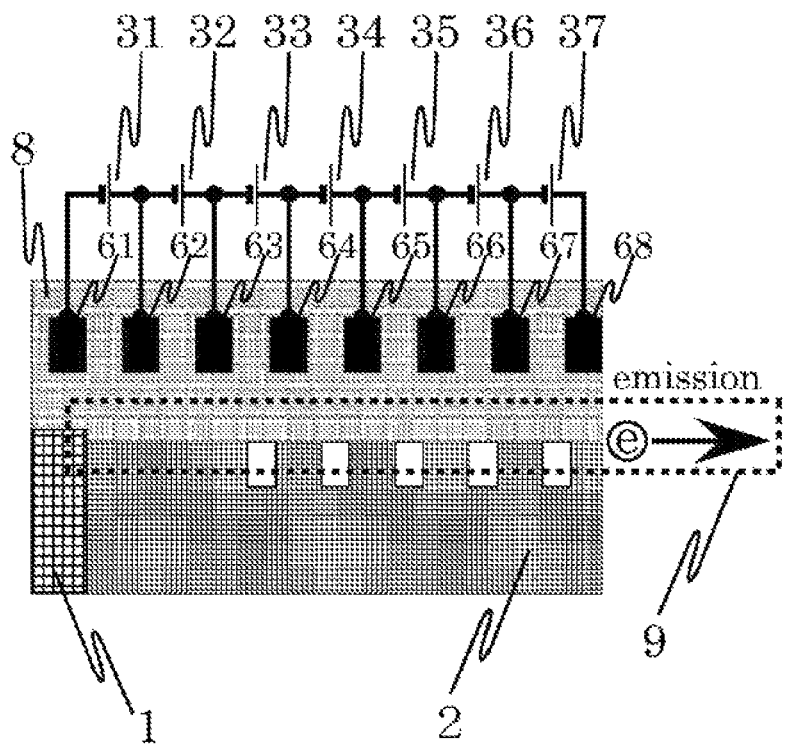
FIG. 35 shows the accelerating channel provided at the boundary between the channel forming material and the insulator.
Figure 36:
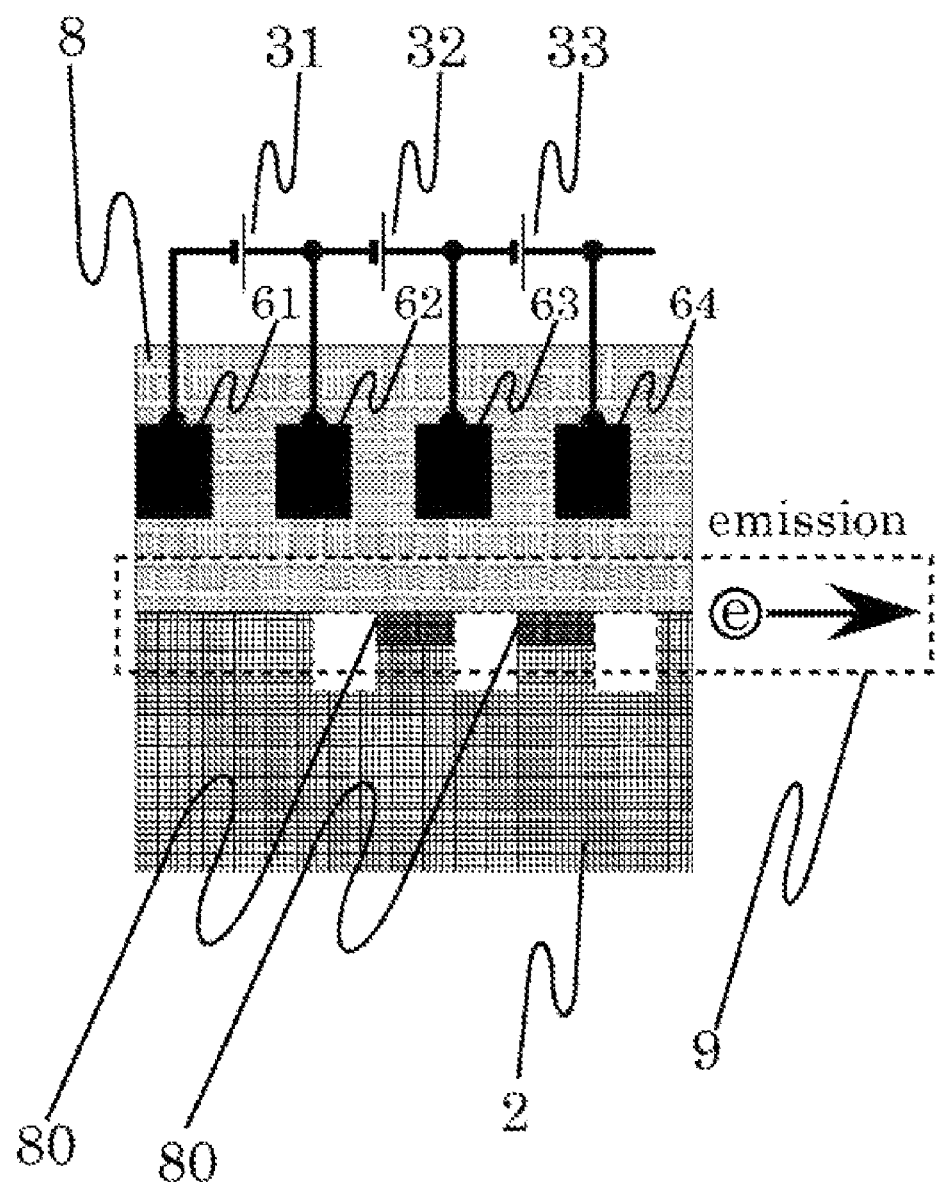
FIG. 36 shows an example in which secondary electron emission materials are provided in an area with protrusions of the channel forming material and an electron is emitted in the field effect power generation device of the invention.
Figure 37:
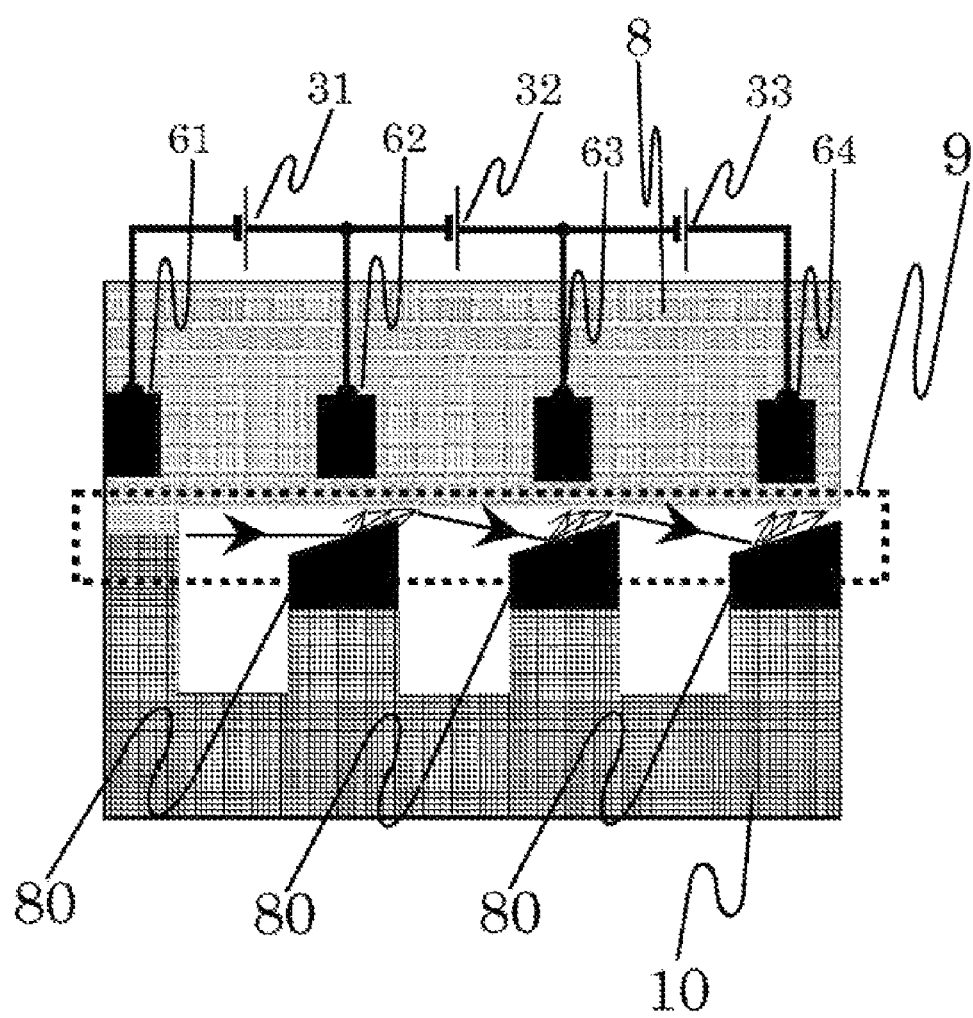
FIG. 37 shows an example in which electrons serving as the carriers move through the accelerating channel, while colliding with the secondary electron emission materials.
Figure 38:
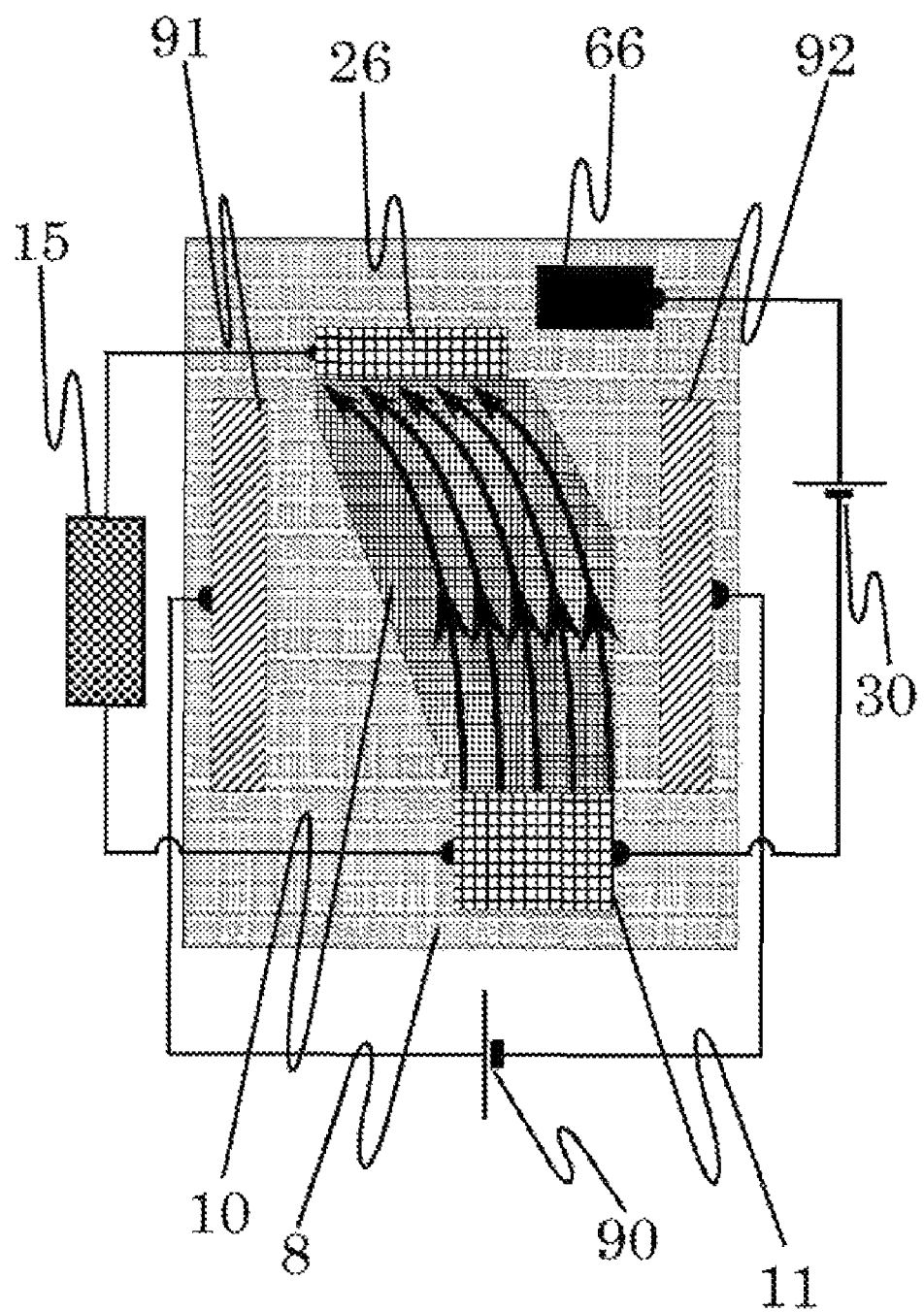
FIG. 38 shows an example in which the flying path of electrons serving as the carriers is deflected in the accelerating channel in the field effect power generation device of the invention.
Figure 39:
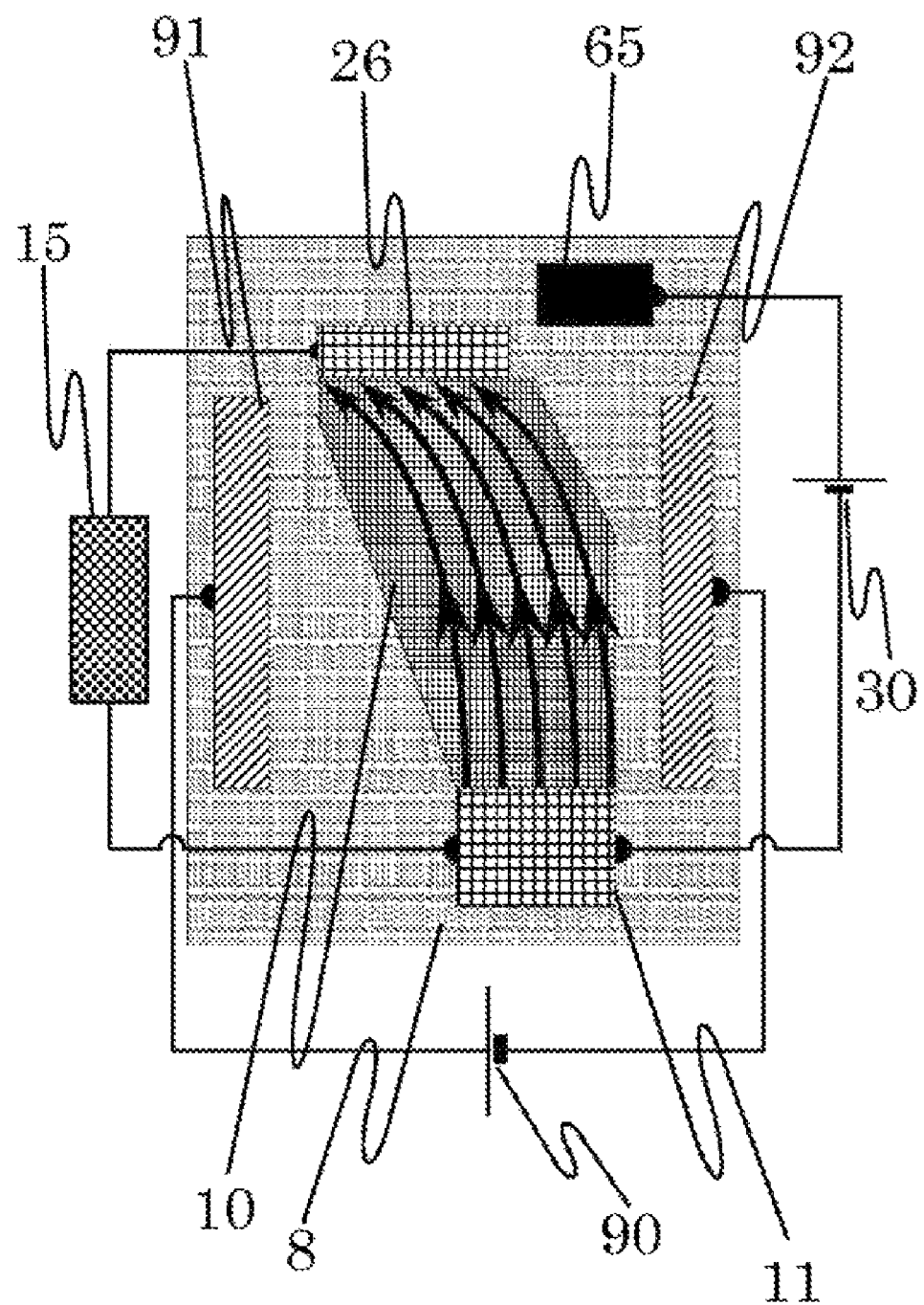
FIG. 39 is a top view showing an example in which electrons in the accelerating channel receive electrical field deflection to have their path deflected to be collected into the electron absorption collector in the field effect power generation device of the invention.
Figure 40:
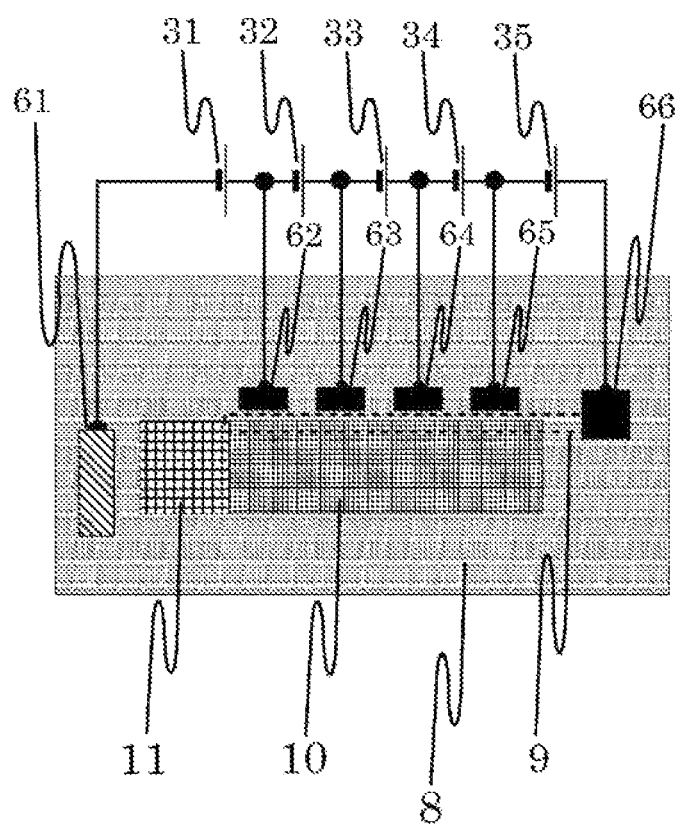
FIG. 40 is a top view showing an example in which electrons move in the accelerating channel while receiving electrical field deflection to be collected into the electron absorption collector in the field effect power generation device of the invention.
Figure 41:
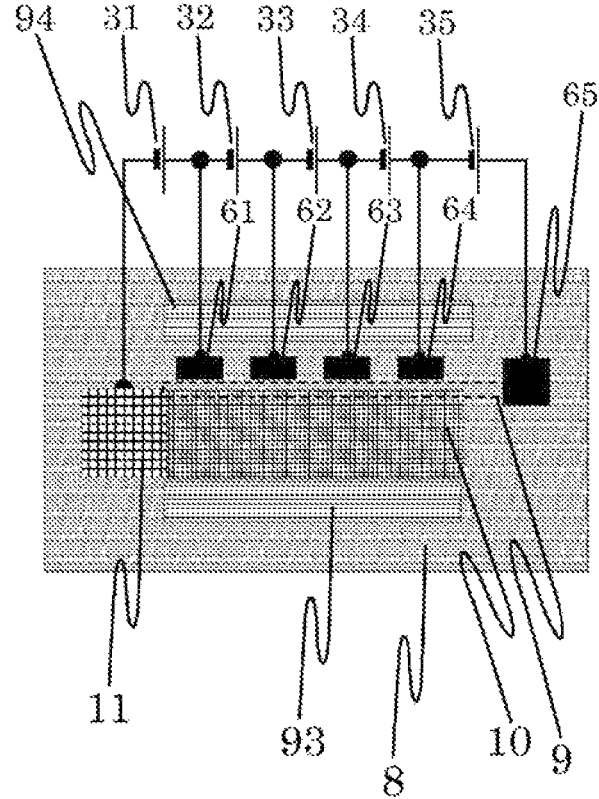
FIG. 41 shows an example in which electrons move in the accelerating channel while receiving magnetic field deflection to be collected into the electron absorption collector in the field effect power generation device of the invention.
Figures 42, 43:
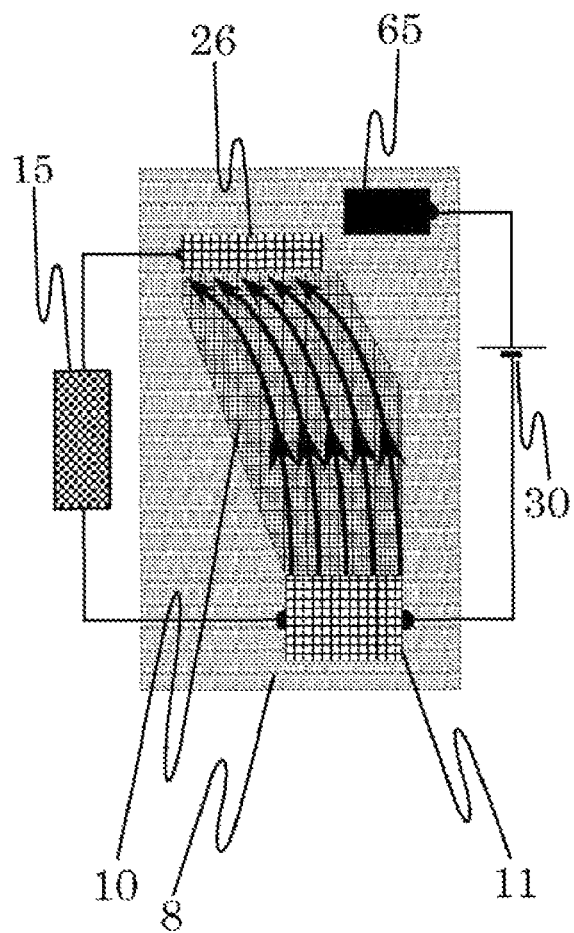
FIG. 42 is a top view showing an example in which electrons in the accelerating channel receive magnetic field deflection to have their path deflected to be collected into the electron absorption collector in the field effect power generation device of the invention.
FIG. 43 shows a formula of thermal electron emission established by S. Dushman.
Figure 44:
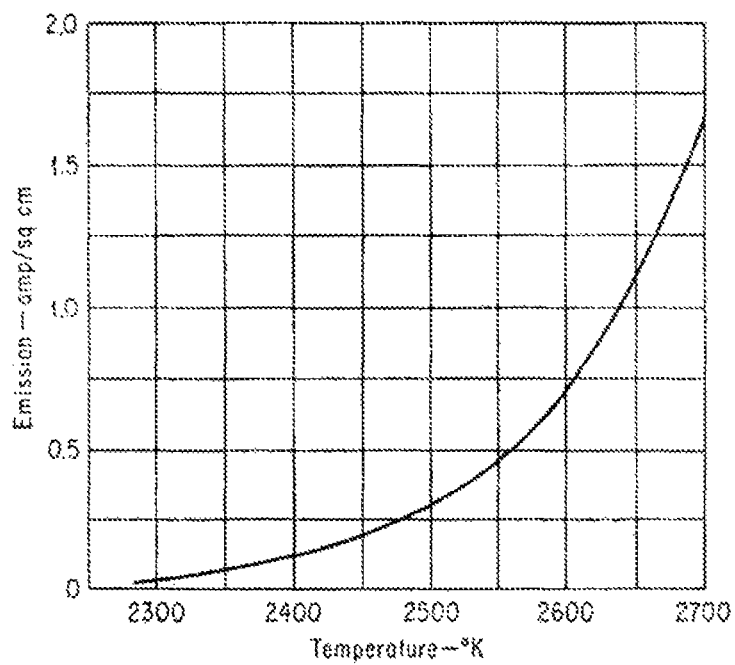
FIG. 44 depicts an electron emission characteristic of tungsten calculated based on the formula of thermal electron emission.
Figure 45:
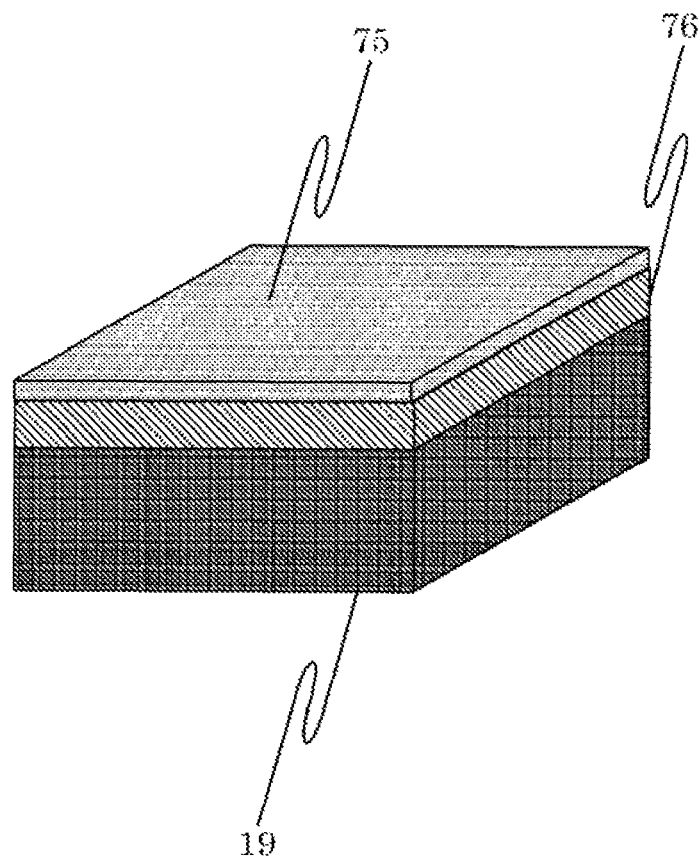
FIG. 45 shows an example in which a carbon-based material is used as the channel forming material in the field effect power generation device of the invention.
Figure 46:
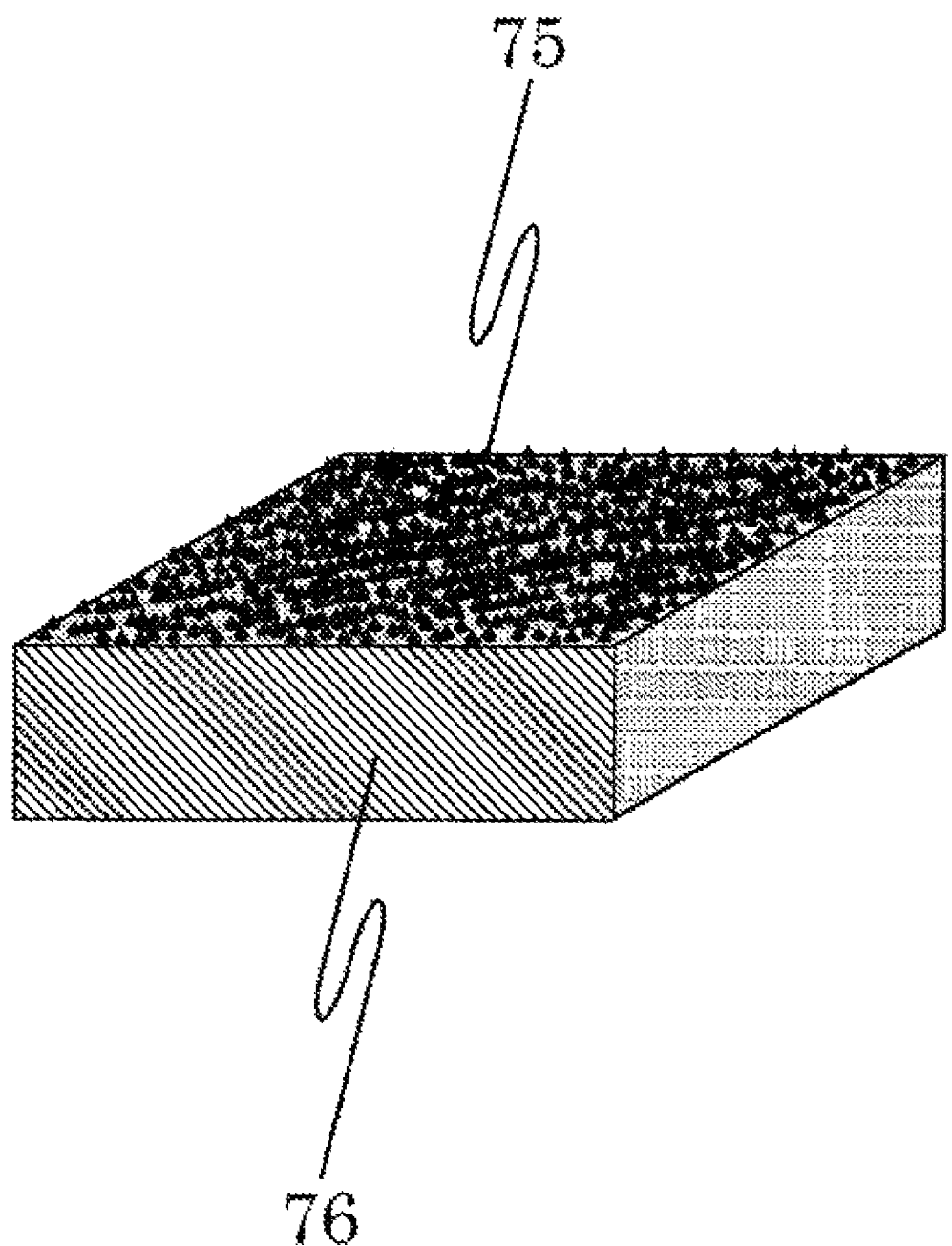
FIG. 46 is an enlarged view of the carbon-based material and sub-nanometer materials as the channel forming material in the field effect power generation device of the invention.
Figure 47:
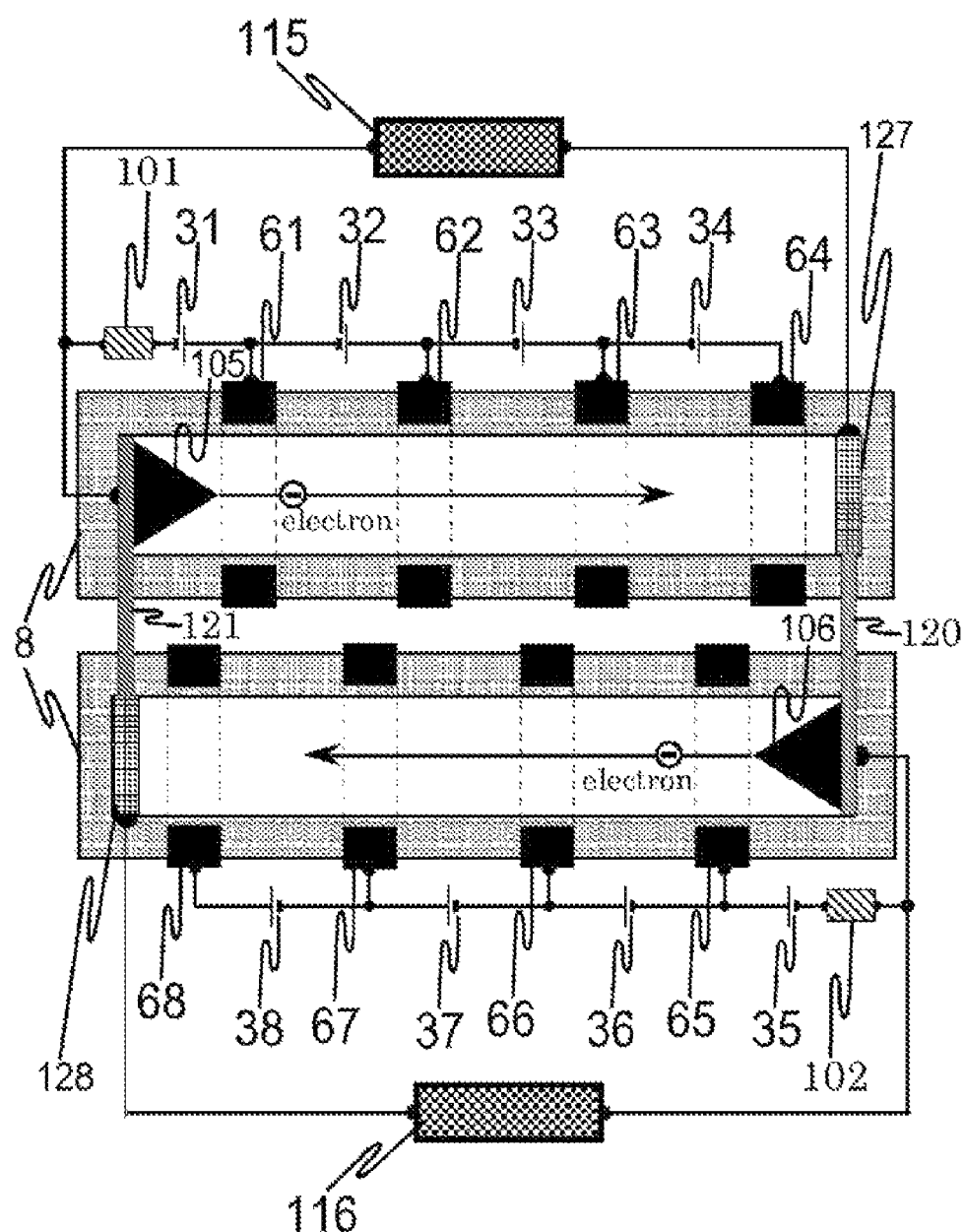
FIG. 47 is a cross-sectional view showing a configuration for controlling output voltage by switching in the field effect power generation device of the invention.
Figure 48:
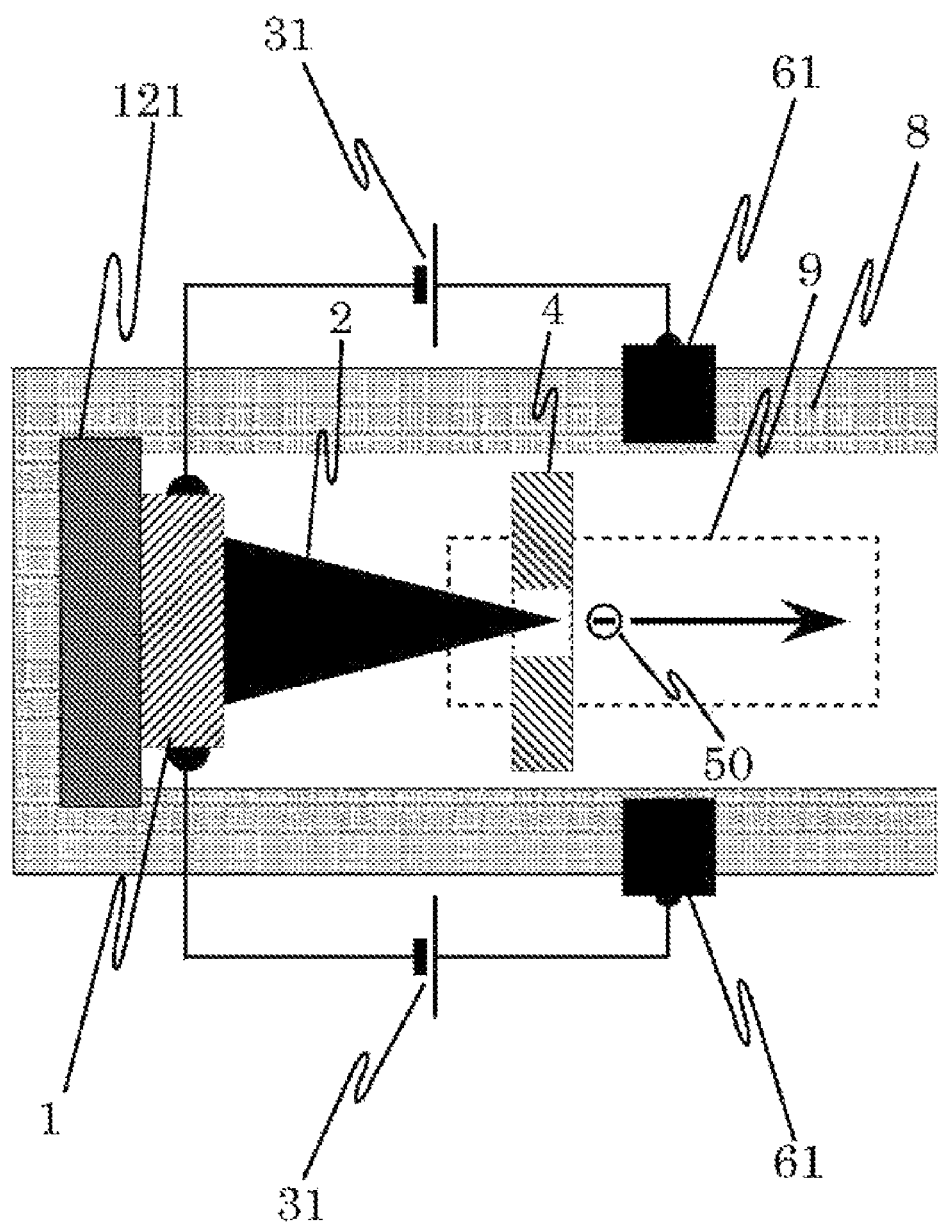
FIG. 48 is an enlarged view of a first stage emitter and its periphery in the field effect power generation device of the invention.
Figure 49:
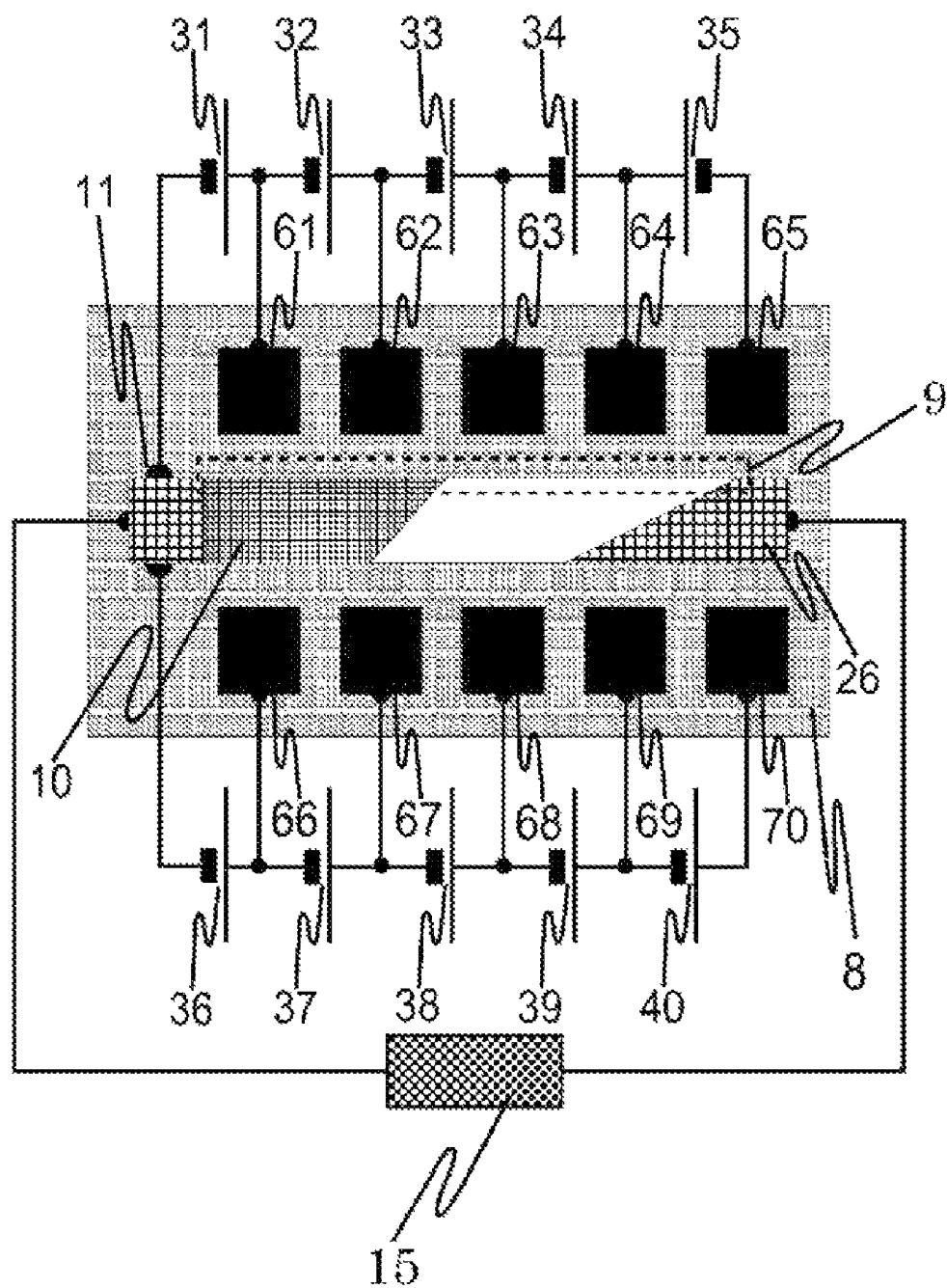
FIG. 49 is a cross-sectional view of an example in which an N-type semiconductor is used as the carrier output material and a P-type semiconductor is used as the channel forming material in the field effect power generation device according to the first embodiment of the present invention.

FIG. 49 is a cross-sectional view of an example in which an N-type semiconductor is used as the carrier output material 1 and a P-type semiconductor is used as the channel forming material 2 in the field effect power generation device according to the first embodiment of the present invention. As shown in FIG. 49, the negative voltage terminal of the first power source 31 is electrically connected to the N-type semiconductor 11. The positive voltage terminal of the first power source 31 is electrically connected to the first electrode of the carrier accelerator 61. An electrical field is applied between the first electrode of the carrier accelerator 61 and the N-type semiconductor 11 and electrons serving as carriers are injected into the P-type semiconductor 10 from the N-type semiconductor 11. The first electrode of the carrier accelerator 61 acts as an injection electrode. By moving in the accelerating channel 9 existing between the insulator 8 and the P-type semiconductor 10, electrons serving as carriers acquire kinetic energy. The positive voltage terminal of the second power source 32 is electrically connected to the second electrode of the carrier accelerator 62. The negative voltage terminal of the second power source 32 is electrically connected to the first electrode of the carrier accelerator 61. An electrical field is applied between the second electrode of the carrier accelerator 62 and the first electrode of the carrier accelerator 61. By moving in the accelerating channel 9 existing between the insulator 8 and the P-type semiconductor 10, electrons serving as carriers acquire kinetic energy. In other words, the second electrode of the carrier accelerator 62 acts as a sliding electrode. The positive voltage terminal of the third power source 33 is electrically connected to the third electrode of the carrier accelerator 63. The negative voltage terminal of the third power source 33 is electrically connected to the second electrode of the carrier accelerator 62. An electrical field is applied between the third electrode of the carrier accelerator 63 and the second electrode of the carrier accelerator 62. By moving in the accelerating channel 9 existing between the insulator 8 and the P-type semiconductor 10, electrons serving as carriers acquire kinetic energy. In other words, the pre-supply of energy is performed for electrons. An edge of the P-type semiconductor 10 is in contact with a vacuum. The third electrode of the carrier accelerator 63 acts as an emission electrode. In other words, electrons move in a sliding manner by a field effect in the accelerating channel 9 existing on the surface of the P-type semiconductor 10 and are emitted into a vacuum by the action of the third electrode of the carrier accelerator 63. The positive voltage terminal of a fourth power source 34 is electrically connected to the fourth electrode of the carrier accelerator 64. The negative voltage terminal of the fourth power source 34 is electrically connected to the third electrode of the carrier accelerator 63. An electrical field is applied between the fourth electrode of the carrier accelerator 64 and the third electrode of the carrier accelerator 63. Electrons serving as carriers are accelerated in the accelerating channel 9 and acquire kinetic energy. In other words, the fourth electrode of the carrier accelerator 64 acts as an accelerating electrode. The negative voltage terminal of a fifth power source 35 is electrically connected to the fifth electrode of the carrier accelerator 65. The positive voltage terminal of the fifth power source 35 is electrically connected to the fourth electrode of the carrier accelerator 64. An electrical field is applied between the fifth electrode of the carrier accelerator 65 and the fourth electrode of the carrier accelerator 64. Electrons serving as carriers are decelerated in the accelerating channel 9. Since flying electrons are decelerated by the electrical field acting as a decelerating electrical field before colliding with the electron absorption collector 26, the flying electrons collide with the electron absorption collector 26 at lower speeds than the speeds that the electrons have before entering the decelerating electrical field. In other words, the fifth electrode of the carrier accelerator 65 acts as a suppressor electrode. The collision of flying electrons having decelerated speeds with the electron absorption collector 26 imparts less energy to the electron absorption collector 26. Accordingly, there is less increase in temperature of the electron absorption collector 26. As a result, the electron absorption collector 26 can be prevented from becoming high temperature. If the electron absorption collector 26 becomes high temperature, an insulation breakdown and material deterioration are caused. However, an advantage of the suppressor electrode is exhibited, such as the decelerating electrical field shown in the diagram decelerates flying electrons and can reduce the increase in temperature of the electron absorption collector 26. In the case where power generation output needs to be increased, durability of the electron absorption collector 26 can be ensured by using the suppressor electrode, and thus successive operation of generating power can be achieved. The negative voltage terminal of a sixth power source 36 is electrically connected to the N-type semiconductor 11. The positive voltage terminal of the sixth power source 36 is electrically connected to the sixth electrode of the carrier accelerator 66. An electrical field is applied between the sixth electrode of the carrier accelerator 66 and the N-type semiconductor 11 and electrons serving as carriers are injected into the P-type semiconductor 10 from the N-type semiconductor 11. The sixth electrode of the carrier accelerator 66 acts as the injection electrode. By moving between the insulator 8 and a lower surface of the P-type semiconductor 10, electrons serving as carriers acquire kinetic energy. The positive voltage terminal of the seventh power source 37 is electrically connected to the seventh electrode of the carrier accelerator 67. The negative voltage terminal of the seventh power source 37 is electrically connected to the sixth electrode of the carrier accelerator 66. An electrical field is applied between the seventh electrode of the carrier accelerator 67 and the sixth electrode of the carrier accelerator 66. Electrons serving as carriers move along an oblique section of the P-type semiconductor 10 and reach the accelerating channel 9. The seventh electrode of the carrier accelerator 67 acts as the sliding electrode. The positive voltage terminal of the eighth power source 38 is electrically connected to the eighth electrode of the carrier accelerator 68. The negative voltage terminal of the eighth power source 38 is electrically connected to the seventh electrode of the carrier accelerator 67. An electrical field is applied between the eighth electrode of the carrier accelerator 68 and the N-type semiconductor 11. By moving in the accelerating channel 9 existing between the insulator 8 and the P-type semiconductor 10, electrons serving as carriers acquire kinetic energy. The positive voltage terminal of a ninth power source 39 is electrically connected to a ninth electrode of the carrier accelerator 69. The negative voltage terminal of the ninth power source 39 is electrically connected to the eighth electrode of the carrier accelerator 68. An electrical field is applied between the ninth electrode of the carrier accelerator 69 and the N-type semiconductor 11. By moving in the accelerating channel 9 existing between the insulator 8 and the P-type semiconductor 10, electrons serving as carriers acquire kinetic energy. The eighth electrode of the carrier accelerator 68 and the ninth electrode of the carrier accelerator 69 act as the accelerating electrodes. The positive voltage terminal of a tenth power source 40 is electrically connected to a tenth electrode of the carrier accelerator 70. The negative voltage terminal of the tenth power source 40 is electrically connected to the ninth electrode of the carrier accelerator 69. An electrical field is applied between the tenth electrode of the carrier accelerator 70 and the N-type semiconductor 11. By moving in the accelerating channel 9 existing between the insulator 8 and the P-type semiconductor 10, electrons serving as carriers acquire kinetic energy. In the diagram, when carriers sufficiently acquire kinetic energy by the action of the carrier accelerator 3 and reach an edge point of a section of the P-type semiconductor 10, electrons are emitted into a vacuum. The emitted electrons are attracted by positive charges accumulated in the positive electrode of the carrier accelerator 3 due to Coulomb force and accelerated. The accelerated electrons reach the electron absorption collector 26 and are absorbed by the electron absorption collector 26. In the diagram, an electrical field is applied between positive charges accumulated in the positive electrodes of the carrier accelerator 41 located at an upper area in the diagram and positive charges accumulated in the positive electrodes of the carrier accelerator 41 located at a lower area in the diagram. The applied electrical field acts in such a direction that flying electrons easily reach the electron absorption collector 26. Here, the P-type semiconductor 10 has an oblique section with an angled edge as shown in the diagram. Electrons, thus, are emitted from the edge, i.e., a region having a small curvature radius, whereby electron emission efficiency increases.

In addition, in the diagram, the electron absorption collector 26 also has an oblique section structure. Flying electrons collide with the electron absorption collector 26 at an angle that is not a right angle. The electrons are reflected and move deeply to reach a narrow region, whereby electron absorption efficiency on the electron absorption collector 26 increases. The electron absorption collector 26 is electrically connected to the negative voltage terminal of the energy accumulator 15. The N-type semiconductor 11 is electrically connected to the positive voltage terminal of the energy accumulator 15. The electrons absorbed by the electron absorption collector 26 reach the negative electrode of the energy accumulator 15. Positive holes injected into the N-type semiconductor 11 from the P-type semiconductor 10 reach the positive electrode of the energy accumulator 15. As a result, positive charges and negative charges are accumulated in the energy accumulator 15. Accordingly, when an electrical load is electrically connected to the both terminals of the energy accumulator 15, positive holes and electrons accumulated in the energy accumulator 15 recombine in the electrical load. In the recombination, electrical energy can be supplied to the electrical load.

<Second Embodiment>

Figure 50:
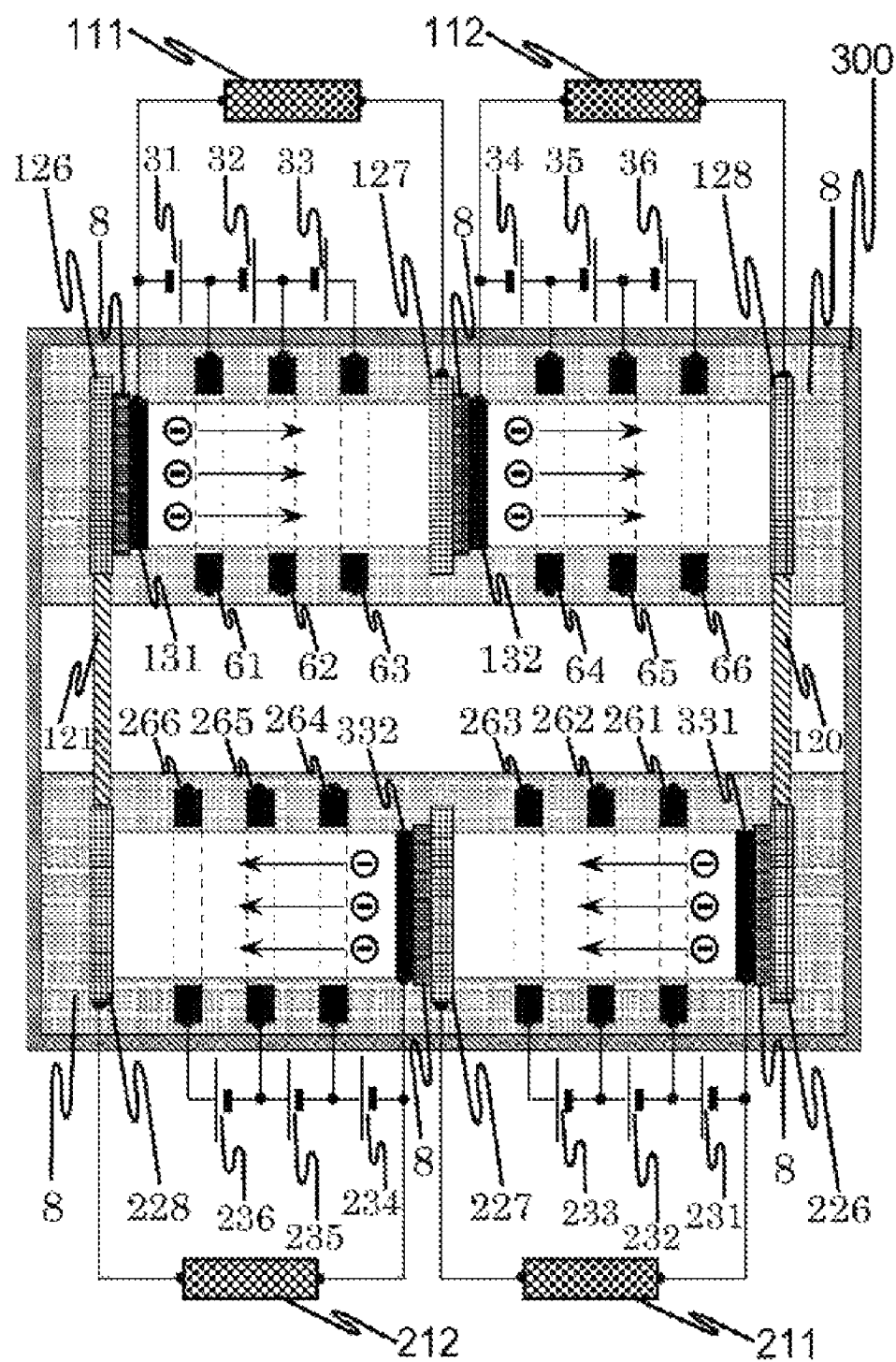
FIG. 50 is a cross-sectional view of an example in which a two-stage cascade feed back method is applied to the field effect power generation device according to the second embodiment of the present invention.
Figure 51:
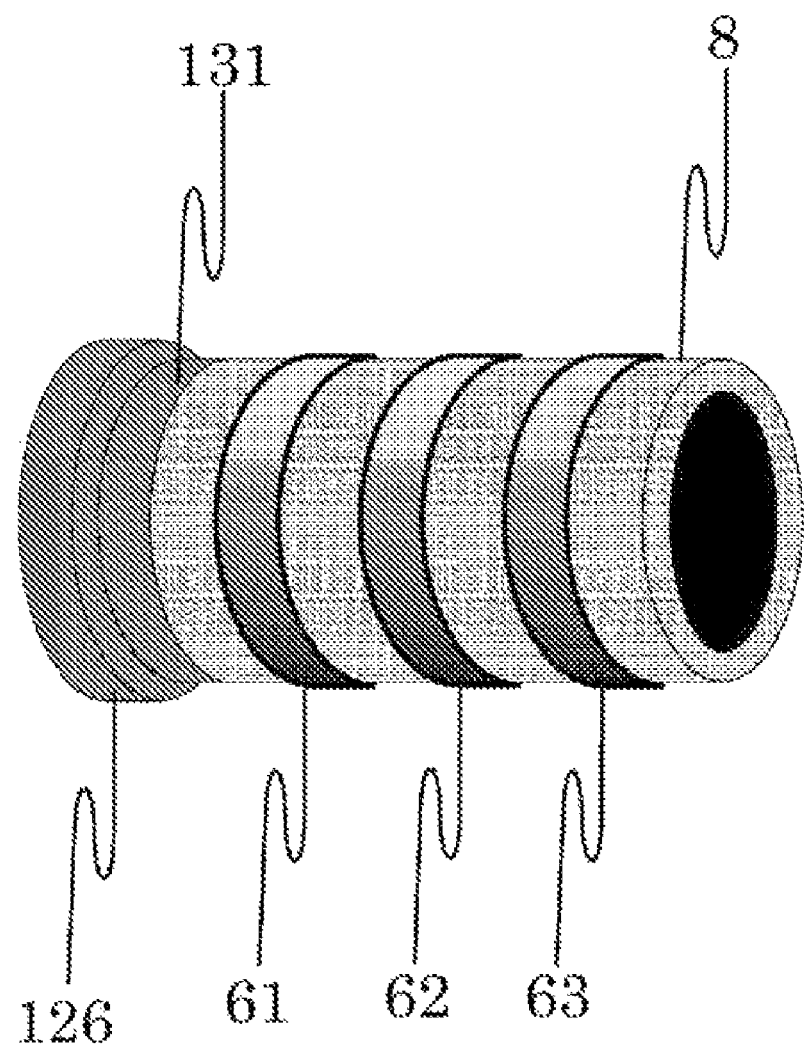
FIG. 51 schematically and partially shows the example in which the two-stage cascade feed back method is applied to the field effect power generation device according to the second embodiment of the present invention.

FIG. 50 is a cross-sectional view of an example in which a two-stage cascade feedback method is applied to the field effect power generation device according to the second embodiment of the present invention. The field effect power generation device has a cylindrical shape. FIG. 51 schematically shows a part of the field effect power generation device taken from a left upper area in FIG. 50. As shown in FIG. 50, the whole of the field effect power generation device is housed in a vacuum vessel 300. In the figure, the negative voltage terminal of the first power source 31 is electrically connected to a first stage carrier output material 131. The positive voltage terminal of the first power source 31 is electrically connected to the first electrode of the carrier accelerator 61. The first power source 31 is used for injecting electrons serving as carriers into the channel forming material 2 from the carrier input-output material 1. The negative voltage terminal of the second power source 32 is electrically connected to the first electrode of the carrier accelerator 61. The positive voltage terminal of the second power source 32 is electrically connected to the second electrode of the carrier accelerator 62. The negative voltage terminal of the third power source 33 is electrically connected to the second electrode of the carrier accelerator 62. The positive voltage terminal of the third power source 33 is electrically connected to the third electrode of the carrier accelerator 63. The negative voltage terminal of the fourth power source 34 is electrically connected to a second stage carrier output material 132. The positive voltage terminal of the fourth power source 34 is electrically connected to the fourth electrode of the carrier accelerator 64. The negative voltage terminal of the fifth power source 35 is electrically connected to the fourth electrode of the carrier accelerator 64. The positive voltage terminal of the fifth power source 35 is electrically connected to the fifth electrode of the carrier accelerator 65. The negative voltage terminal of the sixth power source 36 is electrically connected to the fifth electrode of the carrier accelerator 65. The positive voltage terminal of the sixth power source 36 is electrically connected to the sixth electrode of the carrier accelerator 66.

The negative voltage terminal of a first homeward path power source 231 is electrically connected to the first stage carrier output material 131. The positive voltage terminal of the first homeward path power source 31 is electrically connected to a first electrode of a homeward path carrier accelerator 261. The negative voltage terminal of a second homeward path power source 32 is electrically connected to the first electrode of the homeward path carrier accelerator 261. The positive voltage terminal of the second homeward path power source 32 is electrically connected to a second electrode of the homeward path carrier accelerator 262. The negative voltage terminal of a third homeward path power source 33 is electrically connected to the second electrode of the homeward path carrier accelerator 262. The positive voltage terminal of the third homeward path power source 33 is electrically connected to a third electrode of the homeward path carrier accelerator 263. The negative voltage terminal of a fourth homeward path power source 34 is electrically connected to the second stage carrier output material 132. The positive voltage terminal of the fourth homeward path power source 34 is electrically connected to a fourth electrode of the homeward path carrier accelerator 264. The negative voltage terminal of a fifth homeward path power source 35 is electrically connected to the fourth electrode of the homeward path carrier accelerator 264. The positive voltage terminal of the fifth homeward path power source 35 is electrically connected to a fifth electrode of the homeward path carrier accelerator 265. The negative voltage terminal of a sixth homeward path power source 36 is electrically connected to the fifth electrode of the homeward path carrier accelerator 265. The positive voltage terminal of the sixth homeward path power source 36 is electrically connected to a sixth electrode of the homeward path carrier accelerator 266. The surrounding of the first stage carrier output material 131 is the same as the structure shown in FIG. 52. The channel forming material 2 is electrically connected to the first stage carrier output material 131. An electrical field is applied between the first electrode of the carrier accelerator 61 and the first stage carrier output material 131. A positive voltage is applied to the first electrode of the carrier accelerator 61 while a negative voltage is applied to the first stage carrier output material 131. The electrical field causes electrons serving as carriers to be injected into the channel forming material 2 from the first stage carrier output material 131. The first electrode of the carrier accelerator 61 acts as the injection electrode. The electrons injected into the channel forming material 2 are emitted to the accelerating channel 9 through the irreversible process occurrence section 4. The first electrode of the carrier accelerator 61 also acts as the emission electrode. The emitted electrons are accelerated in the accelerating channel 9 by the first electrode of the carrier accelerator 61, the second electrode of the carrier accelerator 62, and the third electrode of the carrier accelerator 63. The second electrode of the carrier accelerator 62 and the third electrode of the carrier accelerator 63 act as the accelerating electrodes. The accelerated electrons collide with a first stage electron absorption collector 127 and are absorbed by the first stage electron absorption collector 127. The electrons absorbed by the first stage electron absorption collector 127 move to a first stage energy accumulator 111. Since electrons are emitted from the first stage carrier output material 131, positive holes remain in the first stage carrier output material 131. The remaining positive holes move to the first stage energy accumulator 111. The positive holes and electrons form dipoles and are accumulated in the first stage energy accumulator 111. The kinetic energy of electrons emitted from the first stage carrier output material 131 is converted into thermal energy by the collision of the electrons with the first stage electron absorption collector 127. As a result, the temperature of the first stage electron absorption collector 127 increases and generated heat is conducted to the insulator 8 to cause the temperature of the insulator 8 to increase. Heat of the insulator 8 is conducted to the second stage carrier output material 132 to increase the temperature of the second stage carrier output material 132. In the second stage carrier output material 132 having high temperature, electrons have large kinetic energy. The surrounding of the second stage carrier output material 132 is the same as the structure shown in FIG. 53. The channel forming material 2 is electrically connected to the second stage carrier output material 132. An electrical field is applied between the fourth electrode of the carrier accelerator 64 and the second stage carrier output material 132. A positive voltage is applied to the fourth electrode 64 while a negative voltage is applied to the second stage carrier output material 132. The electrical field causes electrons serving as carriers to be injected into the channel forming material 2 from the second stage carrier output material 132. The fourth electrode of the carrier accelerator 64 acts as the injection electrode. The electrons injected into the channel forming material 2 are emitted by the actions of high temperature and electrical field to the accelerating channel 9 through the irreversible process occurrence section 4. The fourth electrode of the carrier accelerator 64 also acts as the emission electrode. The emitted electrons are accelerated in the accelerating channel 9 by the fourth electrode of the carrier accelerator 64, the fifth electrode of the carrier accelerator 65, and the sixth electrode of the carrier accelerator 66. The fifth electrode of the carrier accelerator 65 and the sixth electrode of the carrier accelerator 66 act as accelerating channels. The accelerated electrons collide with a second stage electron absorption collector 128 and are absorbed by the second stage electron absorption collector 128.

Figure 54:
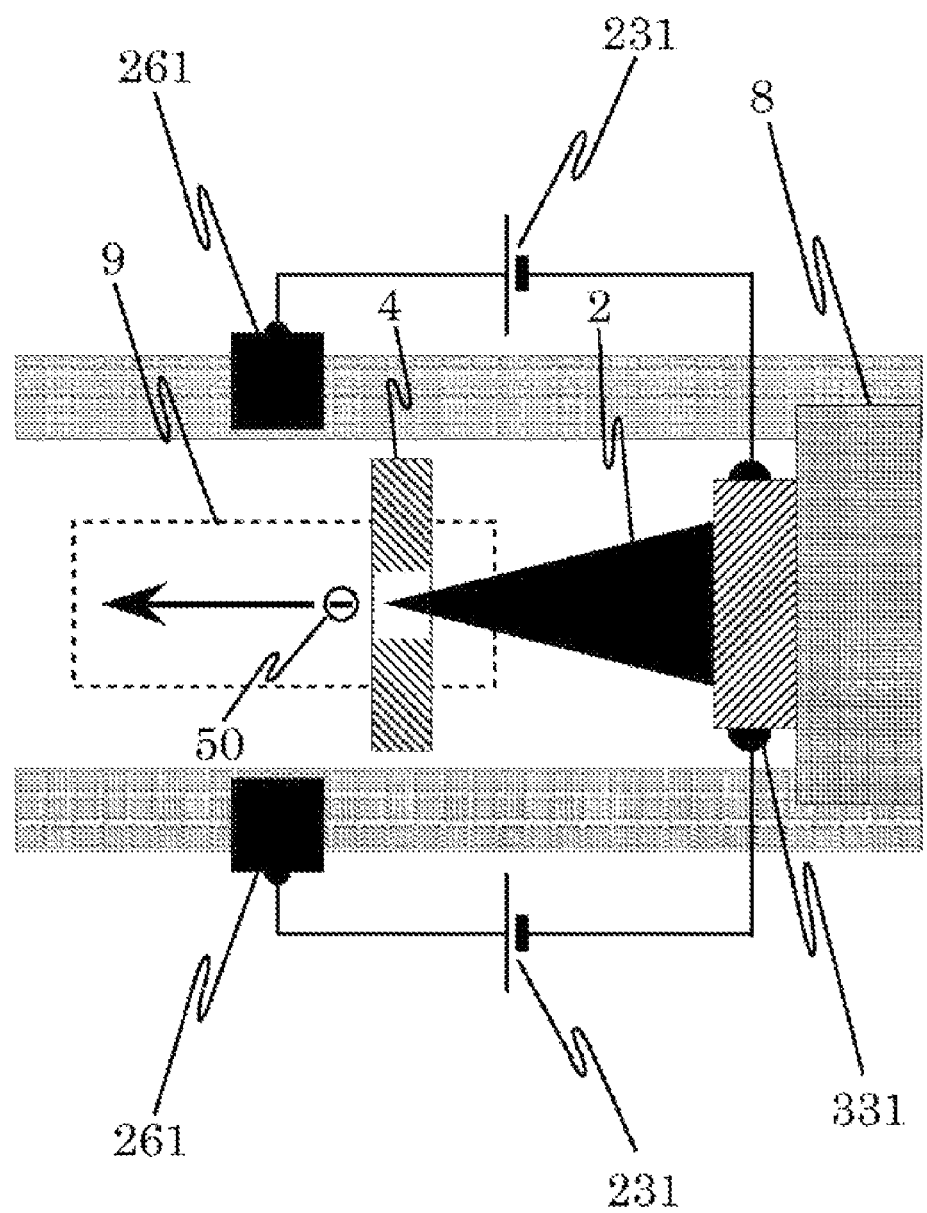
FIG. 54 is a cross-sectional view showing the surrounding of a first stage homeward path carrier output material in the example in which the two-stage cascade feed back method is applied to the field effect power generation device according to the second embodiment of the present invention.

The electrons absorbed by the second stage electron absorption collector 128 move to a second stage energy accumulator 112. Since electrons are emitted from the second stage carrier output material 132, positive holes remain in the second stage carrier output material 132. The remaining positive holes move to the second stage energy accumulator 112. The positive holes and electrons are accumulated in the second stage energy accumulator 112 to form dipoles. The kinetic energy of electrons output from the second stage carrier output material 132 is converted into thermal energy by the electrons collision with the second stage electron absorption collector 128. As a result, the temperature of the second stage electron absorption collector 128 increases and generated heat is conducted to a mode 1 thermal conductor 120 to cause the temperature of the mode 1 thermal conductor 120 to increase. Heat of the mode 1 thermal conductor 120 is conducted to a thermal energy supplier 226 to increase the temperature of the thermal energy supplier 226. Heat of the thermal energy supplier 226 having high temperature is conducted to the insulator 8 to increase the temperature of the insulator 8. Heat of the insulator 8 is conducted to a first stage homeward path carrier output material 331 to cause the temperature of the first stage homeward path carrier output material 331 to increase. As a result, in the first stage homeward path carrier output material 331, electrons can acquire sufficient kinetic energy. FIG. 54 shows the surrounding of the first stage homeward path carrier output material 331. The channel forming material 2 is electrically connected to the first stage homeward path carrier output material 331. An electrical field is applied between the first electrode of the homeward path carrier accelerator 261 and the first stage homeward path carrier output material 331. A positive voltage is applied to the first electrode of the homeward path carrier accelerator 261 while a negative voltage is applied to the first stage homeward path carrier output material 331. The electrical field causes electrons serving as carriers to be injected into the channel forming material 2 from the first stage homeward path carrier output material 331. The first electrode of the homeward path carrier accelerator 261 acts as the injection electrode. The electrons injected into the channel forming material 2 are emitted to the accelerating channel 9 through the irreversible process occurrence section 4. The first electrode of the homeward path carrier accelerator 261 also acts as the emission electrode. The emitted electrons are accelerated in the accelerating channel 9 by the first electrode of the homeward path carrier accelerator 261, the second electrode of the homeward path carrier accelerator 262, and the third electrode of the homeward path carrier accelerator 263. The second electrode of the homeward path carrier accelerator 262 and the third electrode of the homeward path carrier accelerator 263 act as the accelerating electrodes. The accelerated electrons collide with a first stage electron absorption collector 227 and are absorbed by the first stage electron absorption collector 227. The electrons absorbed by the first stage electron absorption collector 227 move to a first stage homeward path energy accumulator 211. Since electrons are emitted from the first stage homeward path carrier output material 331, positive holes remain in the first stage homeward path carrier output material 331. The remaining positive holes move to the first stage homeward path energy accumulator 211. The positive holes and electrons form dipoles and are accumulated in the first stage homeward path energy accumulator 211.

Figure 55:
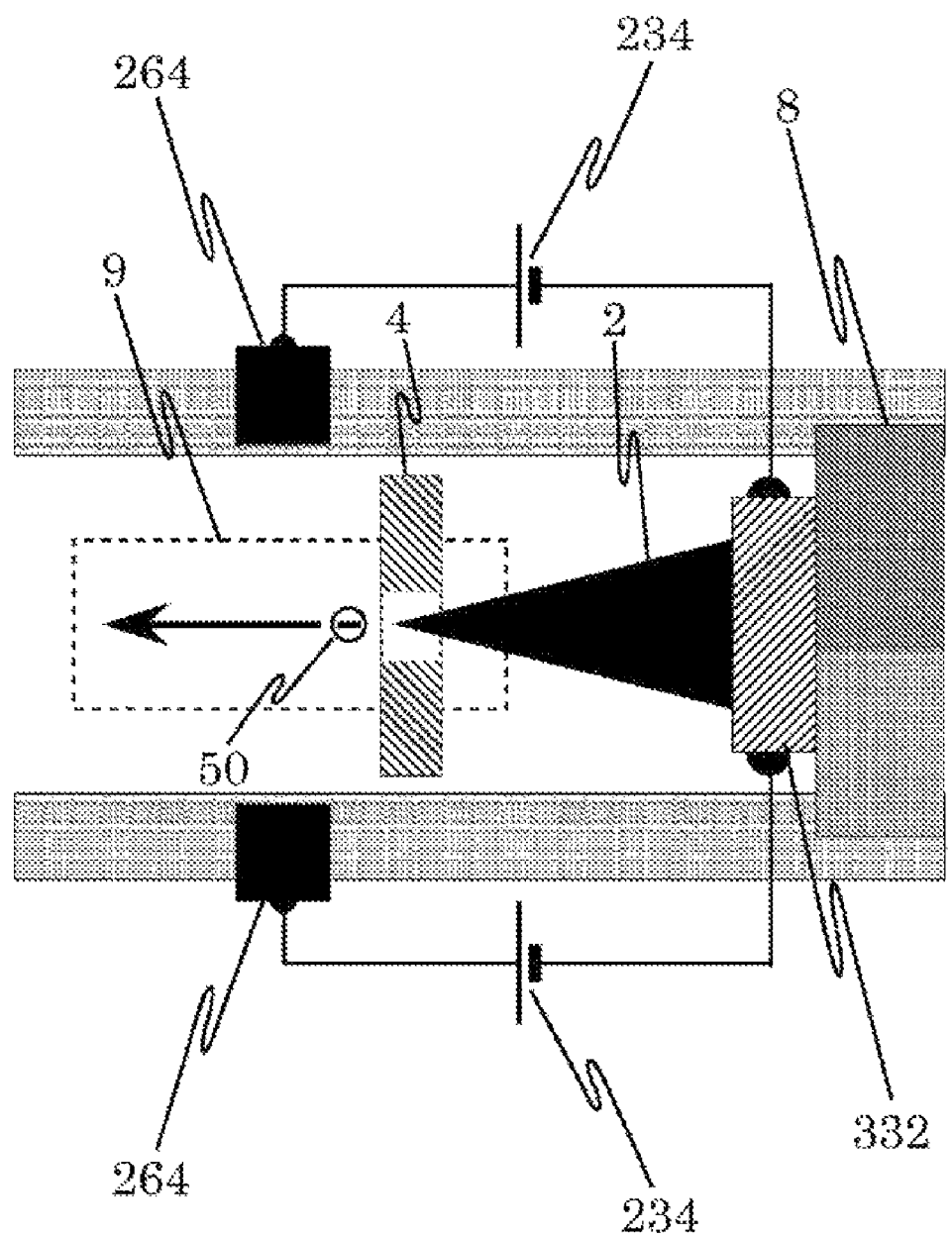
FIG. 55 is a cross-sectional view showing the surrounding of a second stage homeward path carrier output material in the example in which the two-stage cascade feed back method is applied to the field effect power generation device according to the second embodiment of the present invention.

The kinetic energy of electrons emitted from the first stage homeward path carrier output material 331 is converted into thermal energy by the collision of the electrons with the first stage electron absorption collector 227. As a result, the temperature of the first stage electron absorption collector 227 increases and generated heat is conducted to the insulator 8 to cause the temperature of the insulator 8 to increase. Heat of the insulator 8 is conducted to a second stage homeward path carrier output material 332 to increase the temperature of the second stage homeward path carrier output material 332. In the second stage homeward path carrier output material 332 having high temperature, electrons can acquire sufficient kinetic energy. FIG. 55 shows the surrounding of the second stage homeward path carrier output material 332. The channel forming material 2 is electrically connected to the second stage homeward path carrier output material 332. An electrical field is applied between the fourth electrode of the homeward path carrier accelerator 264 and the second stage homeward path carrier output material 332. A positive voltage is applied to the fourth electrode of the homeward path carrier accelerator 264 while a negative voltage is applied to the second stage homeward path carrier output material 332. The electrical field causes electrons serving as carriers to be injected into the channel forming material 2 from the second stage homeward path carrier output material 332. The fourth electrode of the homeward path carrier accelerator 264 acts as the injection electrode. The electrons injected into the channel forming material 2 are emitted by the actions of high temperature and electrical field to the accelerating channel 9 through the irreversible process occurrence section 4. The fourth electrode of the homeward path carrier accelerator 264 also acts as the emission electrode. The emitted electrons are accelerated in the accelerating channel 9 by the fourth electrode of the homeward path carrier accelerator 264, a fifth electrode of the homeward path carrier accelerator 265, and a sixth electrode of the homeward path carrier accelerator 266. The fifth electrode of the homeward path carrier accelerator 265 and the sixth electrode of the homeward path carrier accelerator 266 act as the accelerating electrodes. The accelerated electrons collide with a second stage electron absorption collector 228 and are absorbed by the second stage electron absorption collector 228. The electrons absorbed by the second stage electron absorption collector 228 move to a second stage homeward path energy accumulator 212. Since electrons are emitted from the second stage homeward path carrier output material 332, positive holes remain in the second stage homeward path carrier output material 332. The remaining positive holes move to the second stage homeward path energy accumulator 212. Positive holes and electrons form dipoles and are accumulated in the second stage homeward path energy accumulator 212.

The kinetic energy of electrons output from the second stage homeward path carrier output material 332 is converted into thermal energy by the collision of the electrons with the second stage electron absorption collector 228. As a result, the temperature of the second stage electron absorption collector 228 increases and generated heat is conducted to a mode 2 thermal conductor 121 to increase the temperature of the mode 2 thermal conductor 121. Heat of the mode 2 thermal conductor 121 is conducted to a thermal energy supplier 126 to increase the temperature of the thermal energy supplier 126. Heat of the thermal energy supplier 126 having high temperature is conducted to the insulator 8 to increase the temperature of the insulator 8. Heat of the insulator 8 is conducted to the first stage carrier output material 131 to increase the temperature of the first stage carrier output material 131. In an initial state in which the field effect power generation device starts its operation, few electrons are emitted because the temperature of the first stage carrier output material 131 is low. The temperature of the second stage carrier output material 132, however, increases since the emitted electrons collide with the second stage carrier output material 132. The number of electrons emitted from the second stage carrier output material 132 increases accordingly. The emitted electrons collide with the second stage electron absorption collector 128 to raise the temperature of the second stage electron absorption collector 128. The generated heat is conducted through the mode 1 thermal conductor 120 to raise the temperature of and the number of electrons emitted from the first stage homeward path carrier output material 331. The emitted electrons collide with the first stage electron absorption collector to raise the temperature of and the number of electrons emitted from the second stage homeward path carrier output material 332. The emitted electrons collide with the second stage electron absorption collector 228 to raise the temperature of the second stage electron absorption collector 228. Heat of the second stage electron absorption collector 228 is conducted to the thermal energy supplier 126 through the mode 2 thermal conductor 121 to raise the temperature of and the number of electrons emitted from the thermal energy supplier 126. As the above-described cycle repeats and time elapses, the temperature of members emitting electrons increases and the number of emitted electrons increases. As a result, power generation amount increases and power generation efficiency increases. When the electrical load 5 is electrically connected in parallel with the first stage energy accumulator 111, accumulated electrical energy is consumed as a current which flows in the electrical load 5. When the electrical load 5 is electrically connected in parallel with the second stage energy accumulator 112, accumulated electrical energy is consumed as a current which flows in the electrical load 5. When the electrical load 5 is electrically connected in parallel with the first stage homeward path energy accumulator 211, accumulated electrical energy is consumed as a current which flows in the electrical load 5. When the electrical load 5 is electrically connected in parallel with the second stage homeward path energy accumulator 212, accumulated electrical energy is consumed as a current which flows in the electrical load 5. When the first stage energy accumulator 111, the second stage energy accumulator 112, the first stage homeward path energy accumulator 211, and the second stage path energy accumulator 212 are electrically connected in series and the electrical load 5 is electrically connected in parallel with the series connection at the both ends, electrical energy is consumed. When the energy accumulators are electrically connected in series, a voltage across the series connection becomes high. As a result, electrical energy to be consumed further increases than electrical energy individually emitted from the energy accumulators, and power generation efficiency further increases.

Figure 56:
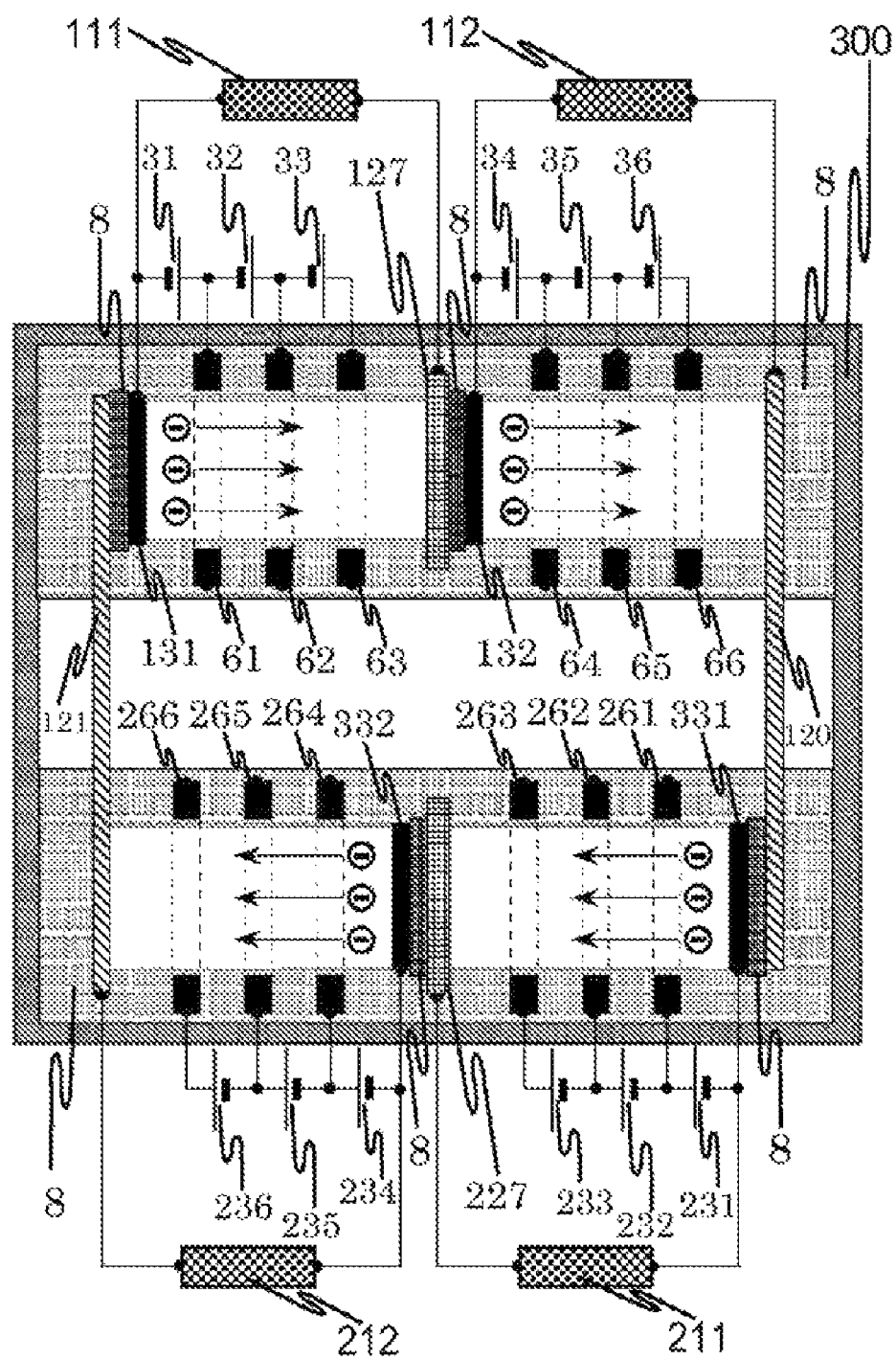
FIG. 56 is a cross-sectional view illustrating thermal conductors being used in the example in which the two-stage cascade feed back method is applied to the field effect power generation device according to the second embodiment of the present invention.

FIG. 56 is a side-cross-sectional view of an example of a two-stage cascade feedback method using the thermal conductors of the field effect power generation device. The role of the second stage electron absorption collector 128 used in FIG. 50 is combined with the role of the mode 1 thermal conductor 120 used in FIG. 56. In addition, the role of the thermal energy supplier 226 used in FIG. 50 is combined with the role of the mode 1 thermal conductor 120 used in FIG. 56. The role of the second stage electron absorption collector 228 used in FIG. 50 is combined with the role of the mode 2 thermal conductor 121 used in FIG. 56. The role of the thermal energy supplier 126 used in FIG. 50 is combined with the role of the mode 2 thermal conductor 121 used in FIG. 56. Materials for the mode 1 thermal conductor 120 and the mode 2 thermal conductor 121 used in FIG. 56 are preferably include materials having good thermal conductivity. An example of the materials for the mode 1 thermal conductor 120 is graphene. An example of the materials for the mode 2 thermal conductor 121 is also graphene. Graphene is composed of layered carbon honeycomb lattice each having an approximately two-dimensional structure. Each layer has high thermal conductivity and less heat is conducted between the layers. Accordingly, when electrons emitted in a vacuum collide with a surface layer of graphene and are absorbed therein, the temperature of the surface layer increases. Since heat is well conducted in the surface layer, electrons are more efficiently emitted from a high temperature emitter in a subsequent mode. Since heat accumulated in the surface layer is conducted to inside layers with a low efficiency, thermal energy is conserved with little loss and electron emission efficiency in the subsequent mode can be increased. Consequently, the use of graphene as a specific material included in the electron absorption collector 26, the mode 1 thermal conductor 120, and the mode 2 thermal conductor 121 can increase the power generation efficiency of the field effect power generation device.

<Third Embodiment>

Figure 57:
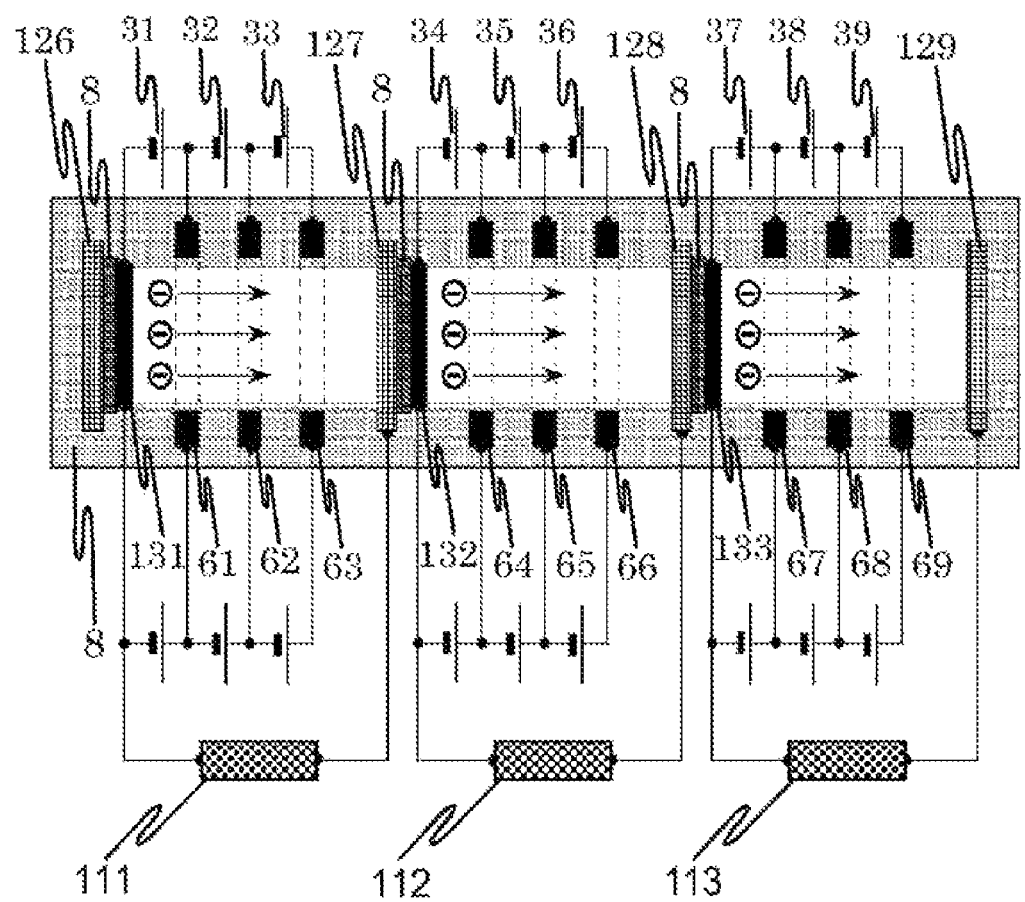
FIG. 57 is a cross-sectional view of an example in which a three-stage cascade system is applied to the field effect power generation device according to the third embodiment of the present invention.

FIG. 57 is a cross-sectional view of an example in which a three-stage cascade system is applied to the field effect power generation device according to the third embodiment of the present invention. In the figure, the negative voltage terminal of the first power source 31 is electrically connected to the first stage carrier output material 131. The positive voltage terminal of the first power source 31 is electrically connected to the first electrode of the carrier accelerator 61. The first power source 31 is used for injecting electrons serving as carriers into the channel forming material 2 from the carrier input-output material 1. The negative voltage terminal of the second power source 32 is electrically connected to the first electrode of the carrier accelerator 61. The positive voltage terminal of the second power source 32 is electrically connected to the second electrode of the carrier accelerator 62. The negative voltage terminal of the third power source 33 is electrically connected to the second electrode of the carrier accelerator 62. The positive voltage terminal of the third power source 33 is electrically connected to the third electrode of the carrier accelerator 63. The negative voltage terminal of the fourth power source 34 is electrically connected to the second stage carrier output material 132. The positive voltage terminal of the fourth power source 34 is electrically connected to the fourth electrode of the carrier accelerator 64. The negative voltage terminal of the fifth power source 35 is electrically connected to the fourth electrode of the carrier accelerator 64. The positive voltage terminal of the fifth power source 35 is electrically connected to the fifth electrode of the carrier accelerator 65. The negative voltage terminal of the sixth power source 36 is electrically connected to the fifth electrode of the carrier accelerator 65. The positive voltage terminal of the sixth power source 36 is electrically connected to the sixth electrode of the carrier accelerator 66. The negative voltage terminal of the seventh power source 37 is electrically connected to a third stage carrier output material 133. The positive voltage terminal of the seventh power source 37 is electrically connected to the seventh electrode of the carrier accelerator 67. The negative voltage terminal of the eighth power source 38 is electrically connected to the seventh electrode of the carrier accelerator 67. The positive voltage terminal of the eighth power source 38 is electrically connected to the eighth electrode of the carrier accelerator 68. The negative voltage terminal of the ninth power source 39 is electrically connected to the eighth electrode of the carrier accelerator 68. The positive voltage terminal of the ninth power source 39 is electrically connected to the ninth electrode of the carrier accelerator 69.

Figure 52:
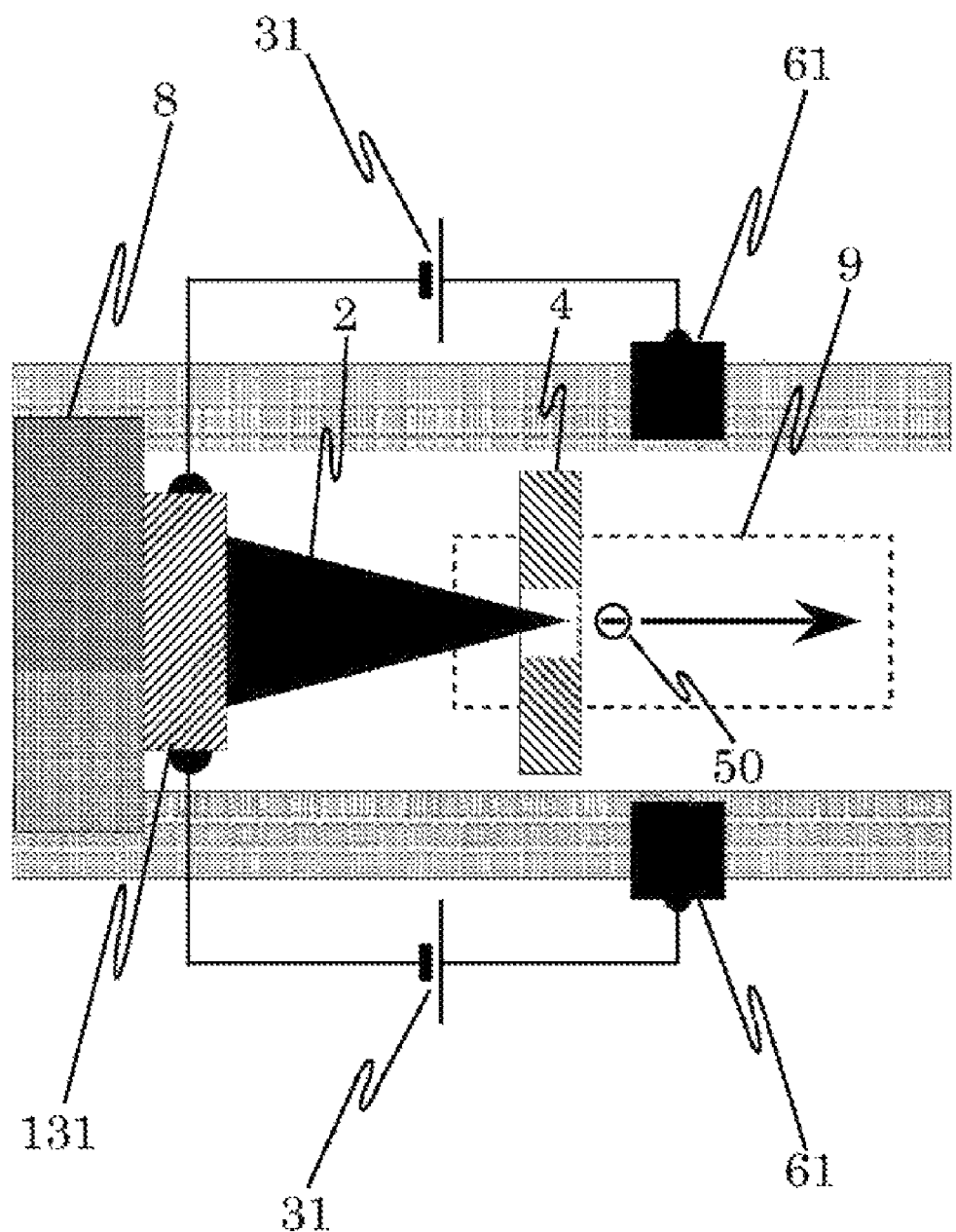
FIG. 52 is a cross-sectional view showing the surrounding of a first stage carrier output material in the example in which the two-stage cascade feed back method is applied to the field effect power generation device according to the second embodiment of the present invention.
Figure 53:
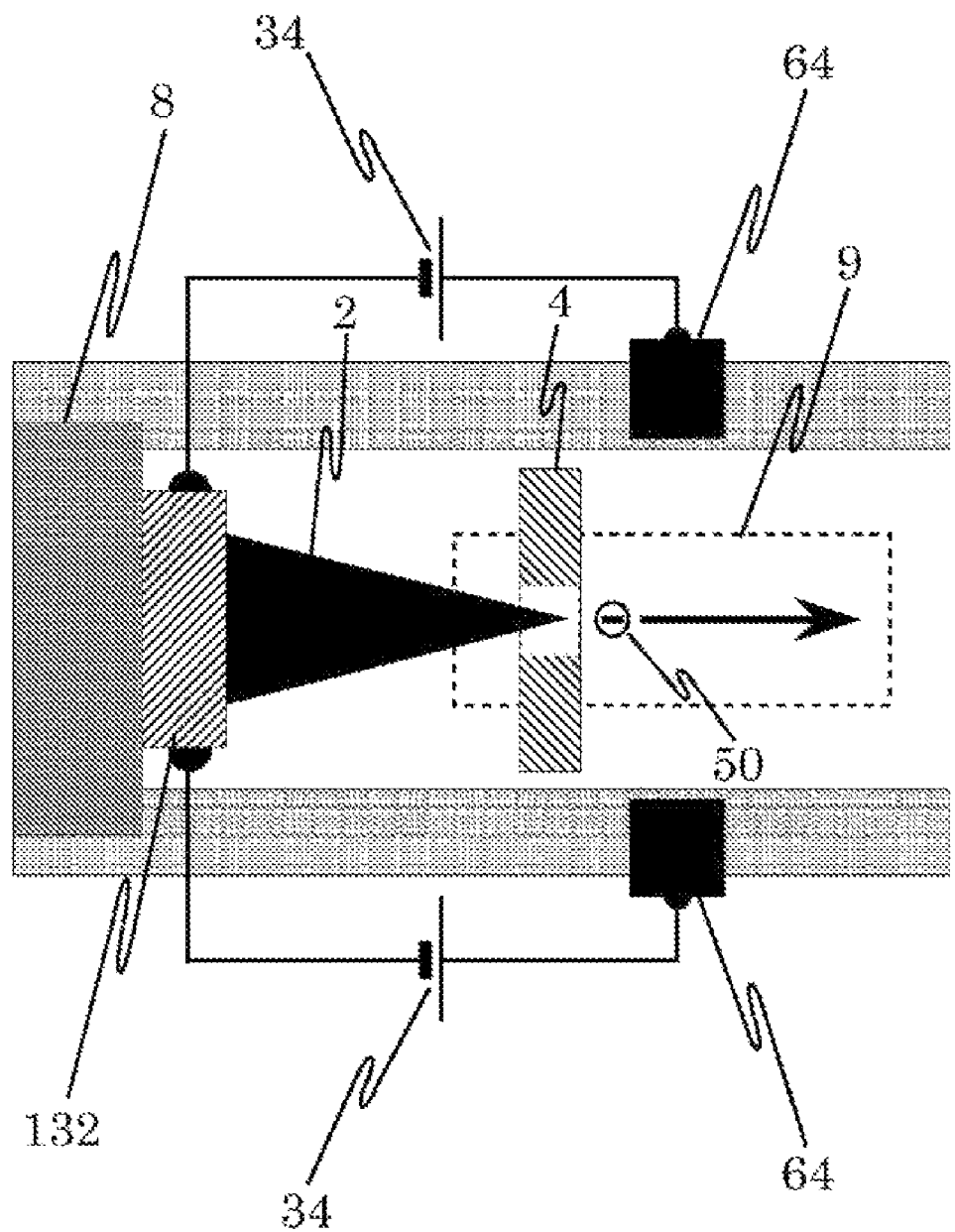
FIG. 53 is a cross-sectional view showing the surrounding of a second stage carrier output material in the example in which the two-stage cascade feed back method is applied to the field effect power generation device according to the second embodiment of the present invention.

The surrounding of the first stage carrier output material 131 is the same as the structure shown in FIG. 52. The channel forming material 2 is electrically connected to the first stage carrier output material 131. An electrical field is applied between the first electrode of the carrier accelerator 61 and the first stage carrier output material 131. A positive voltage is applied to the first electrode of the carrier accelerator 61 while a negative voltage is applied to the first stage carrier output material 131. The electrical field causes electrons serving as carriers to be injected into the channel forming material 2 from the first stage carrier output material 131. The first electrode of the carrier accelerator 61 acts as the injection electrode. The electrons injected into the channel forming material 2 are emitted to the accelerating channel 9 through the irreversible process occurrence section 4. The first electrode of the carrier accelerator 61 also acts as the emission electrode. The emitted electrons are accelerated in the accelerating channel 9 by the first electrode of the carrier accelerator 61, the second electrode of the carrier accelerator 62, and the third electrode of the carrier accelerator 63. The second electrode of the carrier accelerator 62 and the third electrode of the carrier accelerator 63 act as the accelerating electrodes. The accelerated electrons collide with the first stage electron absorption collector 127 and are absorbed by the first stage electron absorption collector 127. The electrons absorbed by the first stage electron absorption collector 127 move to the first stage energy accumulator 111. Since electrons are emitted from the first stage carrier output material 131, positive holes remain in the first stage carrier output material 131. The remaining positive holes move to the first stage energy accumulator 111. Positive holes and electrons form dipoles and are accumulated in the first stage energy accumulator 111.

The kinetic energy of electrons emitted from the first stage carrier output material 131 is converted into thermal energy by the collision of the electrons with the first stage electron absorption collector 127. As a result, the temperature of the first stage electron absorption collector 127 increases and generated heat is conducted to the insulator 8 to cause the temperature of the insulator 8 to increase. Heat of the insulator 8 is conducted to the second stage carrier output material 132 to increase the temperature of the second stage carrier output material 132. In the second stage carrier output material 132 having high temperature, electrons can acquire sufficient kinetic energy. The surrounding of the second stage carrier output material 132 is the same as the structure shown in FIG. 53. The channel forming material 2 is electrically connected to the second stage carrier output material 132. An electrical field is applied between the fourth electrode of the carrier accelerator 64 and the second stage carrier output material 132. A positive voltage is applied to the fourth electrode 64 while a negative voltage is applied to the second stage carrier output material 132. The electrical field causes electrons serving as carriers to be injected into the channel forming material 2 from the second stage carrier output material 132. The fourth electrode of the carrier accelerator 64 acts as the injection electrode. The electrons injected into the channel forming material 2 are emitted by the actions of high temperature and electrical field to the accelerating channel 9 through the irreversible process occurrence section 4. The fourth electrode of the carrier accelerator 64 also acts as the emission electrode. The emitted electrons are accelerated in the accelerating channel 9 by the fourth electrode of the carrier accelerator 64, the fifth electrode of the carrier accelerator 65, and the sixth electrode of the carrier accelerator 66.

Figure 58:
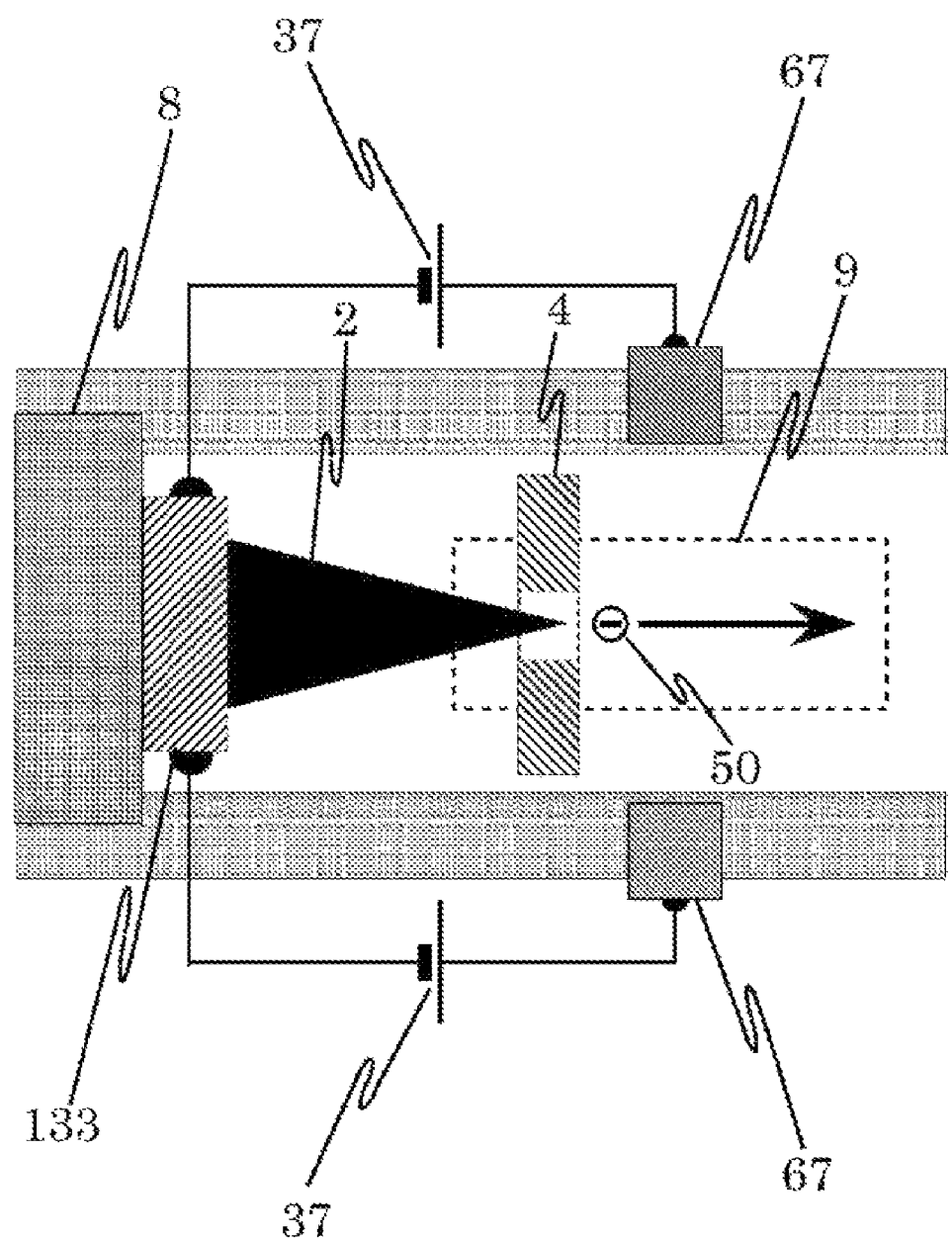
FIG. 58 is a cross-sectional view showing the surrounding of a third stage carrier output material in the example in which the three-stage cascade system is applied to the field effect power generation device according to the third embodiment of the present invention.

The fifth electrode of the carrier accelerator 65 and the sixth electrode of the carrier accelerator 66 act as the accelerating electrodes. The accelerated electrons collide with the second stage electron absorption collector 128 and are absorbed by the second stage electron absorption collector 128. The electrons absorbed by the second stage electron absorption collector 128 move to the second stage energy accumulator 112. Since electrons are emitted from the second stage carrier output material 132, positive holes remain in the second stage carrier output material 132. The remaining positive holes move to the second stage energy accumulator 112. Positive holes and electrons form dipoles and are accumulated in the second stage energy accumulator 112. The kinetic energy of electrons output from the second stage carrier output material 132 is converted into thermal energy by the collision of the electrons with the second stage electron absorption collector 128. As a result, the temperature of the second stage electron absorption collector 128 increases and generated heat is conducted to the insulator 8 to increase the temperature of the insulator 8. Heat of the insulator 8 is conducted to the third stage carrier output material 133 to increase the temperature of the third stage carrier output material 133. In the third stage carrier output material 133 having high temperature, electrons can acquire sufficient kinetic energy. The surrounding of the third stage carrier output material 133 is the same as the structure shown in FIG. 58. The channel forming material 2 is electrically connected to the third stage carrier output material 133. An electrical field is applied between the seventh electrode of the carrier accelerator 67 and the third stage carrier output material 133. A positive voltage is applied to the seventh electrode 67 while a negative voltage is applied to the third stage carrier output material 133. The electrical field causes electrons serving as carriers to be injected into the channel forming material 2 from the third stage carrier output material 133. The seventh electrode of the carrier accelerator 67 acts as the injection electrode. The electrons injected into the channel forming material 2 are emitted by the actions of high temperature and electrical field to the accelerating channel 9 through the irreversible process occurrence section 4. The seventh electrode of the carrier accelerator 67 also acts as the emission electrode. The emitted electrons are accelerated in the accelerating channel 9 by the seventh electrode of the carrier accelerator 67, the eighth electrode of the carrier accelerator 68, and the ninth electrode of the carrier accelerator 69. The eighth electrode of the carrier accelerator 68 and the ninth electrode of the carrier accelerator 69 act as the accelerating electrodes. The accelerated electrons collide with a third stage electron absorption collector 129 and are absorbed by the third stage electron absorption collector 129. The electrons absorbed by the third stage electron absorption collector 129 move to a third stage energy accumulator 113. Since electrons are emitted from the third stage carrier output material 133, positive holes remain in the third stage carrier output material 133. The remaining positive holes move to the third stage energy accumulator 113. Positive holes and electrons form dipoles and are accumulated in the third stage energy accumulator 113. When the electrical load 5 is electrically connected in parallel with the first stage energy accumulator 111, accumulated electrical energy is consumed by a current flowing in the electrical load 5. When the electrical load 5 is electrically connected in parallel with the second stage energy accumulator 112, accumulated electrical energy is consumed by a current flowing in the electrical load 5. When the electrical load 5 is electrically connected in parallel with the third stage energy accumulator 113, accumulated electrical energy is consumed by a current flowing in the electrical load 5.

When the first stage energy accumulator 111, the second stage energy accumulator 112, and the third stage energy accumulator 113 are electrically connected in series and the electrical load 5 is electrically connected in parallel with the series connection at the both ends, electrical energy is consumed. When the energy accumulators are cascaded in series, a voltage across the series connection becomes high. As a result, electrical energy to be consumed further increases than electrical energy individually emitted from the energy accumulators and power generation efficiency further increases.

When thermal energy is applied to the thermal energy supplier 126 as shown in FIG. 57, the temperature of the first stage carrier output material 131 is increased by thermal conduction, and thus the number of electrons emitted from the first stage carrier output material 131 increases and the quantity of electricity generated by the succeeding stages increases. Accordingly, in the case where thermal energy is applied to the thermal energy supplier 126 by heating, generated electrical energy is larger than electrical energy consumed by heater heating, whereby power generation efficiency increases in total. Here, any kind of energy can be supplied to the thermal energy supplier 126 to increase power generation efficiency as far as energy concerned. The present invention, thus, does not limit energy supplied to the thermal energy supplier 126. Examples of supplying energy include electromagnetic and thermal energy. Thermal energy includes geothermal heat sources, solar heating energy, and heat generated in burning fossil fuels.

<Fourth Embodiment>

Figure 59:
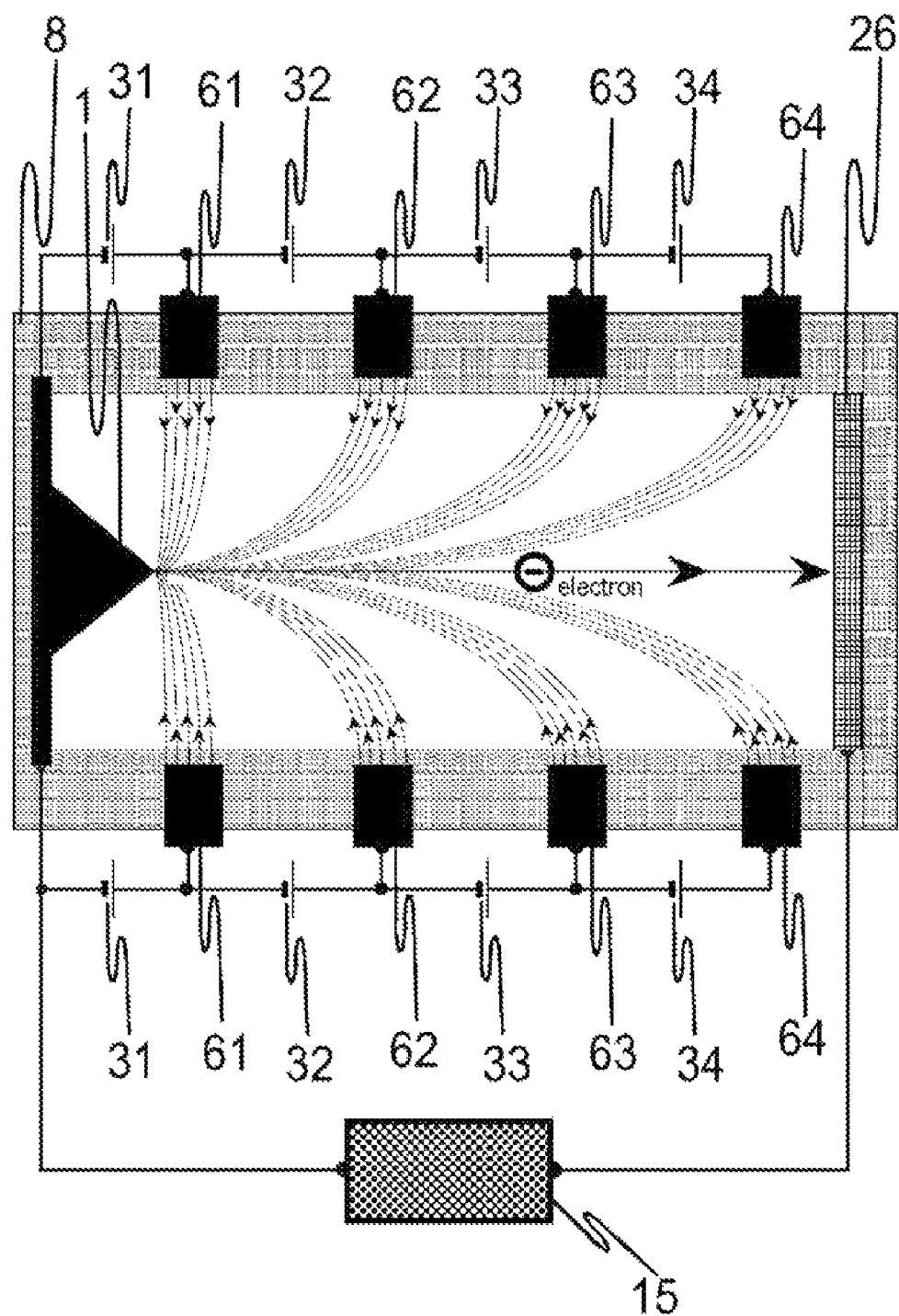
FIG. 59 is a cross-sectional view of an example in which four electrodes are used as the carrier accelerator in the field effect power generation device according to the fourth embodiment of the present invention.

FIG. 59 shows a cross-sectional view showing the field effect power generation device according to the fourth embodiment of the present invention. While, for example, the first power source 31 is illustrated on the upper and lower sides of the diagram, actually the first power source 31 is singly provided. The power generation device has a cylindrical shape and is symmetrical about its transverse axis. Because of this structure, the same elements are illustrated on the upper and lower sides of the diagram. In the diagram, the positive voltage terminal of the first power source 31 is electrically connected to the first electrode of the carrier accelerator 61. The negative voltage terminal of the first power source 31 is electrically connected to the carrier output material 1. The first power source 31 is used for injecting electrons serving as carriers into the channel forming material 2 from the carrier output material 1. The negative voltage terminal of the second power source 32 is electrically connected to the first electrode of the carrier accelerator 61. The positive voltage terminal of the second power source 32 is electrically connected to the second electrode of the carrier accelerator 62. The negative voltage terminal of the third power source 33 is electrically connected to the second electrode of the carrier accelerator 62. The positive voltage terminal of the third power source 33 is electrically connected to the third electrode of the carrier accelerator 63. The negative voltage terminal of the fourth power source 34 is electrically connected to the third electrode of the carrier accelerator 63. The positive voltage terminal of the fourth power source 34 is electrically connected to the fourth electrode of the carrier accelerator 64.

Figure 60:
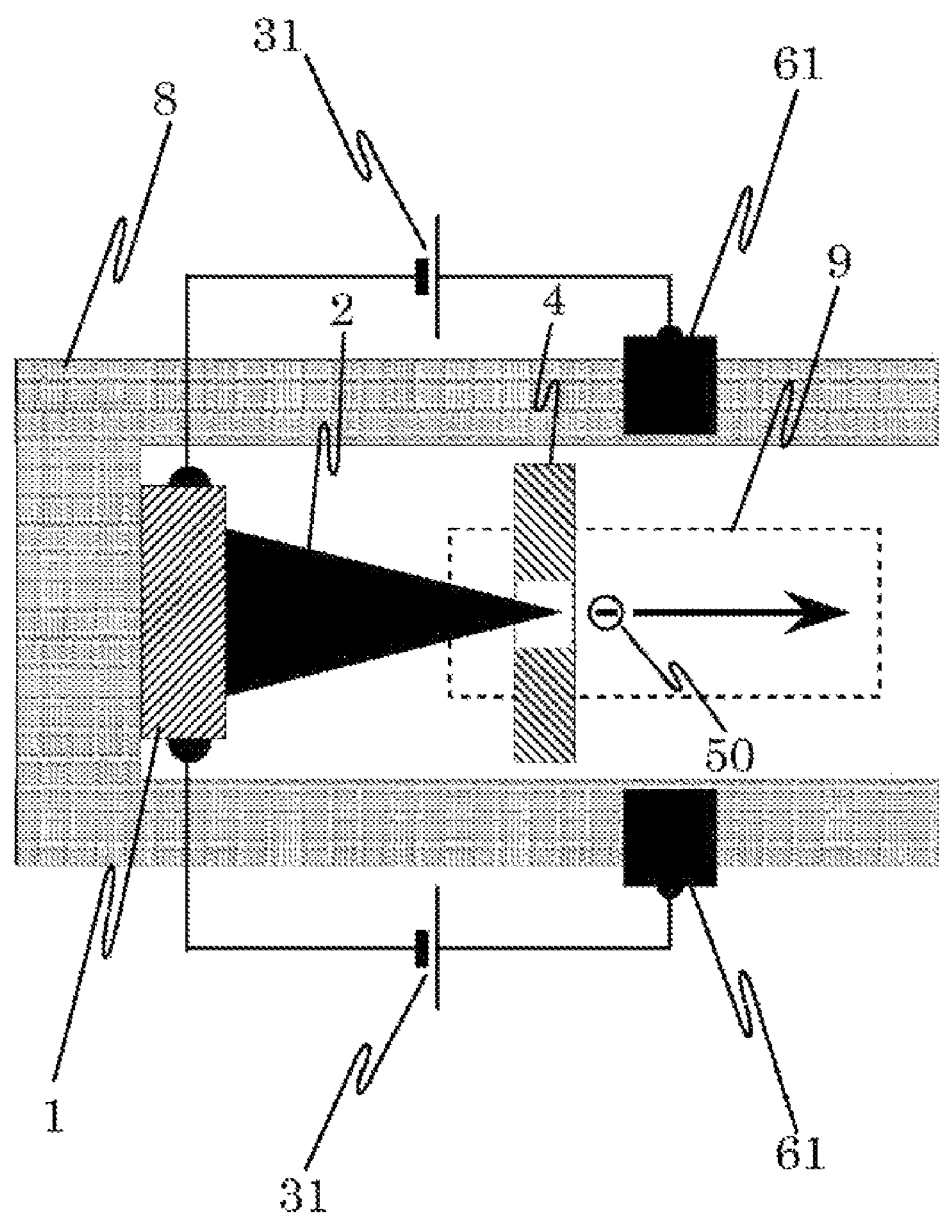
FIG. 60 is an enlarged view showing the surrounding of a carrier output material.

FIG. 60 is an enlarged view showing the surrounding of the carrier output material 1. An electrical field is applied between the first electrode of the carrier accelerator 61 and the carrier output material 1. A positive voltage is applied to the first electrode 61 while a negative voltage is applied to the carrier output material 1. The electrical field acts electrons serving as carriers to be injected into the channel forming material 2 from the carrier output material 1. The first electrode of the carrier accelerator 61 acts as the injection electrode. In the injection, electrons penetrate and pass through a potential barrier existing between the carrier output material 1 and the channel forming material 2 due to quantum tunneling effect and the electrical field applied between the first electrode of the carrier accelerator 61 and the carrier output material 1. The first electrode of the carrier accelerator 61 also acts as a quantum tunneling electrode. The injected electrons move in the accelerating channel 9. Here, it is assumed that the end of the channel forming material 2 has a sufficiently small curvature radius. Examples of the channel forming material 2 include carbon nanotube and carbon wall. The carrier output material 1 is electrically connected to the channel forming material 2. However, if the channel forming material 2 is a carbon-like material, a special adhesion method is required to electrically connect the carrier output material 1 with the channel forming material 2. In thermal power generation devices, it is very difficult to electrically connect the carrier output material 1 with the channel forming material 2 in a high temperature state because the carrier output material 1 is heated to high temperature. However, in the power generation device of the present invention, the carrier output material 1 is not required to be heated. Once the carrier output material 1 and the channel forming material 2 are electrically connected, the electrical connection may rarely be disconnected. The power generation device of the present invention, thus, has superior durability than the conventional thermal power generation devices.

The electrons injected into the channel forming material 2 are accelerated in the accelerating channel 9 by an electrical field applied from the electrodes of the carrier accelerator 3, and can acquire sufficient kinetic energy. The second electrode of the carrier accelerator 62, the third electrode of the carrier accelerator 63, and the fourth electrode of the carrier accelerator 64 act as the accelerating electrodes. The electrons having large kinetic energy reach the irreversible process occurrence section 4, and can be emitted from the channel forming material 2. The first electrode of the carrier accelerator 61 also acts as the emission electrode. In the emission, electrons penetrate and pass through a potential barrier that exists between the channel forming material 2 and a vacuum and corresponds to a work function due to quantum tunneling effect. Then, the injected electrons are emitted into a vacuum owing to applied electrical field.

In FIG. 59, electric lines of force emanated from each electrode of the carrier accelerator 3 are shown as curves with arrows. Since the power generation device has a cylindrical shape, electrons serving as carriers receive an axi-symmetric force and move in the axial direction of the power generation device. Thereafter, the electrons collide with the electron absorption collector 26 and are absorbed by the electron absorption collector 26. The electrons absorbed by the electron absorption collector 26 reach the energy accumulator 15. On the other hand, positive holes having positive charges remain in the carrier output material 1 that has output electrons serving as carriers. Positive holes move to the energy accumulator 15, in which electrons and positive holes form dipoles. The electrons in the electron absorption collector 26 move to the energy accumulator 15. Since almost no electrons remain in the electron absorption collector 26, the emission of subsequent electrons to approach the electron absorption collector 26 is rarely hindered. In other words, since electrons and positive holes form dipoles in the energy accumulator 15, negative charges of electrons rarely affect the moving direction of subsequent electrons. In addition, since positive holes move from the carrier output material 1 to the energy accumulator 15, in which electrons and positive holes form dipoles, positive charges of positive holes rarely hinder the movement of electrons moving from the carrier output material 1 to the carrier input material. Consequently, the good performance of the power generation of the present invention is realized. In the related art of power generation devices, it is difficult to achieve high efficiency power generation since electrons and positive holes remaining their original materials hinder the movement of subsequent carriers.

<Fifth Embodiment>

Figure 61:
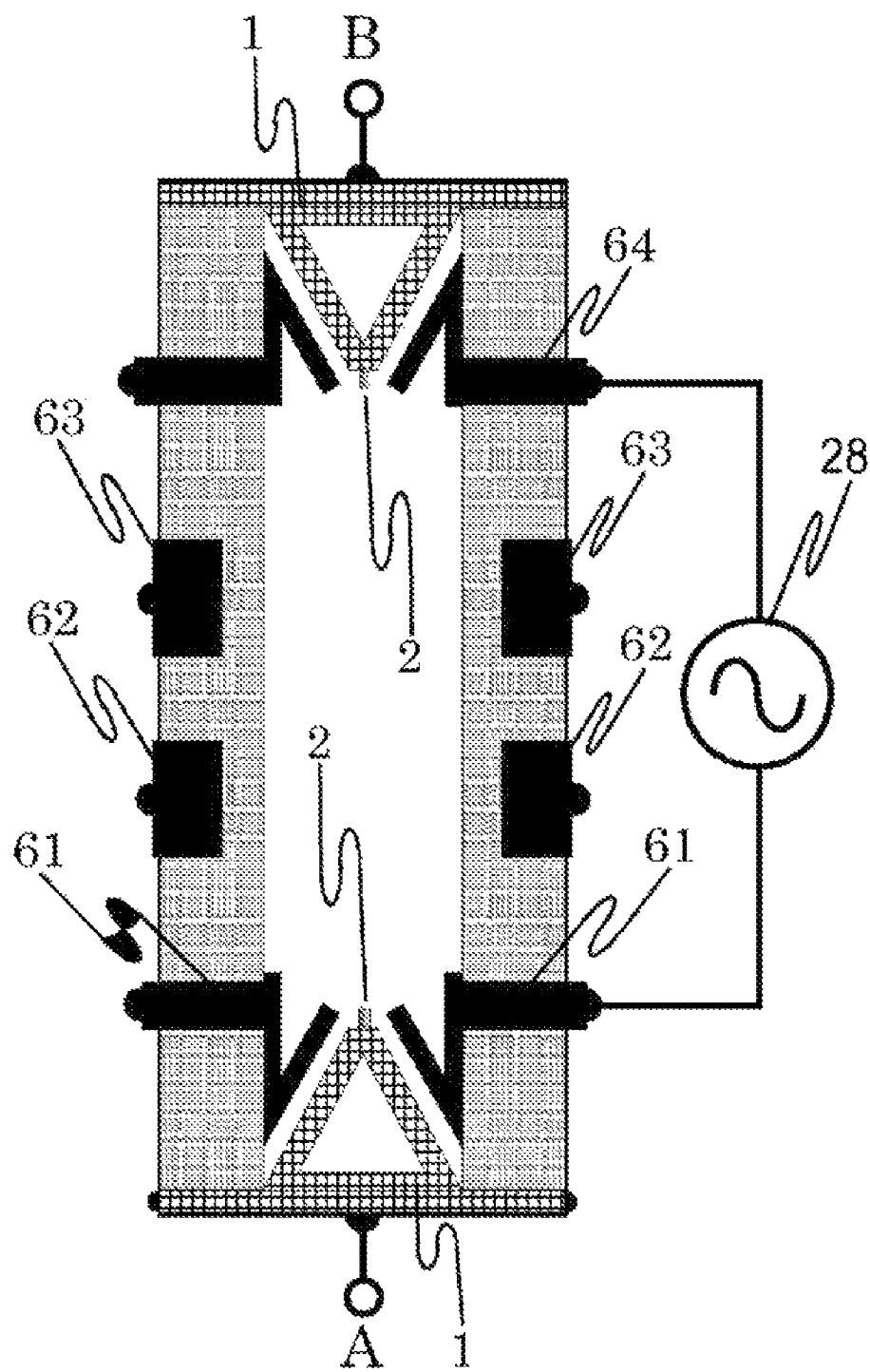
FIG. 61 is a cross-sectional view showing a mode 0 state when the alternate power generation method is employed in the field effect power generation device according to the fifth embodiment of the present invention.
Figure 62:
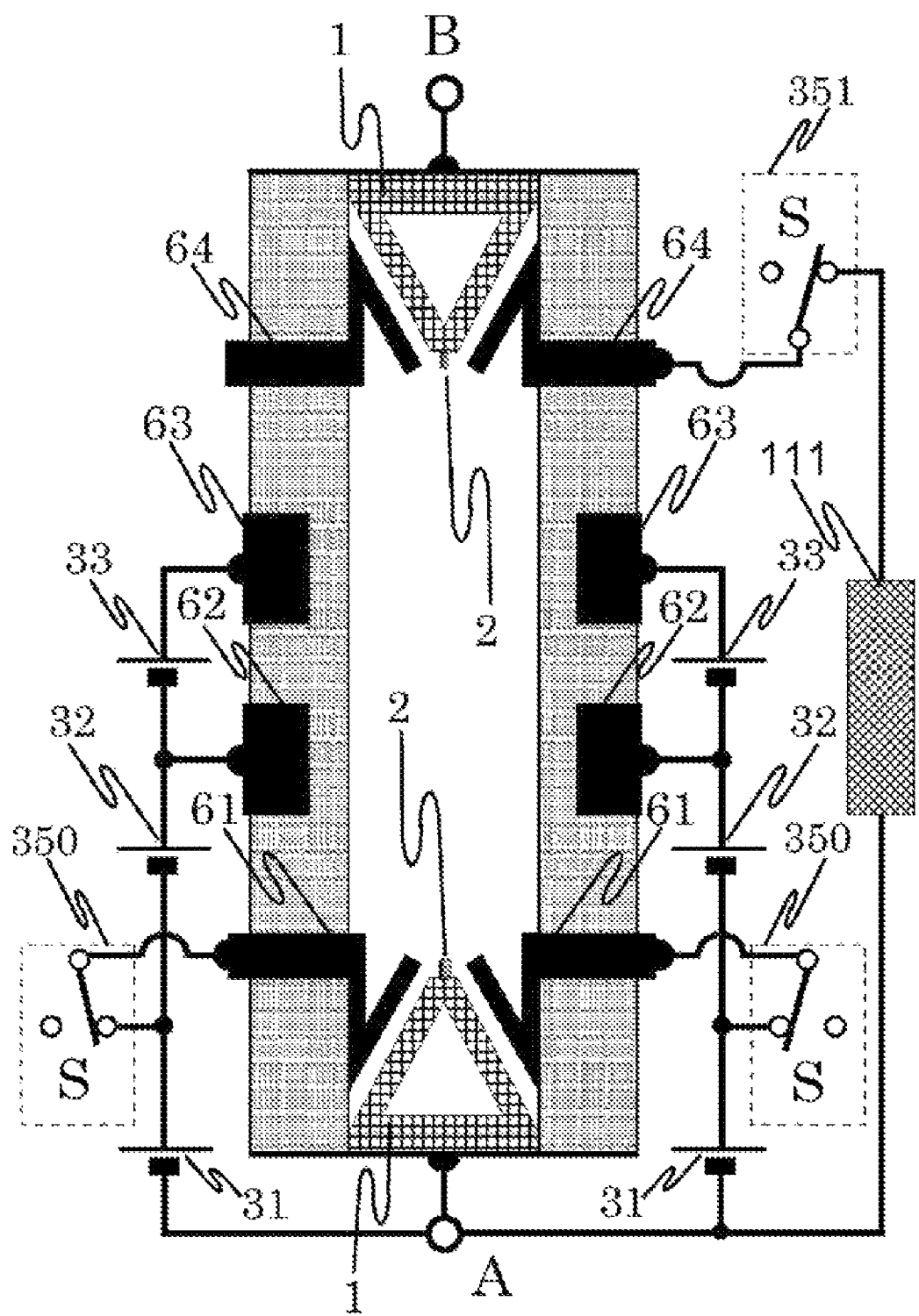
FIG. 62 is a cross-sectional view showing a mode 1 state when the alternate power generation method is employed in the field effect power generation device according to the fifth embodiment of the present invention.
Figure 63:
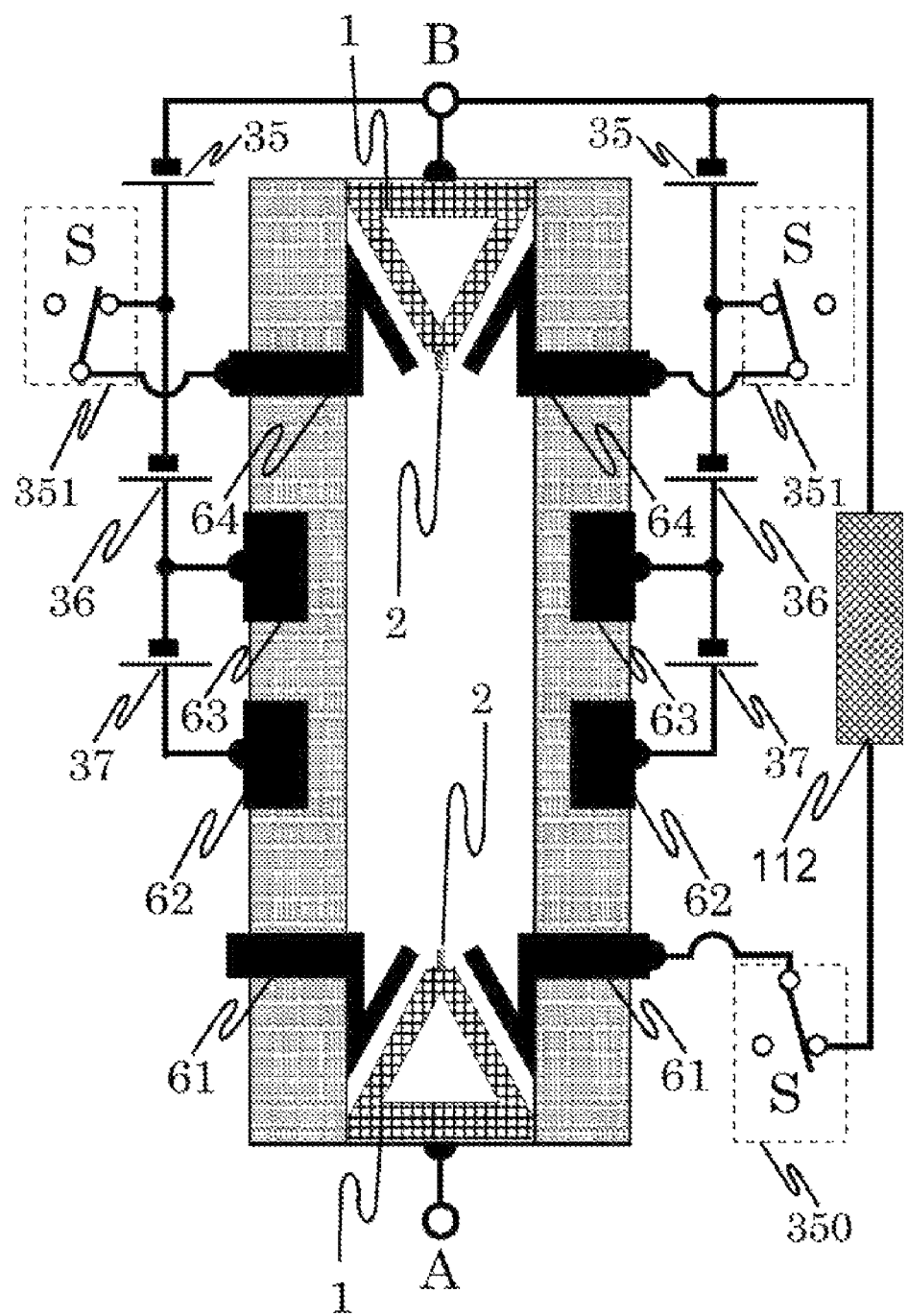
FIG. 63 is a cross-sectional view showing a mode 2 state when the alternate power generation method is employed in the field effect power generation device according to the fifth embodiment of the present invention.

It is called an alternative power generation method when electrical energy is generated with electrons alternatively emitted from an emitter and a collector. FIG. 61 is a cross-sectional view showing a mode 0 state when the alternative power generation method is employed in the field effect power generation device according to the fifth embodiment of the present invention. In the mode 0 that is an initial state, electrons do not acquire sufficient kinetic energy because electrode temperature is low. It is called the mode 0 when an alternative power source 28 is electrically connected to an electrode located on the side adjacent to A and an electrode located on the side adjacent to B, and the electrodes are heated by a discharge phenomenon. FIG. 62 is a cross-sectional view showing a mode 1 state when the alternative power generation method is applied in the field effect power generation device according to the fourth embodiment of the present invention. It is called the mode 1 of the alternative power generation when, as shown in the diagram, electrons are injected into the channel forming material 2 from the carrier output material 1 located on the side adjacent to A, and electrons are emitted from the channel forming material 2. FIG. 63 is a cross-sectional view showing a mode 2 state when the alternative power generation method is applied in the field effect power generation device according to the fifth embodiment of the present invention. It is called the mode 2 of the alternative power generation when electrons are injected into the channel forming material 2 from the carrier output material 1 located on the side adjacent to B, and electrons are emitted from the channel forming material 2.

<Mode 0>

In the initial state, thermal energy is imparted to the carrier output material 1 and the channel forming material 2 for heating the carrier output material 1 and the channel forming material 2. The methods for imparting thermal energy to the carrier output material 1 include heater heating, solar heat, and other thermal sources. A simple heating example is described as follows. The second electrode of the carrier accelerator 62 and the third electrode of the carrier accelerator 63 are set to have a high impedance state. An alternative high voltage is applied to a terminal A and a terminal B. Discharge starts between the electrode on the side adjacent to A and the electrode on the side adjacent to B, and the temperatures of both electrodes increase. In FIG. 61, the alternative power source 28 is electrically connected to the first electrode of the carrier accelerator 61 and the fourth electrode of the carrier accelerator 64. The second electrode of the carrier accelerator 62 and the third electrode of the carrier accelerator 63 are in a high impedance state since nothing is electrically connected to the both electrodes.

A negative voltage is applied to the fourth electrode of the carrier accelerator 64 during a time period in which a positive voltage is applied to the first electrode of the carrier accelerator 61 from the alternative power source 28. In the case where the voltage of the alternative power source 28 is sufficiently high during the time period, electrons are emitted from the fourth electrode of the carrier accelerator 64. The emitted electrons collide with the first electrode of the carrier accelerator 61. Since the sufficiently high voltage is applied to the electrode, the emitted electrons collide with the first electrode of the carrier accelerator 61 while having large kinetic energy. As a result, the temperature of the first electrode of the carrier accelerator 61 increases. Thermal energy of the first electrode of the carrier accelerator 61 is conducted to the carrier output material 1 and the channel forming material 2 owing to heat dissipation. As a result, electrons in the carrier output material 1 and the channel forming material 2 can acquire sufficient kinetic energy from the electrical field.

A positive voltage is applied to the fourth electrode of the carrier accelerator 64 during a time period in which a negative voltage is applied to the first electrode of the carrier accelerator 61 from the alternative power source 28. In the case where the voltage of the alternative power source 28 is sufficiently high during the time period, electrons are emitted from the first electrode of the carrier accelerator 61 and the emitted electrons collide with the fourth electrode of the carrier accelerator 64. Since the sufficiently high voltage is applied to the electrode, the emitted electrons collide with the fourth electrode of the carrier accelerator 64 while having large kinetic energy. As a result, the temperature of the fourth electrode of the carrier accelerator 64 increases. Thermal energy of the fourth electrode of the carrier accelerator 64 is conducted to the carrier output material 1 and the channel forming material 2 owing to heat dissipation. As a result, electrons in the carrier output material 1 and the channel forming material 2 can acquire sufficient kinetic energy.

By employing the alternative power source, the above-described process of electron emission can be done repeatedly. The temperatures of both the first electrode of the carrier accelerator 61 and the fourth electrode of the carrier accelerator 64 increase together and become high. Thermal energy accumulated in the first electrode of the carrier accelerator 61 increases the temperatures of the carrier output material 1 and the channel forming material 2 that are located on the side adjacent to A in FIG. 61 owing to an indirect heating effect. Accordingly, the temperature inside the carrier output material 1 increases and electrons inside the carrier output material 1 can acquire sufficient kinetic energy, whereby electrons can be easily injected. In addition, the temperature inside the channel forming material 2 increases and electrons inside the channel forming material 2 can acquire sufficient kinetic energy, whereby electrons can be easily emitted. Thermal energy accumulated in the fourth electrode of the carrier accelerator 64 increases the temperatures of the carrier output material 1 and the channel forming material 2 that are located on the side adjacent to B in FIG. 61 owing to an indirect heating effect. Accordingly, the temperature inside the carrier output material 1 increases and electrons inside the carrier output material 1 can acquire sufficient kinetic energy, whereby electrons can be easily injected. In addition, the temperature inside the channel forming material 2 increases and electrons inside the channel forming material 2 can acquire sufficient kinetic energy, whereby a large number of electrons can be easily emitted.

<Mode 1>

Figure 64:
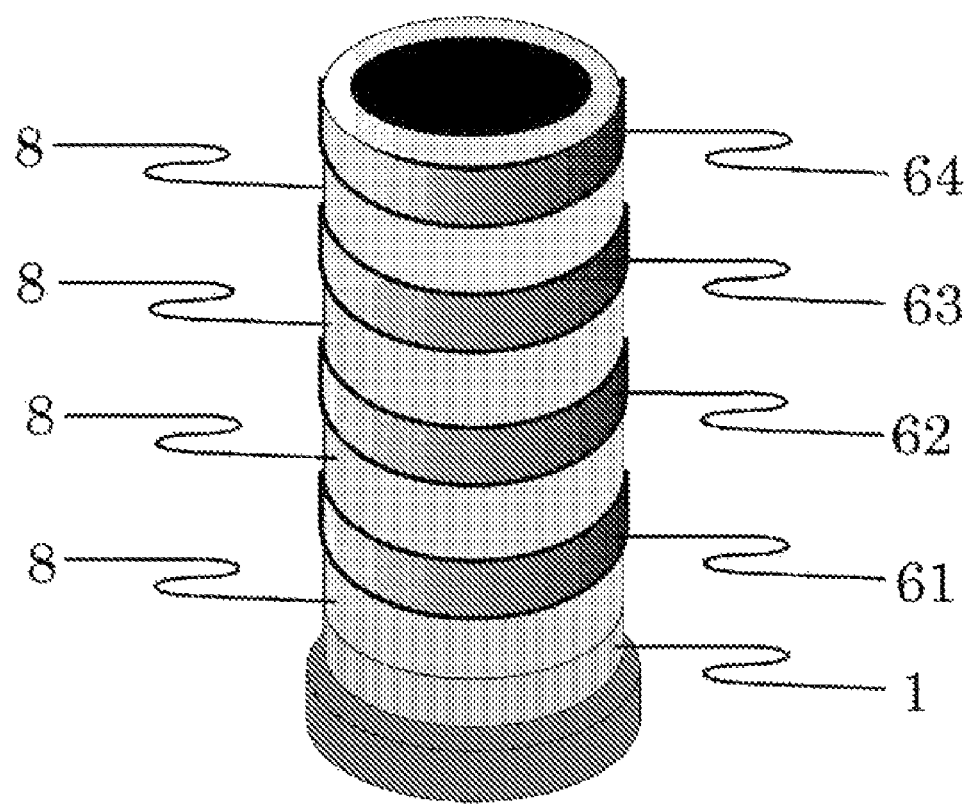
FIG. 64 is an external view showing the mode 1 state when the alternate power generation method is employed in the field effect power generation device according to the fifth embodiment of the present invention.

FIG. 64 is an external view showing the mode 1 state when the alternative power generation method is employed in the field effect power generation device according to the fifth embodiment of the present invention. The carrier output material 1 and the channel forming material 2 in FIG. 62 are enlarged and shown in FIG. 60. As shown in FIG. 62, the negative voltage terminal of the first power source 31 is electrically connected to the carrier output material 1 located on the side adjacent to A. The positive voltage terminal of the first power source 31 is electrically connected to the first electrode of the carrier accelerator 61. The first power source 31 is used for injecting electrons serving as carriers into the channel forming material 2 from the carrier output material 1. The negative voltage terminal of the second power source 32 is electrically connected to the first electrode of the carrier accelerator 61. The positive voltage terminal of the second power source 32 is electrically connected to the second electrode of the carrier accelerator 62. The negative voltage terminal of the third power source 33 is electrically connected to the second electrode of the carrier accelerator 62. The positive voltage terminal of the third power source 33 is electrically connected to the third electrode of the carrier accelerator 63.

As shown in FIG. 60, the channel forming material 2 is electrically connected to the edge of the carrier output material 1. An electrical field is applied between the carrier output material 1 and the first electrode of the carrier accelerator 61, and electrons in the carrier output material 1 are injected into the channel forming material 2. The first electrode of the carrier accelerator 61 acts as the injection electrode. The edge of the channel forming material 2 has an extremely thin shape. An electrical field is, thus, concentrated on the edge surface. As shown in FIG. 60, electrons are emitted by the electrical field to the accelerating channel 9 from the channel forming material 2 through the irreversible process occurrence section 4. The first electrode of the carrier accelerator 61 acts as the emission electrode. In an initial state, a small number of electrons may be emitted because the temperatures of the carrier output material 1 and the channel forming material 2 are low. Once reaching a critical state, electrons in the carrier output material 1 and the channel forming material 2 can acquire sufficient kinetic energy. As a result, the number of injected electrons increases and the number of emitted electrons increases.

The electrons emitted to the accelerating channel 9 are accelerated by a Coulomb force acting among positive charges accumulated in the first electrode of the carrier accelerator 61, positive charges accumulated in the second electrode of the carrier accelerator 62 and positive charges accumulated in the third electrode of the carrier accelerator 63. Finally the emitted electrons collide with the fourth electrode of the carrier accelerator 64. The second electrode of the carrier accelerator 62, the third electrode of the carrier accelerator 63, and the fourth electrode of the carrier accelerator 64 act as the accelerating electrodes. In the mode 1, the fourth electrode of the carrier accelerator 64 plays a role of the collector 4 absorbing electrons. Charges accumulated in the fourth electrode of the carrier accelerator 64 move to the first stage energy accumulator 111 through a switch 351. Positive holes remain in the carrier output material 1 that is located on the side adjacent to A and has injected electrons. The remaining positive holes move to the first stage energy accumulator 111, in which the accumulated positive holes and electrons form dipoles. When the electrical load 5 is electrically connected in parallel with the first stage energy accumulator 111, generated electrical energy is consumed. In the operation of the mode 1, electrons emitted from the channel forming material 2 located on the side adjacent to A are accelerated and collide with the fourth electrode of the carrier accelerator 64. The kinetic energy of the electrons is absorbed by the fourth electrode of the carrier accelerator 64. As a result, the temperature of the fourth electrode of the carrier accelerator 64 increases.

<Mode 2>

The carrier output material 1 and the channel forming material 2 in FIG. 63 are enlarged and shown in FIG. 60. As shown in FIG. 62, the negative voltage terminal of the fifth power source 35 is electrically connected to the carrier output material 1 located on the side adjacent to B. The positive voltage terminal of the fifth power source 35 is electrically connected to the fourth electrode of the carrier accelerator 64. The fifth power source 35 is used for injecting electrons serving as carriers into the channel forming material 2 from the carrier output material 1. The negative voltage terminal of the sixth power source 36 is electrically connected to the fourth electrode of the carrier accelerator 64. The positive voltage terminal of the sixth power source 36 is electrically connected to the third electrode of the carrier accelerator 63. The negative voltage terminal of the seventh power source 37 is electrically connected to the third electrode of the carrier accelerator 63. The positive voltage terminal of the seventh power source 37 is electrically connected to the second electrode of the carrier accelerator 62.

As shown in FIG. 60, the channel forming material 2 is electrically connected to the edge of the carrier output material 1. In the operation of the mode 1, the temperature of the fourth electrode of the carrier accelerator 64 increases and the temperature of a side adjacent to B increases to high temperature. Since the fourth electrode of the carrier accelerator 64 is disposed close to the carrier output material 1 and the channel forming material 2 that are located on the side adjacent to B, the temperatures of the carrier output material 1 and the channel forming material 2 that are located on the side adjacent to B increases to high temperature due to an indirect heating effect by the operation of the mode 1. As a result, the emitted electrons can acquire sufficient kinetic energy.

An electrical field is applied between the carrier output material 1 and the fourth electrode of the carrier accelerator 64. Since electrons stored in the carrier output material 1 can acquire sufficient kinetic energy, electrons are easily injected from the carrier output material 1 into the channel forming material 2. In this case, the fourth electrode of the carrier accelerator 64 acts as the injection electrode. The channel forming material 2 has a thin structure. An electrical field is thus concentrated on the surface of the edge of the channel forming material 2. As shown in FIG. 60, the temperature of the channel forming material 2 located on the side adjacent to B becomes high temperature by the operation of the mode 1. Electrons, thus, emitted into the accelerating channel 9 from the channel forming material 2 through the irreversible process occurrence section 4 due to the applied electrical field. The fourth electrode of the carrier accelerator 64 operates as the emission electrode. In an initial state, a small number of electrons may be emitted since the temperatures of the carrier output material 1 and the channel forming material 2 are low.

The electrons emitted to the accelerating channel 9 are accelerated due to Coulomb force acting among positive charges accumulated in the fourth electrode of the carrier accelerator 64, positive charges accumulated in the third electrode of the carrier accelerator 63, and positive charges accumulated in the second electrode of the carrier accelerator 62, and finally reach the first electrode of the carrier accelerator 61. The fourth electrode of the carrier accelerator 64, the third electrode of the carrier accelerator 63, and the second electrode of the carrier accelerator 62 operate as the accelerating electrodes. In the mode 2, the first electrode of the carrier accelerator 61 plays a role of the collector 4 absorbing electrons. Electrons accumulated in the first electrode of the carrier accelerator 61 move to the second stage energy accumulator 112 through a switch 350. Positive holes remain in the carrier output material 1 that is located on the side adjacent to B and contains injected electrons. The remaining positive holes move to the second stage energy accumulator 112, in which positive holes and electrons form dipoles and are accumulated. When the electrical load 5 is electrically connected in parallel with the second stage energy accumulator 112, generated electrical energy is consumed.

In the operation of the mode 2, electrons emitted from the channel forming material 2 located on the side adjacent to B are accelerated and collide with the first electrode of the carrier accelerator 61. The kinetic energy of the electrons is, thus, absorbed by the first electrode of the carrier accelerator 61. As a result, the temperature of the first electrode of the carrier accelerator 61 increases. Since the first electrode of the carrier accelerator 61 is disposed close to the carrier output material 1 and the channel forming material 2, the temperatures of the carrier output material 1 and the channel forming material 2 increase to high temperature owing to indirect heating effect in the operation of the mode 2. As a result, electrons inside them can acquire sufficient kinetic energy.

As the mode 1 and the mode 2 operate repeatedly, the temperatures of the carrier output material 1 and the channel forming materials 2 each of which located on the side adjacent to A and on the side adjacent to B increase and electrons inside them can acquire sufficient kinetic energy. As a result, the number of injected electrons and the number of emitted electrons increase. As the mode 1 and mode 2 operate sequentially, the carrier output material 1 and the channel forming materials 2 each of which located on the side adjacent to A and on the side adjacent to B become high temperature and an alternative electrical energy can be efficiently obtained. When a generated voltage is applied to an electrical load, a large output current flows. Consequently, the above-described power generation makes it possible to efficiently supply electrical energy to the electrical load 5.

In the above-described alternative power generation, thermal energy is supplied so as to acquire sufficient kinetic energy to electrons in the carrier output material 1 and the channel forming material 2. As another technique to increase power generation efficiency, a critical state of power generation can be established by irradiating the carrier input material with electromagnetic waves having a short wavelength. In the mode 1, a flying path of electrons that collide with the fourth electrode of the carrier accelerator 64 is temporally changed so that material damage is decreased by changing collision areas. In order to change the flying path, it is preferable from durability point of view that a voltage applied to the electrode of the carrier accelerator 60 is varied and collision points of electrons are sequentially changed by employing electric and magnetic deflection methods.

In the mode 2, the flying path of electrons that collide with the first electrode of the carrier accelerator 61 is temporally changed so that material damage is decreased by changing collision areas. In order to change the flying path, it is preferable from durability point of view that a voltage applied to the electrode of the carrier accelerator 60 is varied and collision points of electrons are sequentially changed by employing electric and magnetic deflection methods.

<Sixth Embodiment>

Figure 65:
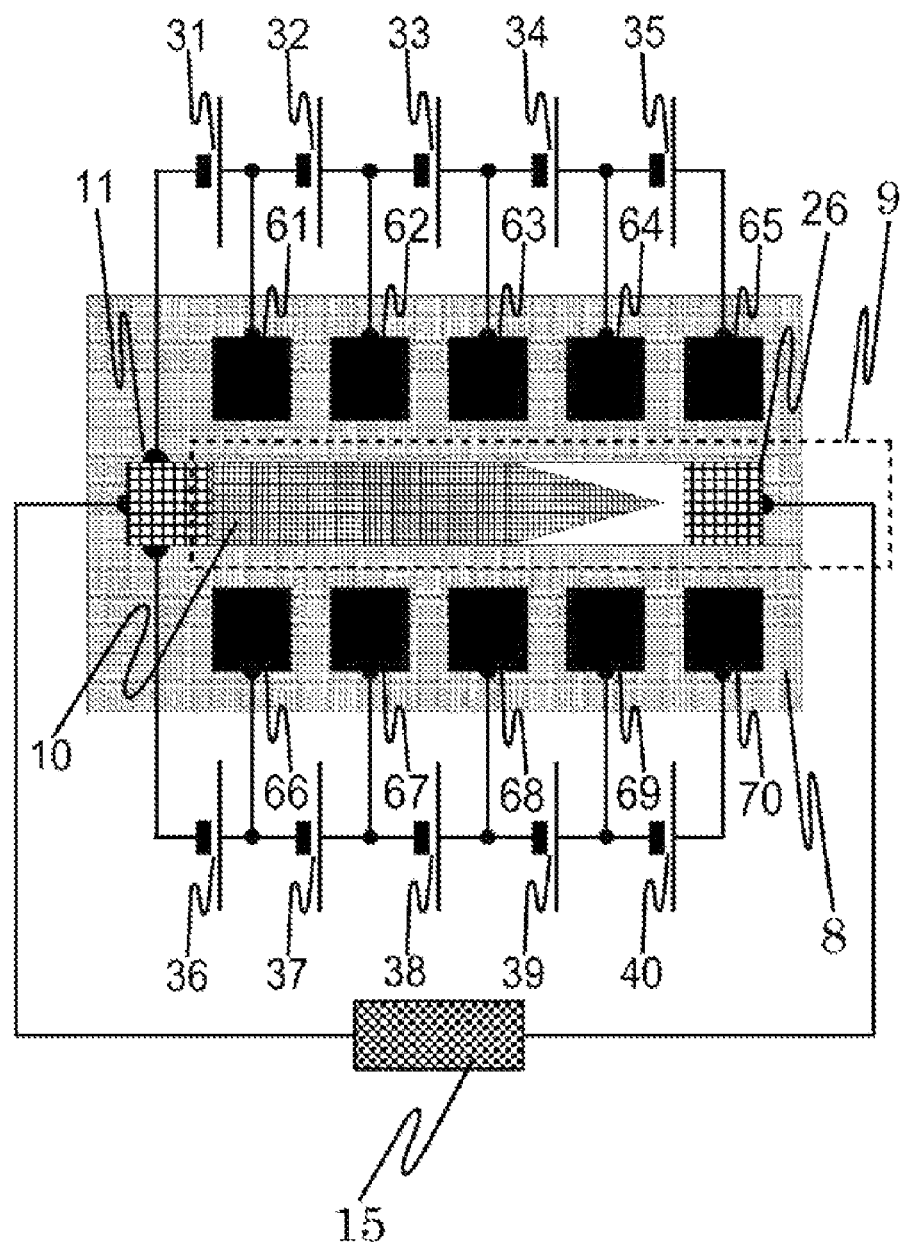
FIG. 65 is a cross-sectional view of an example in which the N-type semiconductor is used as the carrier output material and the P-type semiconductor is used as the channel forming material in the field effect power generation device according to the sixth embodiment of the present invention.

FIG. 65 is a cross-sectional view of an example in which the N-type semiconductor is used as the carrier output material 1 and the P-type semiconductor is used as the channel forming material in the field effect power generation device according to the sixth embodiment of the present invention. A P-N junction is fabricated by using the P-type semiconductor 10 and the N-type semiconductor 11 as shown in this figure. The insulator 8 is disposed around the P-N junction. The first power source 31, the second power source 32, the third power source 33, the fourth power source 34, the fifth power source 35, the sixth power source 36, the seventh power source 37, the eighth power source 38, the ninth power source 39, and the tenth power source 40 are used for accelerating carriers. The first power source 31 is used for injecting carrier electrons from the N-type semiconductor 11 into the P-type semiconductor 10. The negative voltage terminal of the first power source 31 is electrically connected to the N-type semiconductor 11. The positive voltage terminal of the first power source 31 is electrically connected to the first electrode of the carrier accelerator 61. An electrical field is applied between the first electrode of the carrier accelerator 61 and the N-type semiconductor 11, and lines of electric force emanate from the first electrode of the carrier accelerator 61 to the N-type semiconductor 11. Owing to the effect of the electrical field, electrons behaving as majority carriers in the N-type semiconductor 11 are injected from the N-type semiconductor 11 into the P-type semiconductor 10. The first electrode of the carrier accelerator 61 acts as the injection electrode. The electrons injected into the P-type semiconductor 10 are attracted to the first electrode of the carrier accelerator 61 due to Coulomb force, and reach directly under the first electrode of the carrier accelerator 61 to form an inversion layer in an upper surface of the P-type semiconductor 10. The inversion layer acts as the accelerating channel 9. The negative voltage terminal of the second power source 32 is electrically connected to the first electrode of the carrier accelerator 61. The positive voltage terminal of the second power source 32 is electrically connected to the second electrode of the carrier accelerator 62. An electrical field applied between the second electrode of the carrier accelerator 62 and the first electrode of the carrier accelerator 61 accelerates in the accelerating channel 9 the electrons injected into the P-type semiconductor 10. The negative voltage terminal of the third power source 33 is electrically connected to the second electrode of the carrier accelerator 62. The positive voltage terminal of the third power source 33 is electrically connected to the third electrode of the carrier accelerator 63. An electrical field applied between the third electrode of the carrier accelerator 63 and the second electrode of the carrier accelerator 62 accelerates electrons in the accelerating channel 9 disposing on the upper surface of the P-type semiconductor 10. The second electrode of the carrier accelerator 62 and the third electrode of the carrier accelerator 63 act as the sliding electrodes. The negative voltage terminal of the fourth power source 34 is electrically connected to the third electrode of the carrier accelerator 63. The positive voltage terminal of the fourth power source 34 is electrically connected to the fourth electrode of the carrier accelerator 64. An electrical field applied between the fourth electrode of the carrier accelerator 64 and the third electrode of the carrier accelerator 63 accelerates electrons in the accelerating channel 9 disposing on the upper surface of the P-type semiconductor 10. The electrons accelerated on the upper surface of the P-type semiconductor 10 can acquire sufficient kinetic energy, reach on the surface of edge in the upper surface of the P-type semiconductor, and are emitted into a vacuum. The fourth electrode of the carrier accelerator 64 acts as the emission electrode. The negative voltage terminal of the fifth power source 35 is electrically connected to the fourth electrode of the carrier accelerator 64. The positive voltage terminal of the fifth power source 35 is electrically connected to the fifth electrode of the carrier accelerator 65. An electrical field applied between the fifth electrode of the carrier accelerator 65 and the fourth electrode of the carrier accelerator 64 accelerates the emitted electrons in the accelerating channel 9. The fifth electrode of the carrier accelerator 65 acts as the accelerating electrode. The accelerated electrons can acquire sufficient kinetic energy, overcome a repulsive force from negative charges accumulated in the electron absorption collector 26, and are absorbed finally by the electron absorption collector 26

The negative voltage terminal of the sixth power source 36 is electrically connected to the N-type semiconductor 11. The positive voltage terminal of the sixth power source 36 is electrically connected to the sixth electrode of the carrier accelerator 66. An electrical field is applied between the sixth electrode of the carrier accelerator 66 and the N-type semiconductor 11, and lines of electric force emanate from the sixth electrode of the carrier accelerator 66 to the N-type semiconductor 11. Owing to the applied electrical field, electrons operating as majority carriers in the N-type semiconductor 11 are injected from the N-type semiconductor 11 into a lower surface of the P-type semiconductor 10. The sixth electrode of the carrier accelerator 66 acts as the injection electrode. The electrons injected into the lower surface of the P-type semiconductor 10 are attracted to the sixth electrode of the carrier accelerator 66 and reach directly under the sixth electrode of the carrier accelerator 66 to form an inversion layer in the lower surface of the P-type semiconductor 10. The inversion layer acts as the accelerating channel 9. The negative voltage terminal of the seventh power source 37 is electrically connected to the sixth electrode of the carrier accelerator 66. The positive voltage terminal of the seventh power source 37 is electrically connected to the seventh electrode of the carrier accelerator 67. An electrical field applied between the seventh electrode of the carrier accelerator 67 and the sixth electrode of the carrier accelerator 66 accelerates the electrons injected into the lower surface of the P-type semiconductor 10. The negative voltage terminal of the eighth power source 38 is electrically connected to the seventh electrode of the carrier accelerator 67. The positive voltage terminal of the eighth power source 38 is electrically connected to the eighth electrode of the carrier accelerator 68. An electrical field applied between the eighth electrode of the carrier accelerator 68 and the seventh electrode of the carrier accelerator 67 accelerates electrons in the accelerating channel 9 existing on the lower surface of the P-type semiconductor 10. The seventh electrode of the carrier accelerator 67 and the eighth electrode of the carrier accelerator 68 operate as the sliding electrodes. The negative voltage terminal of the ninth power source 39 is electrically connected to the eighth electrode of the carrier accelerator 68. The positive voltage terminal of the ninth power source 39 is electrically connected to the ninth electrode of the carrier accelerator 69. An electrical field applied between the ninth electrode of the carrier accelerator 69 and the eighth electrode of the carrier accelerator 68 accelerates electrons in the accelerating channel 9 disposing on the lower surface of the P-type semiconductor 10. The electrons accelerated on the lower surface of the P-type semiconductor 10 can acquire sufficient kinetic energy, reach the edge point of the lower surface of the P-type semiconductor, and are emitted into a vacuum. The ninth electrode of the carrier accelerator 69 operates as the emission electrode. The negative voltage terminal of the tenth power source 40 is electrically connected to the ninth electrode of the carrier accelerator 69. The positive voltage terminal of the tenth power source 40 is electrically connected to the tenth electrode of the carrier accelerator 70. An electrical field applied between the tenth electrode of the carrier accelerator 70 and the ninth electrode of the carrier accelerator 69 accelerates the emitted electrons. The tenth electrode of the carrier accelerator 70 acts as the accelerating electrode. The accelerated electrons can acquire sufficient kinetic energy, overcome a repulsive force from negative charges accumulated in the electron absorption collector 26, and are finally absorbed by the electron absorption collector 26.

The electrons accelerated on the upper surface and the lower surface of the P-type semiconductor 10 can acquire sufficient kinetic energy, reach the edge points of the upper surface and the lower surface of the P-type semiconductor, and tend to repel each other at their edge points, whereby electrons are well emitted into a vacuum. The N-type semiconductor 11 is electrically connected to the positive voltage terminal of the energy accumulator 15. The electron absorption collector 26 is electrically connected to the negative voltage terminal of the energy accumulator 15. The positive holes are injected from the P-type semiconductor 10 and accumulated in the N-type semiconductor 11. The positive holes move to the positive voltage terminal of the energy accumulator 15 while the electrons accumulated in the electron absorption collector 26 move to the negative voltage terminal of the energy accumulator 15. The positive holes are accumulated in the positive electrode of the energy accumulator 15, while the electrons are accumulated in the negative electrode of the energy accumulator 15. Both carriers constitute the dipole being closely located each other. As a result, both attract each other in accordance with Coulomb's Inverse Square Law. One terminal of the electrical load 5 is electrically connected to the positive electrode of the energy accumulator 15 while the other terminal of the electrical load 5 is electrically connected to the negative electrode of the energy accumulator 15. Positive holes and electrons that are accumulated in the energy accumulator 15 recombine in the electrical load 5. As a result, electrical energy is efficiently supplied to the electrical load 5.

<Seventh Embodiment>

Figure 66:
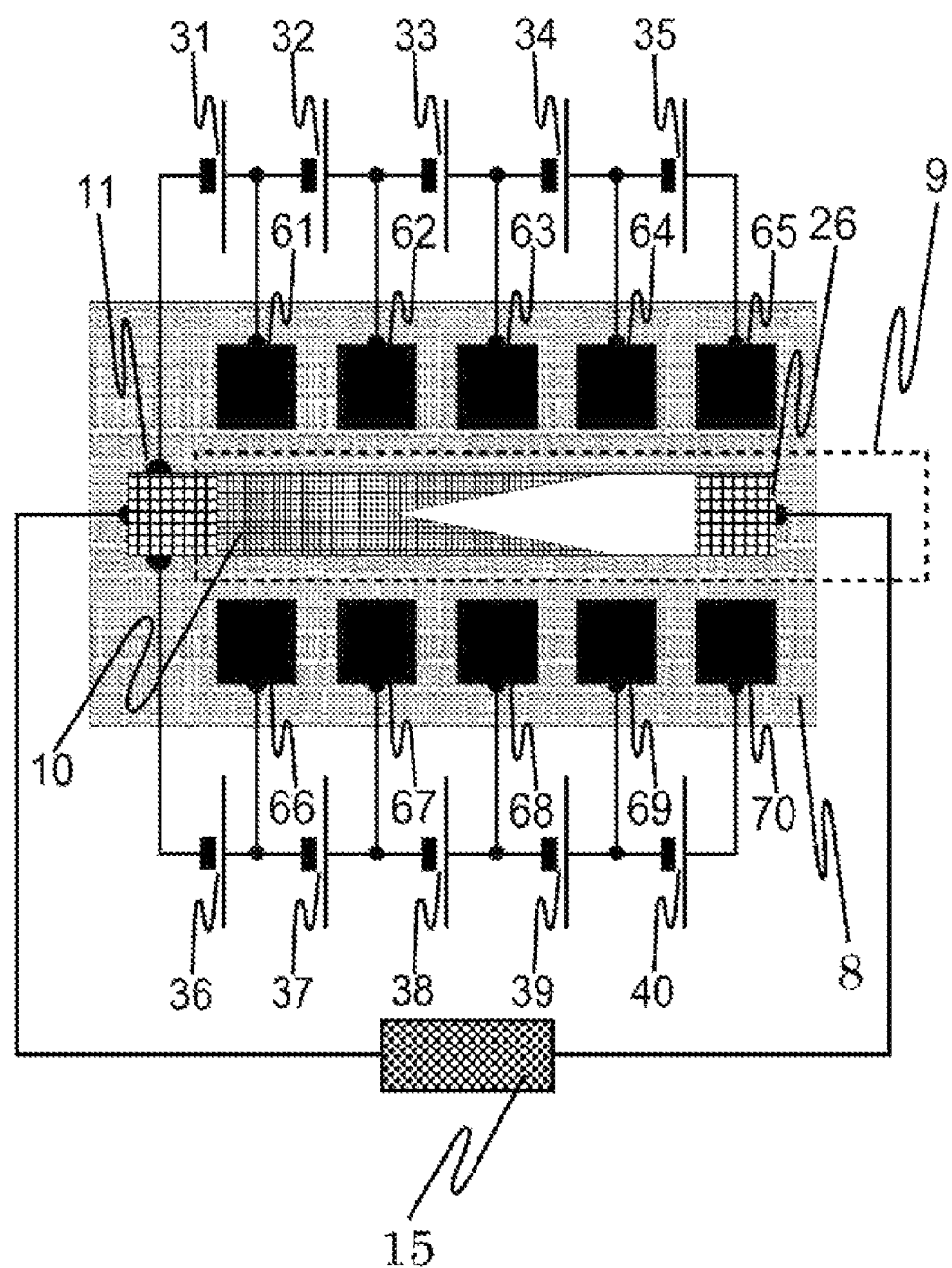
FIG. 66 is a cross-sectional view of an example in which the N-type semiconductor is used as the carrier output material and the P-type semiconductor is used as the channel forming material in the field effect power generation device according to the seventh embodiment of the present invention.

FIG. 66 is a cross-sectional view of an example in which the N-type semiconductor is used as the carrier output material 1 and the P-type semiconductor is used as the channel forming material in the field effect power generation device according to the seventh embodiment of the present invention. In the diagram, the P-type semiconductor 10 and the N-type semiconductor 11 fabricate P-N junction. The insulator 8 is disposed around the P-N junction. The first power source 31, the second power source 32, the third power source 33, the fourth power source 34, the fifth power source 35, the sixth power source 36, the seventh power source 37, the eighth power source 38, the ninth power source 39, and the tenth power source 40 are used for accelerating carriers. The first power source 31 is used for injecting carrier electrons from the N-type semiconductor 11 into the P-type semiconductor 10. The negative voltage terminal of the first power source 31 is electrically connected to the N-type semiconductor 11. The positive voltage terminal of the first power source 31 is electrically connected to the first electrode of the carrier accelerator 61. An electrical field is applied between the first electrode of the carrier accelerator 61 and the N-type semiconductor 11, and lines of electric force emanate from the first electrode of the carrier accelerator 61 to the N-type semiconductor 11. By applying this electrical field, electrons operating as majority carriers in the N-type semiconductor 11 are injected from the N-type semiconductor 11 into the P-type semiconductor 10. The first electrode of the carrier accelerator 61 acts as the injection electrode. The electrons injected into the P-type semiconductor 10 are attracted to the first electrode of the carrier accelerator 61 and reach directly under the first electrode of the carrier accelerator 61 to form an inversion layer in an upper surface of the P-type semiconductor 10. The inversion layer serves as the accelerating channel 9 in which carriers move. The negative voltage terminal of the second power source 32 is electrically connected to the first electrode of the carrier accelerator 61. The positive voltage terminal of the second power source 32 is electrically connected to the second electrode of the carrier accelerator 62. The electrons injected into the P-type semiconductor 10 are accelerated by applying an electrical field between the second electrode of the carrier accelerator 62 and the first electrode of the carrier accelerator 61. The negative voltage terminal of the third power source 33 is electrically connected to the second electrode of the carrier accelerator 62. The positive voltage terminal of the third power source 33 is electrically connected to the third electrode of the carrier accelerator 63. The electrons on the upper surface of the P-type semiconductor 10 are accelerated by applying an electrical field between the third electrode of the carrier accelerator 63 and the second electrode of the carrier accelerator 62, and the electrons move in the accelerating channel 9. The negative voltage terminal of the fourth power source 34 is electrically connected to the third electrode of the carrier accelerator 63. The positive voltage terminal of the fourth power source 34 is electrically connected to the fourth electrode of the carrier accelerator 64. The electrons in the accelerating channel 9 of the upper surface of the P-type semiconductor 10 are accelerated by applying an electrical field between the fourth electrode of the carrier accelerator 64 and the third electrode of the carrier accelerator 63. The second electrode of the carrier accelerator 62 and the third electrode of the carrier accelerator 63 act as the sliding electrodes. The electrons accelerated in the accelerating channel 9 existing on the upper surface of the P-type semiconductor 10 can acquire sufficient kinetic energy, reach the edge point of the upper surface of the P-type semiconductor, and are emitted in a space. The fourth electrode of the carrier accelerator 64 acts as the emission electrode. In the emission, electrons are well emitted because the P-type semiconductor has an oblique edge surface and the edge point of the upper surface has a small curvature radius.

The negative voltage terminal of the fifth power source 35 is electrically connected to the fourth electrode of the carrier accelerator 64. The positive voltage terminal of the fifth power source 35 is electrically connected to the fifth electrode of the carrier accelerator 65. The emitted electrons in the accelerating channel 9 are accelerated by applying electrical field between the fifth electrode of the carrier accelerator 65 and the fourth electrode of the carrier accelerator 64. The fifth electrode of the carrier accelerator 65 acts as the accelerating electrode. The accelerated electrons can acquire sufficient kinetic energy, overcome a repulsive force from negative charges accumulated in the electron absorption collector 26, and are finally absorbed by the electron absorption collector 26.

The negative voltage terminal of the sixth power source 36 is electrically connected to the N-type semiconductor 11. The positive voltage terminal of the sixth power source 36 is electrically connected to the sixth electrode of the carrier accelerator 66. By applying electrical field between the sixth electrode of the carrier accelerator 66 and the N-type semiconductor 11, lines of electric force emanate from the sixth electrode of the carrier accelerator 66 to the N-type semiconductor 11. Owing to the effect of applied electrical field, the electrons acting as majority carriers in the N-type semiconductor 11 are injected from the N-type semiconductor 11 to a lower surface of the P-type semiconductor 10. The sixth electrode of the carrier accelerator 66 acts as the injection electrode. The electrons injected into the lower surface of the P-type semiconductor 10 are attracted to the sixth electrode of the carrier accelerator 66 and reach directly under the sixth electrode of the carrier accelerator 66 to form an inversion layer in the lower surface of the P-type semiconductor 10. The inversion layer serves as the accelerating channel 9 in which electrons move. The negative voltage terminal of the seventh power source 37 is electrically connected to the sixth electrode of the carrier accelerator 66. The positive voltage terminal of the seventh power source 37 is electrically connected to the seventh electrode of the carrier accelerator 67. By applying electrical field between the seventh electrode of the carrier accelerator 67 and the sixth electrode of the carrier accelerator 66, the electrons injected into the lower surface of the P-type semiconductor 10 are accelerated in the accelerating channel 9. The negative voltage terminal of the eighth power source 38 is electrically connected to the seventh electrode of the carrier accelerator 67. The positive voltage terminal of the eighth power source 38 is electrically connected to the eighth electrode of the carrier accelerator 68. By applying electrical field between the eighth electrode of the carrier accelerator 68 and the seventh electrode of the carrier accelerator 67, the electrons are accelerated on the lower surface of the P-type semiconductor 10. The seventh electrode of the carrier accelerator 67 and the eighth electrode of the carrier accelerator 68 act as the sliding electrodes. The negative voltage terminal of the ninth power source 39 is electrically connected to the eighth electrode of the carrier accelerator 68. The positive voltage terminal of the ninth power source 39 is electrically connected to the ninth electrode of the carrier accelerator 69. By applying electrical field between the ninth electrode of the carrier accelerator 69 and the eighth electrode of the carrier accelerator 68, the electrons are accelerated on the lower surface of the P-type semiconductor 10. The electrons accelerated in the accelerating channel 9 existing on the lower surface of the P-type semiconductor 10 can acquire sufficient kinetic energy, reach the edge point of the lower surface of the P-type semiconductor, and can be emitted into a vacuum. The ninth electrode of the carrier accelerator 69 acts as the emission electrode. The electrons are efficiently emitted because the P-type semiconductor has an oblique edge surface and the edge point of the lower surface has a small curvature radius.

The negative voltage terminal of the tenth power source 40 is electrically connected to the ninth electrode of the carrier accelerator 69. The positive voltage terminal of the tenth power source 40 is electrically connected to the tenth electrode of the carrier accelerator 70. By applying electrical field between the tenth electrode of the carrier accelerator 70 and the ninth electrode of the carrier accelerator 69, the emitted electrons are accelerated in the accelerating channel 9. The tenth electrode of the carrier accelerator 70 acts as an accelerating electrode. The accelerated electrons can acquire sufficient kinetic energy, overcome a repulsive force from negative charges accumulated in the electron absorption collector 26, and are finally absorbed by the electron absorption collector 26.

The N-type semiconductor 11 is electrically connected to the positive voltage terminal of the energy accumulator 15. The electron absorption collector 26 is electrically connected to the negative voltage terminal of the energy accumulator 15. The positive holes that are injected from the P-type semiconductor 10 and accumulated in the N-type semiconductor 11 move to the positive voltage terminal of the energy accumulator 15, while the electrons accumulated in the electron absorption collector 26 move to the negative voltage terminal of the energy accumulator 15. The positive holes accumulated in the positive voltage terminal of the energy accumulator 15 and the electrons accumulated in the negative voltage terminal of the energy accumulator 15 are closely located each other. As a result, both attract each other in accordance with Coulomb's law. One terminal of the electrical load 5 is electrically connected to the positive voltage terminal of the energy accumulator 15 while the other terminal of the electrical load 5 is electrically connected to the negative voltage terminal of the energy accumulator 15. Positive holes and electrons that are accumulated in the energy accumulator 15 recombine in the electrical load 5. As a result, electrical energy is supplied to the electrical load 5.

<Eighth Embodiment>

Figure 67:
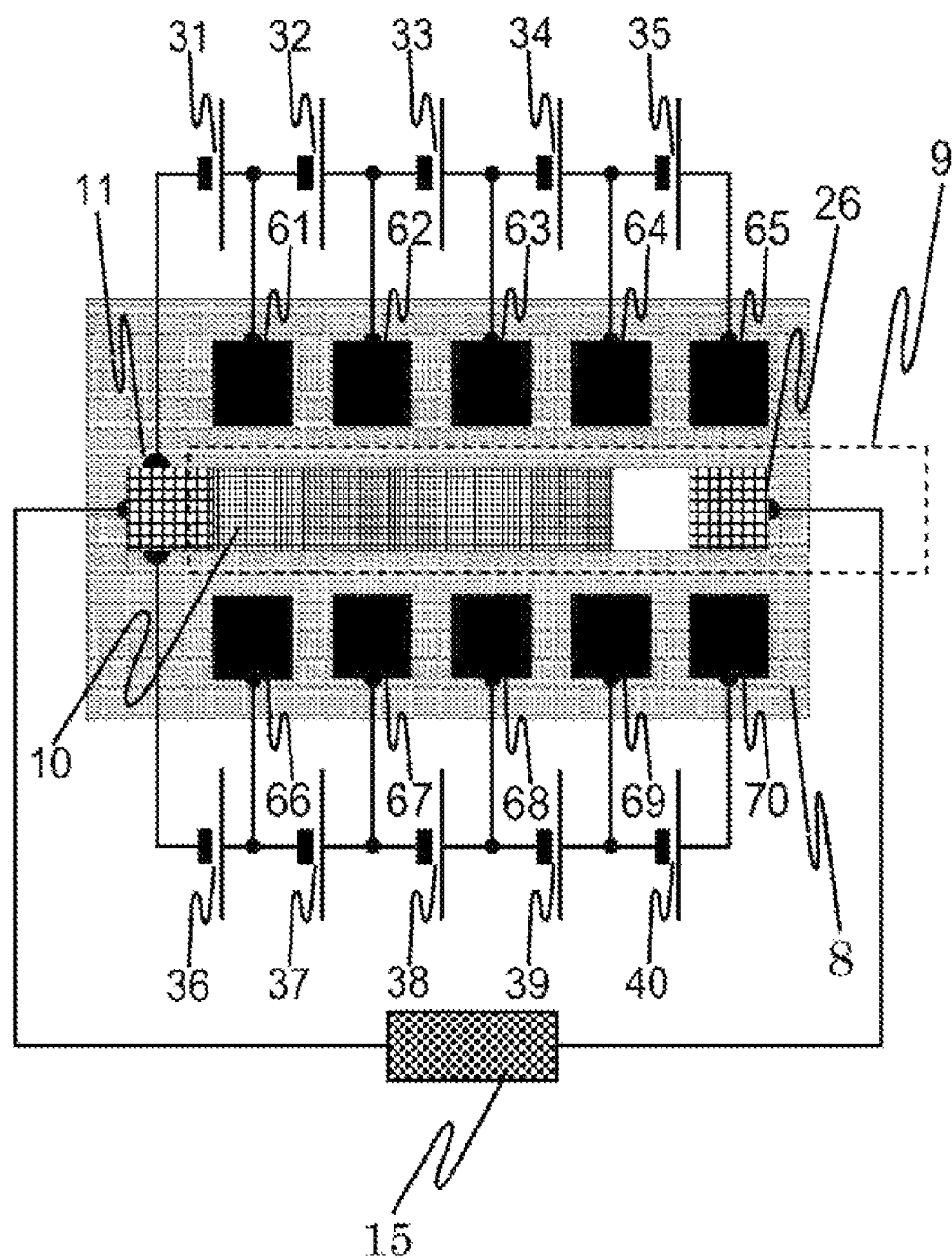
FIG. 67 is a cross-sectional view of an example in which the N-type semiconductor is used as the carrier output material and the P-type semiconductor is used as the channel forming material in the field effect power generation device according to the eighth embodiment of the present invention.

FIG. 67 is a cross-sectional view of an example in which the N-type semiconductor is used as the carrier output material 1 and the P-type semiconductor is used as the channel forming material in the field effect power generation device according to the eighth embodiment of the present invention. In the diagram, the P-type semiconductor 10 and the N-type semiconductor 11 fabricate P-N junction. The insulator 8 is disposed around the P-N junction. The first power source 31, the second power source 32, the third power source 33, the fourth power source 34, the fifth power source 35, the sixth power source 36, the seventh power source 37, the eighth power source 38, the ninth power source 39, and the tenth power source 40 are used for accelerating carriers. The first power source 31 and the sixth power source 36 are used for injecting carrier electrons from the N-type semiconductor 11 into the P-type semiconductor 10. The negative voltage terminal of the first power source 31 is electrically connected to the N-type semiconductor 11. The positive voltage terminal of the first power source 31 is electrically connected to the first electrode of the carrier accelerator 61. By applying electrical field between the first electrode of the carrier accelerator 61 and the N-type semiconductor 11, lines of electric force emanate from the first electrode of the carrier accelerator 61 to the N-type semiconductor 11. Owing to the applied electrical field, the electrons serving as majority carriers in the N-type semiconductor 11 are injected from the N-type semiconductor 11 into the P-type semiconductor 10. The first electrode of the carrier accelerator 61 acts as the injection electrode. The electrons injected into the P-type semiconductor 10 are attracted to the first electrode of the carrier accelerator 61 and reach directly under the first electrode of the carrier accelerator 61 to form an inversion layer in an upper surface of the P-type semiconductor 10. The inversion layer serves as the accelerating channel 9. The negative voltage terminal of the second power source 32 is electrically connected to the first electrode of the carrier accelerator 61. The positive voltage terminal of the second power source 32 is electrically connected to the second electrode of the carrier accelerator 62. By applying electrical field between the second electrode of the carrier accelerator 62 and the first electrode of the carrier accelerator 61 the electrons injected into the P-type semiconductor 10 are accelerated in the accelerating channel 9. The negative voltage terminal of the third power source 33 is electrically connected to the second electrode of the carrier accelerator 62. The positive voltage terminal of the third power source 33 is electrically connected to the third electrode of the carrier accelerator 63. By applying electrical field between the third electrode of the carrier accelerator 63 and the second electrode of the carrier accelerator 62, the electrons are accelerated on the upper surface of the P-type semiconductor 10. The second electrode of the carrier accelerator 62 and the third electrode of the carrier accelerator 63 behave as the sliding electrodes. The negative voltage terminal of the fourth power source 34 is electrically connected to the third electrode of the carrier accelerator 63. The positive voltage terminal of the fourth power source 34 is electrically connected to the fourth electrode of the carrier accelerator 64. By applying electrical field between the fourth electrode of the carrier accelerator 64 and the third electrode of the carrier accelerator 63, the injected electrons are accelerated on the upper surface of the P-type semiconductor 10. The electrons accelerated on the upper surface of the P-type semiconductor 10 can acquire sufficient kinetic energy, reach the edge point of the P-type semiconductor, and are emitted in a vacuum. The fourth electrode of the carrier accelerator 64 acts as the emission electrode. The negative voltage terminal of the fifth power source 35 is electrically connected to the fourth electrode of the carrier accelerator 64. The positive voltage terminal of the fifth power source 35 is electrically connected to the fifth electrode of the carrier accelerator 65. By applying electrical field between the fifth electrode of the carrier accelerator 65 and the fourth electrode of the carrier accelerator 64, the emitted electrons are accelerated in the accelerating channel 9. The fifth electrode of the carrier accelerator 65 acts as the accelerating electrode. The accelerated electrons can acquire sufficient kinetic energy, overcome a repulsive force from negative charges accumulated in the electron absorption collector 26, and are finally absorbed by the electron absorption collector 26.

The negative voltage terminal of the sixth power source 36 is electrically connected to the N-type semiconductor 11. The positive voltage terminal of the sixth power source 36 is electrically connected to the sixth electrode of the carrier accelerator 66. Owing to the applied electrical field between the sixth electrode of the carrier accelerator 66 and the N-type semiconductor 11, lines of electric force emanate from the sixth electrode of the carrier accelerator 66 to the N-type semiconductor 11. By applying electrical field, the electrons operating as majority carriers in the N-type semiconductor 11 are injected from the N-type semiconductor 11 into a lower surface of the P-type semiconductor 10. The sixth electrode of the carrier accelerator 66 acts as the injection electrode. The electrons injected into the lower surface of the P-type semiconductor 10 are attracted to the sixth electrode of the carrier accelerator 66 and reach directly under the sixth electrode of the carrier accelerator 66 to form an inversion layer in a lower surface of the P-type semiconductor 10. The inversion layer serves as the accelerating channel 9. The negative voltage terminal of the seventh power source 37 is electrically connected to the sixth electrode of the carrier accelerator 66. The positive voltage terminal of the seventh power source 37 is electrically connected to the seventh electrode of the carrier accelerator 67. By applying electrical field between the seventh electrode of the carrier accelerator 67 and the sixth electrode of the carrier accelerator 66, the electrons injected into the lower surface of the P-type semiconductor 10 are accelerated in the accelerating channel 9. The negative voltage terminal of the eighth power source 38 is electrically connected to the seventh electrode of the carrier accelerator 67. The positive voltage terminal of the eighth power source 38 is electrically connected to the eighth electrode of the carrier accelerator 68. By applying electrical field between the eighth electrode of the carrier accelerator 68 and the seventh electrode of the carrier accelerator 67, the electrons on the lower surface of the P-type semiconductor 10 are accelerated in the accelerating channel 9. The seventh electrode of the carrier accelerator 67 and the eighth electrode of the carrier accelerator 68 act as the accelerating electrodes. The negative voltage terminal of the ninth power source 39 is electrically connected to the eighth electrode of the carrier accelerator 68. The positive voltage terminal of the ninth power source 39 is electrically connected to the ninth electrode of the carrier accelerator 69. By applying electrical field between the ninth electrode of the carrier accelerator 69 and the eighth electrode of the carrier accelerator 68, the injected electrons are accelerated on the lower surface of the P-type semiconductor 10. The electrons accelerated on the lower surface of the P-type semiconductor 10 can acquire sufficient kinetic energy, reach the edge point of the P-type semiconductor, and are emitted in a vacuum. The ninth electrode of the carrier accelerator 69 acts as the emission electrode. The negative voltage terminal of the tenth power source 40 is electrically connected to the ninth electrode of the carrier accelerator 69. The positive voltage terminal of the tenth power source 40 is electrically connected to the tenth electrode of the carrier accelerator 70. By applying electrical field between the tenth electrode of the carrier accelerator 70 and the ninth electrode of the carrier accelerator 69, the emitted electrons are accelerated in the accelerating channel 9. The tenth electrode of the carrier accelerator 70 acts as the accelerating electrode. The accelerated electrons can acquire sufficient kinetic energy, overcome a repulsive force from negative charges accumulated in the electron absorption collector 26, and are finally absorbed by the electron absorption collector 26.

The N-type semiconductor 11 is electrically connected to the positive voltage terminal of the energy accumulator 15. The electron absorption collector 26 is electrically connected to the negative voltage terminal of the energy accumulator 15. The positive holes that are injected from the P-type semiconductor 10 and accumulated into the N-type semiconductor 11 move to the positive voltage terminal of the energy accumulator 15, while the electrons accumulated in the electron absorption collector 26 move to the negative voltage terminal of the energy accumulator 15. The positive holes accumulated in the positive electrode of the energy accumulator 15 and the electrons accumulated in the negative electrode of the energy accumulator 15 are closely located each other. As a result, both attract each other in accordance due to Coulomb's force. One terminal of the electrical load 5 is electrically connected to the positive voltage terminal of the energy accumulator 15 while the other terminal of the electrical load 5 is electrically connected to the negative voltage terminal of the energy accumulator 15. Positive holes and electrons that are accumulated in the energy accumulator 15 recombine in the electrical load 5. As a result, electrical energy is supplied to the electrical load 5.

<Ninth Embodiment>

Figure 68:
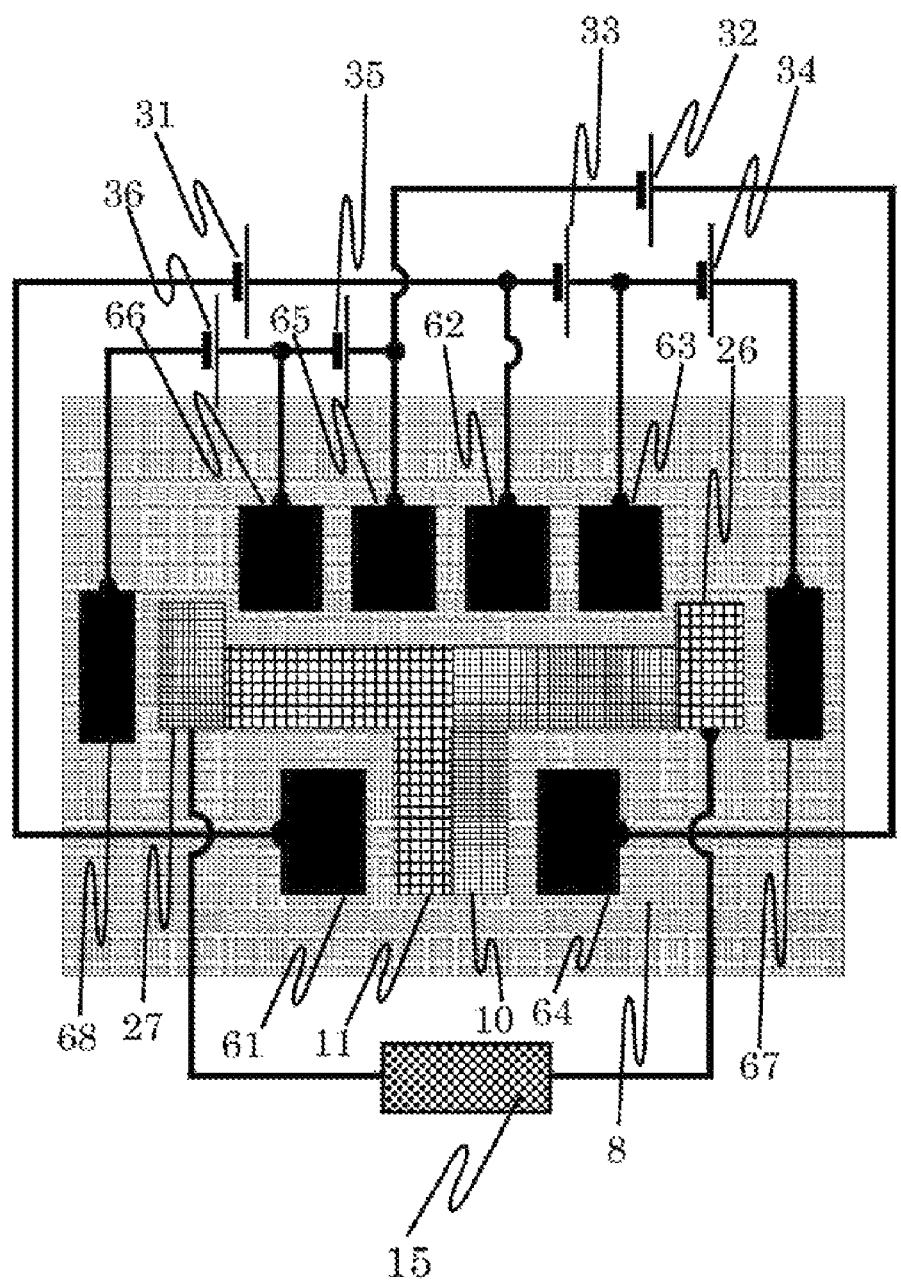
FIG. 68 is a cross-sectional view of an example in which both positive holes and electrodes are used as carriers and electrodes are insulated in the field effect power generation device according to the ninth embodiment of the present invention.

FIG. 68 shows a cross-sectional view of an example in which the N-type semiconductor 11 is used as the carrier output material 1 and the P-type semiconductor 10 is used as the channel forming material 2 and electrodes are insulated in the field effect power generation device according to the ninth embodiment of the present invention. A P-N junction is formed by using the P-type semiconductor 10 and the N-type semiconductor 11. The insulator 8 is disposed around the P-N junction. In order to accelerate the carriers, the six power sources 30 of the first power source 31, the second power source 32, the third power source 33, the fourth power source 34, the fifth power source 35 and the sixth power source 36 are used. The first power source 31 is used for injecting electrons serving as carriers into the P-type semiconductor 10 from the N-type semiconductor 11. In the insulator 8, three positive electrodes 41 of the carrier accelerator and three negative electrodes 42 of the carrier accelerator are disposed. The negative voltage terminal of the first power source 31 is electrically connected with the first electrode of the carrier accelerator 61. The positive voltage terminal of the first power source 31 is electrically connected with the second electrode of the carrier accelerator 62. An electrical field is applied between the second electrode of the carrier accelerator 62 and the first electrode of the carrier accelerator 61, and electrical lines of force emanate from the second electrode of the carrier accelerator 62 and terminate on the first electrode of the carrier accelerator 61. With this electrical field, electrons serving as majority carriers in the N-type semiconductor 11 are injected into the P-type semiconductor 10 from the N-type semiconductor 11. The second electrode of the carrier accelerator 62 acts as the injection electrode. The electrons injected into the P-type semiconductor 10 are attracted to the second electrode of the carrier accelerator 62 and reach directly under the second electrode of the carrier accelerator 62 to form an inversion layer in the surface of the P-type semiconductor 10. The inversion layer forms the accelerating channel 9. The negative voltage terminal of the third power source 33 is electrically connected with the second electrode of the carrier accelerator 62. The positive voltage terminal of the third power source 33 is electrically connected with the third electrode of the carrier accelerator 63. An electrical field applied between the third electrode of the carrier accelerator 63 and the second electrode of the carrier accelerator 62 accelerates the electrons injected into the P-type semiconductor 10 in the accelerating channel 9. The third electrode of the carrier accelerator 63 acts as the sliding electrode. The negative voltage terminal of the fourth power source 34 is electrically connected with the third electrode of the carrier accelerator 63. The positive voltage terminal of the fourth power source 34 is electrically connected with the seventh electrode of the carrier accelerator 67. An electrical field applied between the seventh electrode of the carrier accelerator 67 and the third electrode of the carrier accelerator 63 accelerates the electrons injected into the P-type semiconductor 10 in the accelerating channel 9. The electrons accelerated on the surface of the P-type semiconductor 10 have sufficient kinetic energy. The electrons, thus, penetrate and pass thorough a potential barrier of the irreversible process occurrence section 4 existing at the edge of the P-type semiconductor 10 with a quantum mechanical tunnel effect, and are lastly absorbed by the electron absorption collector 26. In other words, the seventh electrode of the carrier accelerator 67 acts as the tunneling electrode.

The positive voltage terminal of the second power source 32 is electrically connected with the fourth electrode of the carrier accelerator 64. The second power source 32 is used for injecting positive holes serving as carriers into the N-type semiconductor 11 serving as the channel forming material 2 from the P-type semiconductor 10 serving as the carrier output material 1. The negative voltage terminal of the second power source 32 is electrically connected with the fifth electrode of the carrier accelerator 65. An electrical field is applied between the fifth electrode of the carrier accelerator 65 and the fourth electrode of the carrier accelerator 64, and electrical lines of force emanate from the fourth electrode of the carrier accelerator 64 and terminate on the fifth electrode of the carrier accelerator 65. By applying the electrical field, positive holes serving as majority carriers in the P-type semiconductor 10 are injected into the N-type semiconductor 11 from the P-type semiconductor 10. The fifth electrode of the carrier accelerator 65 acts as the injection electrode. The positive holes injected into the N-type semiconductor 11 are attracted to the fifth electrode of the carrier accelerator 65 and reach directly under the fifth electrode of the carrier accelerator 65 to form an inversion layer in the surface of the N-type semiconductor 11. The inversion layer forms the accelerating channel 9. The positive voltage terminal of the fifth power source 35 is electrically connected with the fifth electrode of the carrier accelerator 65. The negative voltage terminal of the fifth power source 35 is electrically connected with the sixth electrode of the carrier accelerator 66. An electrical field applied between the sixth electrode of the carrier accelerator 66 and the fifth electrode of the carrier accelerator 65 accelerates in the accelerating channel 9 the positive holes injected into the N-type semiconductor 11. The positive voltage terminal of the sixth power source 36 is electrically connected with the fifth electrode of the carrier accelerator 65. The negative voltage terminal of the sixth power source 36 is electrically connected with the eighth electrode of the carrier accelerator 68. An electrical field applied between the sixth electrode of the carrier accelerator 66 and the eighth electrode of the carrier accelerator 68 accelerates the positive holes injected into the N-type semiconductor 11 in the accelerating channel 9. The sixth electrode of the carrier accelerator 66 acts as the sliding electrode. The positive holes accelerated in the accelerating channel on the surface of the N-type semiconductor 11 have sufficient kinetic energy. The positive holes, thus, penetrate and pass through a potential barrier of the irreversible process occurrence section 4 existing at the edge of the N-type semiconductor 11 with a quantum mechanical tunnel effect. The eighth electrode of the carrier accelerator 68 acts as the tunneling electrode. Positive holes serving as carriers are lastly absorbed by a positive hole absorption collector 27.

The positive hole absorption collector 27 is electrically connected with the positive voltage terminal of the energy accumulator 15. The electron absorption collector 26 is electrically connected with the negative voltage terminal of the energy accumulator 15. Positive holes accumulated in the positive hole absorption collector 27 move to the positive electrode of the energy accumulator 15 while electrons accumulated in the electron absorption collector 26 move to the negative electrode of the energy accumulator 15. The positive holes accumulated in the positive electrode of the energy accumulator 15 and the electrons accumulated in the negative electrode of the energy accumulator 15 are closely located each other. As a result, both attract each other in accordance with Coulomb's law. One terminal of the electrical load 5 is electrically connected with the positive electrode of the energy accumulator 15 while the other terminal of the electrical load 5 is electrically connected with the negative electrode of the energy accumulator 15. Positive holes and electrons that are accumulated in the energy accumulator 15 recombine in the electrical load 5. As a result, electrical energy is supplied to the electrical load 5.

Figure 69:
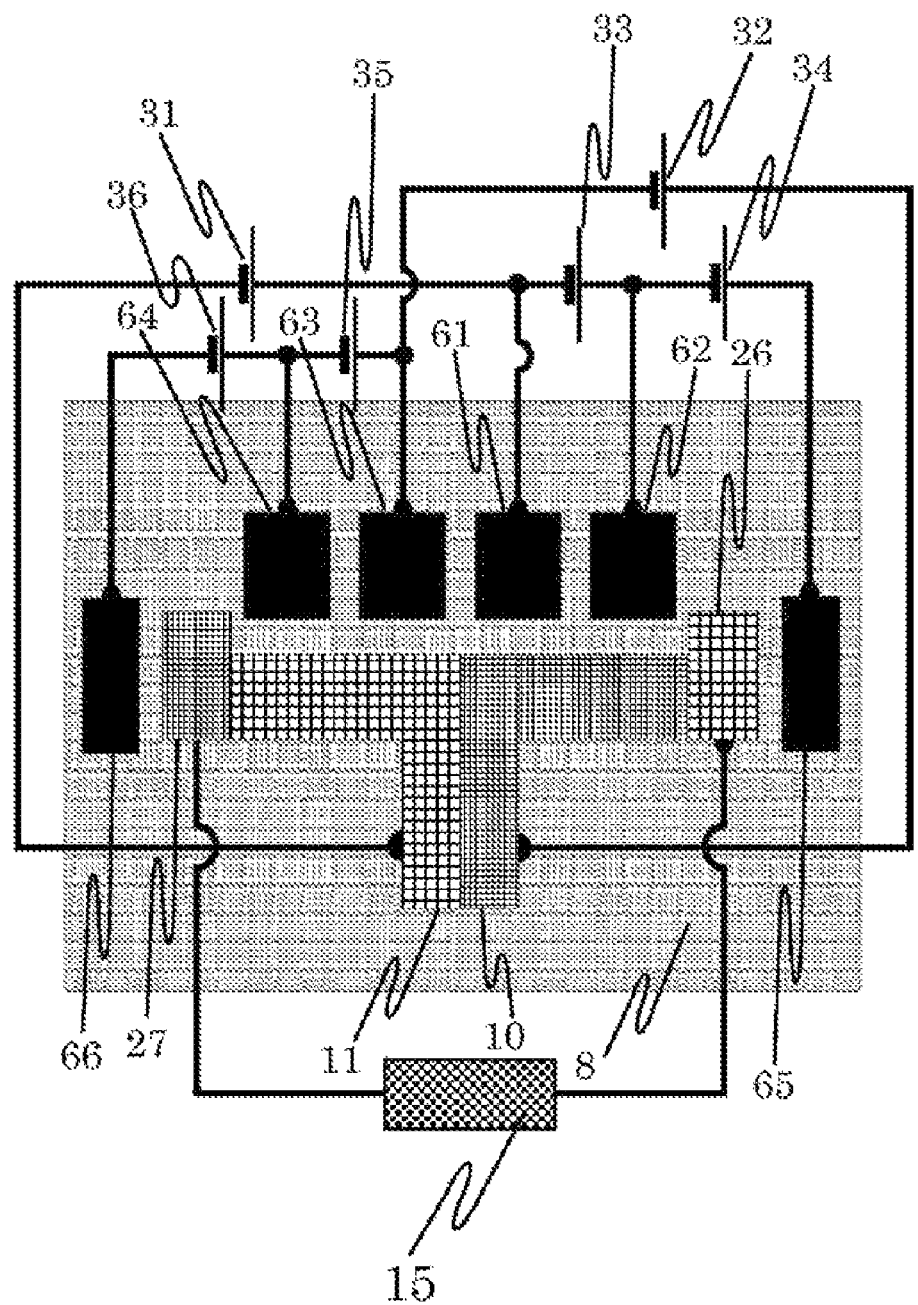
FIG. 69 is a cross-sectional view of an example in which positive holes and electrons are both used as carriers and electrodes are not insulated in the field effect power generation device according to the ninth embodiment of the present invention.

FIG. 69 shows a cross-sectional view of an example in which positive holes and electrons are both used as carriers, and electrodes are not insulated in the field effect power generation device according to the ninth embodiment of the present invention. A P-N junction is formed by using the P-type semiconductor 10 and the N-type semiconductor 11. The insulator 8 is disposed around the P-N junction. The first power source 31, the second power source 32, the third power source 33, the fourth power source 34, the fifth power source 35 and the sixth power source 36 are used for accelerating carries. The first power source 31 is used for injecting electrons serving as carriers into the P-type semiconductor 10 from the N-type semiconductor 11. The negative voltage terminal of the first power source 31 is electrically connected with the N-type semiconductor 11. The positive voltage terminal of the first power source 31 is electrically connected with the first electrode of the carrier accelerator 61. An electrical field is applied between the first electrode of the carrier accelerator 61 and the N-type semiconductor 11, and electric lines of force emanate from the first electrode of the carrier accelerator 61 and terminate on the N-type semiconductor 11. By applying the electrical field, electrons serving as majority carriers in the N-type semiconductor 11 are injected into the P-type semiconductor 10 from the N-type semiconductor 11. The first electrode of the carrier accelerator 61 acts as the injection electrode. The electrons injected into the P-type semiconductor 10 are attracted to the first electrode of the carrier accelerator 61 and reach directly under the first electrode of the carrier accelerator 61 to form an inversion layer in the surface of the P-type semiconductor 10. The inversion layer serves as the accelerating channel 9. The negative voltage terminal of the third power source 33 is electrically connected with the first electrode of the carrier accelerator 61. The positive voltage terminal of the third power source 33 is electrically connected with the second electrode of the carrier accelerator 62. An electrical field applied between the second electrode of the carrier accelerator 62 and the first electrode of the carrier accelerator 61 accelerates the electrons injected into the P-type semiconductor 10 in the accelerating channel 9. The second electrode of the carrier accelerator 62 acts as the sliding electrode. The negative voltage terminal of the fourth power source 34 is electrically connected with the second electrode of the carrier accelerator 62. The positive voltage terminal of the fourth power source 34 is electrically connected with the fifth electrode of the carrier accelerator 65. An electrical field applied between the fifth electrode of the carrier accelerator 65 and the second electrode of the carrier accelerator 62 accelerates the electrons injected into the P-type semiconductor 10 in the accelerating channel 9. The electrons accelerated in the accelerating channel 9 on the surface of the P-type semiconductor 10 have sufficient kinetic energy. The electrons, thus, penetrate and pass through a potential barrier of the irreversible process occurrence section 4 existing at the edge of the P-type semiconductor 10 with a quantum mechanical tunnel effect. The fifth electrode of the carrier accelerator 65 acts as the tunneling electrode. Electrons serving as carriers are lastly absorbed by the electron absorption collector 26.

The positive voltage terminal of the second power source 32 is electrically connected with the P-type semiconductor 10. The first power source 32 is used for injecting positive holes serving as carriers into the N-type semiconductor 11 from the P-type semiconductor 10. The negative voltage terminal of the second power source 32 is electrically connected with the third electrode of the carrier accelerator 63. An electrical field is applied between the third electrode of the carrier accelerator 63 and the P-type semiconductor 10, and electrical lines of force emanate from the P-type semiconductor 10 and terminate on the third electrode of the carrier accelerator 63. With this electrical field, positive holes serving as majority carriers in the P-type semiconductor 10 are injected into the N-type semiconductor 11 from the P-type semiconductor 10. The third electrode of the carrier accelerator 63 acts as the injection electrode. The positive holes injected into the N-type semiconductor 11 are attracted to the third electrode of the carrier accelerator 63 and reach directly under the third electrode of the carrier accelerator 63 to form an inversion layer in the surface of the N-type semiconductor 11. The inversion layer serves as the accelerating channel 9. The positive voltage terminal of the fifth power source 35 is electrically connected with the third electrode of the carrier accelerator 63. The negative voltage terminal of the fifth power source 35 is electrically connected with the fourth electrode of the carrier accelerator 64. An electrical field applied between the fourth electrode of the carrier accelerator 64 and the third electrode of the carrier accelerator 63 accelerates the positive holes injected into the N-type semiconductor 11 in the accelerating channel 9. The fourth electrode of the carrier accelerator 64 acts as the sliding electrode. The positive voltage terminal of the sixth power source 36 is electrically connected with the fourth electrode of the carrier accelerator 64. The negative voltage terminal of the sixth power source 36 is electrically connected with the sixth electrode of the carrier accelerator 66. An electrical field applied between the fourth electrode of the carrier accelerator 64 and the sixth electrode of the carrier accelerator 66 accelerates the positive holes injected into the N-type semiconductor 11 in the accelerating channel 9. The positive holes accelerated in the accelerating channel 9 on the surface of the N-type semiconductor 11 have sufficient kinetic energy. The positive holes, thus, penetrate and pass through a potential barrier of the irreversible process occurrence section 4 existing at the edge of the N-type semiconductor 11 with a quantum mechanical tunnel effect. The sixth electrode of the carrier accelerator 66 acts as the tunneling electrode. Positive holes serving as carriers are lastly absorbed by the positive hole absorption collector 27.

The positive hole absorption collector 27 is electrically connected with the positive voltage terminal of the energy accumulator 15. The electron absorption collector 26 is electrically connected with the negative voltage terminal of the energy accumulator 15. Positive holes accumulated in the positive hole absorption collector 27 move to the positive electrode of the energy accumulator 15 while electrons accumulated in the electron absorption collector 26 move to the negative electrode of the energy accumulator 15. The positive holes accumulated in the positive electrode of the energy accumulator 15 and the electrons accumulated in the negative electrode of the energy accumulator 15 are closely located each other. As a result, both attract each other in accordance with Coulomb's law. One terminal of the electrical load 5 is electrically connected with the positive electrode of the energy accumulator 15 while the other terminal of the electrical load 5 is electrically connected with the negative electrode of the energy accumulator 15. Positive holes and electrons that are accumulated in the energy accumulator 15 recombine in the electrical load 5. As a result, electrical energy is supplied to the electrical load 5.

Figure 70:
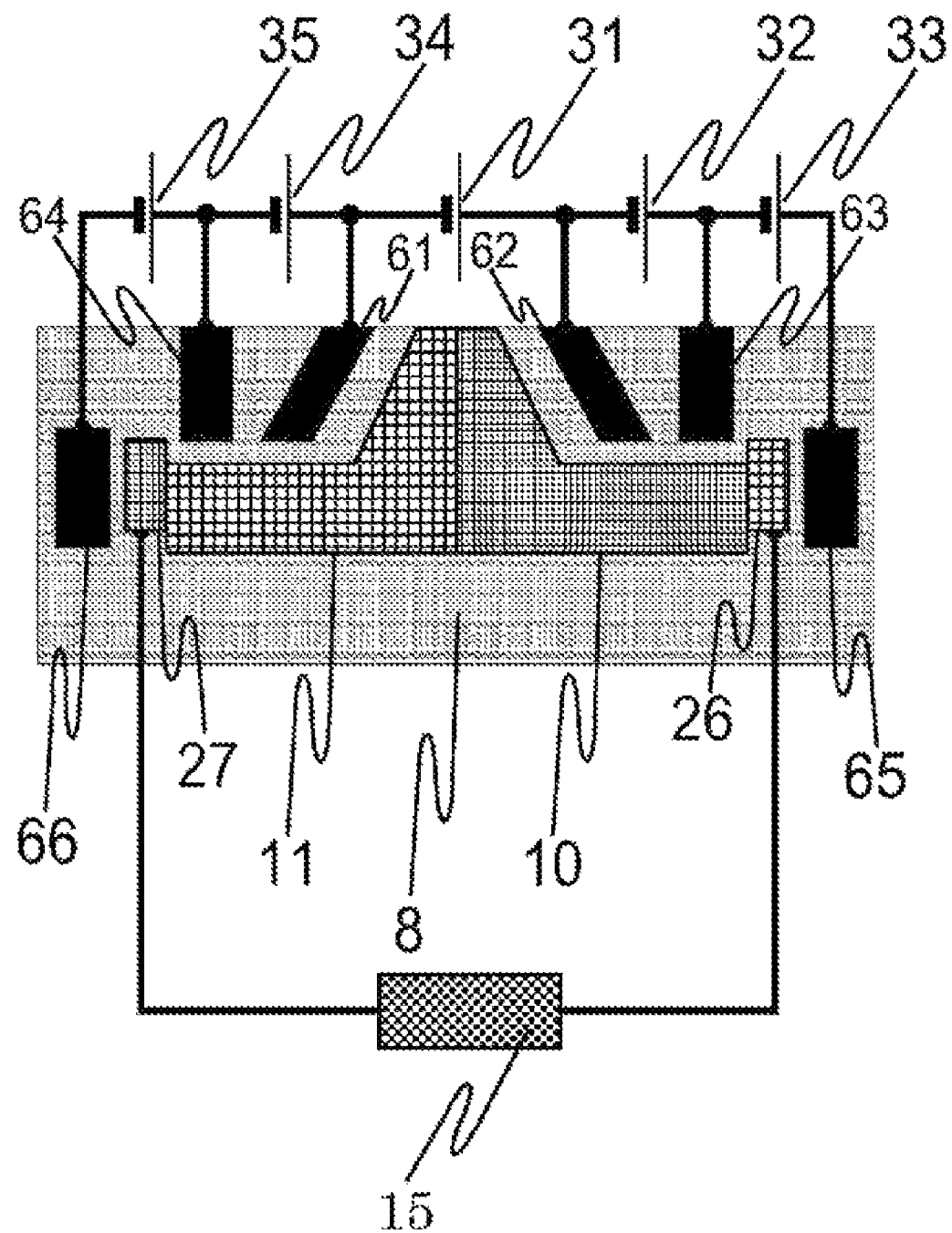
FIG. 70 is a cross-sectional view of an example in which positive holes and electrons are both used as carriers and a channel forming material has an oblique shaped section in the field effect power generation device according to the ninth embodiment of the present invention.

FIG. 70 shows a cross-sectional view of an example in which positive holes and electrons are both used as carriers, and a channel forming material has an oblique shaped section in the field effect power generation device according to the ninth embodiment of the present invention. The P-type semiconductor 10 is used as the carrier output material 1 while the N-type semiconductor 11 is used as the channel forming material 2. A P-N junction is formed by using the P-type semiconductor 10 and the N-type semiconductor 11. The insulator 8 is disposed around the P-N junction. For accelerating carriers, the five power sources 30 are used. As the five power sources 30, the first power source 31, the second power source 32, the third power source 33, the fourth power source 34, and the fifth power source 35 are used. The first power source 31 is used for injecting electrons serving as carriers into the P-type semiconductor 10 from the N-type semiconductor 11. In the insulator 8, three positive electrodes 41 of the carrier accelerator and three negative electrodes 42 of the carrier accelerator are disposed. The negative voltage terminal of the first power source 31 is electrically connected with the first electrode of the carrier accelerator 61. The positive voltage terminal of the first power source 31 is electrically connected with the second electrode of the carrier accelerator 62. An electrical field is applied between the second electrode of the carrier accelerator 62 and the first electrode of the carrier accelerator 61, and electrical lines of force emanate from the second electrode of the carrier accelerator 62 and terminate on the first electrode of the carrier accelerator 61. By applying the electrical field, electrons serving as majority carriers in the N-type semiconductor 11 are injected into the P-type semiconductor 10 from the N-type semiconductor 11. The second electrode of the carrier accelerator 62 acts as the injection electrode. The electrons injected into the P-type semiconductor 10 are attracted to the second electrode of the carrier accelerator 62 and reach directly under the second electrode of the carrier accelerator 62 to form an inversion layer in an oblique surface of the P-type semiconductor 10. The inversion layer serves as the accelerating channel 9.

The negative voltage terminal of the second power source 32 is electrically connected with the second electrode of the carrier accelerator 62. The positive voltage terminal of the second power source 32 is electrically connected with the third electrode of the carrier accelerator 63. An electrical field applied between the third electrode of the carrier accelerator 63 and the second electrode of the carrier accelerator 62 accelerates the electrons injected into the P-type semiconductor 10, and the accelerated electrons move on the surface of the P-type semiconductor. The third electrode of the carrier accelerator 63 acts as the sliding electrode. The negative voltage terminal of the third power source 33 is electrically connected with the third electrode of the carrier accelerator 63. The positive voltage terminal of the third power source 33 is electrically connected with the fifth electrode of the carrier accelerator 65. An electrical field applied between the fifth electrode of the carrier accelerator 65 and the third electrode of the carrier accelerator 63 accelerates the electrons injected into the P-type semiconductor 10 in the accelerating channel 9, and the accelerated electrons move in the accelerating channel 9 existing on the surface of the P-type semiconductor. The electrons accelerated in the accelerating channel 9 on the surface of the P-type semiconductor 10 have sufficient kinetic energy. The electrons, thus, penetrate and pass through a potential barrier of the irreversible process occurrence section 4 existing at the edge of the P-type semiconductor 10 with a quantum mechanical tunnel effect. The fifth electrode of the carrier accelerator 65 acts as the tunneling electrode. Electrons serving as carriers are lastly absorbed by the electron absorption collector 26.

The positive voltage terminal of the fourth power source 34 is electrically connected with the first electrode of the carrier accelerator 61. The negative voltage terminal of the fourth power source 34 is electrically connected with the fourth electrode of the carrier accelerator 64. The first power source 34 is used for injecting positive holes serving as carriers into the N-type semiconductor 11 from the P-type semiconductor 10. An electrical field is applied between the first electrode of the carrier accelerator 61 and the fourth electrode of the carrier accelerator 64, and electrical lines of force emanate from the first electrode of the carrier accelerator 61 and terminate to the fourth electrode of the carrier accelerator 64. By applying the electrical field, positive holes serving as majority carriers in the P-type semiconductor 10 are injected into the N-type semiconductor 11 from the P-type semiconductor 10. The first electrode of the carrier accelerator 61 acts as the injection electrode. The positive holes injected into the N-type semiconductor 11 are attracted to the fourth electrode of the carrier accelerator 64 and reach directly under the fourth electrode of the carrier accelerator 64 to form an inversion layer in an oblique surface of the N-type semiconductor 11. The inversion layer serves as the accelerating channel 9. The positive voltage terminal of the fifth power source 35 is electrically connected with the fourth electrode of the carrier accelerator 64. The negative voltage terminal of the fifth power source 35 is electrically connected with the sixth electrode of the carrier accelerator 66. An electrical field applied between the fourth electrode of the carrier accelerator 64 and the sixth electrode of the carrier accelerator 66 accelerates the positive holes injected into the N-type semiconductor 11 in the accelerating channel 9. The fourth electrode of the carrier accelerator 64 acts as the sliding electrode. The positive holes accelerated in the accelerating channel 9 on the surface of the N-type semiconductor 11 have sufficient kinetic energy. The positive holes, thus, penetrate and pass through a potential barrier of the irreversible process occurrence section 4 existing at the edge of the N-type semiconductor 11 with a quantum mechanical tunnel effect. The sixth electrode of the carrier accelerator 66 acts as the tunneling electrode. Positive holes serving as carriers are lastly absorbed by the positive hole absorption collector 27.

The positive hole absorption collector 27 is electrically connected with the positive voltage terminal of the energy accumulator 15. The electron absorption collector 26 is electrically connected with the negative voltage terminal of the energy accumulator 15. Positive holes accumulated in the positive hole absorption collector 27 move to the positive electrode of the energy accumulator 15 while electrons accumulated in the electron absorption collector 26 move to the negative electrode of the energy accumulator 15. The positive holes accumulated in the positive electrode of the energy accumulator 15 and the electrons accumulated in the negative electrode of the energy accumulator 15 are closely located each other. As a result, both attract each other in accordance with Coulomb's law. One terminal of the electrical load 5 is electrically connected with the positive electrode of the energy accumulator 15 while the other terminal of the electrical load 5 is electrically connected with the negative electrode of the energy accumulator 15. Positive holes and electrons that are accumulated in the energy accumulator 15 recombine in the electrical load 5. As a result, electrical energy is supplied to the electrical load 5.

Figure 71:
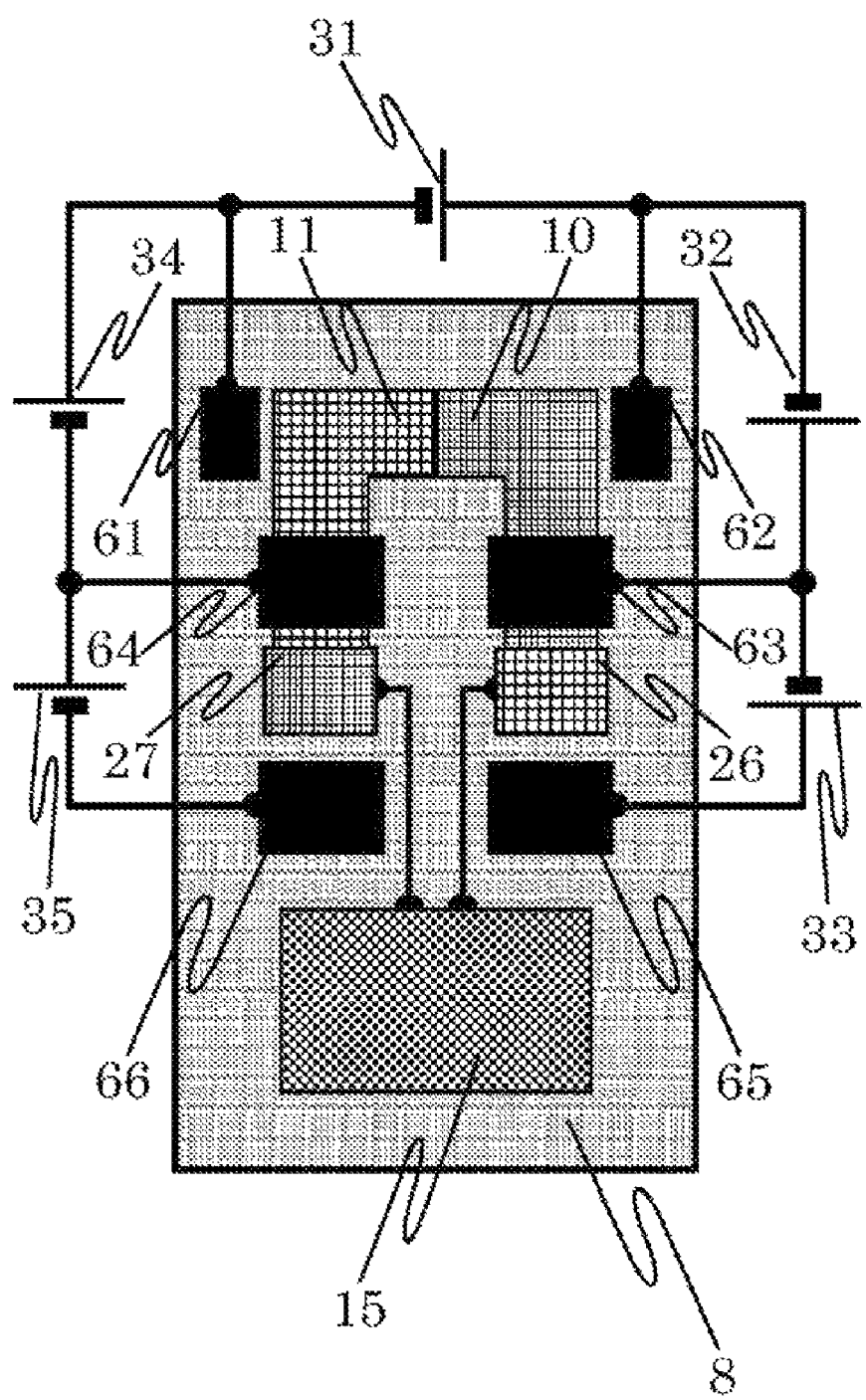
FIG. 71 is a top view of an example in which positive holes and electrons are both used as carriers in the field effect power generation device according to the ninth embodiment of the present invention.

FIG. 71 shows a top view of an example in which positive holes and electrons are both used as carriers in the field effect power generation device according to the ninth embodiment of the present invention. The P-type semiconductor 10 and the N-type semiconductor 11 form a P-N junction. The P-type semiconductor 10 and the N-type semiconductor 11 are both bent at a right angle. This structure can reduce the size of the field effect power generation device. The energy accumulator 15 can be also disposed close to the P-type semiconductor 10 and the N-type semiconductor. This arrangement can simplify the manufacturing of them. Electrons having reached the electron absorption collector 26 are accumulated in the negative electrode of the energy accumulator 15 while positive holes having reached the positive hole absorption collector 27 are accumulated in the positive electrode of the energy accumulator 15. Both attract each other by a Coulomb force to form dipoles. In other words, quantity of electricity accumulated in the energy accumulator 15 can be increased by injecting large numbers of carriers from the P-type semiconductor 10 and the N-type semiconductor 11. As a result, power generation efficiency can be increased.

<Tenth Embodiment>

Figure 72:
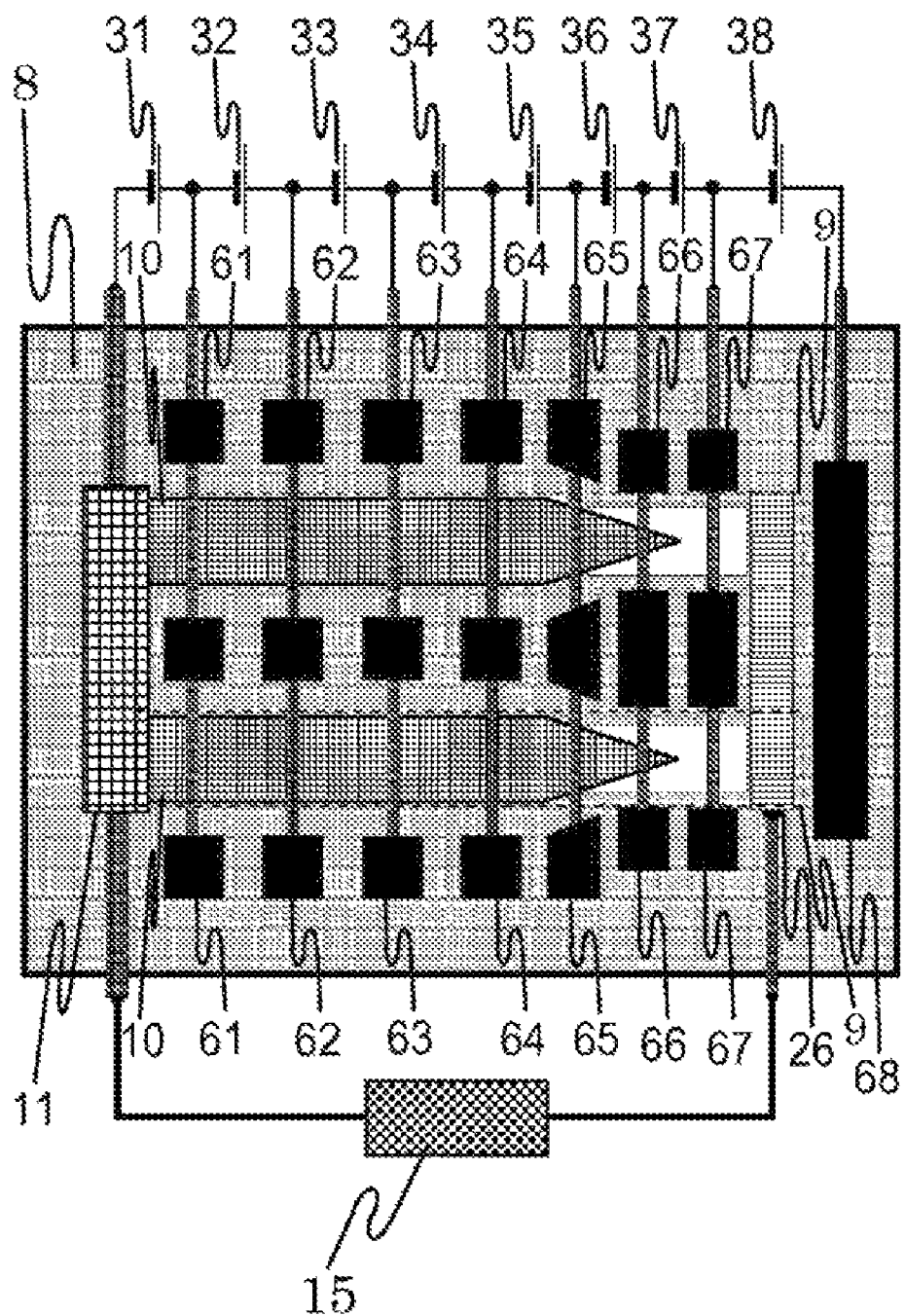
FIG. 72 is an upper-cross-sectional view of an example in which the N-type semiconductor is used as the carrier output material and two P-type semiconductors are used as the channel forming material provided in parallel in the field effect power generation device according to the tenth embodiment of the present invention.

FIG. 72 shows an upper-cross-sectional view of an example in which the N-type semiconductor is used as the carrier output material 1 and two P-type semiconductors are used as the channel forming materials provided in parallel in the field effect power generation device according to the tenth embodiment of the present invention. In the diagram, the P-type semiconductor 10 and the N-type semiconductor 11 form a P-N junction. The negative voltage terminal of the first power source 31 is electrically connected with the N-type semiconductor 11. The positive voltage terminal of the first power source 31 is electrically connected with the first electrode of the carrier accelerator 61. The first power source 31 is used for injecting electrons serving as carriers into the P-type semiconductor 10 from the N-type semiconductor 11. The negative voltage terminal of the second power source 32 is electrically connected with the first electrode of the carrier accelerator 61. The positive voltage terminal of the second power source 32 is electrically connected with the second electrode of the carrier accelerator 62. The negative voltage terminal of the third power source 33 is electrically connected with the second electrode of the carrier accelerator 62. The positive voltage terminal of the third power source 33 is electrically connected with the third electrode of the carrier accelerator 63. The negative voltage terminal of the fourth power source 34 is electrically connected with the third electrode of the carrier accelerator 63. The positive voltage terminal of the fourth power source 34 is electrically connected with the fourth electrode of the carrier accelerator 64. The negative voltage terminal of the fifth power source 35 is electrically connected with the fourth electrode of the carrier accelerator 64. The positive voltage terminal of the fifth power source 35 is electrically connected with the fifth electrode of the carrier accelerator 65. The negative voltage terminal of the sixth power source 36 is electrically connected with the fifth electrode of the carrier accelerator 65. The positive voltage terminal of the sixth power source 36 is electrically connected with the sixth electrode of the carrier accelerator 66. The negative voltage terminal of the seventh power source 37 is electrically connected with the sixth electrode of the carrier accelerator 66. The positive voltage terminal of the seventh power source 37 is electrically connected with the seventh electrode of the carrier accelerator 67. The negative voltage terminal of the eighth power source 38 is electrically connected with the seventh electrode of the carrier accelerator 67. The positive voltage terminal of the eighth power source 38 is electrically connected with the eighth electrode of the carrier accelerator 68.

An electrical field is applied between the first electrode of the carrier accelerator 61 and the N-type semiconductor 11. A positive potential is applied to the first electrode of the carrier accelerator 61 while a negative potential is applied to the N-type semiconductor 11. Electrons serving as carriers are injected into the P-type semiconductor 10 from the N-type semiconductor 11 by applying the electrical field. The first electrode of the carrier accelerator 61 acts as the injection electrode. The injection of electrons is performed in the accelerating channel 9 on the surface of the P-type semiconductor 10, the surface making contact with the insulator 8. The injected electrons are accelerated in the accelerating channel 9 by applying a positive voltage to the first electrode of the carrier accelerator 61, the second electrode of the carrier accelerator 62, the third electrode of the carrier accelerator 63, the fourth electrode of the carrier accelerator 64, the fifth electrode of the carrier accelerator 65, the sixth electrode of the carrier accelerator 66, the seventh electrode of the carrier accelerator 67, and the eighth electrode of the carrier accelerator 68, and are lastly absorbed by the electron absorption collector 26. The second electrode of the carrier accelerator 62, the third electrode of the carrier accelerator 63, the fourth electrode of the carrier accelerator 64, the fifth electrode of the carrier accelerator 65, and the sixth electrode of the carrier accelerator 66 act as the sliding electrodes for moving electrons in the accelerating channel. The seventh electrode of the carrier accelerator 67 is used as the emission electrode for emitting electrons from the P-type semiconductor 10. The electron absorption collector 26 is electrically connected with the negative voltage terminal of the energy accumulator 15. Electrons absorbed in the electron absorption collector 26 are accumulated in the negative electrode of the energy accumulator 15. Meanwhile, positive holes are injected into the N-type semiconductor 11 from the P-type semiconductor 10 by the applied electrical field. Since the N-type semiconductor is electrically connected with the positive voltage terminal of the energy accumulator 15, the positive holes injected into the N-type semiconductor 11 are accumulated in positive electrode of the energy accumulator 15. In the case where an electrical load is electrically connected with the energy accumulator 15 in parallel, positive charges and negative charges that are accumulated in the energy accumulator 15 move through the electrical load and recombine. As a result, electrical energy is supplied to the electrical load.

Two P-type semiconductors 10 are shown in FIG. 72 as an example, however, a large number of P-type semiconductors 10 are practically fabricated parallel and large numbers of electrons serving as carriers reach the electron absorption collector 26. As a result, generated electrical energy can be increased. While the three first electrodes of the carrier accelerator 61 are shown in the diagram, the first electrode of the carrier accelerator 61 is practically disposed around each P-type semiconductor 10. The first electrode of the carrier accelerator 61 singly accelerates carriers in the P-type semiconductors 11 located on the both sides of the first electrode of the carrier accelerator 61. Accordingly, the use of the field effect power generation device having this structure can efficiently generate electrical energy.

<Eleventh Embodiment>

Figure 73:
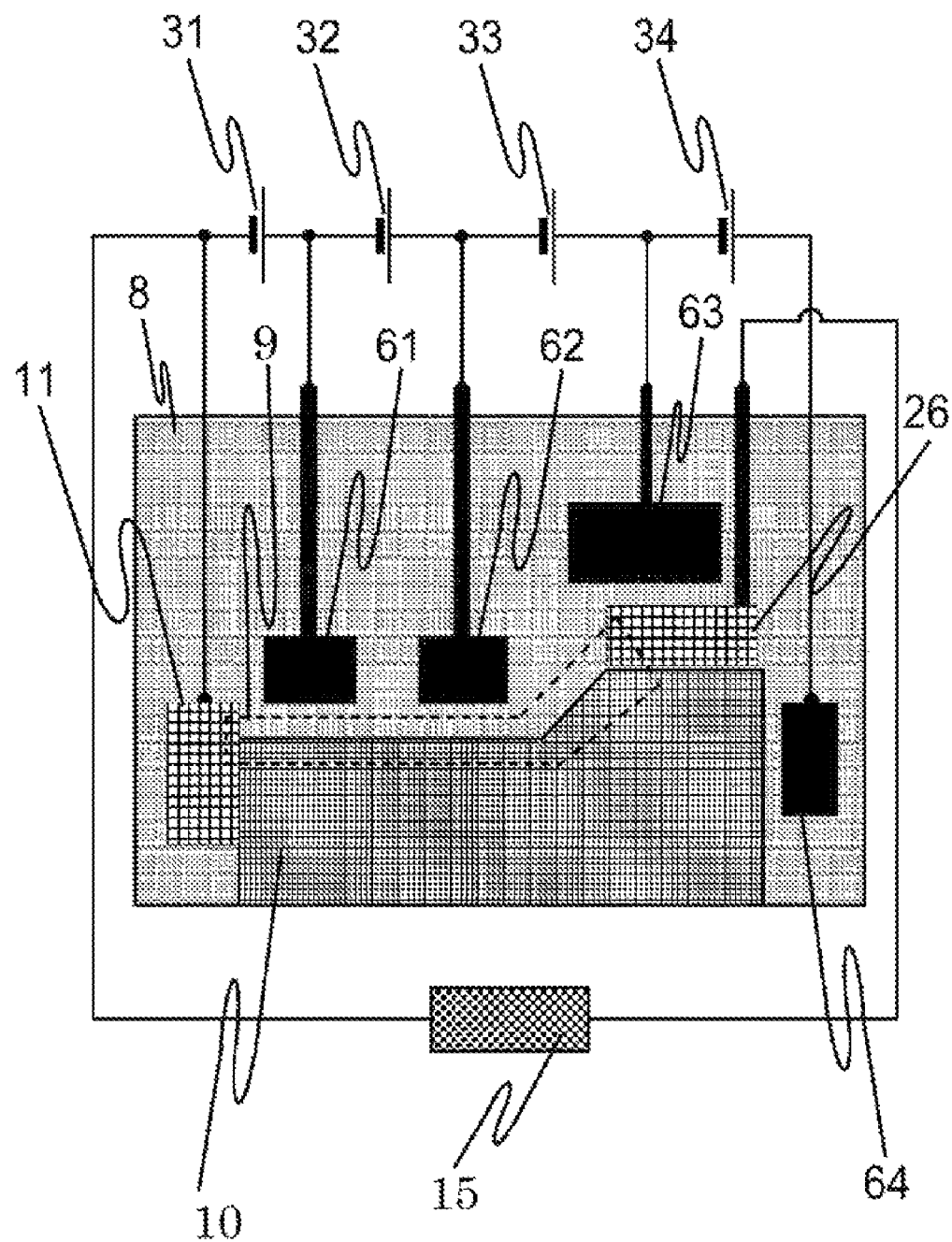
FIG. 73 is a cross-sectional view of an example in which the N-type semiconductor is used as the carrier output material and the P-type semiconductor is used as the channel forming material, and the channel forming material has an oblique shape section in the field effect power generation device according to the eleventh embodiment of the present invention.

FIG. 73 shows a cross-sectional view of an example in which the N-type semiconductor is used as the carrier output material 1 and the P-type semiconductor is used as the channel forming material and the channel forming material has an oblique shape section in the field effect power generation device according to the eleventh embodiment of the present invention. In the diagram, the P-type semiconductor 10 and the N-type semiconductor 11 form a P-N junction. The negative voltage terminal of the first power source 31 is electrically connected with the N-type semiconductor 11. The positive voltage terminal of the first power source 31 is electrically connected with the first electrode of the carrier accelerator 61. The first power source 31 is used for injecting electrons serving as carriers into the P-type semiconductor 10 from the N-type semiconductor 11. The negative voltage terminal of the second power source 32 is electrically connected with the first electrode of the carrier accelerator 61. The positive voltage terminal of the second power source 32 is electrically connected with the second electrode of the carrier accelerator 62. The negative voltage terminal of the third power source 33 is electrically connected with the second electrode of the carrier accelerator 62. The positive voltage terminal of the third power source 33 is electrically connected with the third electrode of the carrier accelerator 63. The negative voltage terminal of the fourth power source 34 is electrically connected with the third electrode of the carrier accelerator 63. The positive voltage terminal of the fourth power source 34 is electrically connected with the fourth electrode of the carrier accelerator 64.

An electrical field is applied between the first electrode of the carrier accelerator 61 and the N-type semiconductor 11. A positive potential is applied to the first electrode of the carrier accelerator 61 while a negative potential is applied to the N-type semiconductor 11. Electrons serving as carriers are injected into the P-type semiconductor 10 from the N-type semiconductor 11 by applying the electrical field. The first electrode of the carrier accelerator 61 acts as the injection electrode. The injection of electrons is performed on the surface of the P-type semiconductor 10, the surface making contact with the insulator 8. Electrons move in the accelerating channel 9. The injected electrons are accelerated by applying a positive voltage to the first electrode of the carrier accelerator 61, the second electrode of the carrier accelerator 62, and the fourth electrode of the carrier accelerator 64. The injected electrons move in the accelerating channel 9 existing in a boundary surface between the P-type semiconductor 10 and the insulator 8. The second electrode of the carrier accelerator 62 and the third electrode of the carrier accelerator 63 act as the sliding electrodes. The third electrode of the carrier accelerator 63 is disposed in an upper area in the diagram and the surface of the P-type semiconductor 10 has an oblique shape section facing the upper area. Accordingly, the injected electrons move in the accelerating channel 9 along the surface shape when moving the boundary surface between the P-type semiconductor 10 and insulator 8. The path of electrons moving is not in a straight-line manner due to the oblique surface of the P-type semiconductor 10. In other words, electrons serving as carriers move so as to approach positive charges of the fourth electrode of the carrier accelerator 64 in an initial state, and thereafter move in the direction of the third electrode of the carrier accelerator 63 due to the oblique surface of the P-type semiconductor 10. Electrons change the straight-line path, move in the accelerating channel 9, and are lastly absorbed by the electron absorption collector 26. Electrons serving as carriers penetrate and pass through a potential barrier of the irreversible process occurrence section 4 due to a quantum mechanical tunnel effect just before being absorbed by the electron collecting collector 26. Thus, the fourth electrode of the carrier accelerator 64 acts as the tunneling electrode. The electron absorption collector 26 is electrically connected with the energy accumulator 15. Electrons absorbed in the electron absorption collector 26 are accumulated in the negative electrode of the energy accumulator 15. Meanwhile, positive holes are injected into the N-type semiconductor 11 from the P-type semiconductor 10 due to an effect of the applied electrical field. Since the N-type semiconductor is electrically connected with the energy accumulator 15, the positive holes injected into the N-type semiconductor 11 are accumulated in the positive electrode of the energy accumulator 15. When the electrical load 5 is electrically connected in parallel with the energy accumulator 15, charges accumulated in the energy accumulator 15 move through the electrical load 5 and recombine in the electrical load 5. As a result, electrical energy is supplied to the electrical load 5, in which electrical energy is consumed.

<Twelfth Embodiment>

Figure 74:
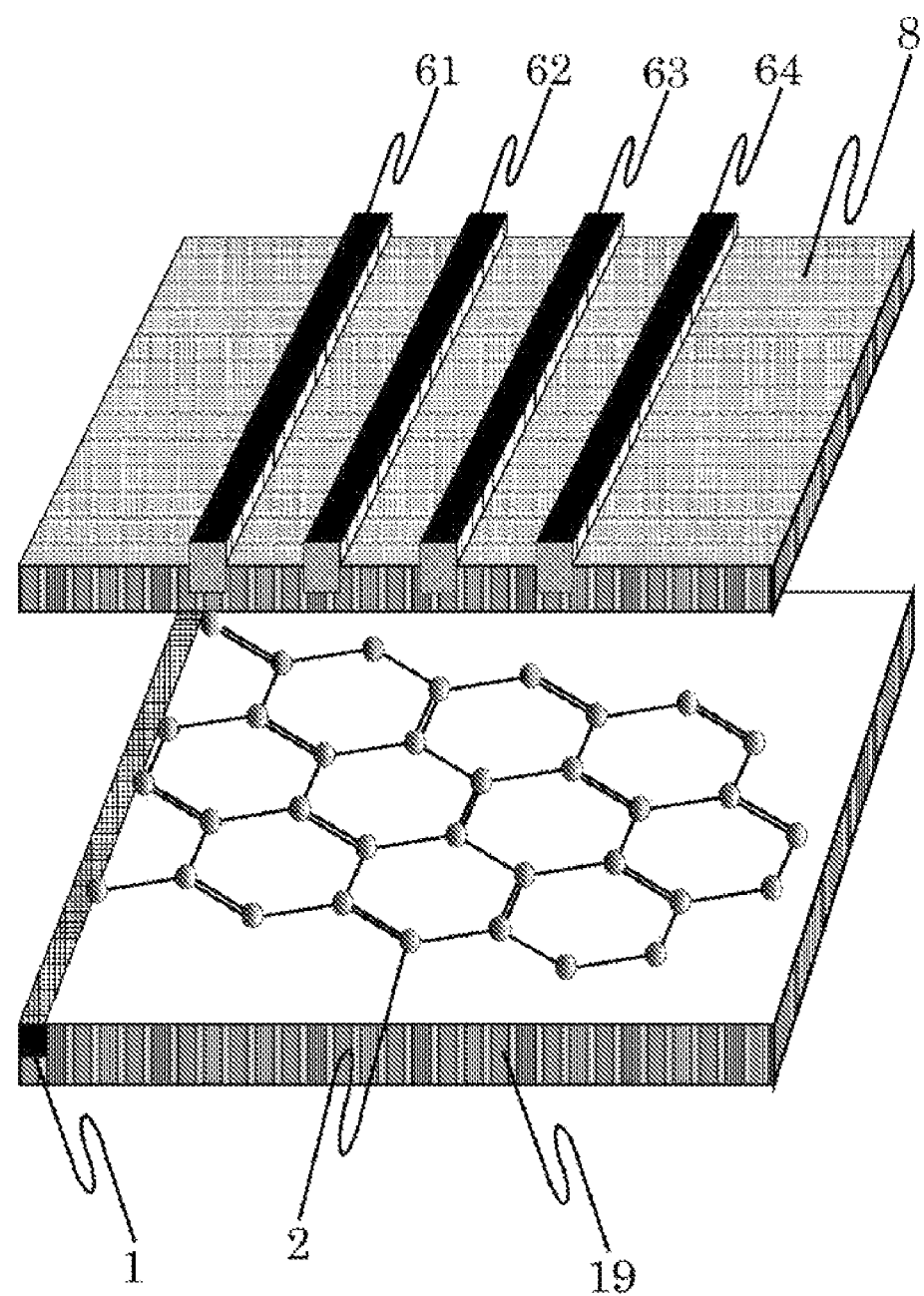
FIG. 74 is an external view when graphene is used as the channel forming material in the field effect power generation device according to the twelfth embodiment of the present invention.

FIG. 74 shows an external view when graphene is used as the channel forming material in the field effect power generation device according to the twelfth embodiment of the present invention. The carrier output material 1 and the channel forming material 2 are disposed on the substrate 19. The carrier output material 1 is a conductive material. Specific examples of the carrier output material 1 include titanium, nickel, copper, gold, and silver. The insulator 8 is disposed above the substrate. The first electrode of the carrier accelerator 61, the second electrode of the carrier accelerator 62, the third electrode of the carrier accelerator 63, and the fourth electrode of the carrier accelerator 64 are disposed in an upper portion of the insulator 8. FIG. 74 shows a case where graphene is used as the channel forming material 2. Carbon atoms chemically bonded with an sp2 hybrid orbital form a carbon hexagonal plane in which carbon atoms are two-dimensionally-bonded. A carbon atom assembly having this plane structure is called graphene. Graphene having such a structure that carbon atoms are arranged in a hexagonal mesh manner forms a single layer of graphite. Graphite is structured as a whole by a multiplicity of graphene layers. Graphene is composed of carbon six-member rings bonded in a plane fashion. Graphene has a thickness in molecular order and excellent electrical conductivity in its plane direction. In other words, graphene has extremely high electron mobility: 200,000 cm2/Vs. Electrons move from one carbon six-member ring to another carbon six-member ring in a plane fashion with almost no resistance.

Figure 75:
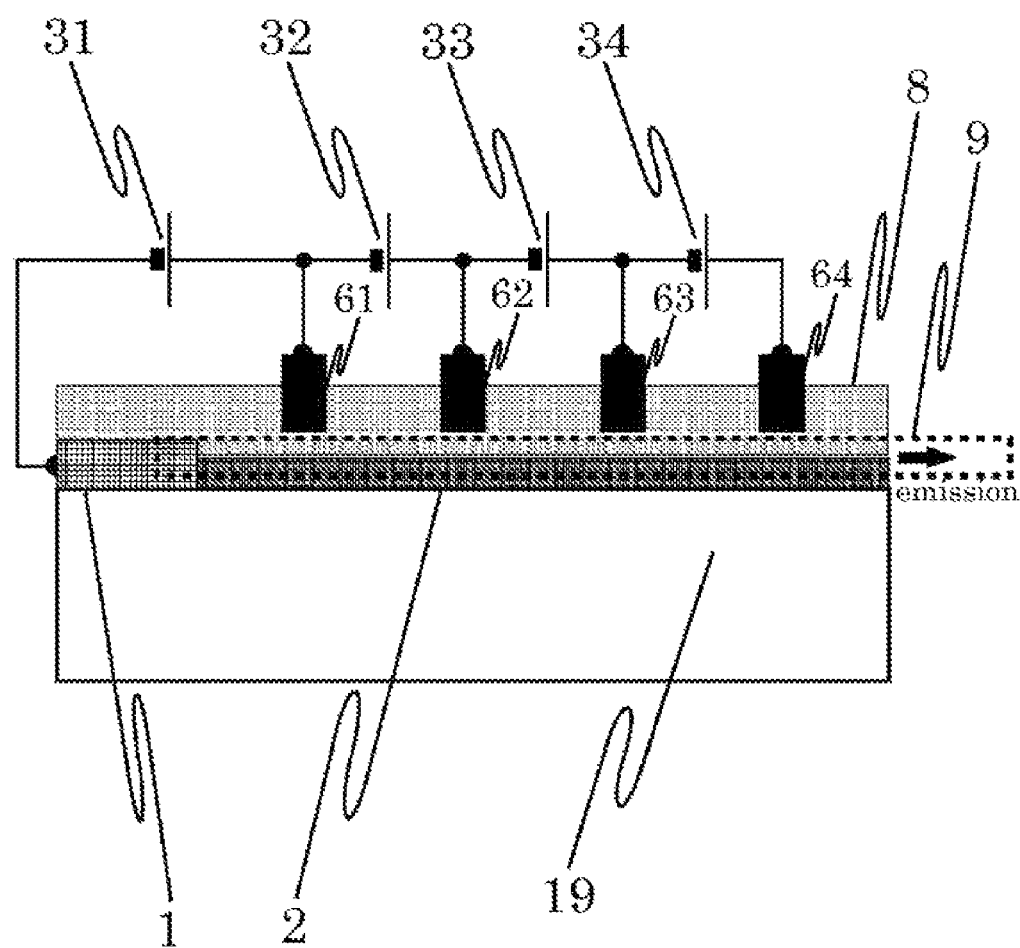
FIG. 75 is a cross-sectional view when graphene is used as the channel forming material in the field effect power generation device according to the twelfth embodiment of the present invention.

FIG. 75 shows a cross-sectional view when graphene is used as the channel forming material in the field effect power generation device according to the twelfth embodiment of the present invention. The carrier output material 1 and the channel forming material 2 are disposed on the substrate 19. The insulator 8 is disposed above the substrate. The first electrode of the carrier accelerator 61, the second electrode of the carrier accelerator 62, the third electrode of the carrier accelerator 63, and the fourth electrode of the carrier accelerator 64 are disposed in the upper portion of the insulator 8. The negative voltage terminal of the first power source 31 is electrically connected with the carrier output material 1. The positive voltage terminal of the first power source 31 is electrically connected with the first electrode of the carrier accelerator 61. The first power source 31 is used for injecting electrons serving as carriers into the channel forming material 2 from the carrier input-output material 1. The negative voltage terminal of the second power source 32 is electrically connected with the first electrode of the carrier accelerator 61. The positive voltage terminal of the second power source 32 is electrically connected with the second electrode of the carrier accelerator 62. The negative voltage terminal of the third power source 33 is electrically connected with the second electrode of the carrier accelerator 62. The positive voltage terminal of the third power source 33 is electrically connected with the third electrode of the carrier accelerator 63. The negative voltage terminal of the fourth power source 34 is electrically connected with the third electrode of the carrier accelerator 63. The positive voltage terminal of the fourth power source 34 is electrically connected with the fourth electrode of the carrier accelerator 64.

An electrical field is applied by a positive voltage applied to the first electrode of the carrier accelerator 61 from the first power source 31 and a negative voltage applied to the carrier output material 1 from the first power source 31. Due to the electrical field formed in the direction from the first electrode of the carrier accelerator 61 to the carrier output material 1, electrons serving as carriers are injected into the channel forming material 2 of graphene from the carrier output material 1. The first electrode of the carrier accelerator 61 acts as the injection electrode. The injected electrons are accelerated in the accelerating channel 9 by a positive voltage applied to the first electrode of the carrier accelerator 61, the second electrode of the carrier accelerator 62, the third electrode of the carrier accelerator 63 and the fourth electrode of the carrier accelerator 64. The second electrode of the carrier accelerator 62, the third electrode of the carrier accelerator 63 and the fourth electrode of the carrier accelerator 64 act as the sliding electrodes by which electrons are accelerated and move on the surface of graphene.

Figure 76:
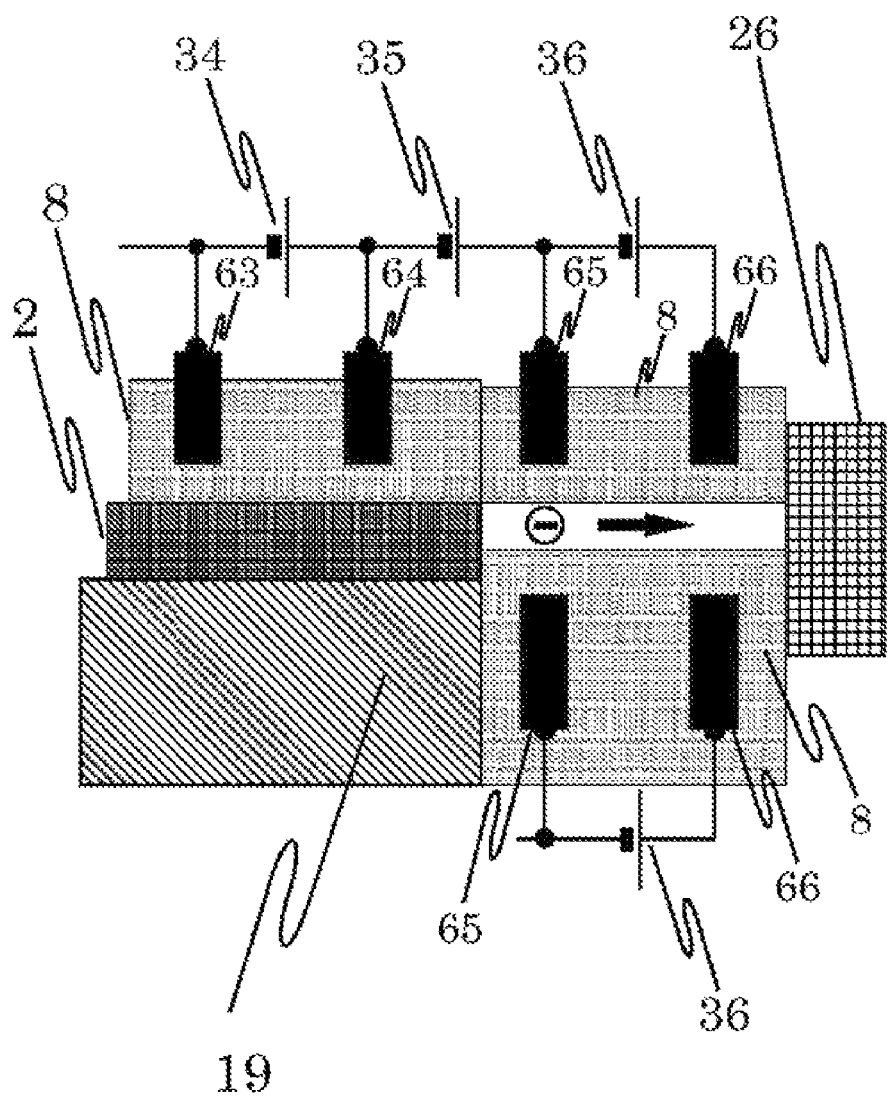
FIG. 76 is an enlarged cross-sectional view of an area near an electron absorption collector when graphene is used as the channel forming material in the field effect power generation device according to the twelfth embodiment of the present invention.

FIG. 76 shows an enlarged cross-sectional view of an area near an electron absorption collector when graphene is used as the channel forming material in the field effect power generation device according to the twelfth embodiment of the present invention. The negative voltage terminal of the fifth power source 35 is electrically connected with the fourth electrode of the carrier accelerator 64. The positive voltage terminal of the fifth power source 35 is electrically connected with the fifth electrode of the carrier accelerator 65. The negative voltage terminal of the sixth power source 36 is electrically connected with the fifth electrode of the carrier accelerator 65. The positive voltage terminal of the sixth power source 36 is electrically connected with the sixth electrode of the carrier accelerator 66. The lower portions of the fifth electrode of the carrier accelerator 65 and the sixth electrode of the carrier accelerator 66 are buried in the insulator 8 and electrically connected with the sixth power source 36. Electrons move on the surface of the channel forming material 2 of graphene at high speed and acquire sufficiently large kinetic energy. High-speed electrons break away from the surface of the channel forming material 2 to be emitted into a vacuum. The fifth electrode of the carrier accelerator 65 acts as the emission electrode. In the emission, electrons penetrate the irreversible process occurrence section 4 serving as a potential barrier due to a quantum mechanical tunnel effect. The emitted electrons are accelerated by a positive voltage applied to the sixth electrode of the carrier accelerator 66. In other words, the sixth electrode of the carrier accelerator 66 acts as the accelerating electrode. Since flying electrons are accelerated, the flying electrons have sufficiently large kinetic energy. The flying electrons overcome a repulsive force received from the electron absorption collector 26 in accordance with Coulomb's law, collide with the electron absorption collector 26, and are collected by the electron absorption collector 26. Since the electron absorption collector 26 is electrically connected with one terminal of the energy accumulator 15, the electrons having reached the electron absorption collector 26 reach the one terminal of the energy accumulator 15. Positive holes remaining in the carrier output material 1 reach the other terminal of the energy accumulator 15. In the energy accumulator 15, positive holes and electrons form pairs and are accumulated. When one terminal of the electrical load 5 is electrically connected with the one terminal of the energy accumulator 15 while the other terminal of the electrical load 5 is electrically connected with the other terminal of the energy accumulator 15, positive holes and electrons that are accumulated in the energy accumulator 15 reach the electrical load 5, recombine therein, and both disappear. In the process, electrical energy is supplied to the electrical load 5.

Figure 77:
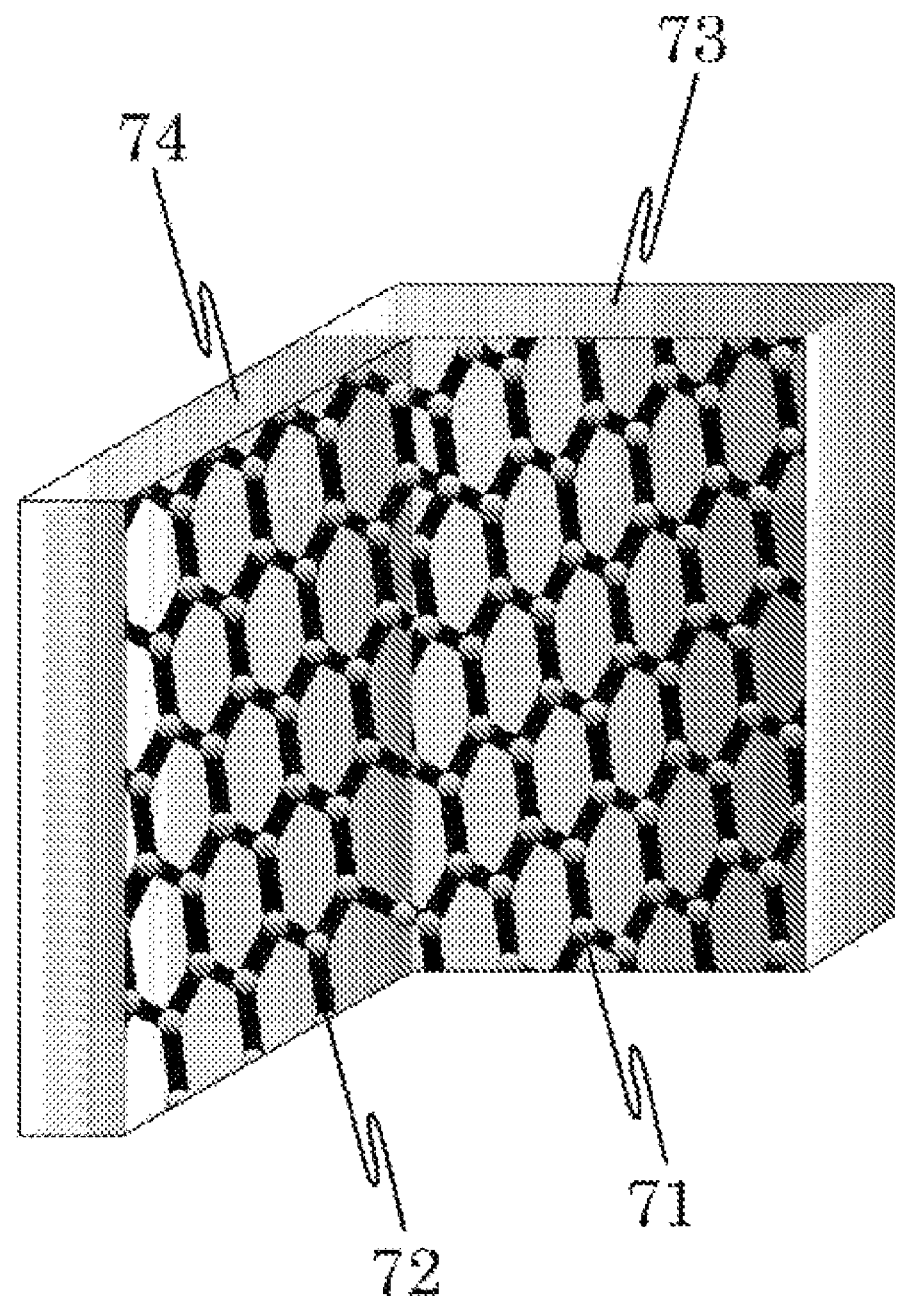
FIG. 77 shows an arrangement of carrier absorption graphene and carrier emission graphene in the field effect power generation device according to the twelfth embodiment of the present invention.

Graphene is a good electrical conductor and a material having high thermal conductivity. An example of field effect electron power generation employing a thermal feedback system utilizing these characteristics of graphene is described below. FIG. 77 shows an arrangement of carrier absorption graphene and carrier emission graphene in the field effect power generation device according to the twelfth embodiment of the present invention. In the diagram, a carrier absorption graphene 71 and a carrier emission graphene 72 are well thermally coupled. In other words, the carrier absorption graphene 71 is a very thin and well conducts heat on its surface in a two-dimensional fashion, whereby heat is well conducted to the carrier emission graphene 72. The carrier absorption graphene 71 and the carrier emission graphene 72 are preferably unified so as to form a substantially right-angled bent structure. A carrier absorption substrate 73 and a carrier emission substrate 74 are disposed so as to make a substantially right angle with each other. The carrier absorption substrate 73 serves as a substrate for supporting the carrier absorption graphene 71 while the carrier emission substrate 74 serves as a substrate for supporting the carrier emission graphene 72. The carrier absorption substrate 73 and the carrier emission substrate 74 are both preferably bad thermal conductors. In other words, power generation efficiency increases if heat is conducted in graphene in a two-dimensional fashion and less thermal energy is emitted externally through the carrier absorption substrate 73 and the carrier emission substrate 74. Accordingly, graphite can achieve excellent power generation efficiency because graphite is composed of layered carbon graphene films and has small thermal conductivity between the layers, whereby heat is blocked between layers.

Figure 78:
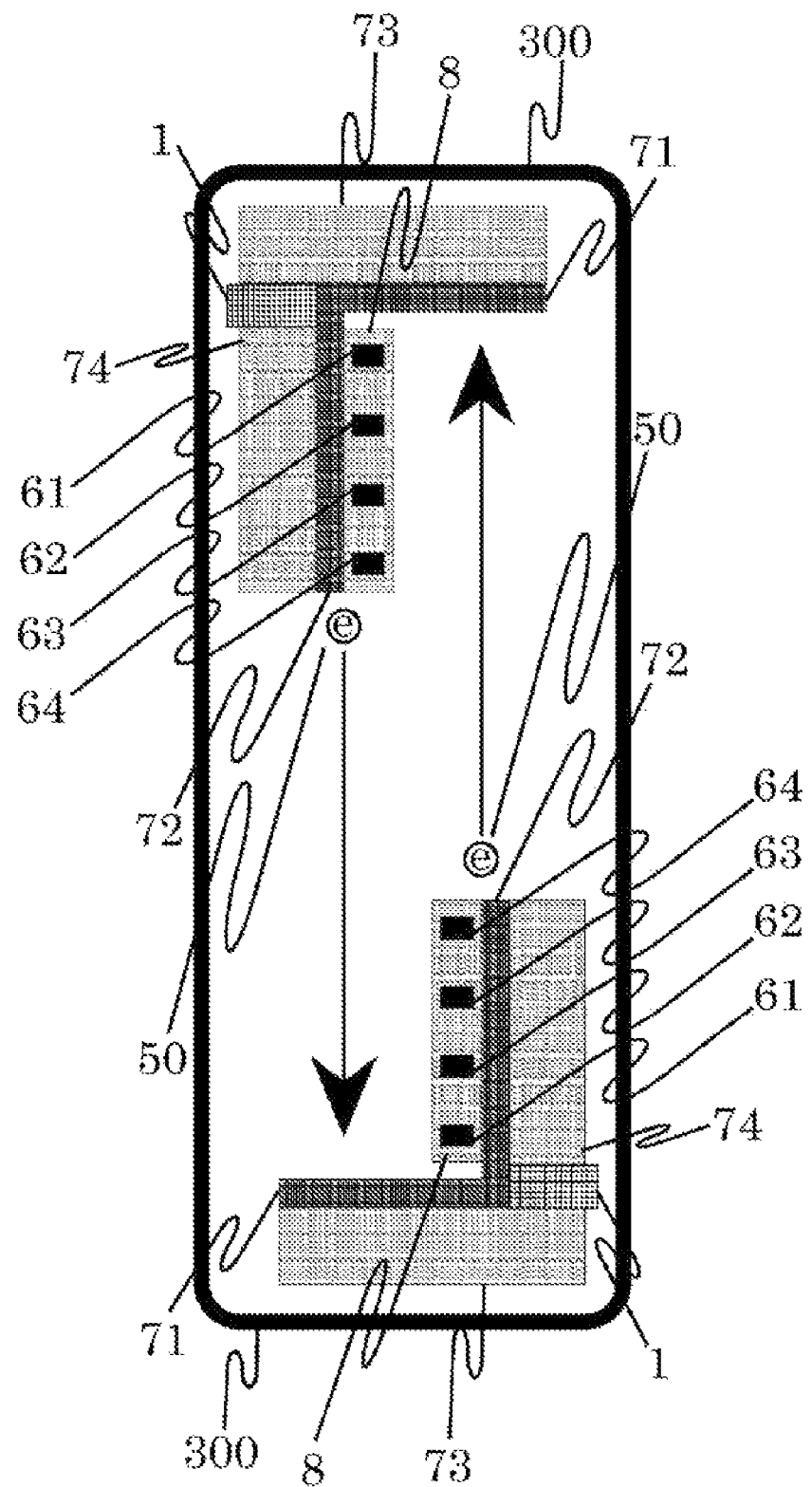
FIG. 78 is a cross-sectional view when carrier absorption graphene and carrier emission graphene are used and the thermal feedback system is employed in the field effect power generation device according to the twelfth embodiment of the present invention.

The body having such a structure that is shown in FIG. 77 is called an emitter-collector complex. Two emitter-collector complexes are disposed so as to be point symmetry. FIG. 78 shows a cross-sectional view when carrier absorption graphene and carrier emission graphene are used and the thermal feedback system is employed in the field effect power generation device according to the twelfth embodiment of the present invention. The carrier emission substrate 74 shown in the lower area of the diagram is a bad thermal conductor and has the carrier emission graphene 72 on one surface thereof. The insulator 8 is disposed on the surface of the carrier emission graphene 72. The first electrode of the carrier accelerator 61, the second electrode of the carrier accelerator 62, the third electrode of the carrier accelerator 63 and the fourth electrode of the carrier accelerator 64 are disposed in the insulator 8. In FIG. 78, the first power source 31, the second power source 32, the third power source 33, the fourth power source 34, the fifth power source 35 and the sixth power source 36 shown in FIG. 75 and FIG. 76 are omitted. In addition, in FIG. 78, the fifth electrode of the carrier accelerator 65 and the sixth electrode of the carrier accelerator 66 shown in FIG. 76 are also omitted. A positive voltage is applied to the first electrode of the carrier accelerator 61 shown in the lower area of FIG. 78 from the first power source 31 while a negative voltage is applied to the carrier output material 1 from the first power source 31. As a result, an electrical field is applied in the direction from the first electrode of the carrier accelerator 61 to the carrier output material 1. Due to the applied electrical field, electrons serving as carriers are injected into the carrier emission graphene 72 (corresponding to the channel forming material 2) from the carrier output material 1. The first electrode of the carrier accelerator 61 of the carrier accelerator acts as the injection electrode. The injected electrons are accelerated by the second electrode of the carrier accelerator 62, the third electrode of the carrier accelerator 63 and the fourth electrode of the carrier accelerator 64, and are emitted into a vacuum. The second electrode of the carrier accelerator 62, the third electrode of the carrier accelerator 63, and the fourth electrode of the carrier accelerator 64 act as the sliding electrodes. The emitted electrons 50 move in an upward direction. The emitted electrons 50 collide with the carrier absorption graphene 71 disposed in the upper area of the diagram, and are absorbed by the carrier absorption graphene 71. In the collision, kinetic energy of the electrons 50 is converted into thermal energy. As a result, the temperature of the carrier absorption graphene 71 increases. Thermal energy of the carrier absorption graphene 71 is conducted to the carrier emission graphene 72 shown in the upper area of the diagram, and the temperature of the carrier emission graphene 72 increases to a high temperature. The carrier absorption substrate 73 and the carrier absorption substrate 74 shown in the upper area of the diagram are both bad thermal conductors, and less thermal energy is externally emitted from the substrates. The electrons 50 absorbed in the carrier absorption graphene 71 shown in the upper area of the diagram move to the energy accumulator 15 and are accumulated in the energy accumulator 15. Meanwhile, positive holes remain in the carrier emission graphene 72 shown in the lower area of the diagram. The remaining positive holes move to the energy accumulator 15, in which electrons and positive holes form pairs and are accumulated.

The carrier emission graphene 72 is disposed on one surface of the carrier emission substrate 74 shown in the upper area of the diagram. The insulator 8 is disposed on the surface of the carrier emission graphene 72. The first electrode of the carrier accelerator 61 of the carrier accelerator, the second electrode of the carrier accelerator 62, the third electrode of the carrier accelerator 63 and the fourth electrode of the carrier accelerator 64 are disposed in the insulator 8. A positive voltage is applied to the first electrode of the carrier accelerator 61 from the first power source 31 while a negative voltage is applied to the carrier output material 1 from the first power source 31. As a result, an electrical field is applied in the direction from the first electrode of the carrier accelerator 61 to the carrier output material 1. Due to the applied electrical field, electrons serving as carriers are injected into the carrier emission graphene 72 (corresponding to the channel forming material 2) shown in the upper area of the diagram from the carrier output material 1. The first electrode of the carrier accelerator 61 acts as the injection electrode. The carrier emission graphene 72 becomes high temperature and electrons in the carrier emission graphene 72 acquire large kinetic energy. As a result, the injected electrons are accelerated by the second electrode of the carrier accelerator 62, the third electrode of the carrier accelerator 63 and the fourth electrode of the carrier accelerator 64, and are well emitted into a vacuum. The second electrode of the carrier accelerator 62, the third electrode of the carrier accelerator 63 and the fourth electrode of the carrier accelerator 64 act as the sliding electrodes. The electrons 50 emitted into the vacuum move in a lower direction of the diagram, collide with the carrier absorption graphene 71 and are absorbed by the carrier absorption graphene 71. In the collision, kinetic energy of the electrons 50 is converted into thermal energy. As a result, the temperature of the carrier absorption graphene 71 increases. Thermal energy of the carrier absorption graphene 71 is conducted to the carrier emission graphene 72 disposed in the upper area of the diagram, and the temperature of the carrier emission graphene 72 increases to a high temperature. The electrons absorbed in the carrier absorption graphene 71 shown in the lower area of the diagram move to the energy accumulator 15 and are accumulated in the energy accumulator 15. Meanwhile, positive holes remain in the carrier emission graphene 72 shown in the upper area of the diagram. The remaining positive holes move to the energy accumulator 15, in which electrons and positive holes form pairs and are accumulated.

Since the temperature of the carrier emission graphene 72 increases, the number of electrons emitted into the vacuum from the carrier emission graphene 72 increases. By repeating the processes, the number of electrons 50 emitted from the carrier emission graphene 72 shown in the upper area and the carrier emission graphene 72 shown in the lower area of the diagram is increased. Accordingly, as temperature increases, the number of electrons 50 absorbed by the carrier absorption graphene 71 increases. As a result, the number of electrons 50 moving to the energy accumulator 15 also increases. Meanwhile, positive holes remain in the carrier emission graphene 72 that has emitted electrons. The remaining positive holes move to the energy accumulator 15, in which electrons and positive holes form pairs and are accumulated. When the electrical load 5 is electrically connected with the both terminals of the energy accumulator 15, electrons and positive holes that are accumulated in the energy accumulator 15 move to the electrical load 5, in which both recombine and disappear. In the disappearance of electrons and positive holes, electrical energy is supplied to the electrical load 5.

As the above-described processes are repeated, the carrier absorption graphene 71 and the carrier emission graphene 72 both become high temperature and the number of electrons 50 emitted into the vacuum increases. Part of the emitted electrons 50 can be accumulated in the energy accumulator 15 and the remaining electrons can be allocated for a next emission. This case is called as continuous field effect power generation. On the other hand, when a pulsing voltage is applied to the electrode 60 of the carrier accelerator, this case is called as time-sharing field effect power generation. The time-sharing field effect power generation has a carrier emission period and a carrier accumulation period. In the carrier emission period, electrons are emitted from the carrier emission graphene 72 and absorbed by the carrier absorption graphene 71. In the carrier accumulation period, electrons absorbed in the carrier absorption graphene 71 are accumulated in the energy accumulator 15. The present invention includes the continuous field effect power generation and the time-sharing field effect power generation.

<Thirteenth Embodiment>

It is called thermal feedback field effect power generation when a power generation output is increased in a device by repeating the following processes: electrons are emitted from a channel forming material 2 in an outward path; the electrons are collected by an electron absorption collector in the outward path; the outward path electrons impart collision energy to the electron absorption collector; the outward path electron absorption collector is heated; thermal energy of the outward path electron absorption collector is conducted to the channel forming material 2 in a homeward path; the temperature of the channel forming material 2 in the homeward path increases, so that large numbers of electrons are emitted from the channel forming material 2 in the homeward path; the large numbers of electrons are collected by an electron absorption collector in the homeward path; the large numbers of electrons impart collision energy to the homeward path electron absorption collector; the homeward path electron absorption collector is heated; thermal energy of the homeward path electron absorption collector is conducted to the channel forming material 2 in the outward path; and the temperature of the channel forming material 2 in the outward path increases, so that large numbers of electrons are further emitted from the channel forming material 2 in the outward path.

Figure 79:
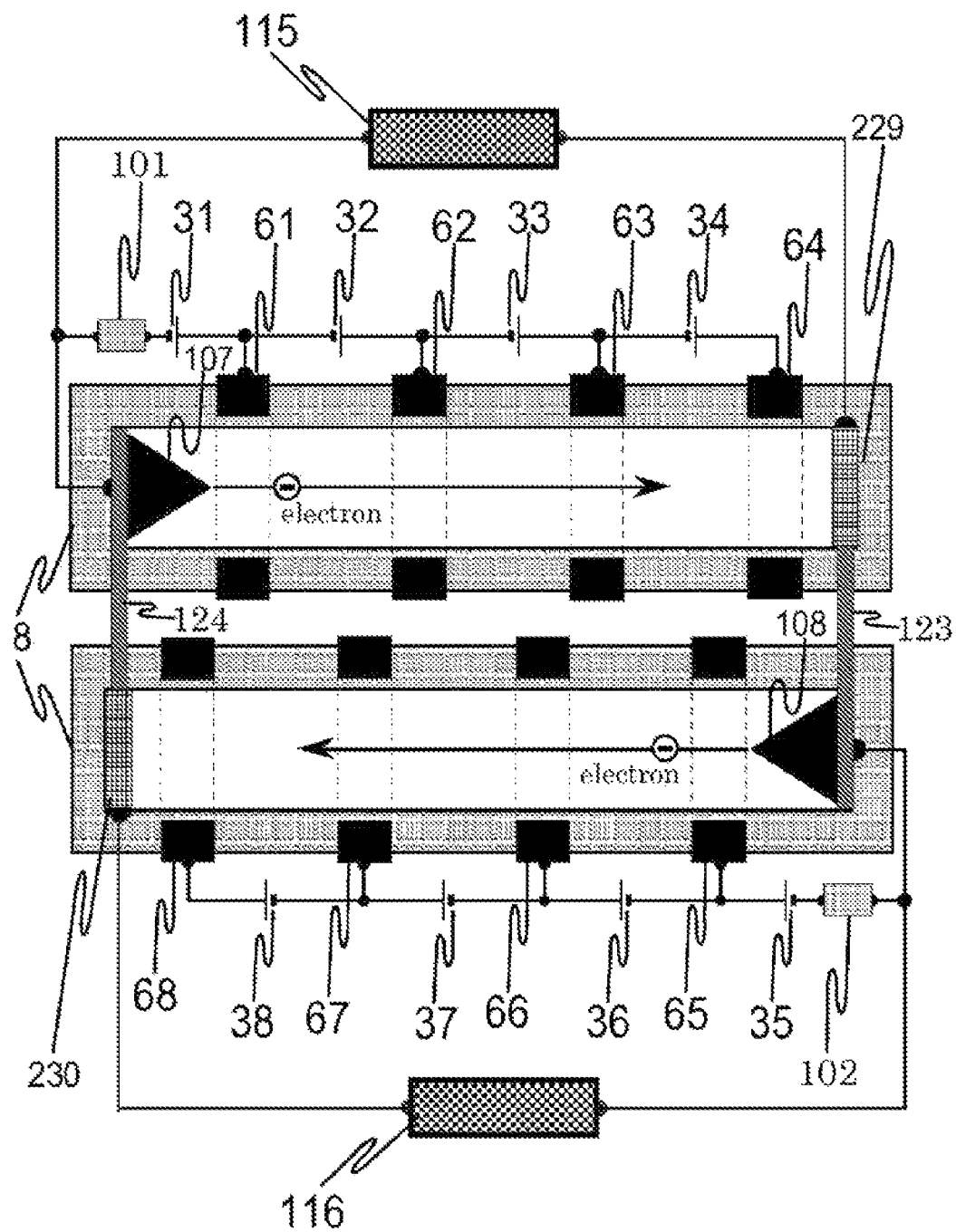
FIG. 79 is a cross-sectional view when the thermal feedback system is employed to the field effect power generation device according to the thirteenth embodiment of the present invention.
Figure 80:
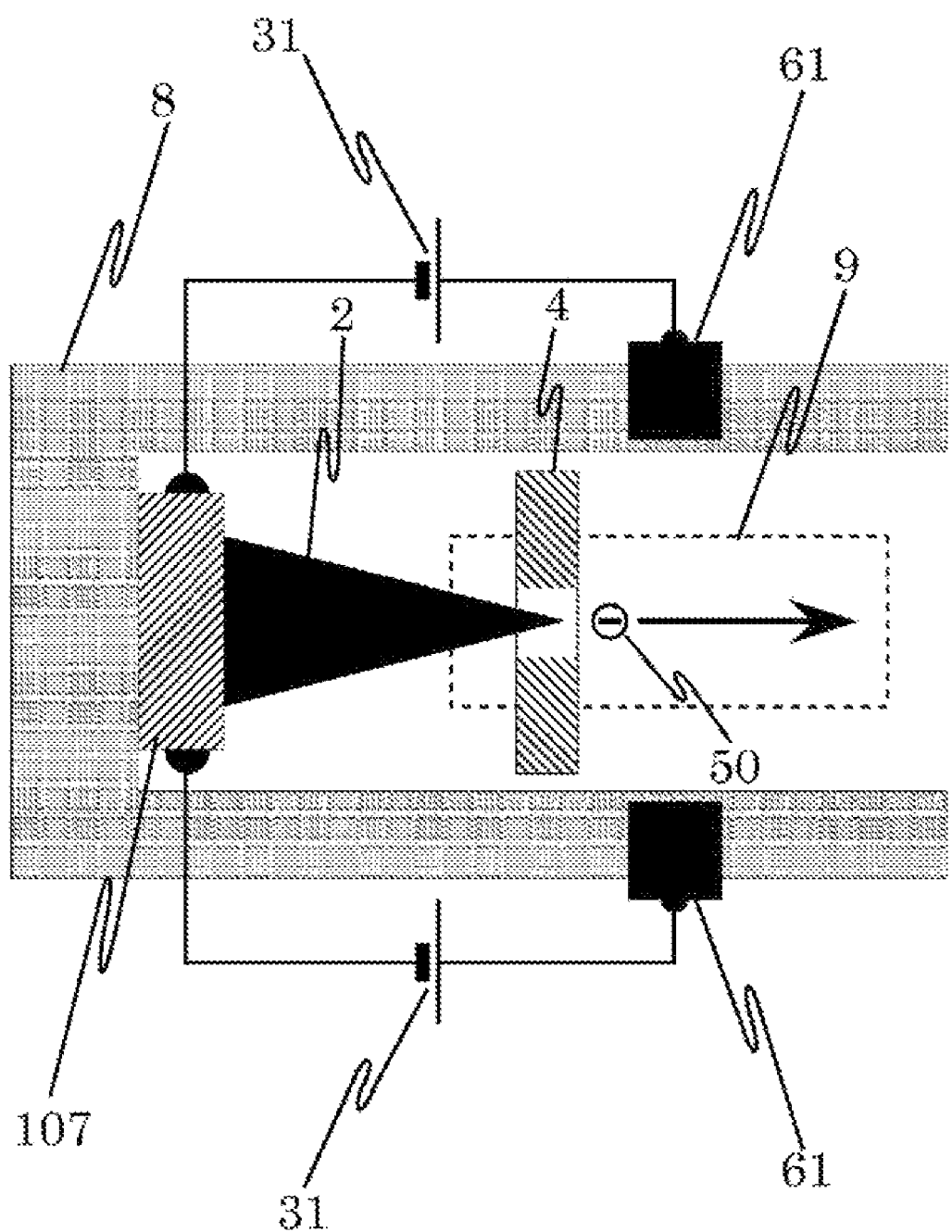
FIG. 80 is an enlarged cross-sectional view showing the surrounding of an outward path carrier output material when the thermal feedback system is employed to the field effect power generation device according to the thirteenth embodiment of the present invention.
Figure 81:
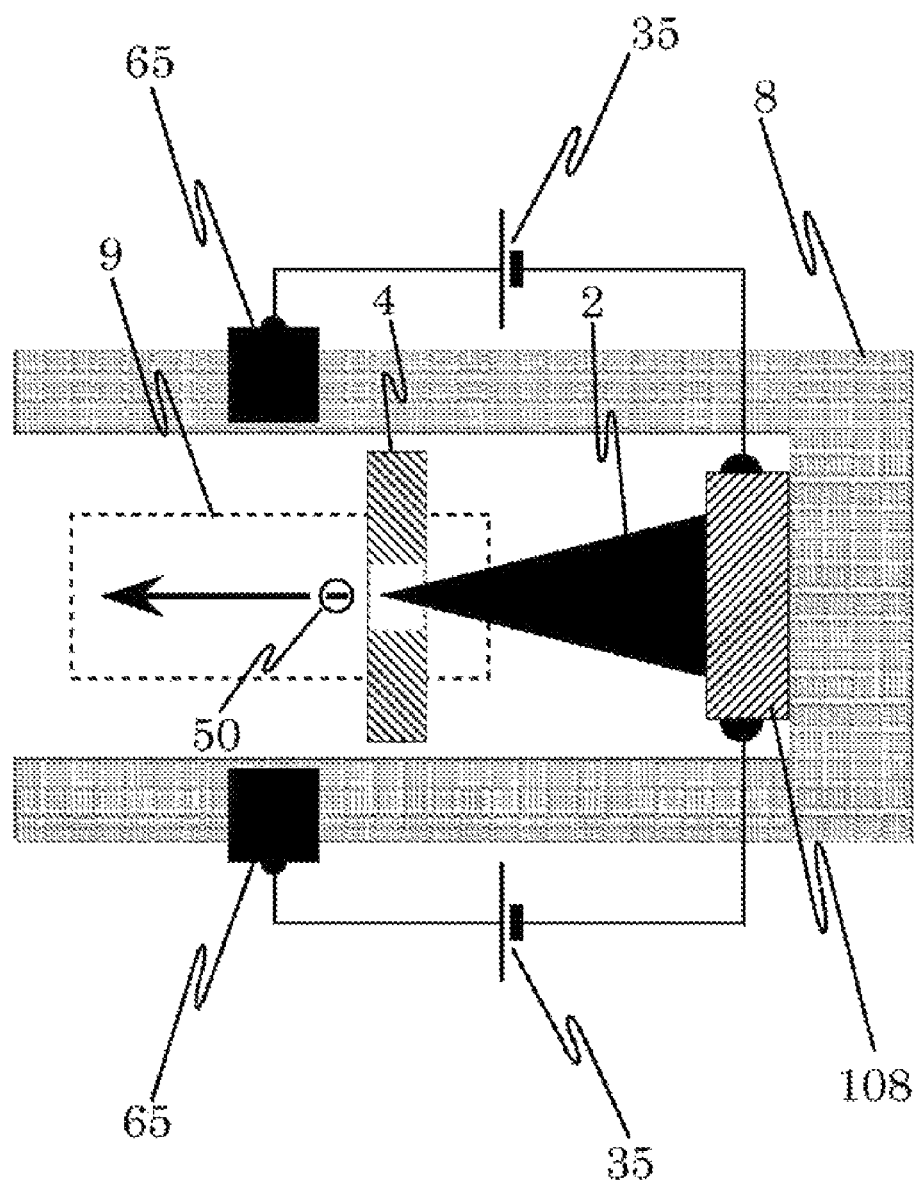
FIG. 81 is an enlarged cross-sectional view showing the surrounding of a homeward path carrier output material when the thermal feedback system is employed to the field effect power generation device according to the thirteenth embodiment of the present invention.

FIG. 79 shows a cross-sectional view when the thermal feedback system is employed to the field effect power generation device according to the thirteenth embodiment of the present invention. FIG. 80 shows an enlarged view showing the surrounding of an outward path carrier output material 107 when a mode 1 start switch 101 is in a conductive state in FIG. 79. FIG. 81 shows an enlarged cross-sectional view showing the surrounding of a homeward path carrier output material when the thermal feedback system is employed to the field effect power generation device according to the thirteenth embodiment of the present invention. FIG. 81 shows an enlarged view showing the surrounding of a homeward path carrier output material 108 when a mode 2 start switch 102 is in a conductive state in FIG. 79.

The thermal feedback field effect power generation has three operational modes.

<Mode 0>

A mode in which the mode 1 start switch 101 is in the conductive state while the mode 2 start switch 102 is also in the conductive state in FIG. 79.

<Mode 1>

A mode in which the mode 1 start switch 101 is in the conductive state while the mode 2 start switch 102 is in a non-conductive state in FIG. 79.

<Mode 2>

A mode in which the mode 1 start switch 101 is in a non-conductive state while the mode 2 start switch 102 is in the conductive state in FIG. 79.

In an initial state of the thermal feedback field effect power generation, the mode 1 operation starts. When the mode 1 operation runs for a certain length of time and the temperatures of the channel forming material 2 in the outward path and the channel forming material 2 in the homeward path get over a certain threshold, the field effect power generation switches the mode 1 operation to the mode 2 operation, and thereafter repeats the mode 1 operation and the mode 2 operation so as to reach a steady state.

<Mode 0>

In the initial state, thermal energy is imparted to the channel forming material 2 in the outward path and the channel forming material 2 in the homeward path in order to increase the temperatures of the channel forming material 2 in the outward path and the channel forming material 2 in the homeward path. The ways to impart thermal energy include heater heating, solar heat and other thermal sources. When the channel forming material 2 in the outward path and the channel forming material 2 in the homeward path are simply heated, the mode 1 start switch 101 is set in the conductive state and the mode 2 start switch 102 is also set in the conductive state in FIG. 79. The first power source 31, the second power source 32, the third power source 33 and the fourth power source 34 are used as the power sources in the outward path. As shown in FIG. 80, the channel forming material 2 is electrically connected with the outward path carrier output material 107. The negative voltage terminal of the first power source 31 is electrically connected with the outward path carrier output material 107. The positive voltage terminal of the first power source 31 is electrically connected with the first electrode of the carrier accelerator 61. An electrical field is applied by a positive voltage applied to the first electrode of the carrier accelerator 61 and a negative voltage applied to the outward path carrier output material 107. By an effect of the applied electrical field, electrons are injected into the channel forming material 2 from the outward path carrier output material 107. The first electrode of the carrier accelerator 61 acts as the injection electrode. The injected electrons move in the accelerating channel 9 on the surface of the channel forming material 2, penetrate and pass through a potential barrier existing in the irreversible process occurrence section 4 due to a quantum mechanical tunnel effect, and are emitted into a vacuum. The first electrode of the carrier accelerator 61 also acts as the emission electrode. The emitted electrons are accelerated and move in the accelerating channel 9.

As shown in FIG. 79, the emitted electrons are accelerated and move in the accelerating channel 9 by a positive voltage applied to the second electrode of the carrier accelerator 62 from the second power source 32. The emitted electrons are further accelerated and move in the accelerating channel 9 by a positive voltage applied to the third electrode of the carrier accelerator 63 from the third power source 33. The emitted electrons are furthermore accelerated and move in the accelerating channel 9 by a positive voltage applied to the fourth electrode of the carrier accelerator 64 from the fourth power source 34. The second electrode of the carrier accelerator 62, the third electrode of the carrier accelerator 63, and the fourth electrode of the carrier accelerator 64 act as the accelerating electrodes. The emitted and accelerated electrons lastly collide with an outward path electron absorption collector 229 and are absorbed by the outward path electron absorption collector 229. In the collision, kinetic energy of the accelerated electrons is supplied to the outward path electron absorption collector 229 to cause the temperature of the outward path electron absorption collector 229 to increase. In addition, negative charges are accumulated in the outward path electron absorption collector 229 having collected electrons. Thermal energy supplied to the outward path electron absorption collector 229 is conducted to the homeward path carrier output material 108 through an outward path thermal conductor 123. Electrons accumulated in the outward path electron absorption collector 229 reach the homeward path carrier output material 108 through the outward path thermal conductor 123. The fifth power source 35, the sixth power source 36, the seventh power source 37 and the eighth power source 38 are used as the power sources in the homeward path. As shown in FIG. 81, the channel forming material 2 is electrically connected with the homeward path carrier output material 108. The negative voltage terminal of the fifth power source 35 is electrically connected with the homeward path carrier output material 108. The positive voltage terminal of the fifth power source 35 is electrically connected with the fifth electrode of the carrier accelerator 65. An electrical field is applied by a positive voltage applied to the fifth electrode of the carrier accelerator 65 and a negative voltage applied to the homeward path carrier output material 108. By an effect of the applied electrical field, electrons are injected into the channel forming material 2 from the homeward path carrier output material 108. The fifth electrode of the carrier accelerator 65 acts as the injection electrode. The injected electrons move on the surface of the channel forming material 2, penetrate and pass through a potential barrier existing in the irreversible process occurrence section 4 due to a quantum mechanical tunnel effect, and are emitted into a vacuum. The fifth electrode of the carrier accelerator 65 also acts as the emission electrode. The emitted electrons are accelerated and move in the accelerating channel 9.

As shown in FIG. 79, the emitted electrons are accelerated and move in the accelerating channel 9 by a positive voltage applied to the sixth electrode of the carrier accelerator 66 from the sixth power source 36. The emitted electrons are further accelerated and move in the accelerating channel 9 by a positive voltage applied to the seventh electrode of the carrier accelerator 67 from the seventh power source 37. The emitted electrons are furthermore accelerated and move in the accelerating channel 9 by a positive voltage applied to the eighth electrode of the carrier accelerator 68 from the eighth power source 38.

The sixth electrode of the carrier accelerator 66, the seventh electrode of the carrier accelerator 67 and the eighth electrode of the carrier accelerator 68 act as the accelerating electrodes. The emitted and accelerated electrons lastly collide with a homeward path electron absorption collector 230 and are absorbed by the homeward path electron absorption collector 230. In the collision, kinetic energy of the accelerated electrons is supplied to the homeward path electron absorption collector 230 to cause the temperature of the homeward path electron absorption collector 230 to increase. In addition, negative charges are accumulated in the homeward path electron absorption collector 230 having collected electrons. Thermal energy supplied to the homeward path electron absorption collector 230 is conducted to the outward path carrier output material 107 through a homeward path thermal conductor 124. Electrons accumulated in the homeward path electron absorption collector 230 reach the outward path carrier output material 107 through the homeward path thermal conductor 124. Since electrons reach the outward path carrier output material 107 and thermal energy is conducted to the outward path carrier output material 107, large numbers of electrons are injected into the channel forming material 2 from the outward path carrier output material 107 and the number of electrons emitted from the channel forming material 2 increases. As the above-described processes are repeated, the temperatures of the outward path carrier output material 107 and the homeward path carrier output material 108 both increase. In other words, the outward path carrier output material 107 and the homeward path carrier output material 108 both reach a high temperature state and electrons inside them have large kinetic energy, whereby large numbers of electrons are injected into the channel forming material 2 from the homeward path carrier output material 108. In addition, the temperature inside the channel forming material 2 increases and electrons inside the channel forming material 2 have large kinetic energy, whereby large numbers of electrons are emitted from the channel forming material 2. When reaching this state, the field effect power generation transitions to the mode 1 because fully-fledged power generation can be operated.

<Mode 1>

When the field effect power generation is transitioned to the mode 1, in FIG. 79, the mode 1 start switch 101 is set in the conductive state while the mode 2 start switch 102 is set in the non-conductive state. The first power source 31, the second power source 32, the third power source 33 and the fourth power source 34 are used as the power sources in the outward path. The channel forming material 2 is electrically connected with the outward path carrier output material 107. As shown in FIG. 80, the negative voltage terminal of the first power source 31 is electrically connected with the outward path carrier output material 107. The positive voltage terminal of the first power source 31 is electrically connected with the first electrode of the carrier accelerator 61. An electrical field is applied by a positive voltage applied to the first electrode of the carrier accelerator 61 and a negative voltage applied to the outward path carrier output material 107. By an effect of the applied electrical field, electrons are injected into the channel forming material 2 from the outward path carrier output material 107. The first electrode of the carrier accelerator 61 acts as the injection electrode. Since the temperature of the outward path carrier output material 107 is high due to the result of the mode 0 operation, kinetic energy of electrons in the outward path carrier output material 107 becomes large, so that the number of electrons injected into the channel forming material 2 from the outward path carrier output material 107 increases. Large numbers of injected electrons move on the surface of the channel forming material 2, penetrate and pass through a potential barrier existing in the irreversible process occurrence section 4 due to a quantum mechanical tunnel effect, and are emitted into a vacuum. The first electrode of the carrier accelerator 61 also acts as the emission electrode. The emitted electrons are accelerated and move in the accelerating channel 9. The large numbers of emitted electrons are accelerated and move in the accelerating channel 9 by a positive voltage applied to the second electrode of the carrier accelerator 62 from the second power source 32. The large numbers of emitted electrons are further accelerated and move in the accelerating channel 9 by a positive voltage applied to the third electrode of the carrier accelerator 63 from the third power source 33. The large numbers of emitted electrons are furthermore accelerated and move in the accelerating channel 9 by a positive voltage applied to the fourth electrode of the carrier accelerator 64 from the fourth power source 34. The second electrode of the carrier accelerator 62, the third electrode of the carrier accelerator 63, and the fourth electrode of the carrier accelerator 64 act as the accelerating electrodes. The large numbers of emitted and accelerated electrons lastly collide with the outward path electron absorption collector 229 and are absorbed by the outward path electron absorption collector 229. In the collision, kinetic energy of the accelerated electrons is supplied to the outward path electron absorption collector 229 to cause the temperature of the outward path electron absorption collector 229 to increase. Thermal energy supplied to the outward path electron absorption collector 229 is conducted to the homeward path carrier output material 108 through an outward path thermal conductor 123. Negative charges are accumulated in the outward path electron absorption collector 229 having collected large numbers of electrons. Meanwhile, large numbers of positive holes remain in the outward path carrier output material 107 having injected large numbers of electrons. The large numbers of electrons collected in the outward path electron absorption collector 229 move to the mode 1 energy accumulator 115 while the large numbers of positive holes remaining in the outward path carrier output material 107 move to the mode 1 energy accumulator 115, and they are accumulated in the mode 1 energy accumulator 115. Since the mode 2 start switch 102 is in the non-conductive state and no electrical field acts the homeward path circuit in the process, the number of electrons injected from the homeward path carrier output material 108 is almost zero. Accordingly, all of the electrons collected in the outward path electron absorption collector 229 move to the mode 1 energy accumulator 115. When the electrical load 5 is electrically connected in parallel with the mode 1 energy accumulator 115, generated electrical energy is consumed.

<Mode 2>

When the field effect power generation is transitioned to the mode 2, in FIG. 79, the mode 1 start switch 101 is set in the non-conductive state while the mode 2 start switch 102 is set in the conductive state. The fifth power source 35, the sixth power source 36, the seventh power source 37 and the eighth power source 38 are used as the power sources in the homeward path. The channel forming material 2 is electrically connected with the homeward path carrier output material 108. As shown in FIG. 81, the negative voltage terminal of the fifth power source 35 is electrically connected with the homeward path carrier output material 108. The positive voltage terminal of the fifth power source 35 is electrically connected with the fifth electrode of the carrier accelerator 65. An electrical field is applied by a positive voltage applied to the fifth electrode of the carrier accelerator 65 and a negative voltage applied to the homeward path carrier output material 108. By an effect of the applied electrical field, electrons are injected into the channel forming material 2 from the homeward path carrier output material 108. The fifth electrode of the carrier accelerator 65 acts as the injection electrode. Since the temperature of the homeward path carrier output material 108 is high due to the result of the mode 0 operation, kinetic energy of electrons in the homeward path carrier output material 108 becomes large, so that the number of electrons injected into the channel forming material 2 from the homeward path carrier output material 108 increases. Large numbers of injected electrons move on the surface of the channel forming material 2, penetrate and pass through a potential barrier existing in the irreversible process occurrence section 4 due to a quantum mechanical tunnel effect, and are emitted into a vacuum. The emitted electrons are accelerated and move in the accelerating channel 9. The large numbers of emitted electrons are accelerated and move in the accelerating channel 9 by a positive voltage applied to the sixth electrode of the carrier accelerator 66 from the sixth power source 36. The large numbers of emitted electrons are further accelerated and move in the accelerating channel 9 by a positive voltage applied to the seventh electrode of the carrier accelerator 67 from the seventh power source 37. The large numbers of emitted electrons are furthermore accelerated and move in the accelerating channel 9 by a positive voltage applied to the eighth electrode of the carrier accelerator 68 from the eighth power source 38.

The sixth electrode of the carrier accelerator 66, the seventh electrode of the carrier accelerator 67, and the eighth electrode of the carrier accelerator 68 act as the accelerating electrodes. The large numbers of emitted and accelerated electrons lastly collide with the homeward path electron absorption collector 230 and are absorbed by the homeward path electron absorption collector 230. In the collision, kinetic energy of the accelerated electrons is supplied to the homeward path electron absorption collector 230 to cause the temperature of the homeward path electron absorption collector 230 to increase. Thermal energy supplied to the homeward path electron absorption collector 230 is conducted to the outward path carrier output material 107 through the homeward path thermal conductor 124. Negative charges are accumulated in the homeward path electron absorption collector 230 having collected large numbers of electrons. Meanwhile, large numbers of positive holes remain in the homeward path carrier output material 108 having injected large numbers of electrons. The large numbers of electrons collected in the homeward path electron absorption collector 230 move to the mode 2 energy accumulator 116 while the large numbers of positive holes remaining in the homeward path carrier output material 108 move to the mode 2 energy accumulator 116, and they are accumulated in the mode 2 energy accumulator 116. Since the mode 1 start switch 101 is in the non-conductive state and no electrical field acts the homeward path circuit in the process, the number of electrons injected from the homeward path carrier output material 108 is almost zero. Accordingly, all of the electrons collected in the homeward path electron absorption collector 230 move to the mode 2 energy accumulator 116. When the electrical load 5 is coupled in parallel with the mode 2 energy accumulator 116, generated electrical energy is consumed.

The temperatures of the outward path carrier output material 107, the homeward path carrier output material 108, the channel forming materials 2 in the outward and homeward paths increase by alternately repeating the above-described mode 1 and mode 2. When switching time of the mode 1 and mode 2 is shortened, their high temperature states are maintained. The number of electrons injected into the channel forming materials 2 in the outward and homeward paths from the outward path carrier output material 107 and the homeward path carrier output material 108 increases. In addition, the number of electrons emitted into a vacuum from the channel forming materials 2 in the outward and homeward paths also increases, whereby power obtained by power generation increases. As a conclusion, the field effect power generation device can perform high efficient power generation since kinetic energy of electrons accelerated by applying an electrical field and charges are effectively utilized for power generation. By popularizing the field effect power generation device in the world, an energy depletion problem and a difficult problem of global environment destruction caused by burning fossil fuels can be simultaneously solved.

<Fourteenth Embodiment>

Figure 82:
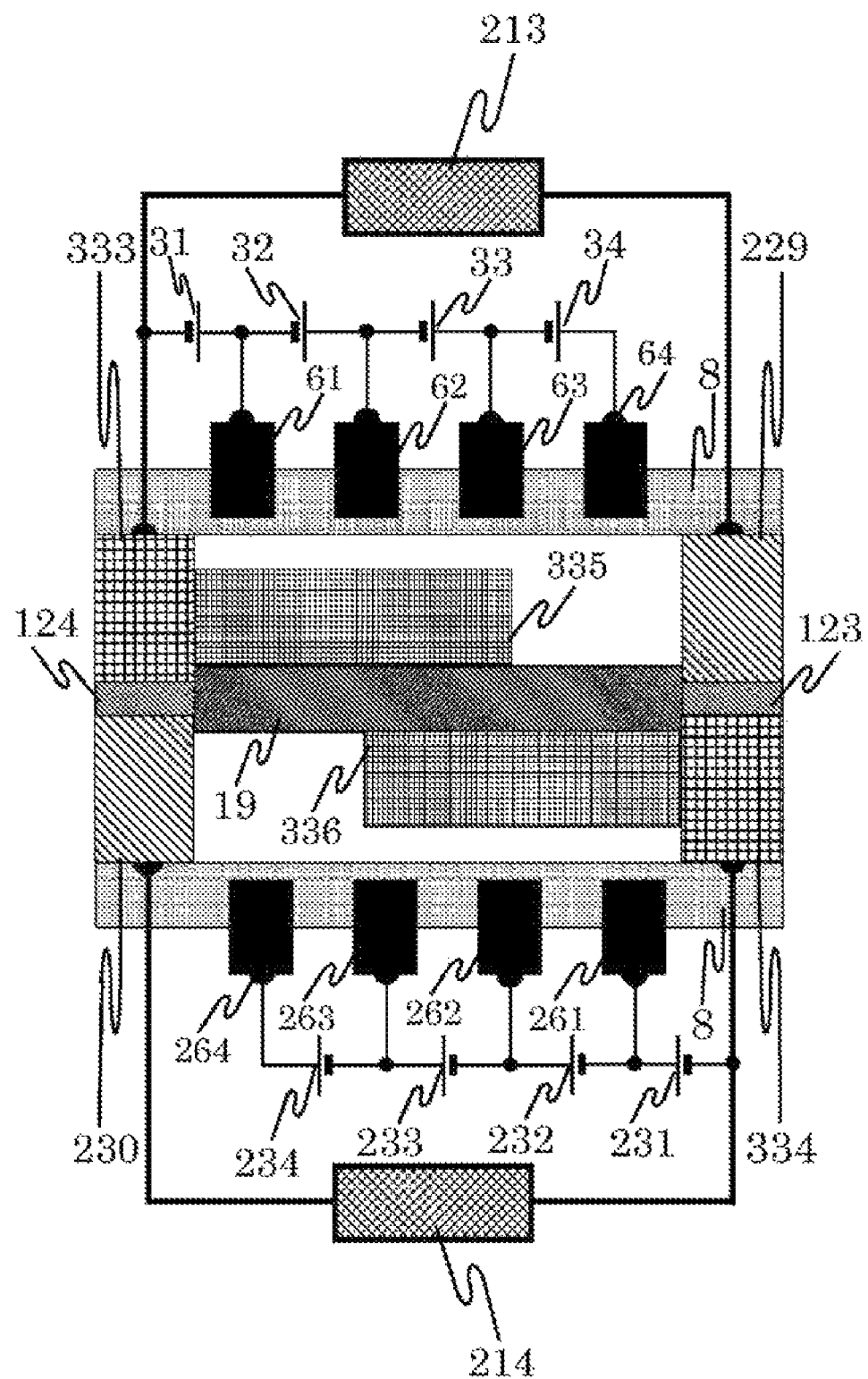
FIG. 82 is a cross-sectional view when the thermal feedback system is employed to the field effect power generation device according to the fourteenth embodiment of the present invention.

FIG. 82 shows a cross-sectional view when the thermal feedback system is employed to the field effect power generation device according to the fourteenth embodiment of the present invention. The thermal feedback field effect power generation device includes outward path power generation and homeward path power generation. The first power source 31, the second power source 32, the third power source 33 and the fourth power source 34 are used as outward path power sources. As shown in the diagram, an outward path carrier output material 333, an outward path channel forming material 335 and the outward path electron absorption collector 229 are disposed on the surface of the substrate 19. Graphene is used as an example of the outward path channel forming material 335. The outward path channel forming material 335 that is graphene is electrically connected with the outward path carrier output material 333. The insulator 8 is disposed on the upper surfaces of the outward path carrier output material 333, the outward path channel forming material 335 and the outward path electron absorption collector 229. The first electrode 61 of an outward path carrier accelerator, the second electrode 62 of the outward path carrier accelerator, the third electrode 63 of the outward path carrier accelerator and the fourth electrode 64 of the outward path carrier accelerator are disposed on the upper surface of the insulator 8.

The thermal feedback field effect power generation device has an outward path operation and a homeward path operation, and both the operations are performed in a parallel manner. In FIG. 82, the positive voltage terminal of the first power source 31 is electrically connected with the first electrode of the carrier accelerator 61. The negative voltage terminal of the first power source 31 is electrically connected with the outward path carrier output material 333. An electrical field is applied between the first electrode of the carrier accelerator 61 and the outward path carrier output material 333. By an effect of the applied electrical field, electrons are injected into the outward path channel forming material 335 from the outward path carrier output material 333. The first electrode of the carrier accelerator 61 acts as the injection electrode. The first power source 31 is used for injecting electrons serving as carriers into the outward path channel forming material 335 from the outward path carrier output material 333. The negative voltage terminal of the second power source 32 is electrically connected with the first electrode of the carrier accelerator 61. The positive voltage terminal of the second power source 32 is electrically connected with the second electrode of the carrier accelerator 62. The negative voltage terminal of the third power source 33 is electrically connected with the second electrode of the carrier accelerator 62. The positive voltage terminal of the third power source 33 is electrically connected with the third electrode of the carrier accelerator 63. The second electrode of the carrier accelerator 62 and the third electrode of the carrier accelerator 63 act as the sliding electrodes.

The negative voltage terminal of the fourth power source 34 is electrically connected with the third electrode of the carrier accelerator 63. The positive voltage terminal of the fourth power source 34 is electrically connected with the fourth electrode of the carrier accelerator 64. The fourth electrode of the carrier accelerator 64 acts as the emission electrode. An electrical field is applied between the first electrode of the carrier accelerator 61 and the outward path carrier output material 333. A positive voltage of the first power source 31 is applied to the first electrode of the carrier accelerator 61 while a negative voltage of the first power source 31 is applied to the outward path carrier output material 333. The electrical field acts electrons serving as carriers to be injected into the outward path channel forming material 335 from the outward path carrier output material 333. In the injection, electrons penetrate and pass through a potential barrier existing between the outward path carrier output material 333 and the outward path channel forming material 335 by the electrical field applied between the first electrode of the carrier accelerator 61 and the outward path carrier output material 333 and a tunnel effect. In other words, the first electrode of the carrier accelerator 61 acts as the tunneling electrode. The injected electrons move in the accelerating channel 9. The injected electrons are accelerated in the accelerating channel 9 by an electrical field applied by a positive voltage applied to the first electrode of the carrier accelerator 61, the second electrode of the carrier accelerator 62, the third electrode of the carrier accelerator 63 and the fourth electrode of the carrier accelerator 64, and increase their kinetic energy. The fourth electrode of the carrier accelerator 64 also acts as the accelerating electrode. The electrons having large kinetic energy reach the irreversible process occurrence section 4 and are emitted from the outward path channel forming material 335. In the emission, electrons penetrate and pass through a potential barrier that exists between the outward path channel forming material 335 and a vacuum and corresponds to a work function, due to a tunnel effect and a applied electrical field, and are emitted into a vacuum. The fourth electrode of the carrier accelerator 64 also acts as the emission electrode. The emitted electrons fly between the insulator 8 and the substrate 19 and reach the outward path electron absorption collector 229. The electrons having reached the outward path electron absorption collector 229 move to an outward path energy accumulator 213. Meanwhile, positive holes remain in the outward path carrier output material 333 having output electrons serving as carriers. Positive holes move to the outward path energy accumulator 213, in which electrons and positive holes form dipoles. The electrons having reached the outward path electron absorption collector 229 move to the outward path energy accumulator 213. Since almost no electrons remain in the outward path electron absorption collector 229, the courses of subsequent electrons approaching the outward path electron absorption collector 229 are rarely hindered. In addition, since positive holes move from the outward path carrier output material 333 to the outward path energy accumulator 213, in which electrons and positive holes form dipoles, positive charges of positive holes rarely hinder the movement of electrons moving from the outward path carrier output material 333 to the outward path channel forming material 335. As a result, good power generation is performed. This is a feature of the power generation device of the present invention. In the related art power generation devices, it is difficult to achieve high efficiency power generation since electrons and positive holes remaining their original materials hinder the movement of subsequent carriers.

Since the emitted electrons are accelerated and collide with the outward path electron absorption collector 229, the temperature of the outward path electron absorption collector 229 increases. The temperature of the outward path electron absorption collector 229 increases and thermal energy is conducted to a homeward path carrier output material 334 through the outward path thermal conductor 123. Accordingly, kinetic energy of electrons in the homeward path carrier output material 334 increases, whereby the number of electrons emitted in the homeward path increases. In other words, the thermal feedback field effect power generation device increases its power generation efficiency since it effectively utilizes all of the generated energy as follows: electrons are accelerated and increase their kinetic energy, the kinetic energy is converted into thermal energy by the collision of electrons, and the thermal energy increases the number of electrons emitted in the homeward path.

In the thermal feedback field effect power generation device shown in FIG. 82, the first homeward path power source 231, a second homeward path power source 232, a third homeward path power source 233 and a fourth homeward path power source 234 are used. As shown in the diagram, a homeward path carrier output material 334, a homeward path channel forming material 336 and the homeward path electron absorption collector 230 are disposed under the substrate 19. Graphene is used as an example of the homeward path channel forming material 336. The homeward path channel forming material 336 that is graphene is electrically connected with the homeward path carrier output material 334. The insulator 8 is disposed under the homeward path carrier output material 334, the homeward path channel forming material 336 and the homeward path electron absorption collector 230. The first electrode of the homeward path carrier accelerator 261, the second electrode of the homeward path carrier accelerator 262, the third electrode of the homeward path carrier accelerator 263 and the fourth electrode of the homeward path carrier accelerator 264 are disposed on the lower surface of the insulator 8. The first electrode of the homeward path carrier accelerator 261 acts as the injection electrode. The second electrode of the homeward path carrier accelerator 262 and the third electrode of the homeward path carrier accelerator 263 act as the sliding electrodes. The fourth electrode of the homeward path carrier accelerator 264 acts as the emission electrode and the accelerating electrode.

The thermal feedback field effect power generation device can perform two operations: an outward path operation and a homeward path operation. When the outward path thermal conductor 123 and the homeward path thermal conductor 124 are insulators, both can be independently operated because power generation in the outward path and power generation in the homeward path are electrically insulated. Accordingly, the outward path power generation and the homeward path power generation can be simultaneously operated in a parallel manner, whereby power generation efficiency increases. When parallel power generation is realized by using insulators for the outward path thermal conductor 123 and the homeward path thermal conductor 124, examples of insulators include insulating materials such as silicon dioxide, ceramic, and mica. When the outward path thermal conductor 123 and the homeward path thermal conductor 124 are electrically conductive, the outward path power generation and the homeward path power generation required to be temporally switched. Because of this, a concept of modes is introduced. In other words, the outward path power generation is performed in a mode 1 while the homeward path power generation is performed in a mode 2. The modes are switched by electronic switching, whereby field effect power generation is realized.

In FIG. 82, the positive voltage terminal of the first homeward path power source 231 is electrically connected with the first electrode of the homeward path carrier accelerator 261. The negative voltage terminal of the first homeward path power source 231 is electrically connected with the homeward path carrier output material 334. The first homeward path power source 231 is used for injecting electrons serving as carriers into the homeward path channel forming material 336 from the homeward path carrier output material 334. The negative voltage terminal of the second homeward path power source 232 is electrically connected with the first electrode of the homeward path carrier accelerator 261. The positive voltage terminal of the second homeward path power source 232 is electrically connected with the second electrode of the homeward path carrier accelerator 262. The negative voltage terminal of the third homeward path power source 233 is electrically connected with the second electrode of the homeward path carrier accelerator 262. The positive voltage terminal of the third homeward path power source 233 is electrically connected with the third electrode of the homeward path carrier accelerator 263. The negative voltage terminal of the fourth homeward path power source 234 is electrically connected with the third electrode of the homeward path carrier accelerator 263. The positive voltage terminal of the fourth homeward path power source 234 is electrically connected with the fourth electrode of the homeward path carrier accelerator 264.

An electrical field is applied between the first electrode of the homeward path carrier accelerator 261 and the homeward path carrier output material 334. A positive voltage of the first homeward path power source 231 is applied to the first electrode of the homeward path carrier accelerator 261 while a negative voltage of the first homeward path power source 231 is applied to the homeward path carrier output material 334. By applying the electrical field, electrons serving as carriers are injected into the homeward path channel forming material 336 from the homeward path carrier output material 334. The first electrode of the homeward path carrier accelerator 261 acts as the injection electrode. In the injection, electrons penetrate and pass through a potential barrier existing between the homeward path carrier output material 334 and the homeward path channel forming material 336 by the electrical field applied between the first electrode of the homeward path carrier accelerator 261 and the homeward path carrier output material 334 and a tunnel effect. The first electrode of the homeward path carrier accelerator 261 also acts as the tunneling electrode. The injected electrons move in the accelerating channel 9. The injected electrons are accelerated in the accelerating channel 9 by an electrical field applied by a positive voltage applied to the first electrode of the homeward path carrier accelerator 261, the second electrode of the homeward path carrier accelerator 262, the third electrode of the homeward path carrier accelerator 263 and the fourth electrode of the homeward path carrier accelerator 264, and increase their kinetic energy. The electrons having large kinetic energy reach the irreversible process occurrence section 4 and are emitted from the homeward path channel forming material 336. The second electrode of the homeward path carrier accelerator 262 and the third electrode of the homeward path carrier accelerator 263 act as the sliding electrodes. The fourth electrode of the homeward path carrier accelerator 264 acts as the emission electrode. In the emission, electrons penetrate and pass through a potential barrier that exists between the homeward path channel forming material 336 and a vacuum, and corresponds to a work function, due to a tunnel effect and an applied electrical field, and are emitted into the vacuum. The emitted electrons fly between the insulator 8 and the substrate 19, and reach the homeward path electron absorption collector 230. The electrons having reached the homeward path electron absorption collector 230 move to a homeward path energy accumulator 214. Meanwhile, positive holes remain in the homeward path carrier output material 334 having output electrons serving as carriers. Positive holes move to the homeward path energy accumulator 214, in which electrons and positive holes form dipoles. The electrons having reached the homeward path electron absorption collector 230 move to the homeward path energy accumulator 214. Since almost no electrons remain in the homeward path electron absorption collector 230, the courses of subsequent electrons approaching the homeward path electron absorption collector 230 are rarely hindered. In addition, since positive holes move from the homeward path carrier output material 334 to the homeward path energy accumulator 214, in which electrons and positive holes form dipoles, positive charges of positive holes rarely hinder the movement of electrons moving from the homeward path carrier output material 334 to the homeward path channel forming material 336. As a result, good power generation is performed. This is a feature of the power generation device of the present invention. In the related art power generation devices, it is difficult to achieve high efficiency power generation since electrons and positive holes remaining their original materials hinder the movement of subsequent carriers.

Since the emitted electrons are accelerated and collide with the homeward path electron absorption collector 230, the temperature of the homeward path electron absorption collector 230 increases. The temperature of the homeward path electron absorption collector 230 increases and thermal energy is conducted to the outward path carrier output material 333 through the homeward path thermal conductor 124. Accordingly, kinetic energy of electrons in the outward path carrier output material 333 increases, whereby the number of electrons emitted in the outward path increases. In other words, the thermal feedback field effect power generation device increases its power generation efficiency since it effectively utilizes all of the generated energy as follows: electrons are accelerated and increase their kinetic energy, the kinetic energy is converted into thermal energy by the collision of electrons, and the thermal energy increases the number of electrons emitted in the outward path. Namely, electrons are accelerated and increase their kinetic energy, the kinetic energy is converted into thermal energy by the collision of electrons, and the thermal energy increases the number of electrons emitted in the outward path after the homeward path. The temperature of the outward path electron absorption collector 229 is increased by the collision of emitted electrons in the outward path while the temperature of the homeward path electron absorption collector 230 is increased by the collision of emitted electrons in the homeward path. Accordingly, the number of emitted electrons increases as a whole and the thermal feedback field effect power generation device increases its power generation efficiency. If the temperatures of the outward path electron absorption collector 229 and the homeward path electron absorption collector 230 significantly increase, device durability is lowered. Practically, a temperature most suitable for the device is set by controlling a power source voltage, whereby the field effect power generation device can be used for a long period of time.

<Fifteenth Embodiment>

Figure 83:
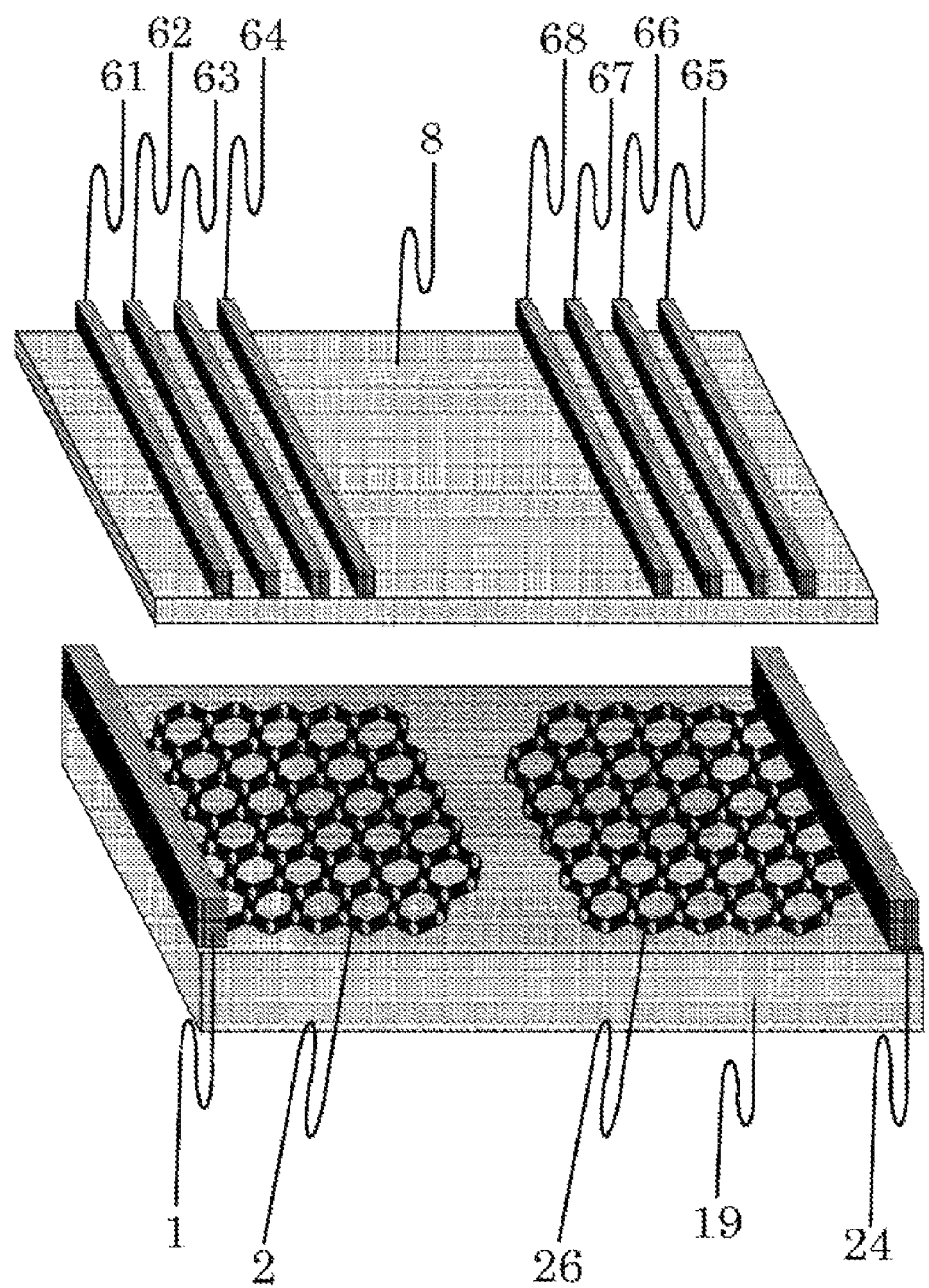
FIG. 83 is a cross-sectional view showing the mode 1 state when the alternate power generation method is employed in the field effect power generation device according to the fifteenth embodiment of the present invention.

FIG. 83 shows a cross-sectional view showing the mode 1 state when the alternate power generation method is employed in the field effect power generation device according to the fifteenth embodiment of the present invention. In the field effect power generation device employing the alternate power generation method, the first power source 31, the second power source 32, the third power source 33, the fourth power source 34, the fifth power source 35, the sixth power source 36, the seventh power source 37 and the eighth power source 38 are used as power sources and are electrically connected with the electrodes of the carrier accelerator in the same manner of FIG. 79. The power sources, however, are not shown in the diagram. As shown in FIG. 83, the channel forming material 2 and the electron absorption collector 26 are disposed on the surface of the substrate 19. The insulator 8 is disposed above the channel forming material 2 and the electron absorption collector 26. Graphene is used for both the channel forming material 2 and the electron absorption collector 26. The channel forming material 2 that is graphene and the carrier output material 1 are electrically connected with each other. However, when the channel forming material 2 is graphene that is a carbon-based material, a special adhesion method is required to electrically connect the carrier output material 1 with the channel forming material 2. For example, when titanium is used for the carrier output material 1, the carrier output material 1 that is titanium is electrically well connected with the channel forming material 2 that is the carbon-based material approximately at 1100° C. In the electrical field electron power generation device employing the alternate power generation method of the present invention, the carrier output material 1 is heated to a high temperature by switching the modes. Accordingly, good power generation efficiency is obtained by electrically connecting the carrier output material 1 with the channel forming material 2 at a high temperature state. The electron absorption collector 26 that is graphene is electrically connected with a collector 24.

The field effect power generation device employing the alternate power generation method has a mode 1 and a mode 2. The mode 1 and the mode 2 are switched by using the mode 1 start switch 101 and the mode 2 start switch 102. The mode 1 start switch 101 and the mode 2 start switch 102 are connected between the power source and the electrode of the carrier accelerator in the same manner as that shown in FIG. 79. In FIG. 83, they are not shown. In FIG. 83, the positive voltage terminal of the first power source 31 is electrically connected with the first electrode of the carrier accelerator 61. The negative voltage terminal of the first power source 31 is electrically connected with the carrier output material 1 through the mode 1 start switch 101. The first power source 31 is used for injecting electrons serving as carriers into the channel forming material 2 from the carrier input-output material 1. The first electrode of the carrier accelerator 61 acts as the injection electrode. The negative voltage terminal of the second power source 32 is electrically connected with the first electrode of the carrier accelerator 61. The positive voltage terminal of the second power source 32 is electrically connected with the second electrode of the carrier accelerator 62. The negative voltage terminal of the third power source 33 is electrically connected with the second electrode of the carrier accelerator 62. The positive voltage terminal of the third power source 33 is electrically connected with the third electrode of the carrier accelerator 63. The negative voltage terminal of the fourth power source 34 is electrically connected with the third electrode of the carrier accelerator 63. The positive voltage terminal of the fourth power source 34 is electrically connected with the fourth electrode of the carrier accelerator 64. The second electrode of the carrier accelerator 62, the third electrode of the carrier accelerator 63, and the fourth electrode of the carrier accelerator 64 act as the sliding electrodes. The negative voltage terminal of the fifth power source 35 is electrically connected with the fourth electrode of the carrier accelerator 64. The positive voltage terminal of the fifth power source 35 is electrically connected with the eighth electrode of the carrier accelerator 68. The negative voltage terminal of the sixth power source 36 is electrically connected with the eighth electrode of the carrier accelerator 68. The positive voltage terminal of the sixth power source 36 is electrically connected with the seventh electrode of the carrier accelerator 67. The negative voltage terminal of the seventh power source 37 is electrically connected with the seventh electrode of the carrier accelerator 67. The positive voltage terminal of the seventh power source 37 is electrically connected with the sixth electrode of the carrier accelerator 66. The negative voltage terminal of the eighth power source 38 is electrically connected with the sixth electrode of the carrier accelerator 66. The positive voltage terminal of the eighth power source 38 is electrically connected with the fifth electrode of the carrier accelerator 65. The eighth electrode of the carrier accelerator 68, the seventh electrode of the carrier accelerator 67, the sixth electrode of the carrier accelerator 66, and the fifth electrode of the carrier accelerator 65 act as the emission electrodes and the accelerating electrodes. In the mode 1 of the field effect power generation, the mode 1 start switch 101 is in a conductive state while the mode 2 start switch 102 is in a non-conductive state. The carrier output material 1 is conductive, and metal is generally used for the carrier output material 1. An electrical field is applied between the first electrode of the carrier accelerator 61 and the carrier output material 1. A positive voltage is applied to the first electrode 61 while a negative voltage is applied to the carrier output material 1. The electrical field acts electrons serving as carriers to be injected into the channel forming material 2 from the carrier output material 1. In the injection, electrons penetrate and pass through a potential barrier existing between the carrier output material 1 and the channel forming material 2 by the electrical field applied between the first electrode of the carrier accelerator 61 and the carrier output material 1 and a tunnel effect. The first electrode of the carrier accelerator 61 acts as the tunneling electrode. The injected electrons move in the accelerating channel 9. The injected electrons are accelerated in the accelerating channel 9 by an electrical field applied by a positive voltage applied to the first electrode of the carrier accelerator 61, the second electrode of the carrier accelerator 62, the third electrode of the carrier accelerator 63, the fourth electrode of the carrier accelerator 64, the eighth electrode of the carrier accelerator 68, the seventh electrode of the carrier accelerator 67, the sixth electrode of the carrier accelerator 66, and the fifth electrode of the carrier accelerator 65, and increase their kinetic energy. The first electrode of the carrier accelerator 61, the second electrode of the carrier accelerator 62, the third electrode of the carrier accelerator 63, the fourth electrode of the carrier accelerator 64, the eighth electrode of the carrier accelerator 68, the seventh electrode of the carrier accelerator 67, the sixth electrode of the carrier accelerator 66, and the fifth electrode of the carrier accelerator 65 act as the emission electrodes and the accelerating electrodes. The electrons having large kinetic energy reach the irreversible process occurrence section 4 and are emitted from the channel forming material 2. In the emission, electrons penetrate and pass through a potential barrier that exists between the channel forming material 2 and a vacuum, and corresponds to a work function, due to a tunnel effect and an applied electrical field, and are emitted into the vacuum. The emitted electrons fly between the insulator 8 and the substrate 19, reach the electron absorption collector 26, and lastly reach the collector 24. The electrons having reached the collector 24 move to the mode 1 energy accumulator 115. Meanwhile, positive holes remain in the carrier output material 1 having output electrons serving as carriers. Positive holes move to the mode 1 energy accumulator 115, in which electrons and positive holes form dipoles. The electrons having reached the collector 24 move to the mode 1 energy accumulator 115. Since almost no electrons remain in the collector 24, the courses of subsequent electrons approaching the collector 24 are rarely hindered. In addition, since positive holes move from the carrier output material 1 to the mode 1 energy accumulator 115, in which electrons and positive holes form dipoles, positive charges of positive holes rarely hinder the movement of electrons moving from the carrier output material 1 to the channel forming material 2. As a result, good power generation is performed. This is a feature of the power generation device of the present invention. In the related art power generation devices, it is difficult to achieve high efficiency power generation since electrons and positive holes remaining their original materials hinder the movement of subsequent carriers. Since the emitted electrons are accelerated and collide with the electron absorption collector 26, the temperature of the electron absorption collector 26 increases. As the temperature of the electron absorption collector 26 increases, kinetic energy of electrons in the electron absorption collector 26 increases. When the mode is switched to the mode 2, the number of emitted electrons increases. In other words, the field effect power generation device employing the alternate power generation method increases its power generation efficiency since it utilizes all of the generated energy as follows: electrons are accelerated and increase their kinetic energy, the kinetic energy is converted into thermal energy by the collision of electrons, and the thermal energy increases the number of electrons emitted in the next mode.

In the mode 2 of the field effect power generation, the mode 1 start switch 101 is in the non-conductive state while the mode 2 start switch 102 is in the conductive state. In the field effect power generation device employing the alternate power generation method at the mode 2, the first power source 31, the second power source 32, the third power source 33, the fourth power source 34, the fifth power source 35, the sixth power source 36, the seventh power source 37 and the eighth power source 38 are used as power sources and are electrically connected with the electrodes of the carrier accelerator in the same manner of FIG. 79. The power sources, however, are not shown in the diagram.

Figure 84:
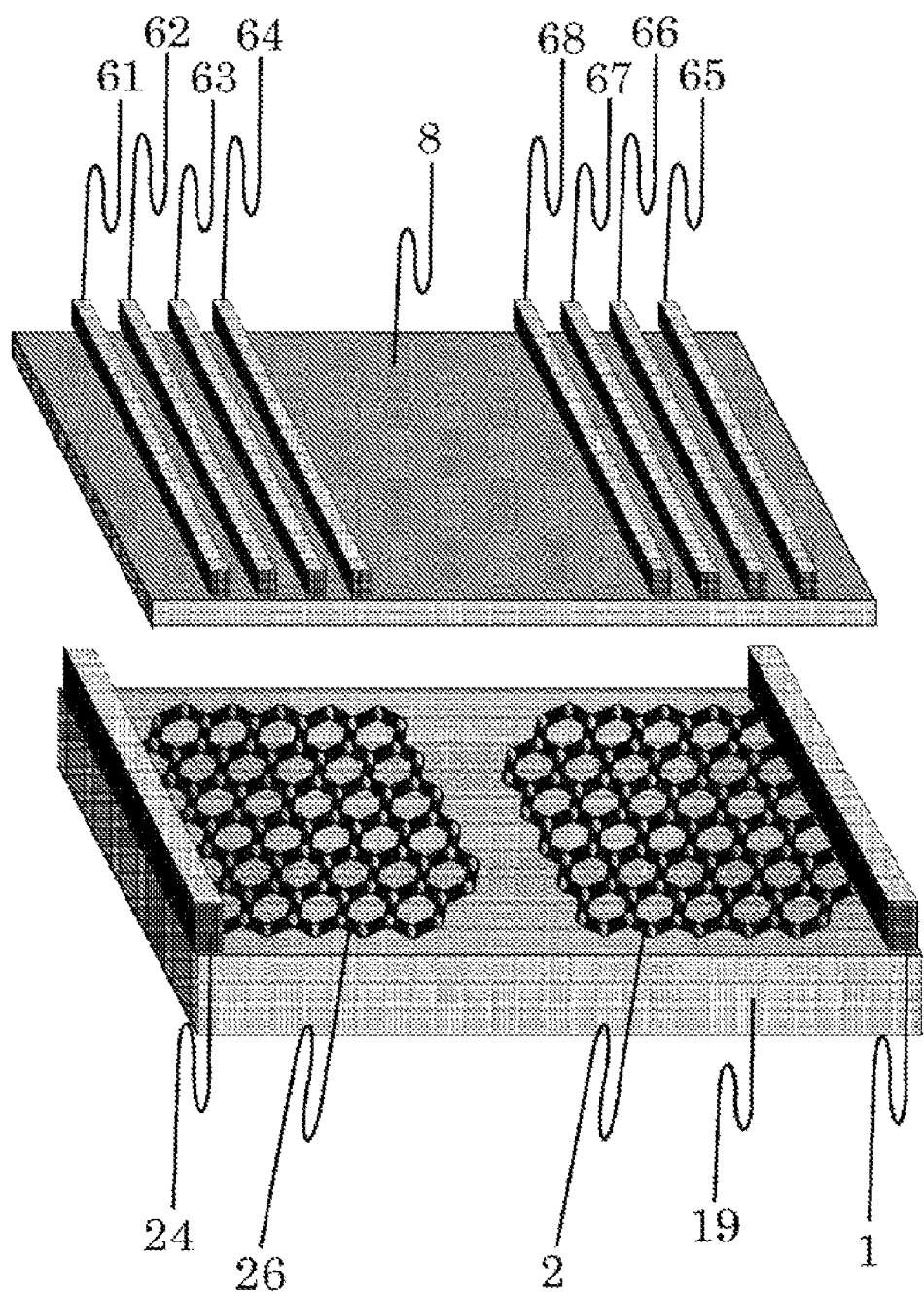
FIG. 84 is a cross-sectional view showing the mode 2 state when the alternate power generation method is employed in the field effect power generation device according to the fifteenth embodiment of the present invention.

FIG. 84 shows a cross-sectional view showing the mode 2 state when the alternate power generation method is employed in the field effect power generation device according to the fifteenth embodiment of the present invention. In the diagram, the positive voltage terminal of the first power source 31 is electrically connected with the fifth electrode of the carrier accelerator 65. The negative voltage terminal of the first power source 31 is electrically connected with the carrier output material 1 through the mode 2 start switch 102. The first power source 31 is used for injecting electrons serving as carriers into the channel forming material 2 from the carrier input-output material 1. The fifth electrode of the carrier accelerator 65 acts as the injection electrode for injecting electrons into the channel forming material 2 from the carrier input-output material 1. The negative voltage terminal of the second power source 32 is electrically connected with the fifth electrode of the carrier accelerator 65. The positive voltage terminal of the second power source 32 is electrically connected with the sixth electrode of the carrier accelerator 66. The negative voltage terminal of the third power source 33 is electrically connected with the sixth electrode of the carrier accelerator 66. The positive voltage terminal of the third power source 33 is electrically connected with the seventh electrode of the carrier accelerator 67. The negative voltage terminal of the fourth power source 34 is electrically connected with the seventh electrode of the carrier accelerator 67. The positive voltage terminal of the fourth power source 34 is electrically connected with the eighth electrode of the carrier accelerator 68. The negative voltage terminal of the fifth power source 35 is electrically connected with the eighth electrode of the carrier accelerator 68. The sixth electrode of the carrier accelerator 66, the seventh electrode of the carrier accelerator 67, and the eighth electrode of the carrier accelerator 68 act as the sliding electrodes. The positive voltage terminal of the fifth power source 35 is electrically connected with the fourth electrode of the carrier accelerator 64. The negative voltage terminal of the sixth power source 36 is electrically connected with the fourth electrode of the carrier accelerator 64. The positive voltage terminal of the sixth power source 36 is electrically connected with the third electrode of the carrier accelerator 63. The negative voltage terminal of the seventh power source 37 is electrically connected with the third electrode of the carrier accelerator 63. The positive voltage terminal of the seventh power source 37 is electrically connected with the second electrode of the carrier accelerator 62. The negative voltage terminal of the eighth power source 38 is electrically connected with the second electrode of the carrier accelerator 62. The positive voltage terminal of the eighth power source 38 is electrically connected with the first electrode of the carrier accelerator 61.

The fourth electrode of the carrier accelerator 64, the third electrode of the carrier accelerator 63, the second electrode of the carrier accelerator 62, and the first electrode of the carrier accelerator 61 act as the emission electrodes and the accelerating electrodes. In the mode 2 of the field effect power generation, the mode 2 start switch 102 is in the conductive state while the mode 1 start switch 101 is in the non-conductive state. The carrier output material 1 is conductive, and metal is generally used for the carrier output material 1. The channel forming material 2 and the electron absorption collector 26 are disposed on the surface of the substrate 19. Graphene is used for both the channel forming material 2 and the electron absorption collector 26. The channel forming material 2 that is graphene and the carrier output material 1 are electrically connected with each other. However, the channel forming material 2 is graphene that is a carbon-based material, a special adhesion method is required to electrically connect the carrier output material 1 with the channel forming material 2. For example, when titanium is used for the carrier output material 1, the carrier output material 1 that is titanium is electrically well connected with the channel forming material 2 that is the carbon-based material approximately at 1100° C. In the electrical field electron power generation device employing the alternate power generation method of the present invention, the carrier output material 1 is heated to a high temperature by switching the modes. Accordingly, good power generation efficiency is obtained by electrically connecting the carrier output material 1 with the channel forming material 2 at a high temperature state. The electron absorption collector 26 that is graphene is electrically connected with the collector 24.

An electrical field is applied between the first electrode of the carrier accelerator 61 and the carrier output material 1. A positive voltage is applied to the first electrode of the carrier accelerator 61 while a negative voltage is applied to the carrier output material 1. The electrical field acts electrons serving as carriers to be injected into the channel forming material 2 from the carrier output material 1. In the injection, electrons penetrate and pass through a potential barrier existing between the carrier output material 1 and the channel forming material 2 by the electrical field applied between the first electrode of the carrier accelerator 61 and the carrier output material 1 and a tunnel effect. The first electrode of the carrier accelerator 61 acts as the tunneling electrode. The injected electrons move in the accelerating channel 9. The injected electrons are accelerated in the accelerating channel 9 by an electrical field applied by a positive voltage applied to the fifth electrode of the carrier accelerator 65, the sixth electrode of the carrier accelerator 66, the seventh electrode of the carrier accelerator 67, the eighth electrode of the carrier accelerator 68, the fourth electrode of the carrier accelerator 64, the third electrode of the carrier accelerator 63, the second electrode of the carrier accelerator 62, and the first electrode of the carrier accelerator 61, and increase their kinetic energy. The electrons having large kinetic energy reach the irreversible process occurrence section 4 and are emitted from the channel forming material 2. In the emission, electrons penetrate and pass through a potential barrier that exists between the channel forming material 2 and a vacuum, and corresponds to a work function, due to a tunnel effect and an applied electrical field, and are emitted into the vacuum. The emitted electrons fly between the insulator 8 and the substrate 19, reach the electron absorption collector 26, and lastly reach the collector 24.

The electrons having reached the collector 24 move to the mode 2 energy accumulator 116. Meanwhile, positive holes remain in the carrier output material 1 having output electrons serving as carriers. Positive holes move to the mode 2 energy accumulator 116, in which electrons and positive holes form dipoles. The electrons having reached the collector 24 move to the mode 2 energy accumulator 116. Since almost no electrons remain in the collector 24, the courses of subsequent electrons approaching the collector 24 are rarely hindered. In addition, since positive holes move from the carrier output material 1 to the mode 2 energy accumulator 116, in which electrons and positive holes form dipoles, positive charges of positive holes rarely hinder the movement of electrons moving from the carrier output material 1 to the channel forming material 2. As a result, good power generation is performed. This is a feature of the power generation device of the present invention. In the related art power generation devices, it is difficult to achieve high efficiency power generation since electrons and positive holes remaining their original materials hinder the movement of subsequent carriers.

Since the emitted electrons are accelerated and collide with the electron absorption collector 26, the temperature of the electron absorption collector 26 increases. As the temperature of the electron absorption collector 26 increases, kinetic energy of electrons in the electron absorption collector 26 increases. When the mode is switched to the mode 1 from the mode 2, the number of emitted electrons increases. In other words, electrons are accelerated and increase their kinetic energy, the kinetic energy is converted into thermal energy by the collision of electrons, and the thermal energy increases the number of electrons emitted in the next mode. The number of emitted electrons is increased by repeating the mode 1 and the mode 2, whereby the field effect power generation device employing the alternate power generation method increases its power generation efficiency. If the temperature of the electron absorption collector 26 significantly increases, device durability is lowered. Practically, a temperature most suitable for the device is set by adjusting conduction periods of the mode 1 start switch 101 and mode 2 start switch 102, whereby the field effect power generation device can be used for a long period of time.

Sixteenth Embodiment

Figure 85:
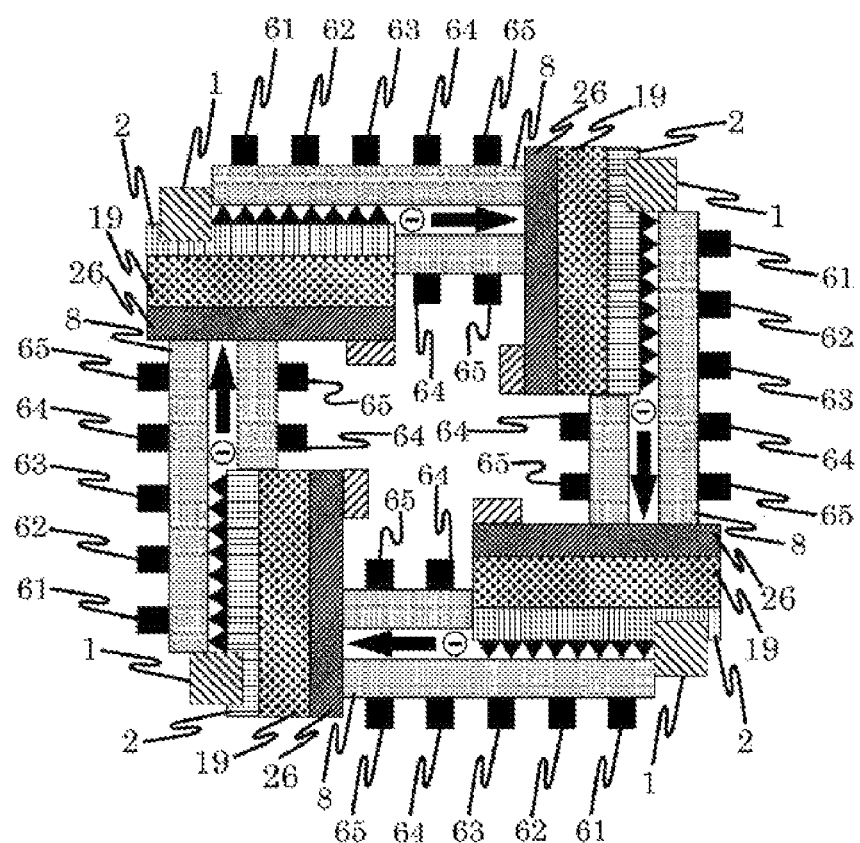
FIG. 85 is a cross-sectional view when a four-stage thermal feedback system is employed to the field effect power generation device according to the sixteenth embodiment of the present invention.

FIG. 85 shows a cross-sectional view when a four-stage thermal feedback system is employed to the field effect power generation device according to the sixteenth embodiment of the present invention. In the diagram, four power generation units are rotationally disposed so as to make an angle of 90 degrees with each other. The same numerals are given to the same parts of the four power generation units. Emitted electrons collide with one of the four electron absorption collectors 26. The electron absorption collector 26 with which electrons collide is heated, and each of the electron absorption collectors 26 is heated in order clockwise. Since the four power generation units operate in the same manner, the operation is described by focusing on a power generation unit illustrated in the upper left part in FIG. 85.

The substrate 19 shown in FIG. 85 has insulation property. In other words, the substrate 19 is made of insulating material such as silicon dioxide. The carrier output material 1 and the channel forming material 2 are disposed on the substrate 19. The carrier output material 1 is a conductive material. Specific examples of the carrier output material 1 include titanium, nickel, copper, gold, and silver. The insulator 8 is disposed above the channel forming material 2. The first electrode of the carrier accelerator 61, the second electrode of the carrier accelerator 62, the third electrode of the carrier accelerator 63, the fourth electrode of the carrier accelerator 64, and the fifth electrode of the carrier accelerator 65 are disposed in an upper portion of the insulator 8. FIG. 85 shows a case where graphene is used as the channel forming material 2. Carbon atoms chemically bonded with an sp2 hybrid orbital form a carbon hexagonal plane in which carbon atoms are two-dimensionally-bonded. A carbon atom assembly having this plane structure is called as graphene. Graphene having such a structure that carbon atoms are arranged in a hexagonal mesh manner forms a single layer of graphite. Graphite is structured as a whole by a multiplicity of graphene layers. Graphene is composed of carbon six-member rings bonded in a plane fashion. Graphene has a thickness in molecular order and excellent electrical conductivity in its plane direction. In other words, graphene has extremely high electron mobility: 200,000 cm2/Vs. Electrons move from one carbon six-member ring to another carbon six-member ring in a plane-like fashion with almost no resistance. The first power source 31, the second power source 32, the third power source 33, the fourth power source 34, and the fifth power source 35 are used as shown in FIG. 75. The power sources, however, are not shown in FIG. 85. The negative voltage terminal of the first power source 31 is electrically connected with the carrier output material 1. The positive voltage terminal of the first power source 31 is electrically connected with the first electrode of the carrier accelerator 61. The first power source 31 is used for injecting electrons serving as carriers into the channel forming material 2 from the carrier input-output material 1. The negative voltage terminal of the second power source 32 is electrically connected with the first electrode of the carrier accelerator 61. The positive voltage terminal of the second power source 32 is electrically connected with the second electrode of the carrier accelerator 62. The negative voltage terminal of the third power source 33 is electrically connected with the second electrode of the carrier accelerator 62. The positive voltage terminal of the third power source 33 is electrically connected with the third electrode of the carrier accelerator 63. The negative voltage terminal of the fourth power source 34 is electrically connected with the third electrode of the carrier accelerator 63. The positive voltage terminal of the fourth power source 34 is electrically connected with the fourth electrode of the carrier accelerator 64. The negative voltage terminal of the fifth power source 35 is electrically connected with the fourth electrode of the carrier accelerator 64. The positive voltage terminal of the fifth power source 35 is electrically connected with the fifth electrode of the carrier accelerator 65.

An electrical field is applied by a positive voltage applied from the first power source 31 to the first electrode of the carrier accelerator 61 and a negative voltage applied to the carrier output material 1 from the first power source 31. By an effect of the electrical field formed in the direction from the first electrode of the carrier accelerator 61 to the carrier output material 1, electrons serving as carriers are injected into the channel forming material 2 of graphene from the carrier output material 1. The first electrode of the carrier accelerator 61 acts as the injection electrode. The injected electrons are accelerated in the accelerating channel 9 by a positive voltage applied to the first electrode of the carrier accelerator 61, the second electrode of the carrier accelerator 62, and the third electrode of the carrier accelerator 63. The second electrode of the carrier accelerator 62 and the third electrode of the carrier accelerator 63 act as the sliding electrodes by which electrons are accelerated and move on the surface of graphene. The lower portions of the fourth electrode of the carrier accelerator 64 and the fifth electrode of the carrier accelerator 65 are buried in the insulator 8, and voltages are applied to the electrodes from the power sources. Electrons move on the surface of the channel forming material 2 of graphene at high speed and acquire sufficiently large kinetic energy. High-speed electrons break away from the surface of the channel forming material 2 so as to be emitted into a vacuum. The fourth electrode of the carrier accelerator 64 acts as the emission electrode. In the emission, electrons penetrate a potential barrier serving as the irreversible process occurrence section 4 due to a quantum mechanical tunnel effect. The emitted electrons are accelerated by a positive voltage applied to the fifth electrode of the carrier accelerator 65. In other words, the fifth electrode of the carrier accelerator 65 acts as the accelerating electrode. As flying electrons are accelerated, the flying electrons have sufficiently large kinetic energy. The flying electrons overcome a repulsive force received from the electron absorption collector 26 in accordance with Coulomb's law, collide with the electron absorption collector 26, and are collected by the electron absorption collector 26. The electron absorption collector 26 is electrically connected with one terminal of the energy accumulator 15 as shown in FIG. 50. The energy accumulator, however, is not shown in FIG. 85. The electrons having reached the electron absorption collector 26 reach the one terminal of the energy accumulator 15. Positive holes remaining in the carrier output material 1 reach the other terminal of the energy accumulator 15. In the energy accumulator 15, positive holes and electrons form pairs and are accumulated. When one terminal of the electrical load 5 is electrically connected with the one terminal of the energy accumulator 15 while the other terminal of the electrical load 5 is electrically connected with the other terminal of the energy accumulator 15, positive holes and electrons that are accumulated in the energy accumulator 15 reach the electrical load 5, recombine therein, and both disappear. In the process, electrical energy is supplied to the electrical load 5.

In FIG. 85, materials having good thermal conductivity are used for the electron absorption collector 26. The electron absorption collector 26 is electrically connected to the substrate 19 while maintaining its good thermal conductivity. Insulating material, such as mica and silicon dioxide, having an extremely thin thickness is used for the substrate 19. Materials having good thermal conductivity are used for both the carrier output material 1 and the channel forming material 2. The carrier output material 1 and the channel forming material 2 are both connected with the substrate 19 while maintaining their good thermal conductivity. Flying electrons are accelerated and collide with the electron absorption collector 26, causing the temperature of the electron absorption collector 26 to increase. Thermal energy supplied to the electron absorption collector 26 is well conducted to the substrate 19. Thermal energy of the substrate 19 that becomes a high temperature state is conducted to the carrier output material 1 and the channel forming material 2 from the substrate 19, whereby the temperatures of the carrier output material 1 and the channel forming material 2 increase. Electrons emitted from a first power generation unit shown in the upper left part of FIG. 85 cause the temperatures of the carrier output material 1 and the channel forming material 2 of a second power generation unit shown in the upper right part of FIG. 85 to increase. Kinetic energy of electrons in the carrier output material 1 and the channel forming material 2 of the second power generation unit becomes large. In other words, energy is pre-supplied to the carrier output material 1 and the channel forming material 2 of the second power generation unit. Since kinetic energy of electrons in the carrier output material 1 and the channel forming material 2 of the second power generation unit becomes large, the number of electrons emitted from the channel forming material 2 increases.

The above-described thermal energy circulation is repeated from the first power generation unit to the second power generation unit, a third power generation unit, and a fourth power generation unit in order. As the circulation is repeated, the number of electrons emitted from each channel forming material 2 gradually increases. The optimum number of emitted electrons is determined by considering the device durability and power generation efficiency, for example. In order to determine the optimum number, a voltage value supplied from the external power source is controlled so as to achieve an optimum power generation output. In the above-described electrical field electron power generation device, emitted electrons are accelerated so as to increase their kinetic energy, and large kinetic energy causes the temperature of the electron absorption collector 26 to increase, whereby the number of electrons contributing to power generation increases. In other words, thermal energy generated by electron collision is utilized by being fed-back to power generation phenomenon, whereby power efficiency drastically increases and practicability increases. In the electrical field electron power generation device, electrical energy can be obtained by an electrical field effect on electrons with almost no other externally supplied energy. The electrical field electron power generation device, thus, can be regarded as a true power generation device different from related art energy converting devices.

Industrial Applicability

The present invention performs efficient power generation by utilizing an electrical field effect, solves environmental problems caused by burning fossil energy and also fossil energy depletion problems, and can stably supply energy necessary for the survival of humankind.

REFERENCE NUMERALS

1 carrier output material
2 channel forming material
3 carrier accelerator
4 irreversible process occurrence section
5 electrical load
8 insulator
9 accelerating channel
10 P-type semiconductor
11 N-type semiconductor
13 negative charge accumulation conductor
14 positive charge accumulation conductor
15 energy accumulator
16 positive charge input/output portion
17 negative charge input/output portion
19 substrate
20 potential barrier occurrence portions
22 emission
23 carrier surface movement
24 collector
25 suppressor
26 electron absorption collector
27 positive hole absorption collector
28 carrier absorption collector
30 power source
31 first power source
32 second power source
33 third power source
34 fourth power source
35 fifth power source
36 sixth power source
37 seventh power source
38 eighth power source 39 ninth power source
40 tenth power source
41 positive electrodes of the carrier accelerator
42 negative electrodes of the carrier accelerator
43 power source positive voltage terminal
44 power source negative voltage terminal
49 positive hole
50 electron
60 electrode of the carrier accelerator
61 first electrode of the carrier accelerator
62 second electrode of the carrier accelerator
63 third electrode of the carrier accelerator
64 fourth electrode of the carrier accelerator
65 fifth electrode of the carrier accelerator
66 sixth electrode of the carrier accelerator
67 seventh electrode of the carrier accelerator
68 eighth electrode of the carrier accelerator
69 ninth electrode of the carrier accelerator
70 tenth electrode of the carrier accelerator
71 carrier absorption graphene
72 carrier emission graphene
73 carrier absorption substrate
74 carrier emission substrate
75 sub-nanometer material
76 carbon-based material
80 secondary electron emission material
81 Coulomb force applied on the carriers
82 resultant vector
90 carrier path deflection power source
91 carrier path deflection positive electrode
92 carrier path deflection negative electrode
93 carrier path deflection N pole
94 carrier path deflection S pole
101 mode 1 start switch
102 mode 2 start switch
105 first stage emitter
106 second stage emitter
107 outward path carrier output material
108 homeward path carrier output material
111 first stage energy accumulator
112 second stage energy accumulator
113 third stage energy accumulator
115 mode 1 energy accumulator
116 mode 2 energy accumulator
120 mode 1 thermal conductor
121 mode 2 thermal conductor
123 outward path thermal conductor
124 homeward path thermal conductor
126 thermal energy supplier
127 first stage electron absorption collector
128 second stage electron absorption collector
129 third stage electron absorption collector
131 first stage carrier output material
132 second stage carrier output material
133 third stage carrier output material
211 first stage homeward path energy accumulator
212 second stage homeward path energy accumulator
213 outward path energy accumulator
214 homeward path energy accumulator
226 thermal energy supplier
227 first stage electron absorption collector
228 second stage electron absorption collector
229 outward path electron absorption collector
230 homeward path electron absorption collector
231 first homeward path power source
232 second homeward path power source
233 third homeward path power source
234 fourth homeward path power source
235 fifth homeward path power source
236 homeward path sixth power source
261 first electrode of the homeward path carrier accelerator
262 second electrode of the homeward path carrier accelerator
263 third electrode of the homeward path carrier accelerator
264 fourth electrode of the homeward path carrier accelerator
265 fifth electrode of the homeward path carrier accelerator
266 sixth electrode of the homeward path carrier accelerator
300 vacuum container
331 first stage homeward path carrier output material
332 second stage homeward path carrier output material
333 outward path carrier output material
334 homeward path carrier output material
335 outward path channel forming material
336 homeward path channel forming material
350 switch
351 switch

The invention claimed is:

1. A field effect power generation device comprising:
a carrier output material;
a channel forming material;
an electrode of a carrier accelerator;
an insulator;
an irreversible process occurrence section;
an accelerating channel;
an energy accumulator;
a carrier absorption collector; and
an electrical load, wherein
the carrier output material is electrically connected with the channel forming material, the insulator is disposed on a part of a surface of the channel forming material, the electrode of the carrier accelerator is disposed in the insulator, a part of the accelerating channel is formed on the surface of the channel forming material on which the insulator is provided, a carrier in the carrier output material is injected from the carrier output material into the channel forming material by an effect of an electrical field applied by the electrode of the carrier accelerator, and
energy is pre-supplied to the carrier by accelerating the carrier injected into the channel forming material in the accelerating channel by the effect of the electrical field applied by the electrode of the carrier accelerator, the carrier passes through the irreversible process occurrence section to be collected in the carrier absorption collector, the carrier absorbed in the carrier absorption collector is fed to one of input terminals of the energy accumulator, an anti-carrier remaining in the carrier output material is fed to the other of the input terminals of the energy accumulator, the carrier and the anti-carrier are accumulated in the energy accumulator in a pair, the energy accumulator is electrically connected to the electrical load, and electrical energy is supplied to the electrical load by moving the carrier and the anti-carrier to the electrical load.

2. The field effect power generation device according to claim 1, wherein the carrier accelerator includes a plurality of power sources and a plurality of electrodes, the accelerating channel is formed by electrically connecting the electrodes of the carrier accelerator with the power sources and disposing the electrodes of the carrier accelerator at a periphery of the channel forming material with an insulator interposed therebetween, the carrier is injected from the carrier output material to the channel forming material by the effect of the electrodes of the carrier accelerator in the accelerating channel, and energy is pre-supplied to the carrier by accelerating the injected carrier.

3. The field effect power generation device according to claim 1, wherein a P-type semiconductor and an N-type semiconductor are used as the carrier output material and an N-type semiconductor and a P-type semiconductor are used as the channel forming material.

4. The field effect power generation device according to claim 1, wherein the irreversible process occurrence section includes an insulator and a vacuum.

5. The field effect power generation device according to claim 1, wherein electrical energy is supplied to the electrical load by converting a part of kinetic energy of the electron accelerated by the effect of the carrier accelerator into electrical, electromagnetic, and thermal energy to be feedbacked to an electron to be emitted next so that a part of the energy is pre-supplied to the electron to be emitted next.

6. The field effect power generation device according to claim 5, wherein an electrical field is applied by using a part of the electrical and electromagnetic energy for feedbacking the energy, and a part of the energy is pre-supplied to the electron to be emitted next by an effect of the applied electrical field.

7. The field effect power generation device according to claim 5, wherein a magnetic field is applied by using a part of the electrical and electromagnetic energy for feedbacking the energy, and a part of the energy is pre-supplied to the electron to be emitted next by the effect of the applied magnetic field.

8. A field effect power generation device comprising:
a carrier output material;
a channel forming material;
a carrier accelerator;
an irreversible process occurrence section;
an accelerating channel;
an energy accumulator;
a carrier absorption collector; and
an electrical load, wherein
the carrier accelerator acts on an electron in the carrier output material to make the electron penetrate the irreversible process occurrence section so that the electron is injected from the carrier output material to the channel forming material, the electron injected into the channel forming material is moved to the accelerating channel, energy is pre-supplied to the electron by accelerating the electron in the accelerating channel by an effect of the carrier accelerator to make the electron penetrate the irreversible process occurrence section so that the electron is emitted into a vacuum, the emitted electron is collected in the electron absorption collector, the electron collected in the electron absorption collector is fed to one of input terminals of the energy accumulator, a positive hole remaining in the carrier output material is fed to the other of the input terminals of the energy accumulator, the electron and the positive hole are accumulated in the energy accumulator in a pair, the energy accumulator is electrically connected to the electrical load, and electrical energy is supplied to the electrical load by supplying the electron and the positive hole to the electrical load.

9. The field effect power generation device according to claim 8, further comprising a suppressor disposed at a periphery of the carrier absorption collector.

10. The field effect power generation device according to claim 8, wherein the number of output electrons is increased by irradiating the carrier output material and the channel forming material with electromagnetic waves, electrons and photons that have the wave-like nature according to quantum mechanics.

11. The field effect power generation device according to claim 8, wherein a secondary electron emission material is provided entirely or partially on the surface of the channel forming material.

12. The field effect power generation device according to claim 8, further comprising a deflection electrode and a deflection pole that deflect a path of the emitted electrode.

13. The field effect power generation device according to claim 8, further comprising a thermal conductor, wherein energy is pre-supplied to the electron by supplying thermal energy generated in the electron absorption collector to the carrier output material and the channel forming material through the thermal conductor.

14. The field effect power generation device according to claim 8, wherein the channel forming material is a carbon-based material, and a sub-nanometer material is disposed on the surface of the carbon-based material.

15. The field effect power generation device according to claim 8, wherein an output voltage is controlled by controlling voltage of a power source for the carrier accelerator.

16. The field effect power generation device according to claim 8, wherein electrical energy is supplied to the electrical load by converting a part of kinetic energy of the electron accelerated by the effect of the carrier accelerator into electrical, electromagnetic, and thermal energy to be feedbacked to an electron to be emitted next so that a part of the energy is pre-supplied to the electron to be emitted next.

* * * * *